(12) United States Patent
Kanda et al.

(10) Patent No.: US 9,847,913 B2
(45) Date of Patent: Dec. 19, 2017

(54) SYSTEM AND METHOD FOR GATHERING INFORMATION

(71) Applicant: FUJITSU LIMITED, Kawasaki-shi, Kanagawa (JP)

(72) Inventors: Hisashi Kanda, Kawasaki (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 314 days.

(21) Appl. No.: 14/719,360

(22) Filed: May 22, 2015

(65) Prior Publication Data
US 2015/0358219 A1 Dec. 10, 2015

(30) Foreign Application Priority Data
Jun. 9, 2014 (JP) ................ 2014-118467

(51) Int. Cl.
 *G06F 15/173* (2006.01)
 *H04L 12/24* (2006.01)
 *H04L 12/26* (2006.01)

(52) U.S. Cl.
 CPC ...... *H04L 41/0896* (2013.01); *H04L 43/0817* (2013.01)

(58) Field of Classification Search
 CPC ........ G06F 9/522; G06F 15/16; G06F 21/554; H04L 41/0893; H04L 43/045; H04L 43/10; H04L 45/16; H04L 51/06; H04L 67/125; H04Q 9/00
 See application file for complete search history.

(56) References Cited

U.S. PATENT DOCUMENTS

| | | | |
|---|---|---|---|
| 9,135,208 B1* | 9/2015 | Huang | G06F 15/16 |
| 2005/0071457 A1* | 3/2005 | Yang-Huffman | H04L 41/0893 709/224 |
| 2005/0152285 A1* | 7/2005 | Shimizu | H04Q 9/00 370/254 |
| 2008/0109569 A1* | 5/2008 | Leonard | G06F 15/16 710/22 |
| 2009/0003357 A1* | 1/2009 | Ushiyama | H04L 45/16 370/400 |
| 2010/0287366 A1* | 11/2010 | Araki | G06F 21/554 713/150 |
| 2011/0270966 A1* | 11/2011 | Zhou | H04L 43/045 709/224 |

(Continued)

FOREIGN PATENT DOCUMENTS

JP 9-298543 11/1997

OTHER PUBLICATIONS

A. Gara, et al, "Overview of the Blue Gene/L system architecture", IBM Journal of Research and Development vol. 49 No. 213, Mar./May 2005, pp. 195-212 (18 pages).

(Continued)

*Primary Examiner* — Dustin Nguyen
(74) *Attorney, Agent, or Firm* — Fujitsu Patent Center

(57) ABSTRACT

An information gathering system includes: an ID gathering mechanism, provided at a transmitter side node, that generates a collective identifier from one or a plurality of individual identifiers of respective management targets, each of the individual identifiers being generated according to a state of a corresponding management target; and an ID analysis mechanism, provided at a receiver side node, that restores an individual identifier from the collective identifier and specifies a management target based on the restored individual identifier.

13 Claims, 69 Drawing Sheets

(56) References Cited

U.S. PATENT DOCUMENTS

| | | | | |
|---|---|---|---|---|
| 2012/0026890 A1* | 2/2012 | Banka | ............... | H04L 67/125 370/242 |
| 2013/0232255 A1* | 9/2013 | Fukui | ............... | H04L 43/10 709/224 |
| 2014/0033209 A1* | 1/2014 | Lih | ............... | G06F 9/522 718/101 |
| 2014/0359035 A1* | 12/2014 | Wang | ............... | H04L 51/06 709/206 |

OTHER PUBLICATIONS

Hiroaki Ishihata, "Development of a high-function, high-performance system interconnect technology", Dec. 20, 2006, pp. 1-13, Internet (URL: http://ngarch.isit.or.jp/psi/images/event/hiroaki_ishihata_20061220.pdf), partial English translation (14 pages).

Toshiyuki Shimizu, "Development of a high-function switch that supports collective communication", Feb. 18, 2008, pp. 1-14, Internet (URL: http://ngarch.isit.or.jp/psi/images/event/toshiyuki_shimizu_20080218.pdf), partial English translation (16 pages).

Yuichiro Ajima, et al. "Tofu: A 6d Mesh/Torus Interconnect for Exascale Computers", IEEE Computer Society, vol. 42, No. 11 (2009), pp. 36-40 (5 pages).

Yuichiro Ajima, et al. "The Tofu Interconnect", 2011 19th Annual IEEE Symposium on High Performance Interconnects, vol. 32, Issue 1 (2011), pp. 87-94 (8 pages).

Henry S. Warren, "Hacker's Delight (2nd Edition)", Sep. 14, 2012, partial English translation (46 pages).

Donald E. Knuth, "The Art of Computer Programming", Second Edition, vol. 2/Seminumerical Algorithms, 1981 (46 pages).

Peter W. Shor, "Polynomial-Time Algorithms for Prime Factorization and Discrete Logarithms on a Quantum Computer", SIAM Journal on Computing vol. 26, Issue 5, Jan. 25, 1996, pp. 1-28 (28 pages).

* cited by examiner

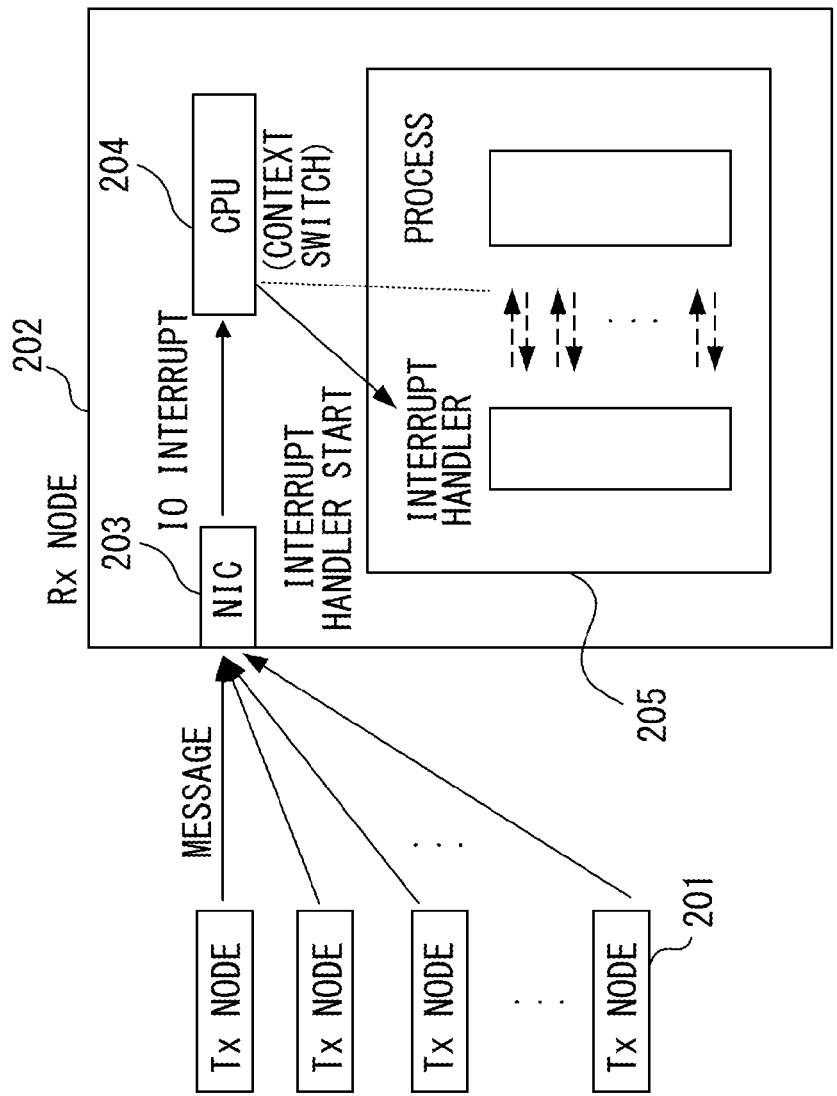
F I G. 2 A 0000 0000 0000 0100 0000 0000 0000 .... 0000 0000 0000 .... 0001 0000 0000 0000 .... 0000 0000 0000 .... 0000 0000 0000

F I G. 3

ID OF TARGET AND 1-BIT INFORMATION ABOUT TARGET

ID GATHERING MECHANISM — 401

ID ENCODING MECHANISM — 403

ENCODED "INDIVIDUAL ID" OF MANAGEMENT TARGET
OR
IDENTITY ELEMENT OF OPERATION USED FOR REDUCTION

REDUCTION (COMMUNICATION+OPERATION) — 404

COLLECTIVE ID

ID ANALYSIS MECHANISM (OPERATES ON Rx NODE) — 402

| PROCESS FOR RESTORING INDIVIDUAL ID OF GENERATION-FACTOR FROM COLLECTIVE ID |
| PROCESS FOR RESTORING TARGET NUMBER FROM INDIVIDUAL ID |

F I G. 4

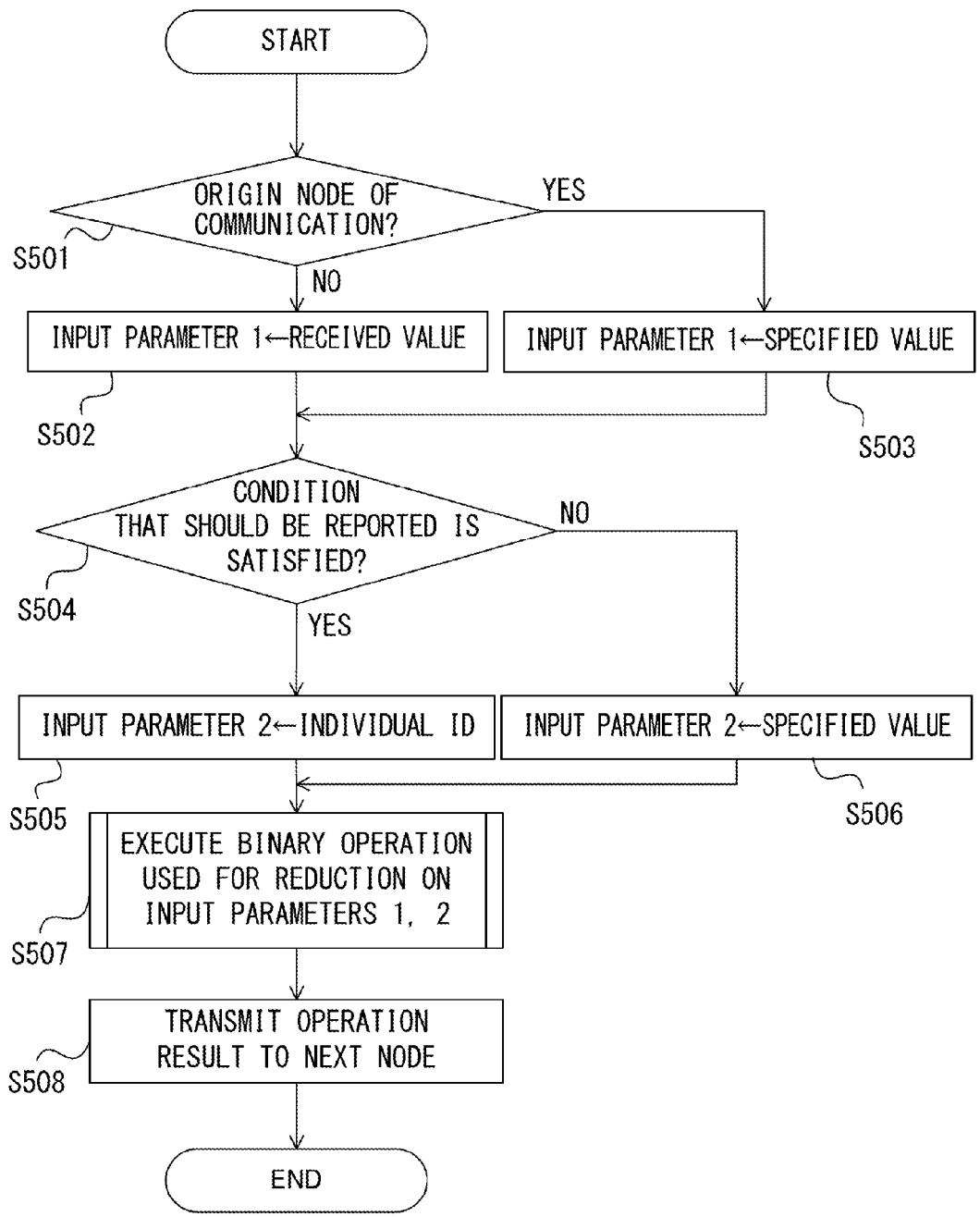
F I G. 5

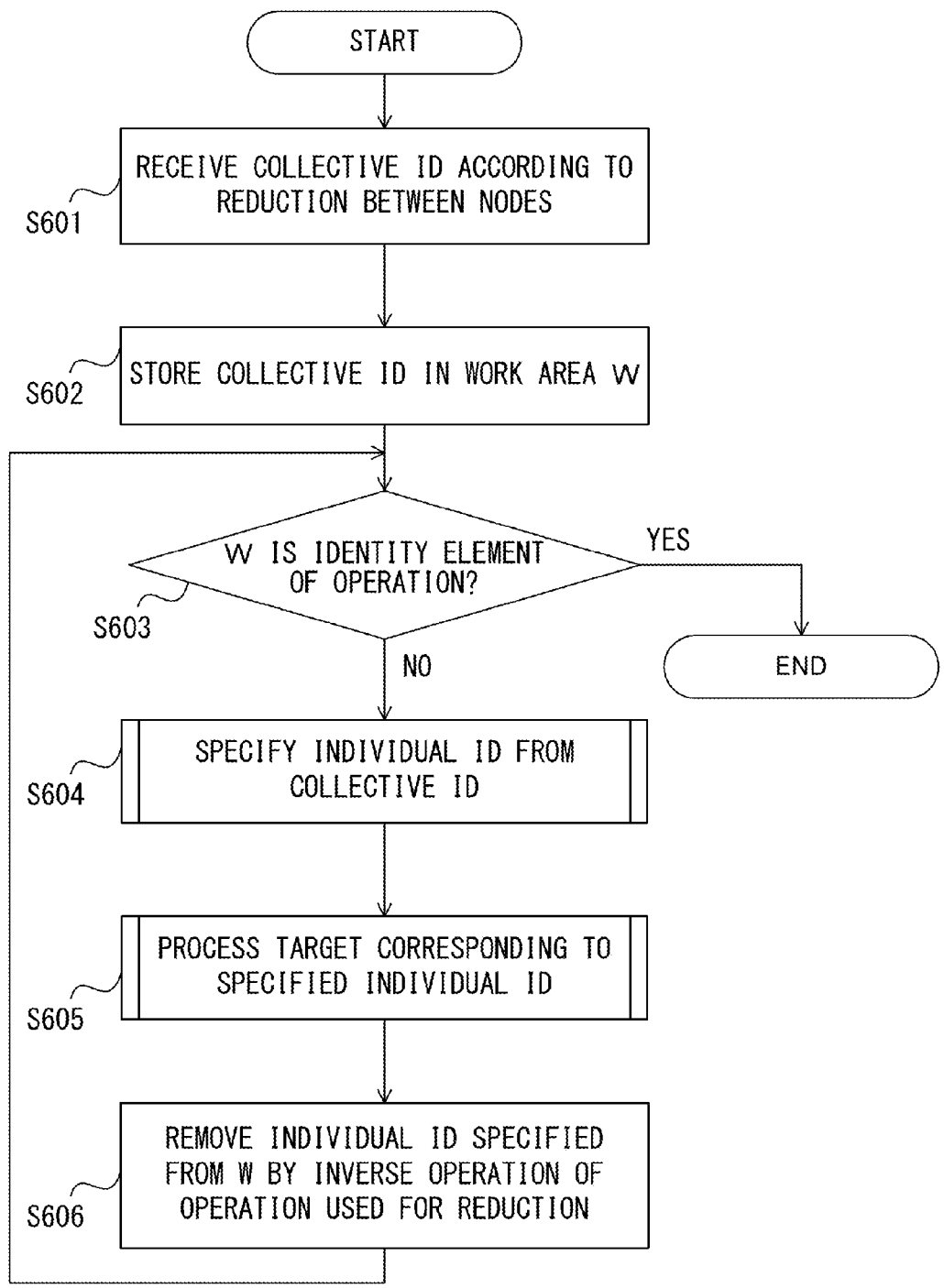
F I G. 6

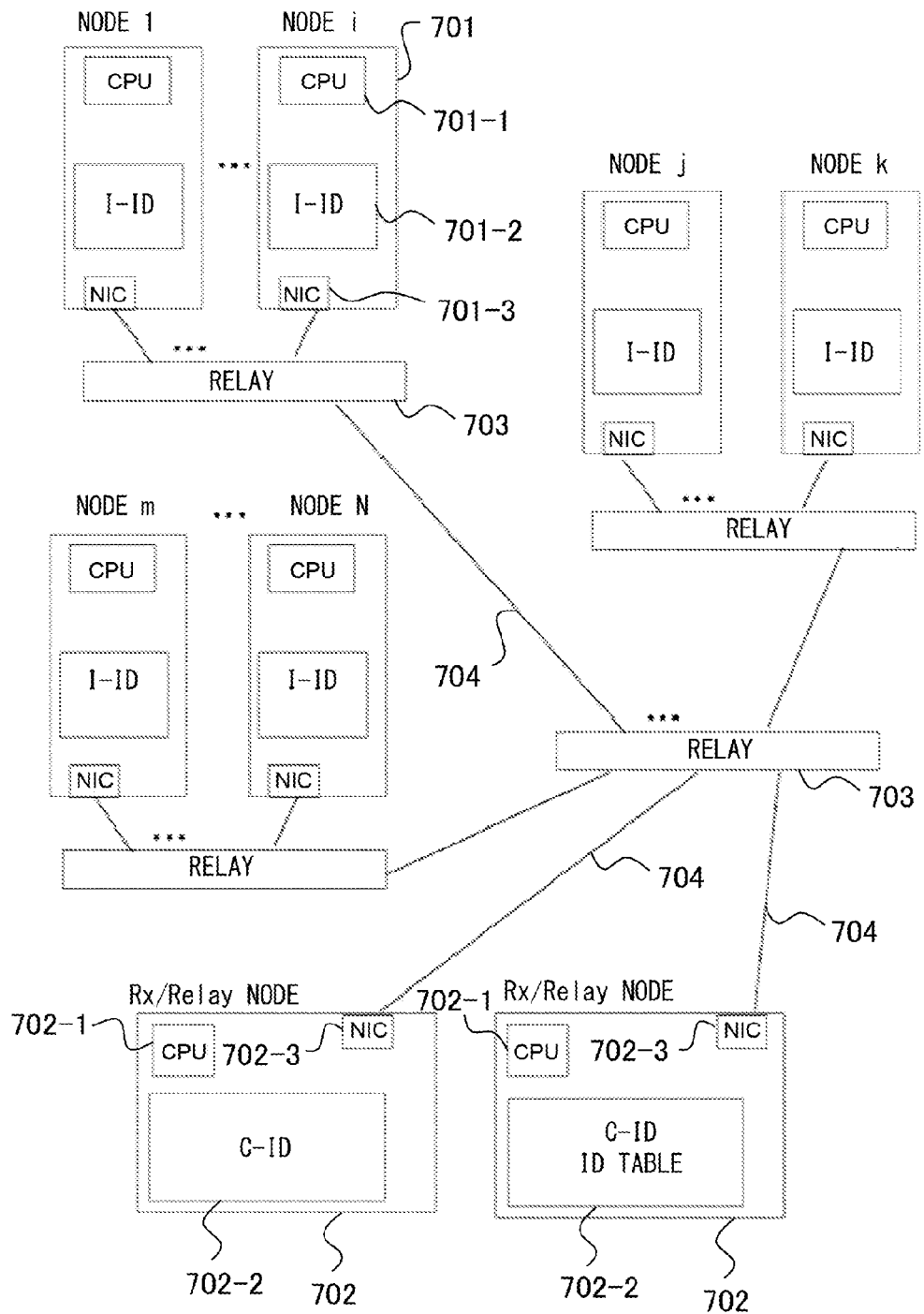
F I G. 7

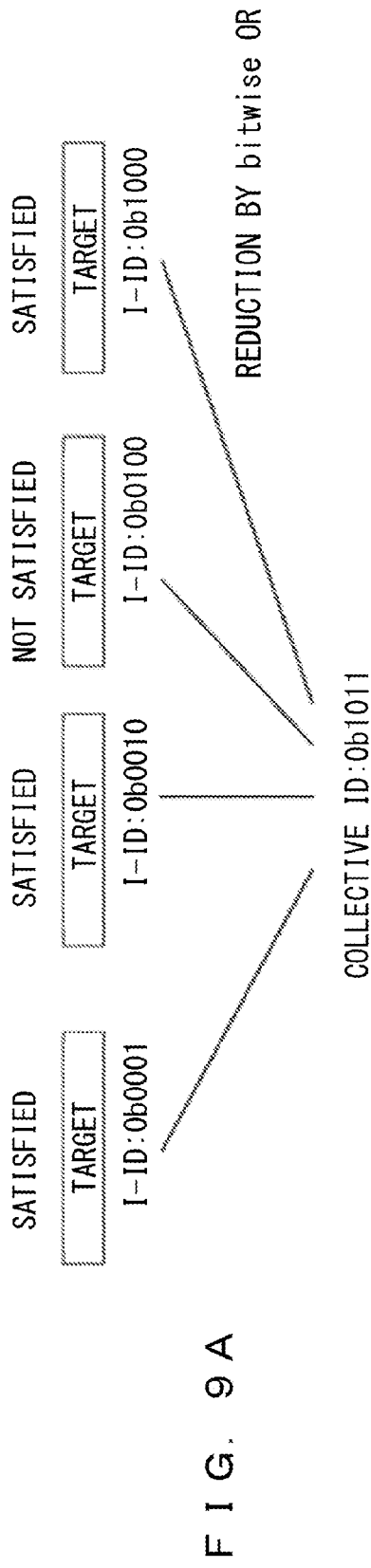
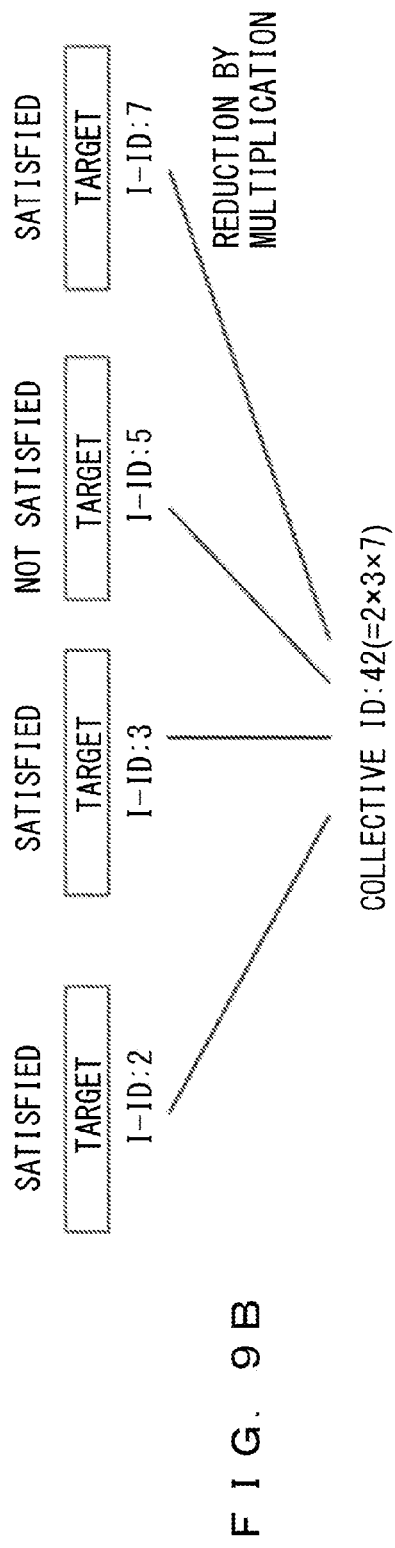

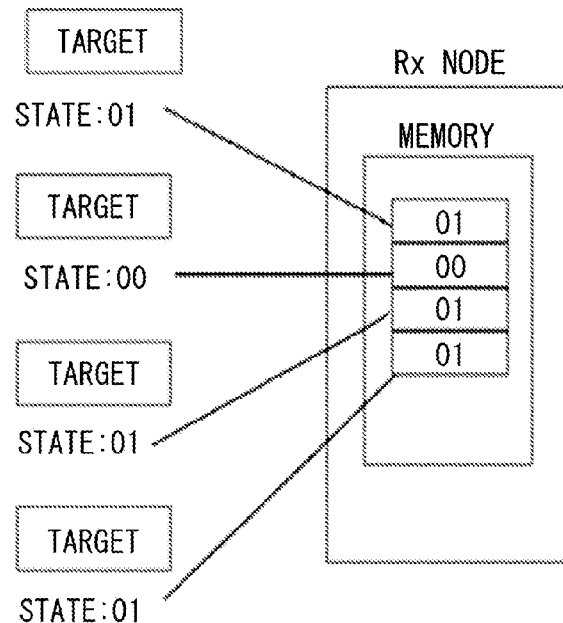
F I G. 1 0 A
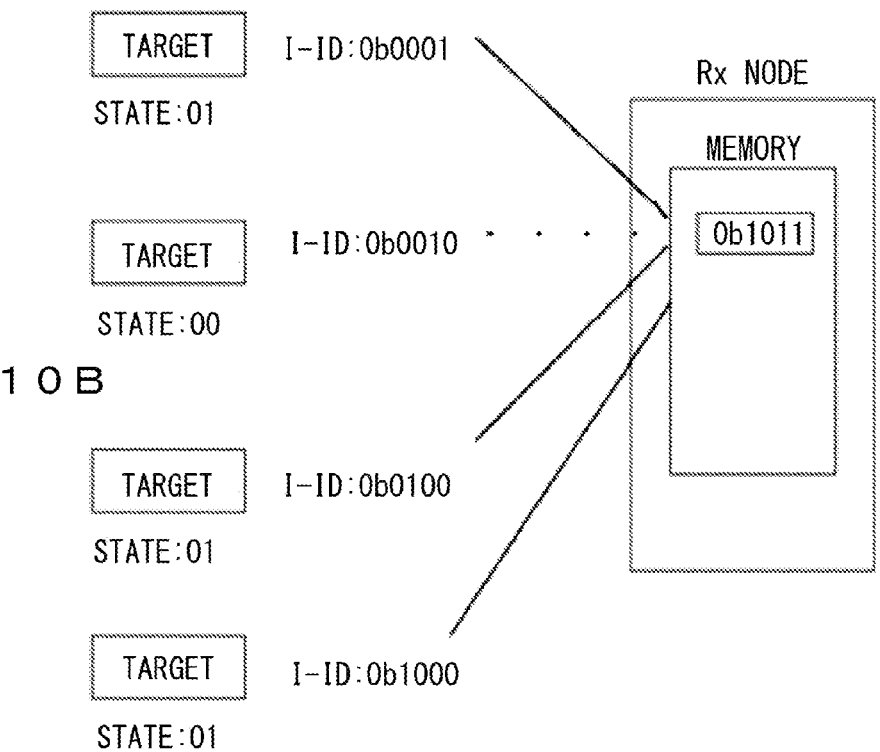
F I G. 1 0 B

WHEN RESOLUTION OF COLLECTIVE ID IS PERFECT

WHEN RESOLUTION OF COLLECTIVE ID HAS UPPER LIMIT

WHEN RESOLUTION OF COLLECTIVE ID IS PERFECT
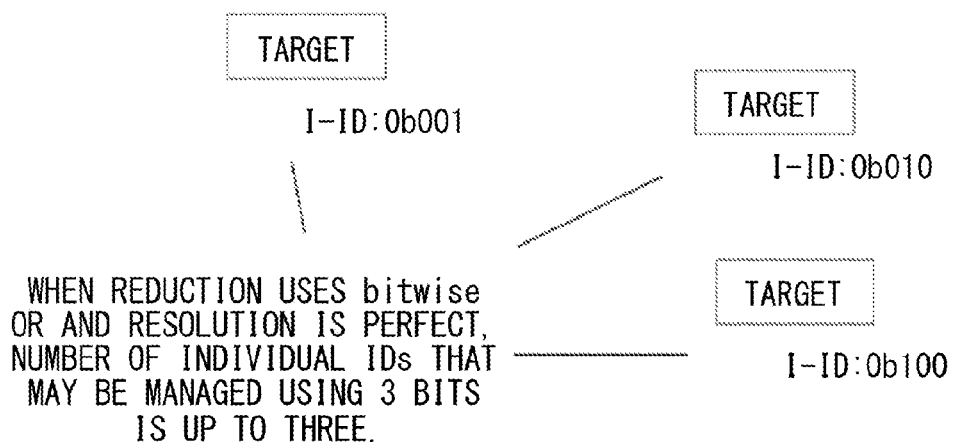
F I G. 1 2 A
WHEN RESOLUTION OF COLLECTIVE ID HAS UPPER LIMIT
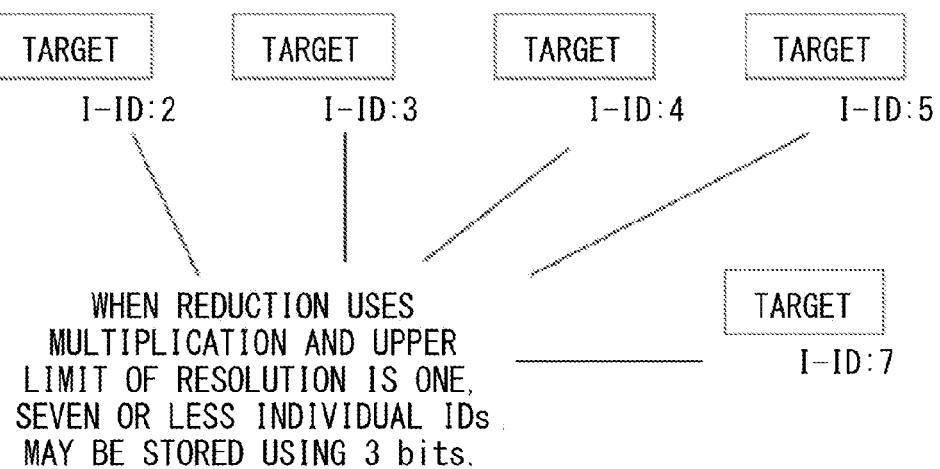
F I G. 1 2 B

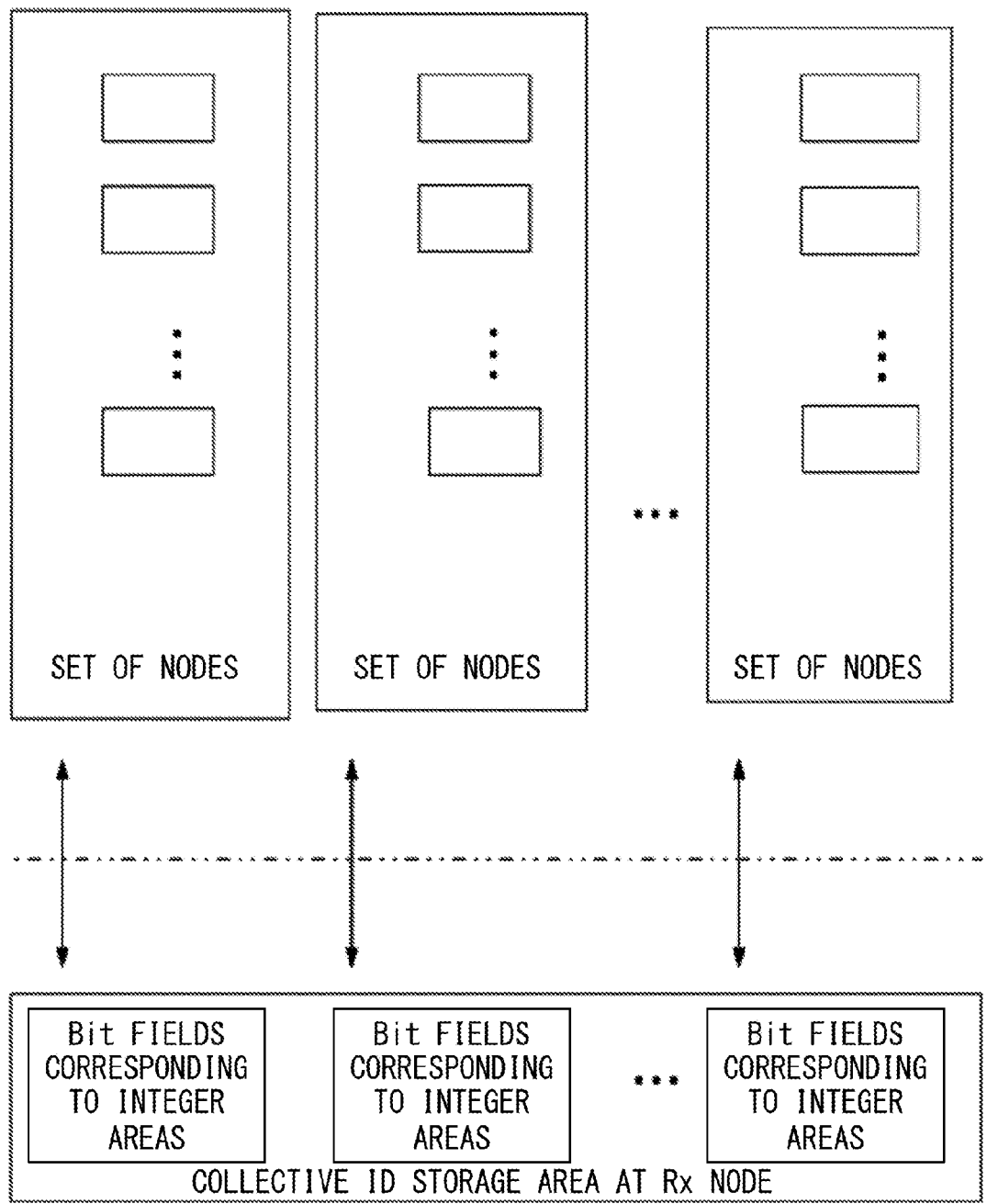
F I G. 1 3

FIG. 15A

| 2 | 3 | 5 | 7 | 11 | 13 | 17 | ... |

FIG. 15B

| 5 | 7 | 11 | 13 | 17 | 19 | 23 | ... |

FIG. 15C

| 2 | 3 | 4 | 5 | 7 | 9 | 11 | ... |

FIG. 15D

| 3 | 5 | 7 | 9 | 11 | 13 | 17 | ... |

FIG. 15E

| NUMBER | 1 | 2 | 3 | 4 | 5 | 6 | 7 | ... | 17 | ... |
|---|---|---|---|---|---|---|---|---|---|---|
| FIRST COMPONENT | 2 | 5 | 1 | 1 | 11 | 1 | 1 | ... | 1 | ... |
| SECOND COMPONENT | 1 | 1 | 3 | 5 | 1 | 9 | 1 | ... | 1 | ... |
| ... | | | | | | | | | | |
| s-th COMPONENT | 1 | 1 | 1 | 1 | 1 | 1 | 1 | ... | 1 | ... |

FIG. 15F

| NUMBER | 1 | 3 | 4 | 8 | 10 | 11 | ... | 17 | ... |
|---|---|---|---|---|---|---|---|---|---|
| FIRST COMPONENT | 2 | 1 | 5 | 1 | 1 | 1 | ... | 1 | ... |
| SECOND COMPONENT | 1 | 3 | 1 | 11 | 1 | 1 | ... | 1 | ... |
| ... | | | | | | | | | |
| s-th COMPONENT | 1 | 1 | 1 | 1 | 9 | 1 | ... | 1 | ... |

FIG. 15G

| NUMBER | 1 | 3 | 4 | 5 | 6 | 7 | ... |
|---|---|---|---|---|---|---|---|
| REAL PART | 1 | 1 | 1 | 2 | 2 | 1 | ... |
| IMAGINARY PART | -1 | 2 | -2 | 1 | -1 | 4 | ... |

FIG. 15H

| NUMBER | 1 | 2 | 3 | 4 | 5 | 6 | 7 | ... |
|---|---|---|---|---|---|---|---|---|
| COEFFICIENT OF 1 | 2 | 1 | 1 | 2 | 1 | 2 | 5 | ... |
| COEFFICIENT OF $\omega$ | 0 | -1 | 2 | 3 | -1 | 5 | 0 | ... |

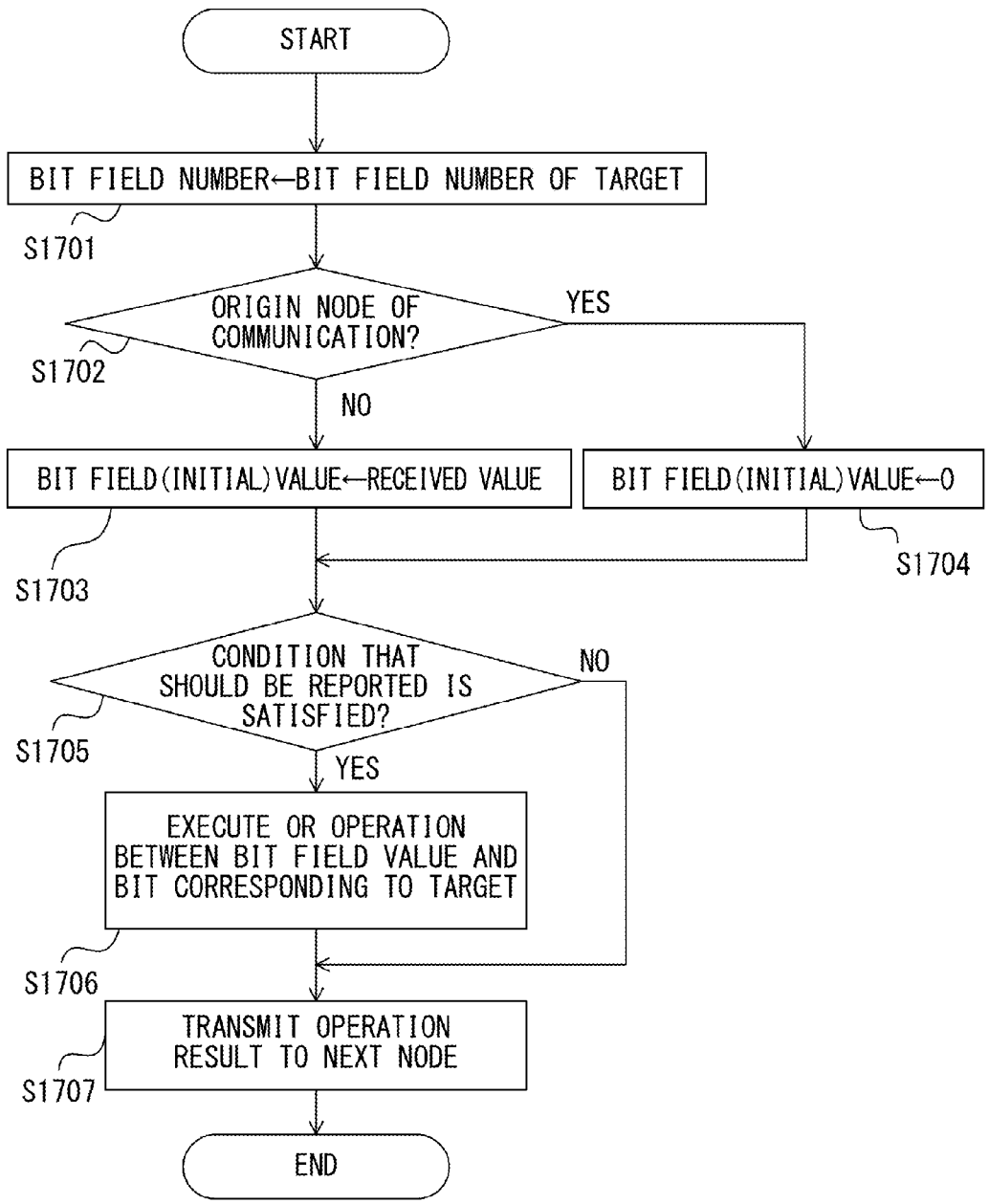
F I G. 1 7

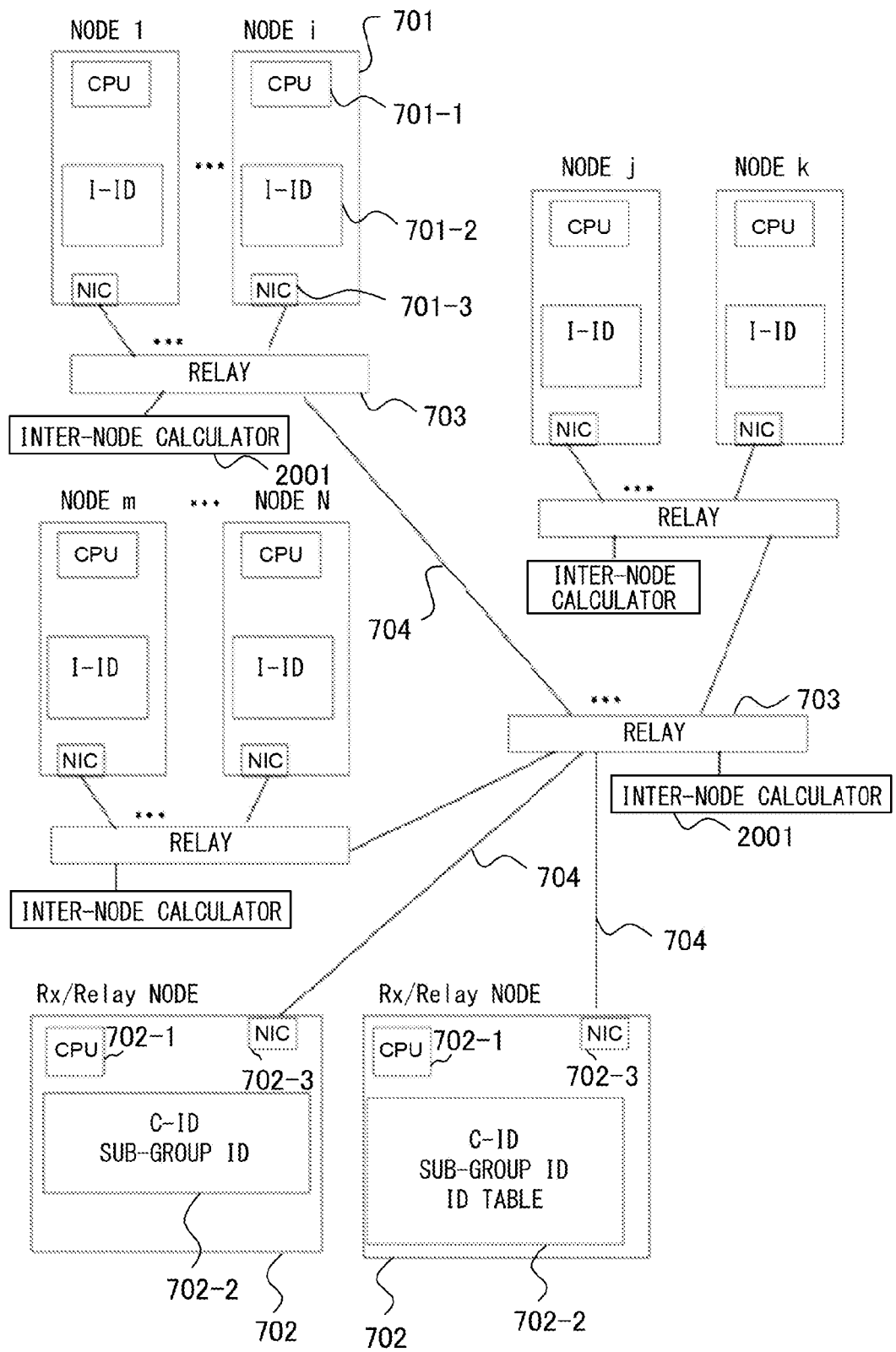
F I G. 20

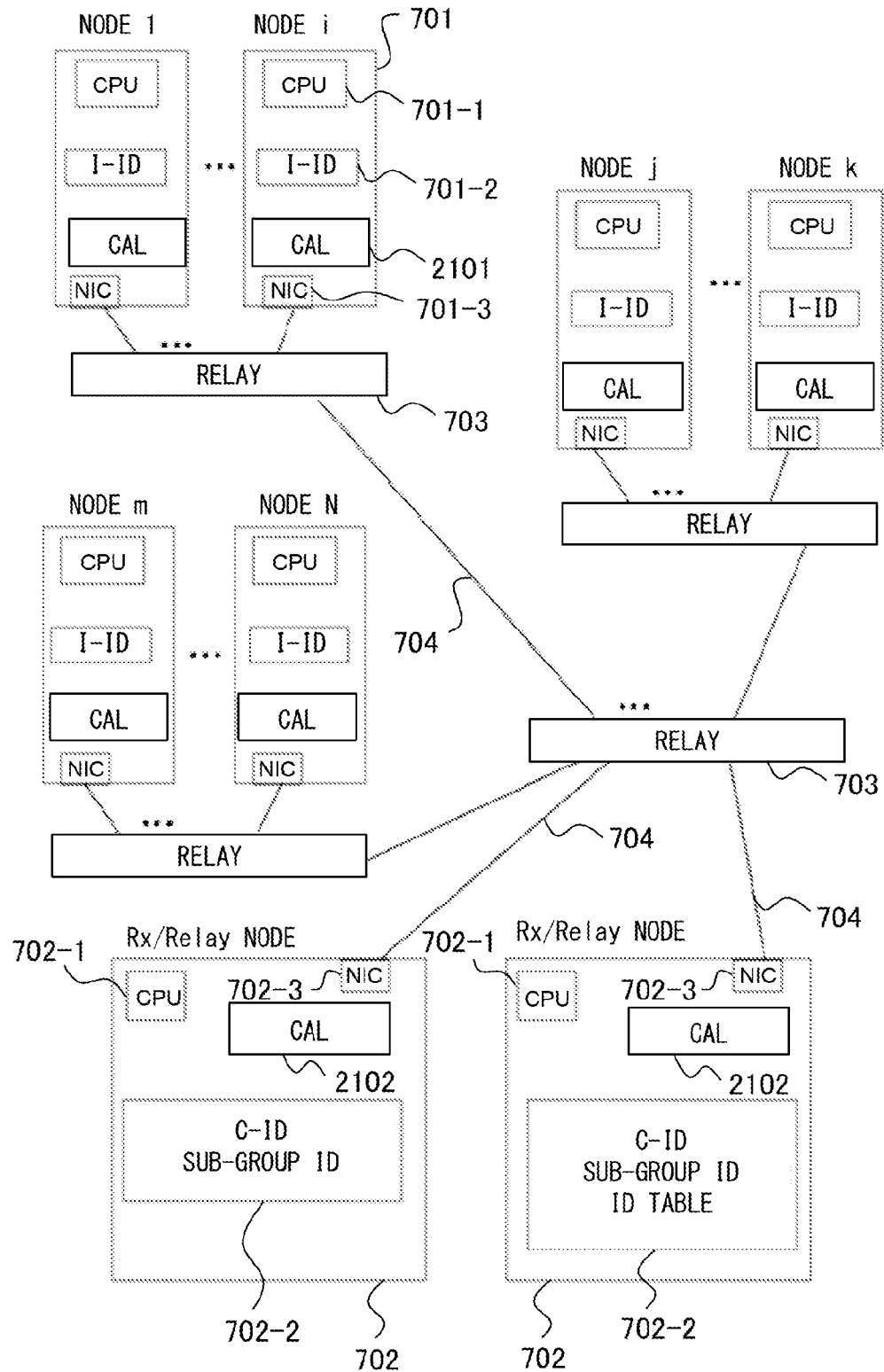
F I G. 2 1

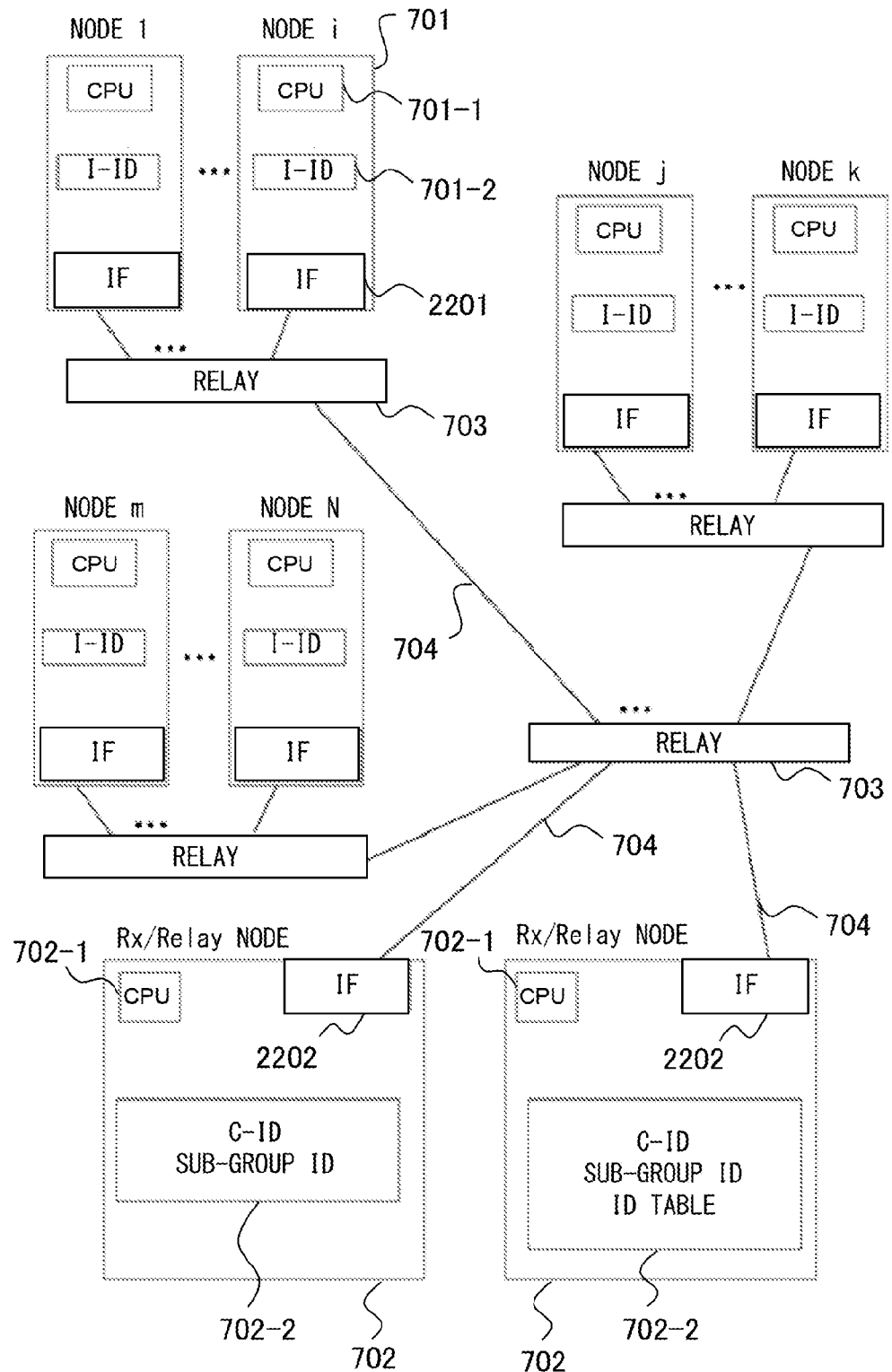
F I G. 2 2

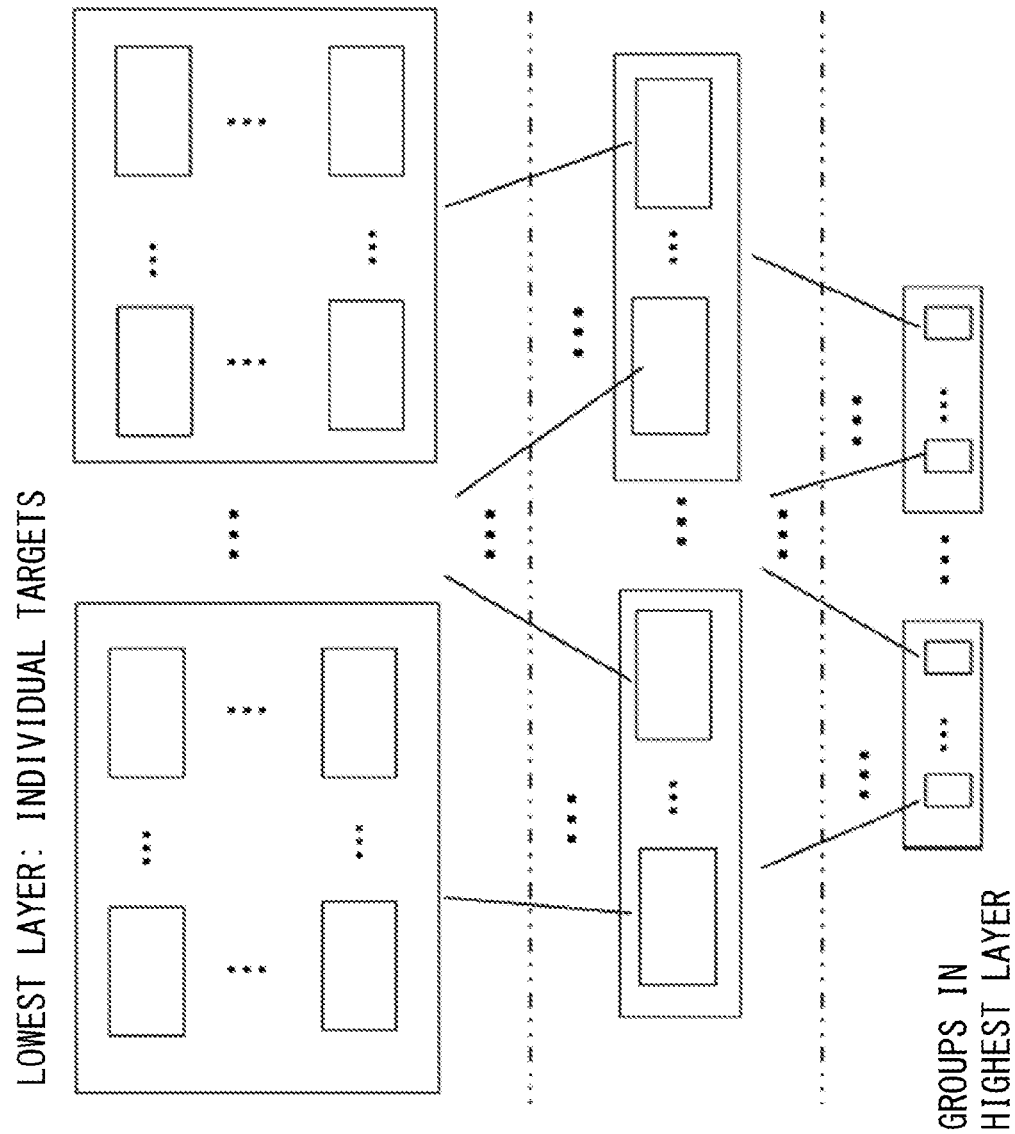

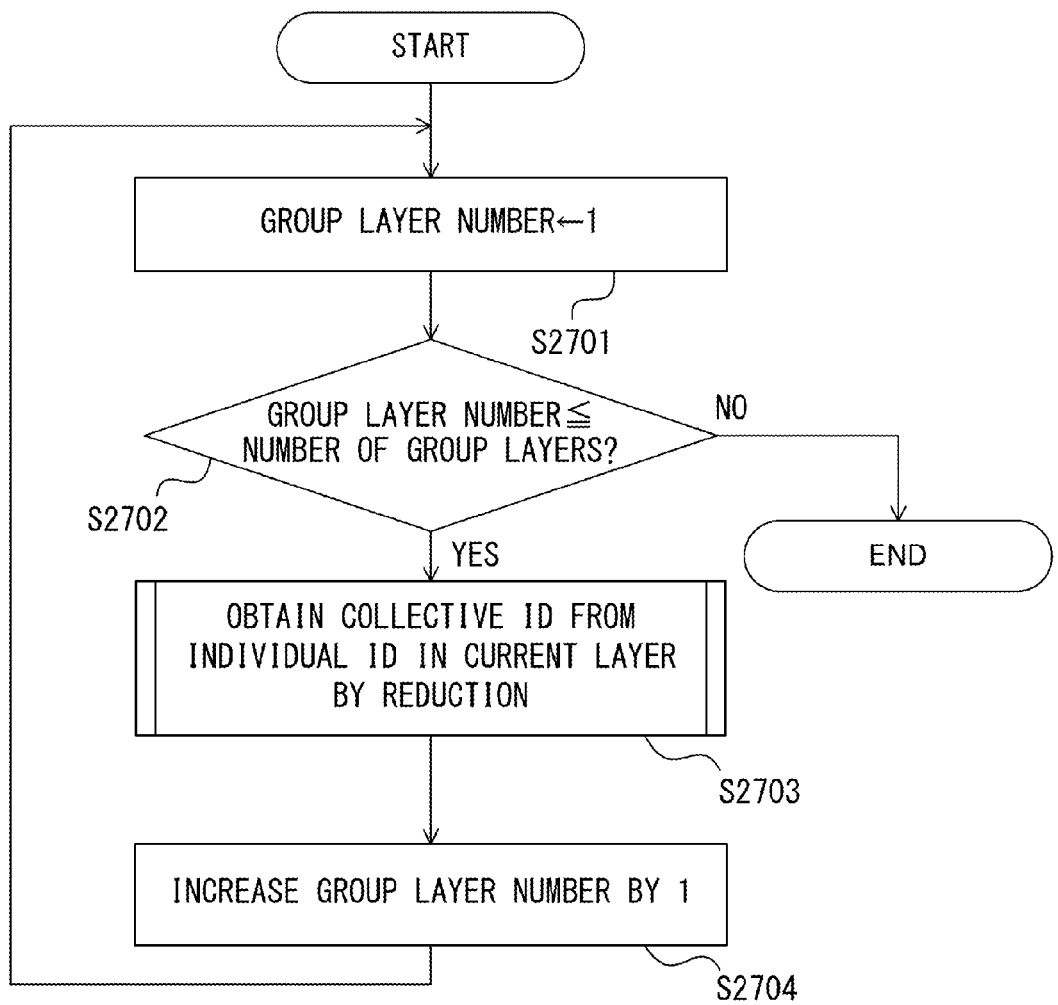
F I G. 27

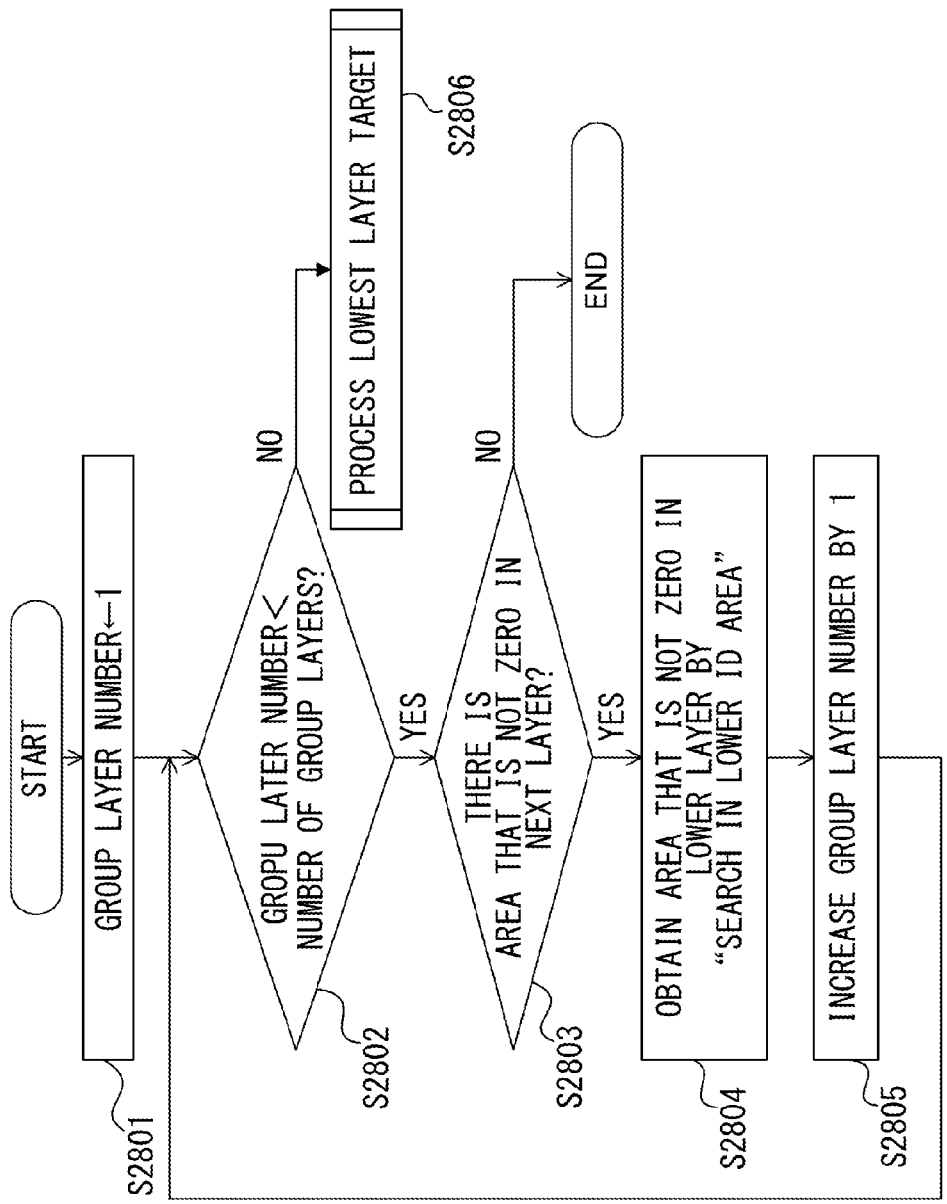
F I G. 28

| p_in_b | 0 | 1 | 2 | 3 | NUMBER OF PRIME NUMBERS p THAT APPEAR IN b |
|---|---|---|---|---|---|
| a1 | no | yes | no | yes | WHETHER a1 HAS BEEN USED IN CALCULATION PROCESS OF b |
| a2 | no | no | yes | yes | WHETHER a2 HAS BEEN USED IN CALCULATION PROCESS OF b |

F I G. 3 2

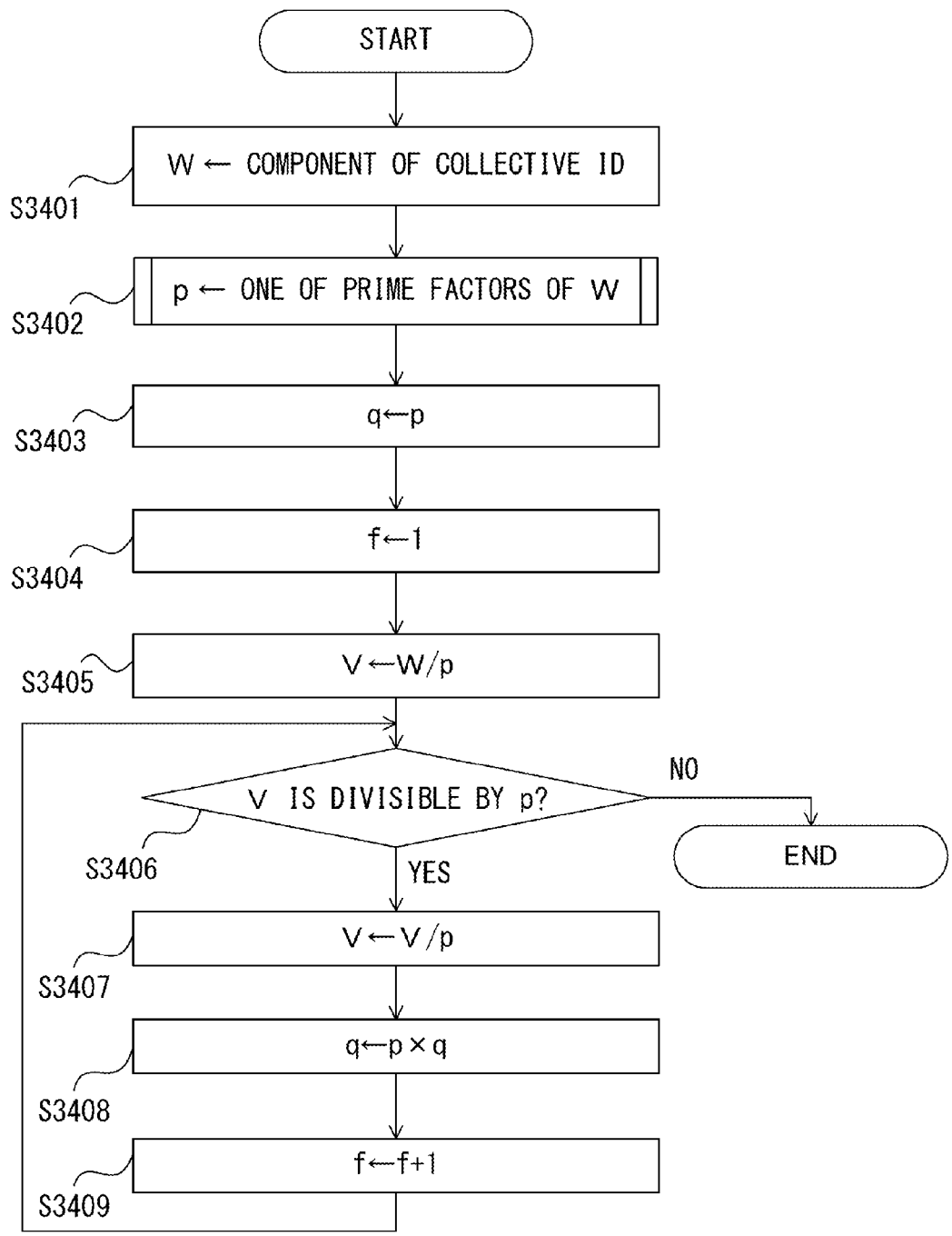
F I G. 3 4

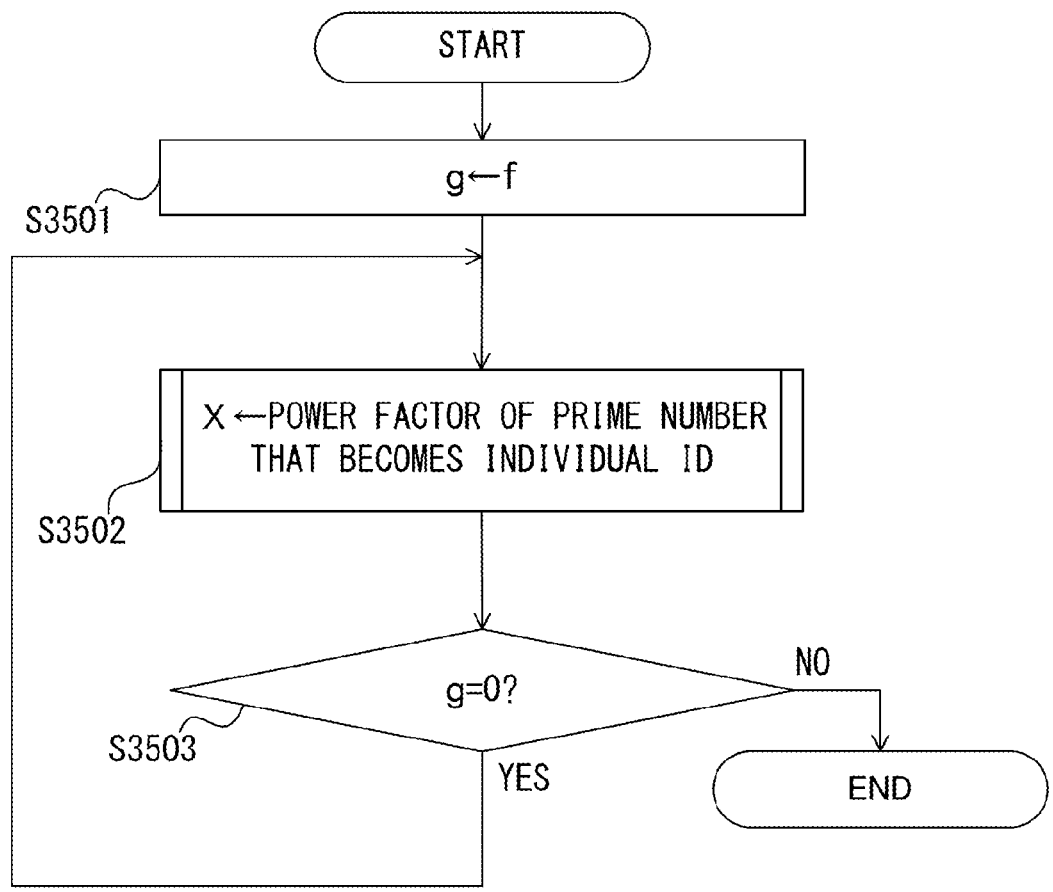
F I G. 3 5

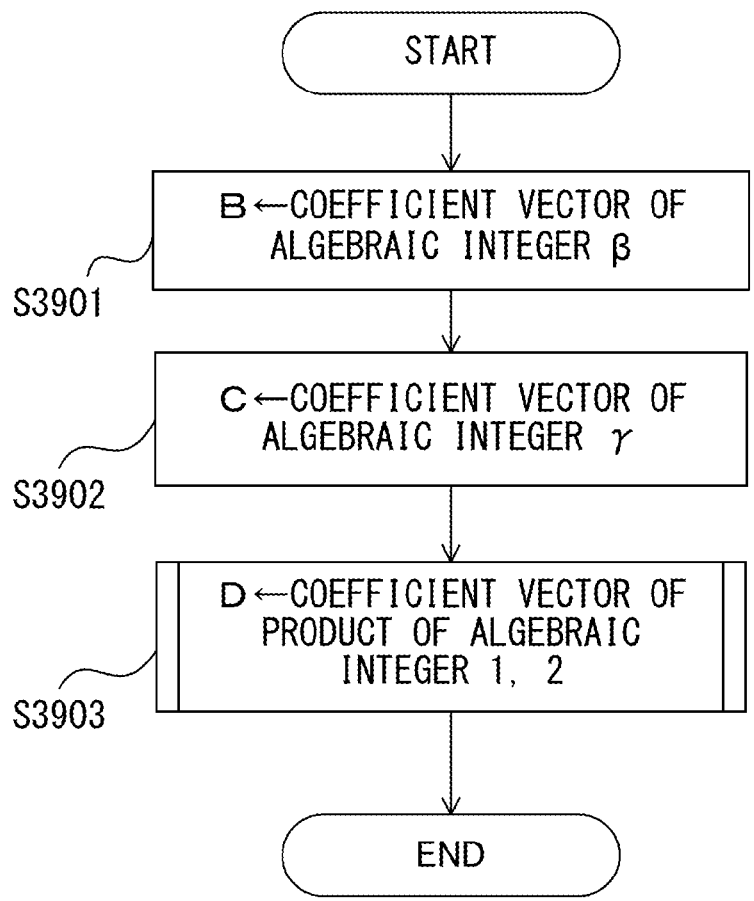
F I G. 3 9

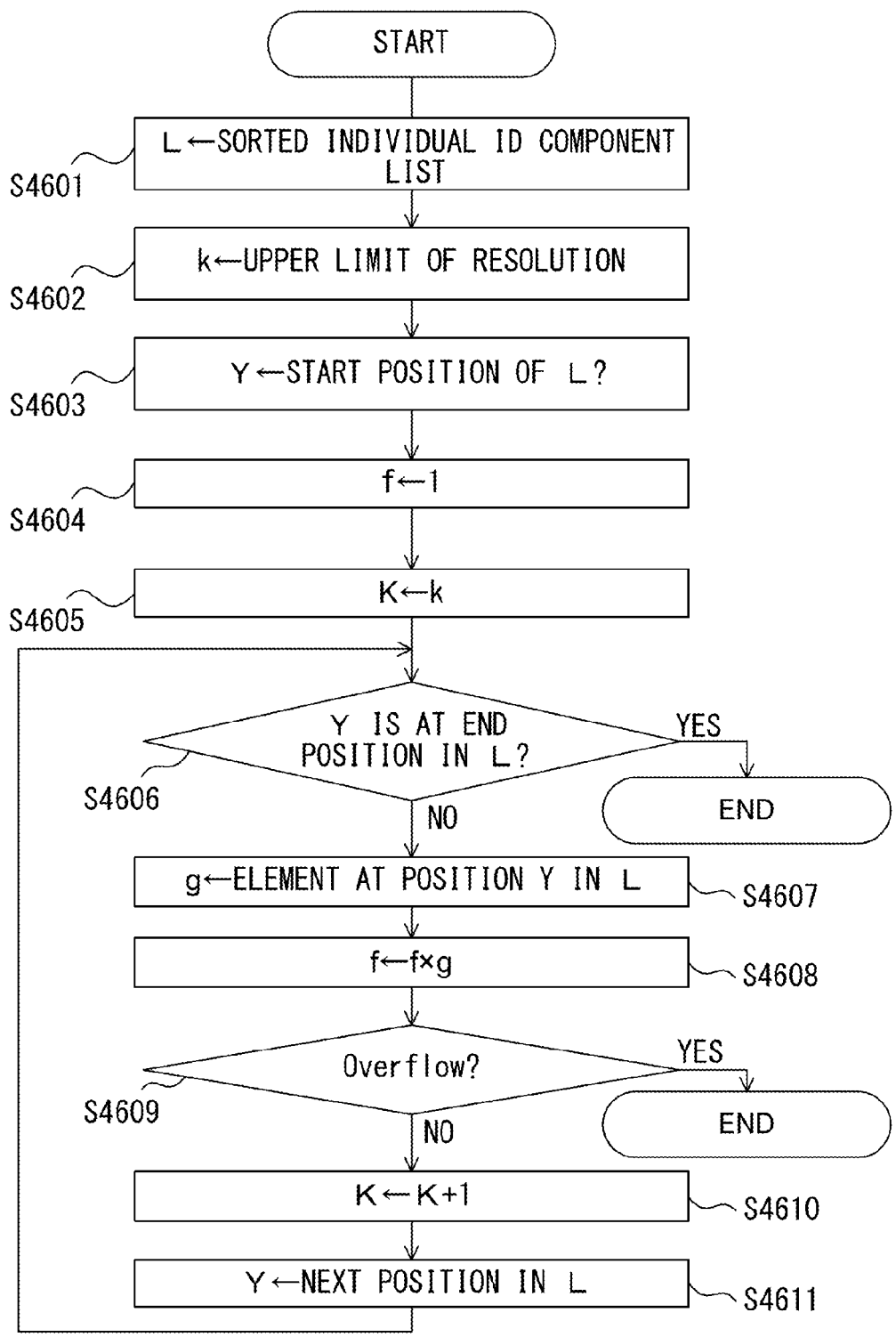
F I G. 46

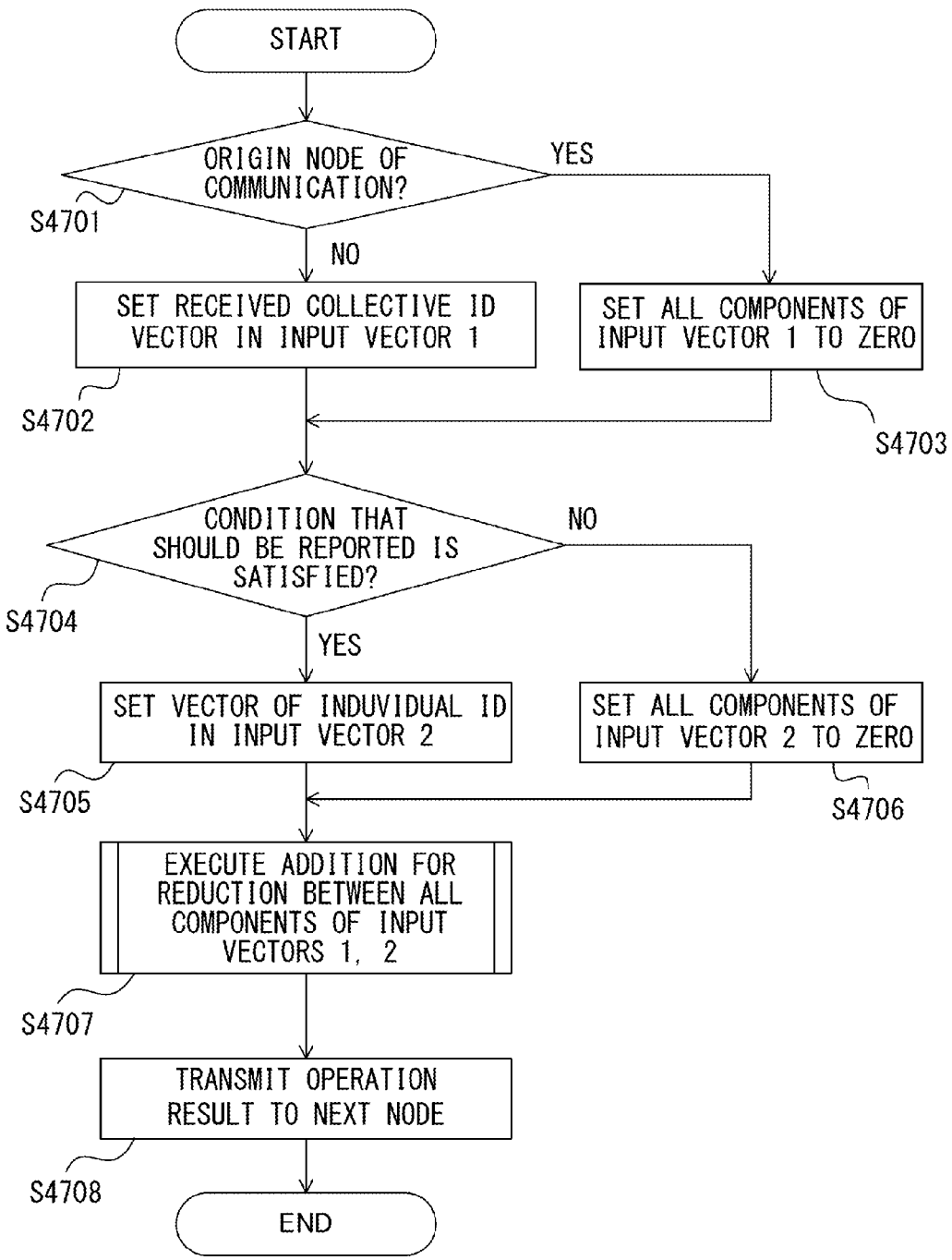
F I G. 4 7

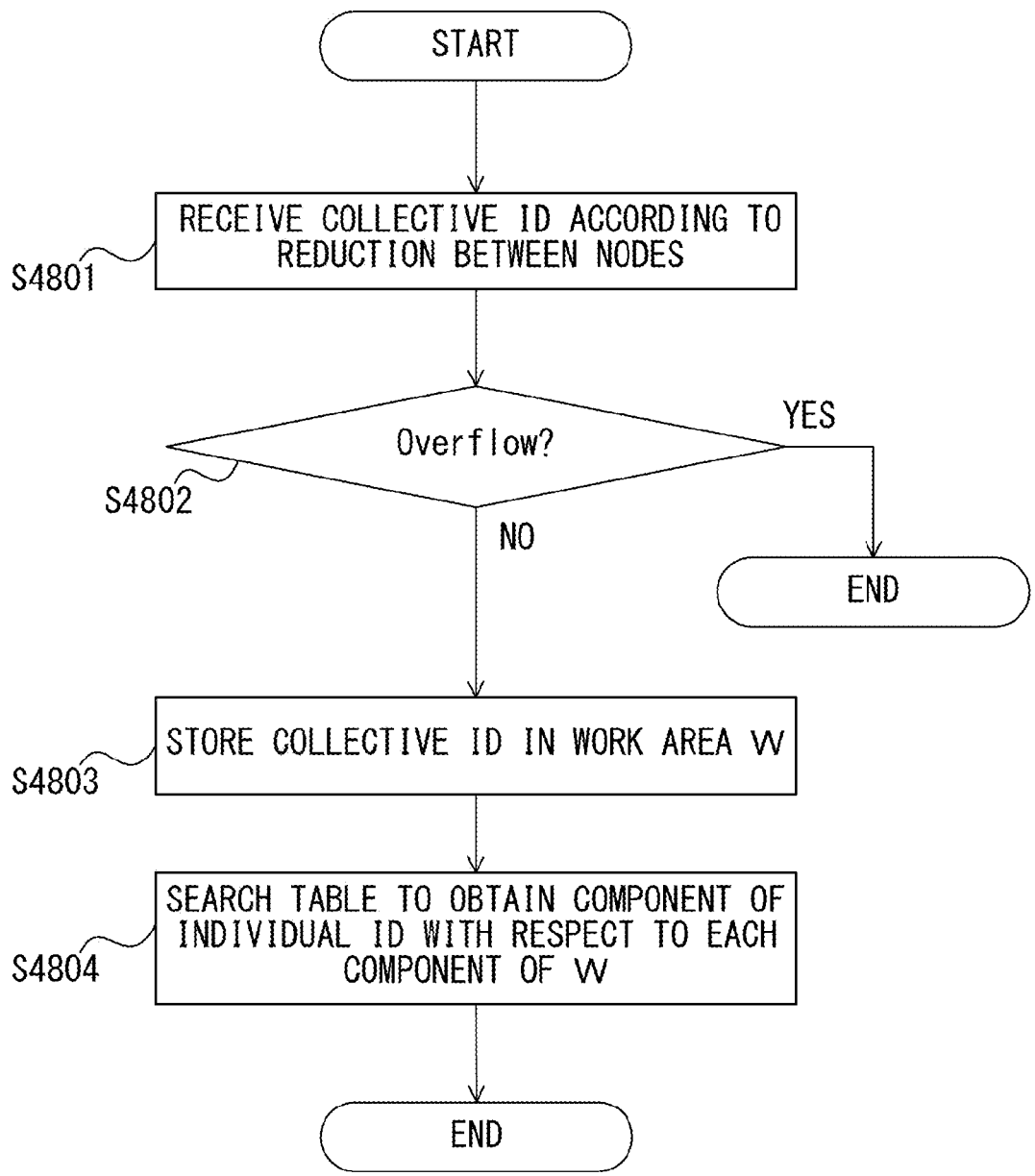
F I G. 48

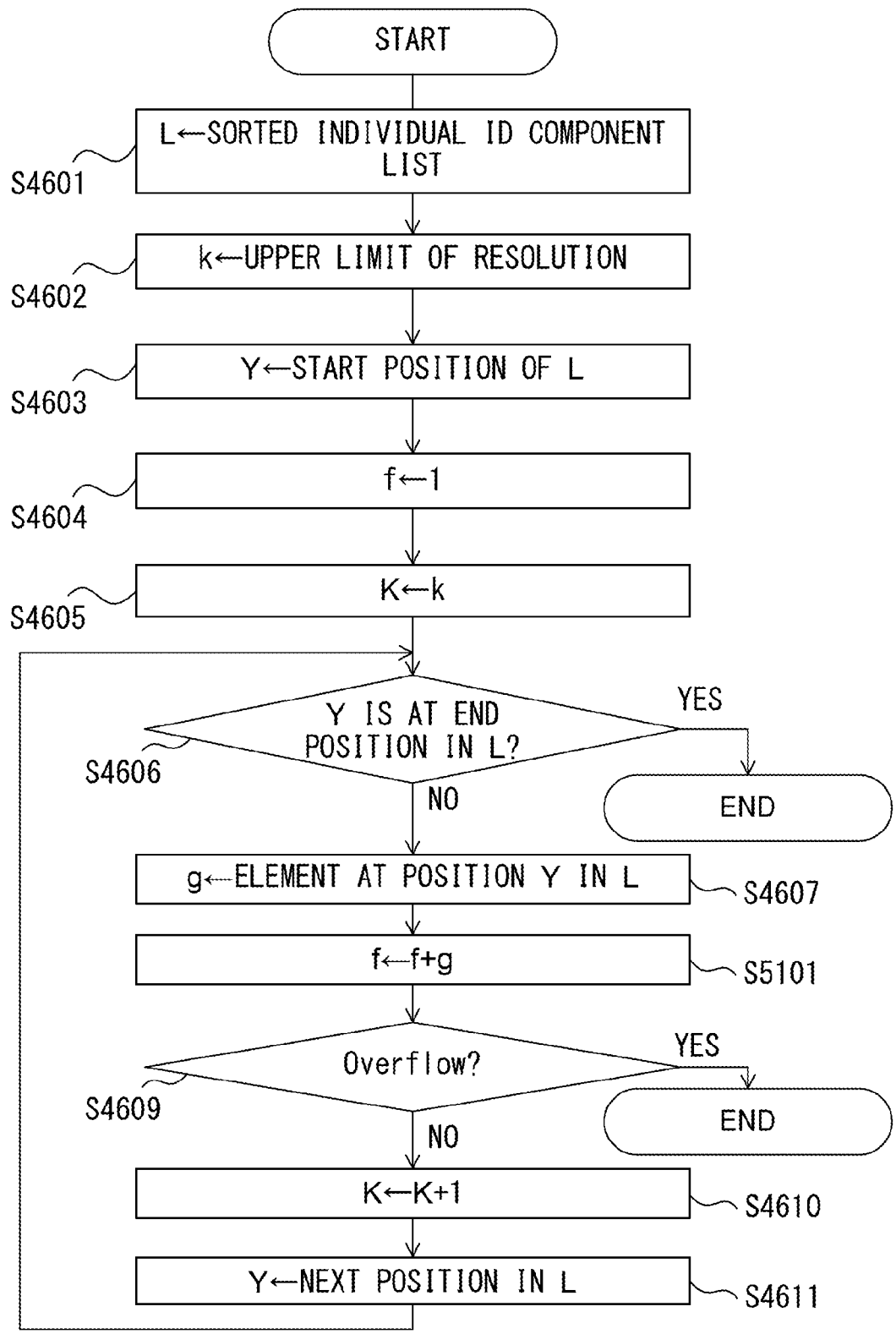
F I G. 5 1

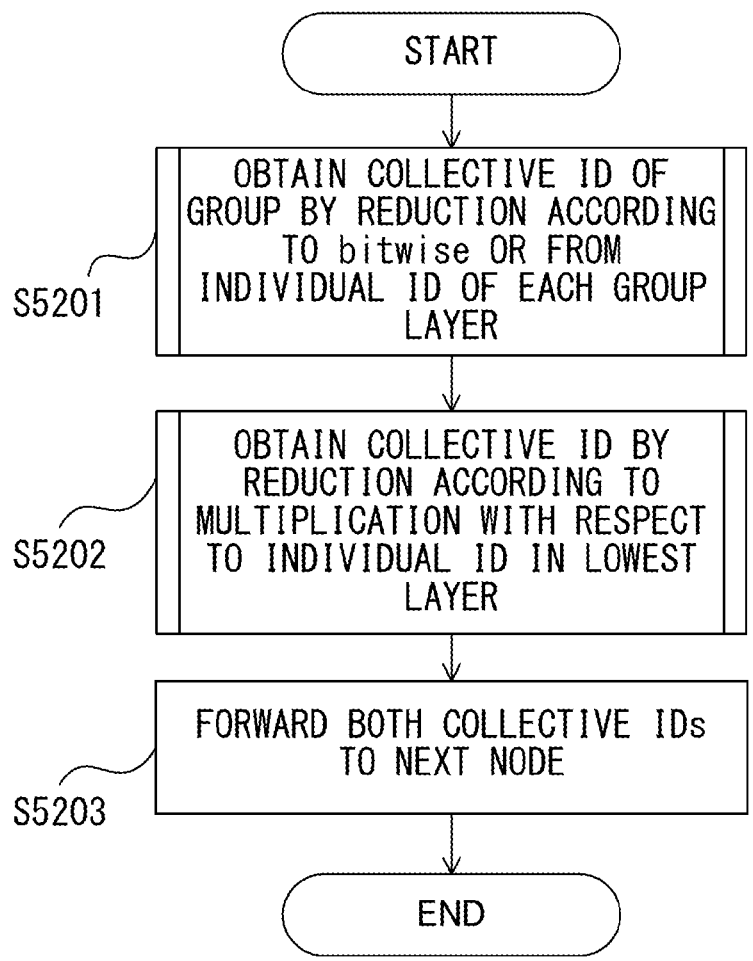
F I G. 5 2

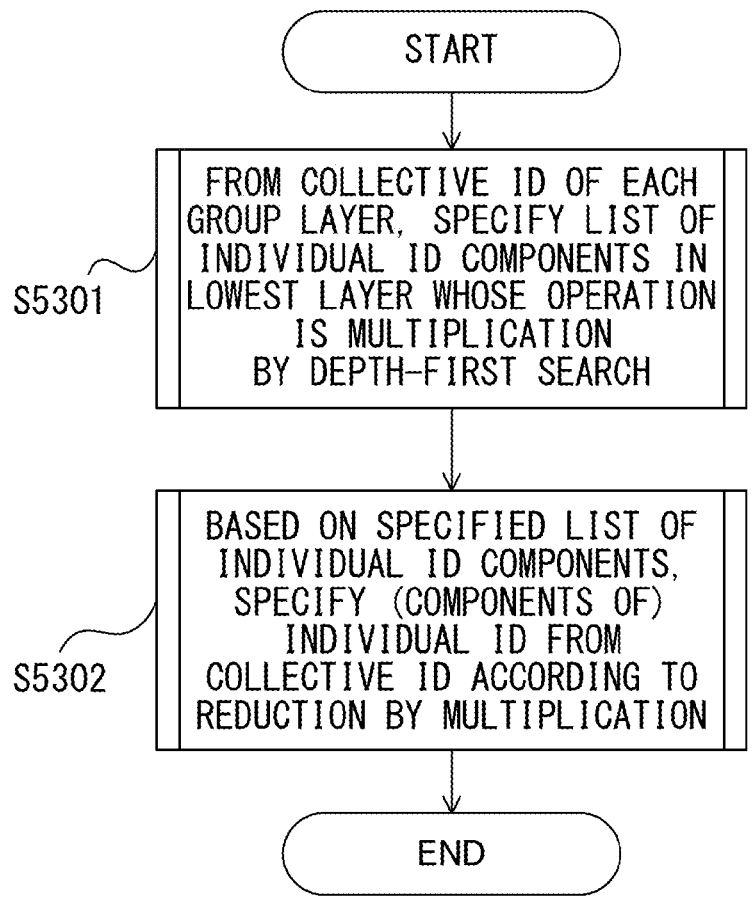
F I G. 5 3

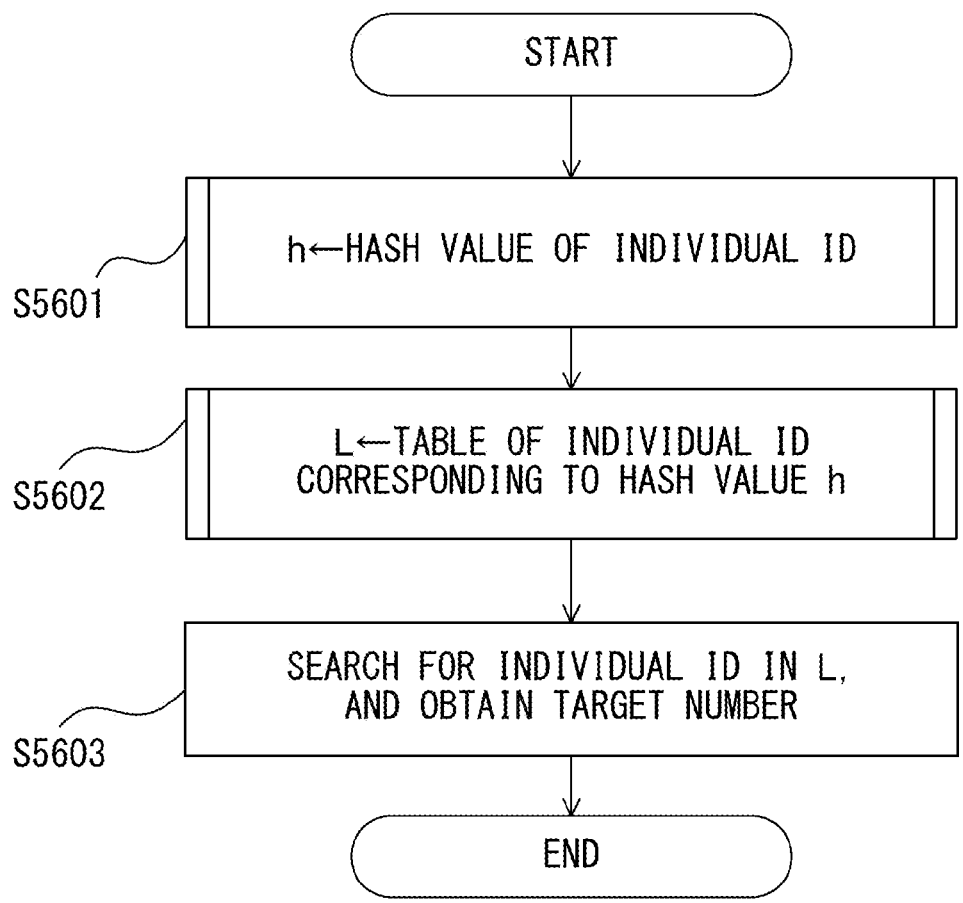
F I G. 5 6

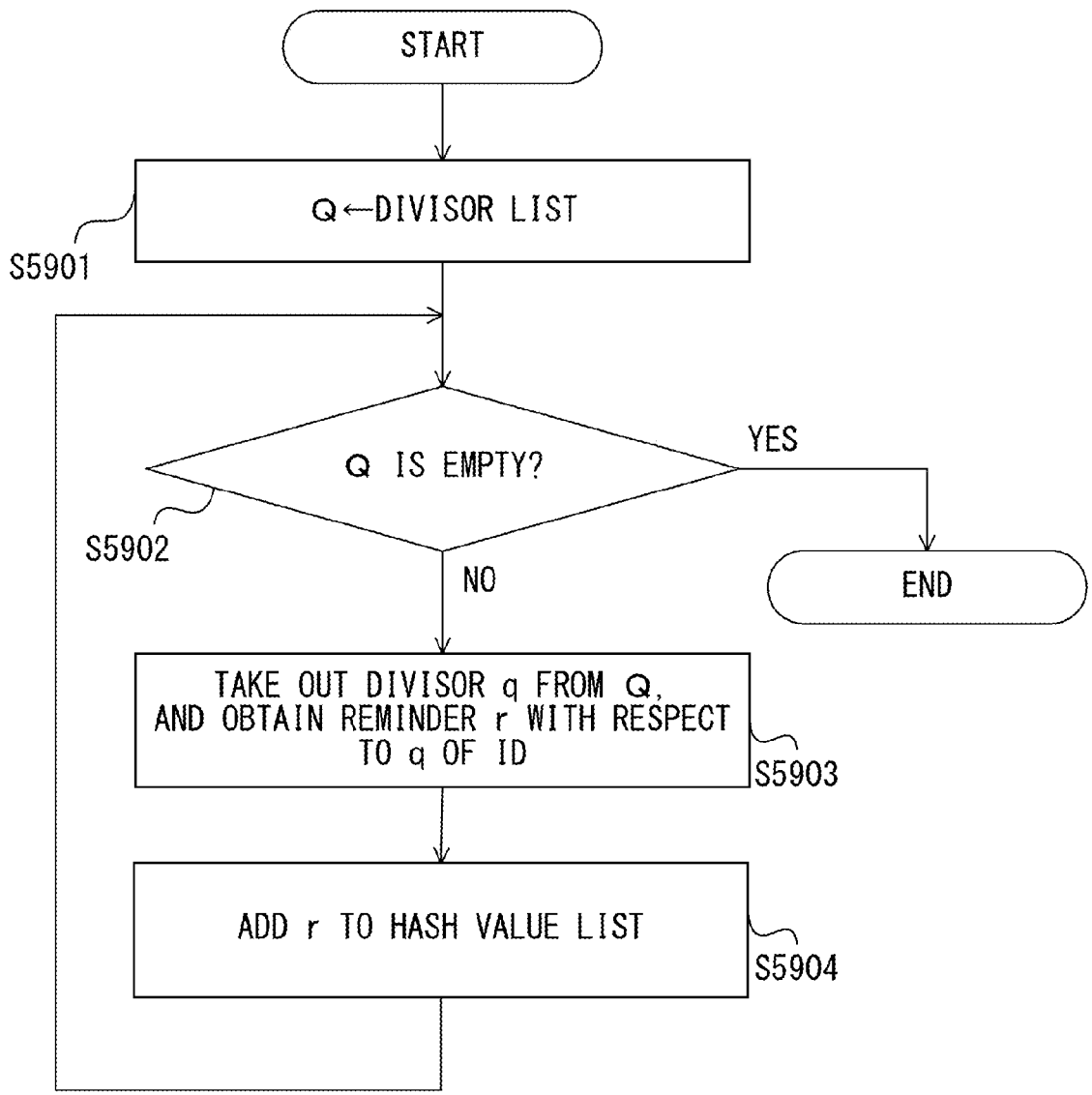
F I G. 5 9

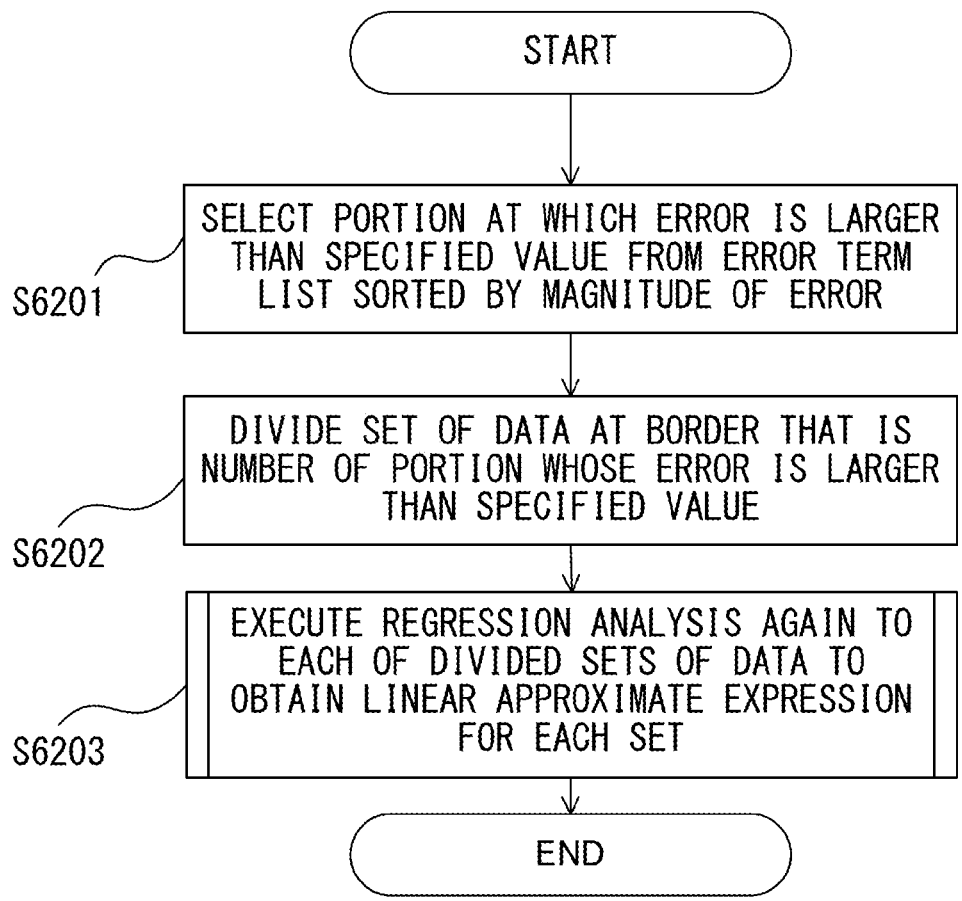
F I G. 6 2

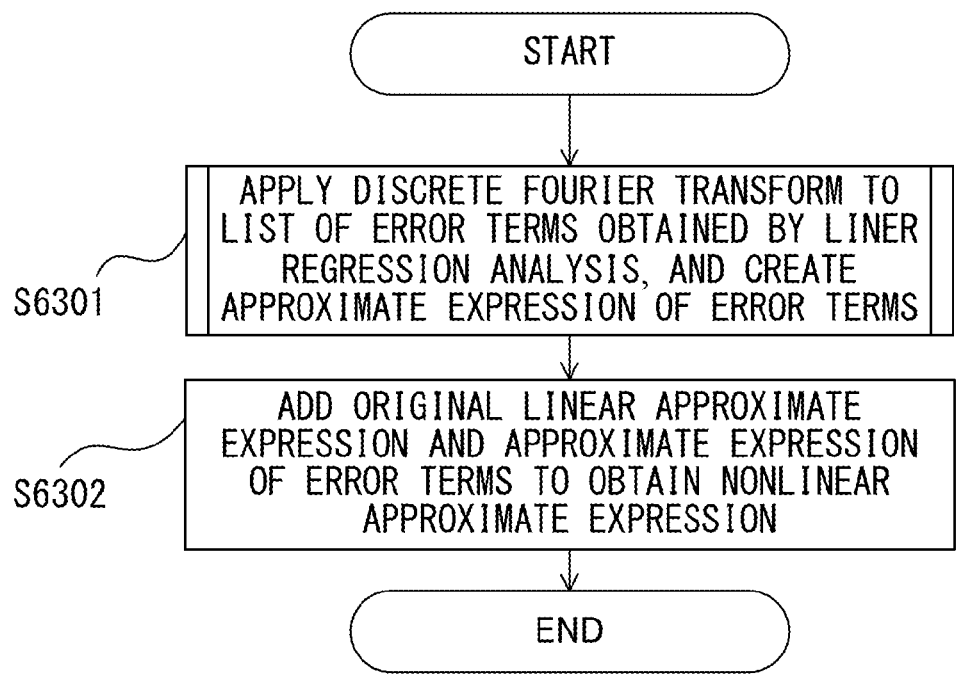
F I G. 6 3

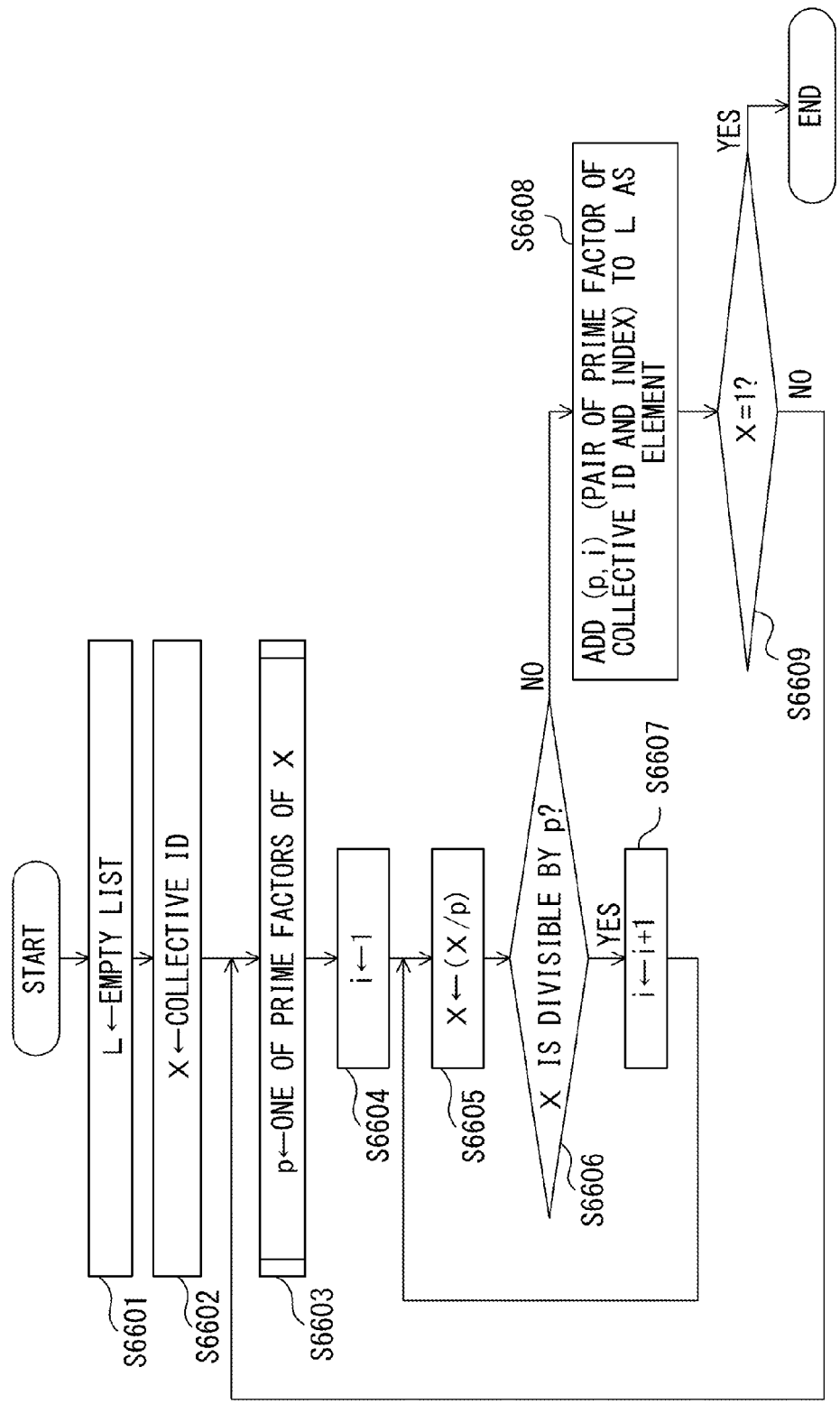
F I G. 66

FIG. 67A

[CPU THAT PERFORMS OPERATION OF USUAL BITS]

- p method
- p−1 method
- p+1 method
- Fermat's method
- Continued Fraction Method
- MPQS
- ECM

[MEMORY]

FIG. 67B

USE SHOR'S ALGORITHM

[CPU THAT PERFORMS OPERATION OF USUAL BITS]

[CALCULATOR THAT PERFORMS OPERATION OF QUANTUM BITS (Qubit) (QUANTUM COMPUTER)]

[MEMORY]

SYSTEM AND METHOD FOR GATHERING INFORMATION

CROSS-REFERENCE TO RELATED APPLICATION

This application is based upon and claims the benefit of priority of the prior Japanese Patent Application No. 2014-118467, filed on Jun. 9, 2014, the entire contents of which are incorporated herein by reference.

FIELD

The embodiments discussed herein are related to a system and a method for gathering information from a plurality of nodes in a distributed system.

BACKGROUND

In order to control parallel jobs executed using a plurality of nodes in a large-scale distributed system, or to manage nodes or components of nodes in the entire system as "resources", it is sometimes necessary for the node that controls jobs or the entire system to gather information of the state of the management target in real time.

In the information-gathering communication for performing such gathering, there is an issue of the communication volume of the communication or the transmission rate, in transmission and reception on the network. In recent computer systems, the communication speed in the network that connects between nodes is significantly lower than the processing speed of the computer provided at each node, and therefore, the communication volume for information of the state of the management target transmitted on the network becomes the main factor in determining the level of the load of the entire information gathering mechanism.

In order to reduce the load mentioned above, the following network management system has been known. Terminal apparatuses output the state inside the apparatus as management information. Intelligent agents (intermediate management apparatuses) connected to them in the LAN (Local Area Network) obtain their MIB (Management Information Base), gathers them, and creates a gathered MIB. The management apparatus connected to them by the backbone LAN manages the terminal apparatuses by managing the gathered MIB. This known art realizes a network management system that does not put a load on the network apparatus in which the traffic between the network management apparatus and the respective terminal apparatuses is low, and that enables easy analysis of management information as well as management without the need for the administrator to be aware of the difference in vendor-specific management information. (For example, Japanese Laid-open Patent Publication No. 9-298543).

However, in the information-gathering communication that does not have a layered structure, it is difficult to efficiently reduce the communication volume on the network that connects between nodes, in the process of transmitting a message from the transmitter side node to the receiver side node.

SUMMARY

According to an aspect of the embodiments, an information gathering system includes: an ID gathering mechanism, provided at a transmitter side node, that generates a collective identifier from one or a plurality of individual identifiers of respective management targets, each of the individual identifiers being generated according to a state of a corresponding management target; and an ID analysis mechanism, provided at a receiver side node, that restores an individual identifier from the collective identifier and specifies a management target based on the restored individual identifier.

The object and advantages of the invention will be realized and attained by means of the elements and combinations particularity pointed out in the claims.

It is to be understood that both the foregoing general description and the following detailed description are exemplary and explanatory and are not restrictive of the invention.

BRIEF DESCRIPTION OF DRAWINGS

FIGS. 2A and 2B illustrate examples of an interrupt gathering process in a large-scale system;

FIG. 3 illustrates an example of a sparse bit string (almost all the bits are zero);

FIG. 4 illustrates an example of functions of a computer that configures an information gathering mechanism;

FIG. 5 is a flowchart illustrating an example of a process of an ID gathering mechanism at a transmitter side node in the first embodiment;

FIG. 6 is a flowchart illustrating an example of a process of an ID analyzing mechanism at a receiver side node in the first embodiment;

FIG. 7 illustrates an example of an information gathering mechanism according to the first embodiment;

FIGS. 9A and 9B illustrate an example of a method for calculating a collective identifier reduction;

FIGS. 10A and 10B explain the effect of the reduction of memory usage;

FIGS. 12A and 12B explain the reduction of the communication volume and the memory usage by Reduction;

FIG. 13 explains the correspondence relationship between the management target number and the bit position in a collective identifier storage area in a memory area of a receiver side node;

FIGS. 15A-15H illustrate an example of an individual identifier table held by a receiver side node in a case in which the operation is multiplication;

FIGS. 16A-16D illustrate an example of an identifier table held by a receiver side node in a case in which the operation is addition;

FIG. 17 is a flowchart illustrating an example of a process performed by an ID gathering mechanism at a transmitter side node in the second embodiment;

FIG. 20 illustrates a first example of an information gathering mechanism according to the second embodiment;

FIG. 21 illustrates a second example of an information gathering mechanism according to the second embodiment;

FIG. 22 illustrates a third example of an information gathering mechanism according to the second embodiment;

FIG. 23 explains the layers in grouping of management targets (nodes);

FIG. 27 is a flowchart illustrating an example of a transmission process for a collective identifier for which grouping has been applied in a layered manner by an ID gathering mechanism at a transmitter side node in the fourth embodiment;

FIG. 28 is a flowchart illustrating an example of a reception process involving a depth-first search performed by an ID analysis mechanism at a receiver side node in the fourth embodiment;

FIG. 32 explains the operations in the fifth embodiment;

FIGS. 33-36 are flowcharts illustrating an extraction process for an individual identifier component of a prime number power from a collective identifier in a case in which the operation of the Reduction is multiplication;

FIGS. 39-41 are flowcharts illustrating an example of processes in the seventh embodiment;

FIGS. 44-46 are flowcharts illustrating an example in a creation process for an exceptional value list in a case in which multiplication by addition of logarithms is used;

FIG. 47 is a flowchart illustrating an example of a process of an ID gathering mechanism at a transmitter side node in a ninth embodiment;

FIG. 48 is a flowchart illustrating an example of a process of an ID analysis mechanism at a receiver side node in the ninth embodiment;

FIGS. 49-51 are flowcharts illustrating an example of a creation process for a correspondence list of individual identifier components used at a receiver side node in a case in which components of a collective identifier are obtained by the reduction according to Addition;

FIG. 52 is a flowchart illustrating an example of a transmission process for identifiers for which grouping has been performed in a layered manner by bitwise OR operation in the tenth embodiment;

FIG. 53 is a flowchart illustrating an example of a reception process for identifiers for which grouping has been performed in a layered manner by bitwise OR operation in the tenth embodiment;

FIG. 56 is a flowchart illustrating an example of a general process of a search process in an individual identifier list in the eleventh embodiment;

FIGS. 58-59 are flowcharts illustrating an example of a search process in an individual identifier list in the eleventh embodiment.

FIGS. 60-65 are flowcharts illustrating an example of a speeding-up process for associating an individual identifier and a management target number in the twelfth embodiment;

FIG. 66 is a flowchart illustrating an example of a process for obtaining at least one prime factor that is an integer by an algorithm other than the brute force method; and FIGS. 67A and 67B illustrate the difference between thirteenth and fourteenth embodiments.

DESCRIPTION OF EMBODIMENTS

Figure 1:
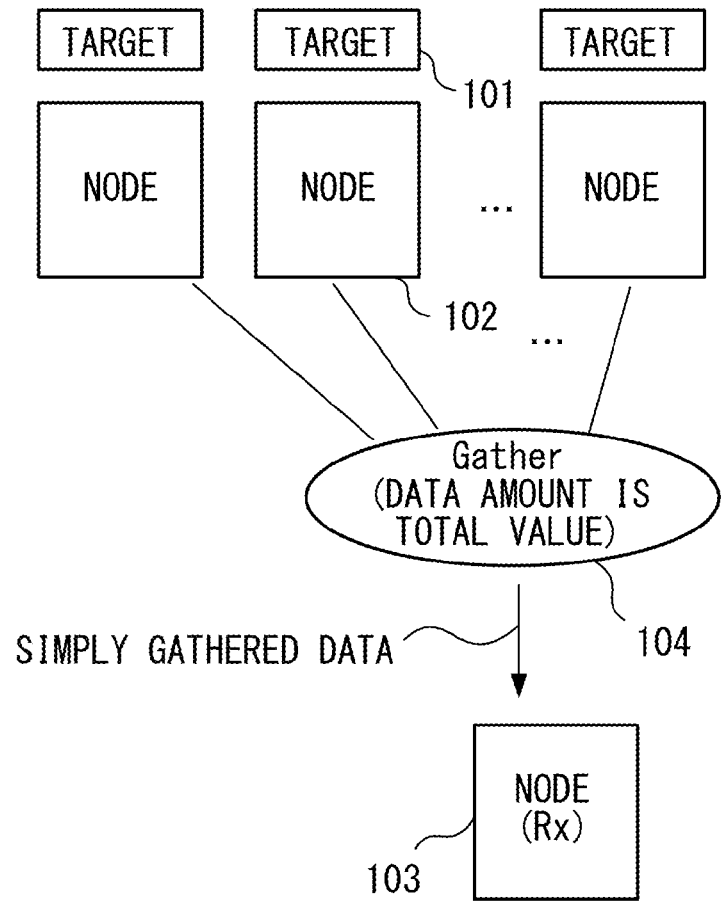
FIGS. 1A and 1B illustrate a comparison between a related art and an embodiment of the present invention.

Hereinafter, embodiments of the present invention are explained in detail with reference to the drawings.

Before explaining some embodiments, a technique that is considered as the usual case by the applicant and problems in the technique are explained.

As an example of information gathering in a distributed system, for example, in a case such as the following case, it is necessary that the state of each system resource at the time in point that is sufficiently close to the time of assignment is gathered by the node that performs the assignment control. For example, this applies to a case in which, at the time of node assignment to a job, optimization is performed according to the expected execution time for the job and the hardware resource to be accessed. In addition, the checkpoint interval and the migration destination may be decided after the start of the execution. In another case, assignment may be done in consideration of the state of the components of each node itself, the load distribution in the file server, and further, the expected load in the communication path for accessing the server, and so on. Note that in order to continuously monitor the state and load of each hardware resource and to perform appropriate changes as needed, it is desirable that information gathering is performed at short intervals.

In addition to the gathering of state information, in a parallel computer, results of calculation of a portion in parallel at a plurality of nodes may be gathered to one specific node at a certain point in time, or a plurality of nodes may share their calculation results with each other. Such information-gathering communication tends to become a bottle neck or a critical path of the entire parallel computation.

In the information-gathering communication for performing such gathering, there is an issue of the volume of the communication or the transmission rate in transmission and reception on the network. In recent computer systems, the communication speed in the network that connects between nodes is significantly lower than the processing speed of the computer provided at each node, and therefore, the communication volume for information of the state of the management target transmitted on the network becomes the main factor in determining the level of the load put on the entire information gathering mechanism. Therefore, not only the factor that is proportional to the data amount but also the time required per transmission/reception action regardless of the data amount is not negligible.

In the information-gathering communication for performing such gathering, not only the transmission time in transmission on the network but also the processing load at the node that gathers information is also a problem. In recent computer systems, the speed of access to the memory is much lower than the operation processing speed of the CPU, and therefore, the memory capacity to be accessed becomes the main factor that determines the level of the load at the node.

The specific problem of the information-gathering communication becomes clear in comparison with "broadcast communication" that is a typical information-spreading communication. In broadcast communication to a number of nodes, the load at the transmitter side node is improved to the same order as that in transmission to one node, by using hardware equipped with a broadcast communication mechanism. However, in its application to reporting of state information or parallel computing, unlike broadcast communication for video image distribution or the like, it is necessary to realize reliable multicast including strict countermeasures for bit error in data and for missing packets, and it is impossible in many cases to realize it simply by using only the broadcast communication mechanism of hardware. Meanwhile, several methods are known for realizing reliable multicast using the broadcast communication function that is available in various system environments. According to these techniques, the load at the transmitter side node becomes "0(1)", with the parameter being the number of nodes, and it is relatively easy to satisfy requirements regarding the actual time required for the communication.

Here, 0( ) is the "Landau symbol", indicating in general that a certain amount increases or decreases in the same order as the amount specified in ( ) (that the limit of the ratio of the amount mentioned by the symbol and the amount specified in ( ) is a constant). The expression 0(1) means "being constant even when the amount (or the parameter) that is the basis of the comparison changes".

The communication in which information from a plurality of nodes is gathered into a specific node is defined as an API called MPI_gather in the Message Passing Interface (MPI) standard, for example. Meanwhile, the communication API with the MPI in a case in which all the joined nodes eventually share communication target data is called MPI_Allgather. In the explanation below, a case in which the API defined by the MPI is not used is still called "gather" or "allgather", as long as the common communication pattern is used.

With regard to reduction of the required time for gather, for example, techniques based on the following operation (including communication hardware for realizing this operation) is known.

In the technique called Write RDMA (Write Remote Direct Memory Access), the communication starts with only a command at the transmitter side, and a specified area of the memory of the receiver side is updated. According to this technique, overhead for issuing the communication command at the receiver side is reduced.

A technique for suppressing the interrupt operation in each of individual communications is known. In this technique, when receiving data from a plurality of nodes, reception interrupt is not generated for individual data, and the completion of data transmission from all the nodes at the transmitter side is recognized by another means such as barrier synchronization between all the nodes at the transmitter side and receiver side node. Especially in a large scale system, if interruptions are generated in proportion to the number of transmitter side nodes, overhead for context switching becomes very large. Therefore, to reduce the number of interrupts according to this technique is effective in improving performance.

However, the combination of the above two techniques have limitations due to the following factors (1) and (2) regarding the reduction of the overhead at the receiver side node.

(1) The data amount received each time from an individual node is at least equal to or more than "the minimum packet length". With respect to write RDMA (also with respect more generally to the RDMA including read), there is a minimum data length (hereinafter, referred to as L (the unit is usually byte) that is supported as the unit of memory access, independently from the minimum value of the packet length.

(2) The data amount that should be received increases at 0(N) according to the number N of correspondent communication nodes. When receiving data in a specified format from individual nodes by write RDMA described above, an area of N*L or more is required. However, the time required for reception is 0 (log (N)), when data from each node is relatively small (that is, when the communication latency term has large contribution with respect to the communication time). On the other hand, it is 0 (N) when data is relatively large and the communication may be evaluated as "the data size/the bandwidth". In general, reception from several tens of nodes or more requires a time in proportion to "(the number of relay stages)×(the number of correspondent communication nodes for each of receiver side nodes including relays) due to relay nodes provided in several stages.

Assuming that the number a of correspondent communication nodes is constant at each relay stage, the number of relay stages is proportional to the logarithm that has a as a base. Assuming the number of source nodes as N, the required time for communication is approximately "a×log (N)/log (a)". When the relay process is performed on a node, it has been widely known that it is advantageous in a large-scale system to make the value of a relatively small, about 2 or 3, from studies supported by evidences based on theoretical models, simulations and actual measurements. Here, log(N)/log(a) is an expression that expresses a "logarithm of N with a as a base" by a logarithm with a "standard fixed value" as a base. The standard fixed value to be the base of the logarithm differs depending on the context, but in any case, the format of the expression is the same. The following values are used as the "standard fixed value".

(1) In the case of a "common logarithm", 10
(2) In the case of a "natural logarithm", e (Napier's constant)
(3) In the case of many documents in computer science, 2

Hereinafter, when describing a "logarithm of x with a as a base", an expression log_a(x) is also used. For example, log_a(x)=log_10(x)/log_10(a)=log_e(x)/log_e(a)=log_2(x)/log_2(a).

In relaying, by waiting until forwarding by Write RDMA from nodes at an immediately preceding stage are all completed and forwarding the entire area that includes received data at one time after that, it becomes possible to make the processing time at the CPU required for relaying not necessarily dependent on the number of nodes. However, the increase in the total actual time required for communication according to the number of nodes is inevitable.

Here, information accumulation by gather described above is assumed as a comparison-target technique for some embodiments described above. FIG. 1A illustrates the system in a related technique assumed as a comparison target for some embodiments described later (FIG. 1B is described later). In the assumed related technique, a scheme 104 for gathering information from one or more management targets 101 in one or more nodes 102 into a receiver side node 103 is information accumulation by gather, as illustrated in FIG. 1A. In this scheme, the identifier of the management target 101 and 1-bit information (in a specified state: 1, otherwise: 0) for each management target 101 are gathered.

This related technique is not a method (X) in which "a node that detects an occurrence of a specified state in the management target starts communication that involves an interrupt process, and other nodes do not report anything". The reason for this is as follows.

The method (X) may appear as a natural monitoring method because, as long as the rate of occurrence of a specified state in the management target for the node is small as expected, the load at the receiver side is supposed to be sufficiently small. However, the method (X) has the following two problems in terms of stable operations in a large-scale system.

(1) It is impossible to distinguish the case in which "the message from the management node is not transmitted because the management target is not in the specified state" from the case in which "a critical abnormality has occurred in a node and it is impossible to transmit a message". For the latter state, the state of the node may be eventually detected in an appropriate manner if a separate monitoring is performed. However, it is not necessarily easy to avoid occurrence and recording of a wrong recognition with respect to the state of the management target, and to recover from the influence of the wrong recognition.

Figure 2B:
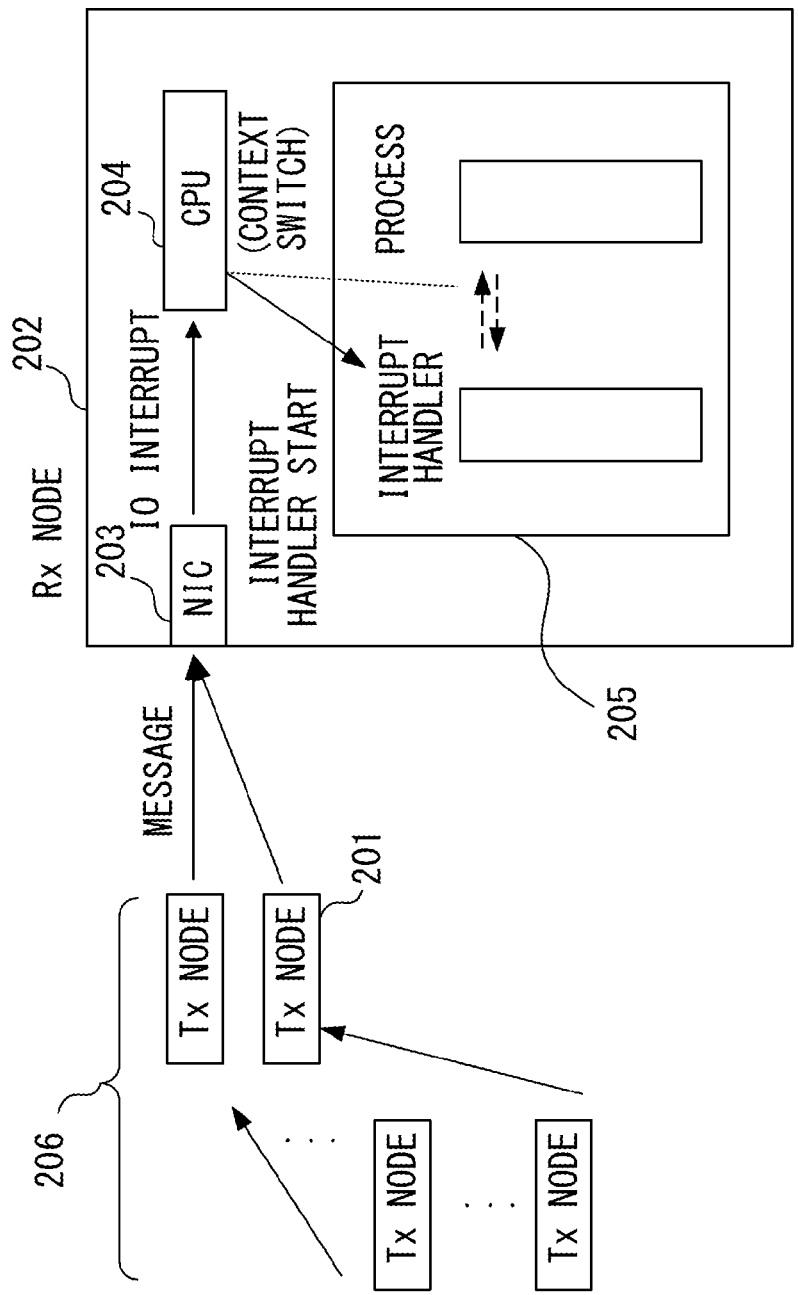
Figure 8C:
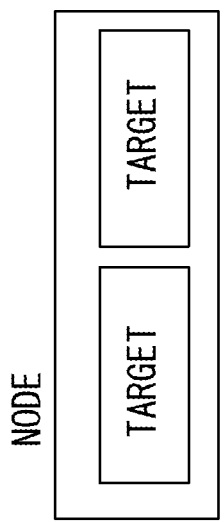
FIGS. 8A-8D explain the management target managed by a transmitter side node.
Figure 8D:
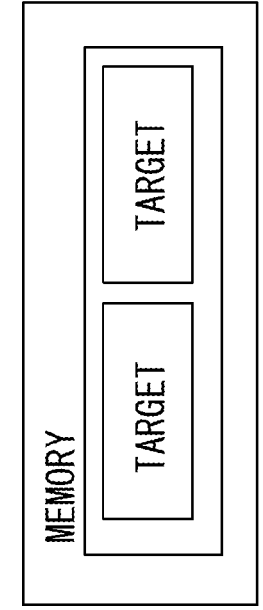
Figure 8A:
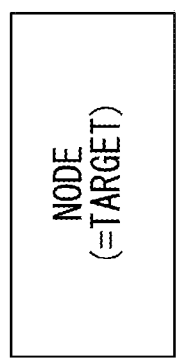
Figure 8B:
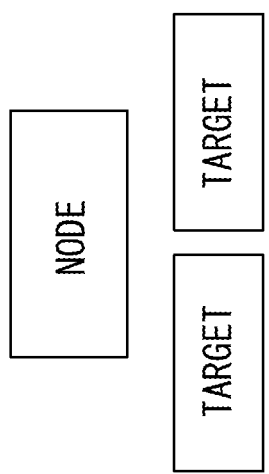

(2) The receiver side node may be overloaded when a specified state occurs in many nodes at the same time. FIGS. 2A and 2B illustrate examples of an interrupt gathering process in a large-scale system. A case is considered in which, as illustrated in FIG. 2A, an NIC (Network Information Controller) 203 in a receiver side node 202 generates an IO interrupt every time it receives a message from each transmitter side node 201. In this case, a CPU 204 switches a context 205 at the receiver side according to the IO interruption from the NIC 203, activates an interrupt handler and starts the process. The worst value of the number of interrupts in this case is proportional to the number of nodes of the transmitter side nodes 201. In addition, the traffic on the network connected to the NIC 203 also increases according to the number of the transmitter side nodes 201, leading to an increase in the communication volume on the network.

Communication involving interruption generates overhead for a context switching process for handling the interruption, as illustrated in FIG. 2A. For this reason, in order to process reception interrupt from a tremendously larger number of nodes than usual in a large-scale system, it is difficult to avoid occurrence of overload at the receiver side node 202.

A possible countermeasure for the overload at the receiver side node is to stop interruption when k pieces of messages are received, as a function of receiver-side hardware, but in this case, it is not easy to appropriately decide the timing to set back the state to the one in which interruption is generated again. Furthermore, when the range in which the instruction for stopping interruption is available is each network interface or each port according to the specifications of the receiver-side hardware, to stop interruption is to interfere with the communication that uses the same network interface or the port. In this case, from the viewpoint of the need in the communication performed by the network apparatus for another purpose, to stop interruption may be disadvantageous because the stoppage of interruption leads to troubles in system operations.

The problem here is that "the total number of nodes in the specified state at a given point in time" is not "information determined before transmission", and therefore, a method in which "whether or not to generate interruption by instruction (from the transmitter side) according to the packet attribution corresponding to the type of reported information" is not available.

According to the above consideration, assuming a case of receiving reports from a large number of nodes at the same time when using communication that involves interruption at the time of reception, the following countermeasure is required. It is necessary to reduce the traffic on the network by applying layers according to the number of the transmitter side nodes 201 (management targets) in the system as illustrated as 206 in FIG. 2B, and to perform load distribution between the respective nodes as well as to prepare system resources on an assumption assuming the maximum load.

Furthermore, irregular generation of interrupts is known to deteriorate "collective communication" performance in parallel computing. That is, the parallel computing performance of the system significantly deteriorates unless the node that receives monitoring information described above is separated from the node that performs parallel computing, or unless at least the system resource that processes the interrupt described above is provided at each node separately from the system resource for parallel computing. However, such a configuration in which extra independent system resources that are excessive for normal processing are provided for different purposes leads to a significant increase in system cost.

According to the above consideration, it is understood that a monitoring method without significant difference in the load at the receiver side node between the case in which the state distribution of the management targets is in line with assumption and in other cases is highly desirable for a large-scale system. However, the method (X) in which "communication that generates interruption only when a specified state occurs" does not satisfy this condition. Therefore, it is preferable to solve the following three problems.

Technical problem 1: The increase in the communication volume on the network, and that the limit in reducing the memory access load at each node is exceeded in the information-gathering communication, because it is inevitable for the receiver side node to refer to the area of the minimum message size for every message from each node.

Technical problem 2: The increase in the communication volume on the network and that the limit in reduction in the memory access load at each node is exceeded in the information-gathering communication, because it is inevitable for the receiver side node to access all information, even from nodes for which no action is required.

Technical problem 3: To realize a smaller communication volume on the network and a memory access load at each node than those in a case in which the states of all the management targets need to be identified, under a condition that, when management targets in the number that is greater than a threshold set in advance enters a "monitored state", only the fact that "the threshold has been exceeded" needs to be recognized.

A presupposition that is common to all these technical problems is that the communication performance of the entire system is limited by the low communication efficiency and the low memory usage efficiency in the information gathering technique that is usually considered for a situation in which "a specified node receives information from a larger number of nodes about management targets in the same number or in a greater number, one bit for each management target".

In addition, the presupposition that is common to Technical problem 2 and Technical problem 3 is that the communication performance of the entire system is limited by the low communication efficiency and the low memory usage efficiency in the information gathering technique that is usually considered for a situation in which, under the common presupposition mentioned above, "the majority of received bits are 0 (the number of bits 1 is small)". FIG. 3 illustrates an example of a sparse bit string (almost all the bits are 0). Even for an information string in which 0 is in the majority as illustrated in FIG. 3, it is necessary to perform communication for each bit and to assign a memory area at each node, leading to a low communication efficiency and a low memory access efficiency.

Hereinafter, the three problems mentioned above are explained in greater detail in view of the related arts described above.

In simultaneous reception in a large-scale system, there are problems common to general information reception and specific problems of information reception in a case in which an "exceptional state" occurs. First, problems that are common to information reception from a large number of nodes in a large-scale system are explained.

When relaying information, it is difficult to significantly reduce communication delay, because there are the following trade-offs between the number of correspondent communication nodes for management nodes or individual intermediate nodes at each stage and the number of relay stages.
(1) When the number of correspondent communication nodes at each stage is reduced, the number of relay stages increases.
(2) When the number of correspondent communication nodes at each stage is increased, the memory area for reception increases.
(3) The memory area required for the reception process increases, and the overhead involved in the reception (or relay) process increases in proportion to the number of correspondent communication nodes at each stage.

In communication that involves relay operations at nodes, the communication latency increases at least in proportion to the "logarithm of the number of nodes" in accordance with the increase in the number of relay stages. The reduction of the communication latency has to be achieved by reducing the time required for the "relay operation" at each stage, and for this purpose, it is necessary to reduce the communication data volume and the processing time at each stage of relaying.

In the factors that control the processing performance in information gathering from a large number of nodes, the processing time at the receiver side node, especially the time required for memory access at the receiver side node accounts for a considerable proportion. The time required for memory access is an increasing function of the memory capacity to be accessed, and therefore, the reduction of the memory capacity to be accessed is a key in improving performance, but the lower limit in reduction is set due to the following factors. This problem is "Technical problem 1" previously described.
(1) The memory area of at least the minimum packet size is required even for receiving 1 bit.
(2) To receive packets of all the nodes while suppressing interruption in order to reduce CPU overhead due to the interrupt process at the time of reception, the memory of the number of nodes×the minimum packet size is required for saving messages. This is because the memory cannot be released until all the messages are received.

Next, specific problems of information reception in a case in which an "exceptional state occurs in the management target" are explained. Here, an "exceptional state" may be stated as an "abnormal state" in many cases, but there is also a case in which "a normal but simply rare" case. As a "not abnormal but exceptional" state, for example when performing parallel computing for the product of a large-scale sparse matrix, when the fact that "the majority of components are 0" is known, components that are not 0 are considered as "exceptional". A sparse matrix is often expressed not by assigning an area to all the components but as "a pair of "the position of a component that is not 0" and "the value of the position", and as input data or (final) output data, each component is seldom set as the direct management target. However, when performing parallel processing for an operation, a corresponding portion for the majority of nodes may become 0 in some cases. However, to facilitate understanding, explanation is provided below with an example of state monitoring in a case in which an "abnormal state" occurs.

Generally, the failure rate of individual hardware components that constitute a large-scale parallel system is very low, and the rate at which a plurality of nodes or components fail at the same time is much lower than the failure rate of one component, except for the case when there is a common point of failure among a plurality of nodes or a plurality of components on the system. This is because, assuming an abnormality of each node or component as an "independent event", the rate at which a plurality of management targets enter an abnormal state is the product of the rates at which one management target enters an abnormal state.

For this reason, when checking the state of the individual management target after receiving the states of all the management targets, the states regarding most of the management targets are to be "skipped". In other words, even though no action at the receiver side is required for almost all the management targets, there is still a load generated for communication of the states of many management targets and for referring to the memory. This problem is "Technical problem 2" previously described.

In such a case, it is to be noted that there is no need for the process for specifying all the nodes in which abnormality has occurred, in some cases. For example, in a system for monitoring abnormality in all the nodes assigned to a parallel job, it is assumed that a case in which the number of nodes having abnormality is equal to or smaller than a threshold set in advance as handled differently from a case in which it exceeds the threshold as described below.
(1) When the number is equal to or smaller than the threshold, assigning job for an alternative node is immediately continued.
(2) When the number exceeds the threshold, the job is temporarily stopped.

In such a system, it is necessary in case (1) to identify nodes in which abnormality has occurred, but in case (2), it is not necessary to identify nodes in which abnormality has occurred, because as long as the fact that "the number of abnormal nodes has exceeded the threshold" is recognized, the process itself for the time being is possible.

More generally, when abnormalities that exceed the number of redundant resources provided for ensuring reliability occur, provided that the number of redundant resources has been determined according to appropriate grounds, it is unlikely that abnormality that occurred at the same time are independent events. Therefore, even if a large number of redundant resources are provided, whether or not recovery is possible is uncertain. When there is an unexpected "single point of failure", it is inevitable to stop the process since it is impossible to continue the process by assigning a redundant source. In this situation, it is considered that the individual points of abnormality may be specified according to the need after the process is stopped.

Here, a case of using a method in which information is gathered into a receiver side node by Write RDMA from a plurality of nodes (that is, a related art) is considered. In this case, as long as reception is confirmed after all the data are transmitted in order to reduce reception overhead, the condition in which "a specified (usually, an abnormal) state is received from the number of nodes that exceeds the threshold" is to be confirmed in a search process in the data after reception.

In such a case, the worst instance involves access to the entire memory of "the number of nodes×the minimum packet size". On average, access to the memory of at least about half of the entire memory is required. This is because, assuming that areas corresponding to individual nodes in an abnormal state are located before and after a middle point from the beginning of the order of access at equal rates, the average memory capacity to be accessed until a node corresponding to one abnormal state is ½ of the entire memory capacity. Assuming the threshold as k and assuming that the search is to be continued until the number of nodes that exceeds the threshold k are detected, the average memory capacity for which the search is to be performed is an increasing function of k.

According to the above, in the related art, even in a case in which k=1 and monitoring of the state of only one management target is required in the normal condition, the communication volume and memory access in proportion to the total number of management targets are required, and also the communication volume and the memory area of the minimum packet size are required for each management target. The increase in the communication volume as well as the processing load for this reason, are not small.

However, even when the distribution situation of a specified state is different from expectation, it is always possible to switch the process when the condition that a larger number of management targets as expected are in the specified state is detected, and therefore, there is no significant difference in processing time. That is, there is an advantage that it is easier to realize stable operations in unexpected cases, whereas the processing time increases in an unexpected situation in a method (the method (X) mentioned above) in which communication that involves interruption for every management target in the specified state is performed.

Therefore, the problem to be solved is to reduce the communication volume on the network and the memory capacity to which access is required at the time of processing at each node, while maintaining the advantage that "there is no significant difference in the processing time in an unexpected state compared with the processing time in the normal condition", under the situation in which "the number of management targets that are in the specified state in the normal condition is expected to be equal or smaller than threshold k". This is Technical problem 3 previously described.

In the explanation below, the following monitoring method is defined as "having resolution of k". Such a monitoring method is a monitoring method in which, regarding a specified (usually, an abnormal) state that is common among the number of management targets that exceeds a specified threshold k, individual management targets are not necessarily identified, but when the number of management targets in the specified state is equal to or smaller than the threshold k, management targets are identified.

Meanwhile, there are two viewpoints described below regarding the behavior of the monitoring system when the monitored conditions are satisfied for the number of management targets that exceed k during monitoring with the resolution k. It depends on the situation which of the two viewpoints is appropriate.

(1) It is better when it is possible to identify more than k targets in many cases. This is a case in which, for example, the calculated collective identifier are represented within an area of a specified size, and even though it is impossible for all the cases, it is preferable that it is possible in more cases to resolve into more than k individual identifiers. Stated in the other way, when more than k management targets are in the specified state and it is not originally necessary to know the individual identifiers, the calculation is still executed in many cases to obtain individual identifiers from the collective identifier (this may not be desirable in some cases).

(2) It is better when the process for identifying more than k targets is not needed or the process is easy in many cases. This is a case in which, for example, it is preferable that it is possible to judge that k or more individual identifiers are included, only from the size of the collective identifier in more cases (including the case in which judgment may be made according to the overflow in operation during reduction). Stated in the other way, there are few case in which k or more individual identifiers are identified (this may not be desirable in some cases).

For example, encoding with a resolution limited by an upper limit k may be used, when the following process is performed while a given set S of management targets is fixed.
(1) When an event of interest occurs in more than k management targets in S, the use of S itself is temporarily stopped.
(2) When the number of nodes in S in which the even has occurred is equal to or smaller than k, a certain measure is taken for individual node and the use of S is continued.

The same method is applicable to the management of not only the state of an entire node but also the state of "components of a certain node", "a series of devices managed by a certain node", and the like, and therefore, a general expression "management target" is used below for a while.

In addition, in the embodiments explained below, management of a "node" may also be used as an expression. That is, reporting is performed for each management target by the node that is in charge of the management.

<Technical Elements that are Common Among all the Embodiments>

FIG. 1B illustrates a scheme 105 for gathering information into a receiver side node 103 from one or more management target 101 in one or more nodes 102 in some embodiments described later. In the case illustrated in FIG. 1B, when the management target 101 is in a specified state, encoded data (the individual identifier described later) is reported, a reduction operation is executed with respect to this report, and data (the collective identifier described later) with a reduced data volume is reported to the receiver side node 103. Meanwhile, when the management target 101 is not in a specified state, the identity element of the reduction operation to be used is reported, and the operation of reduction is executed with respect to this report. That is, in accordance with the report of the identity element, the operation result of reduction to which this identify element is input does not change.

Some embodiments described later relate to a method for gathering information in a distributed environment without sharing the memory, and the typical example is the case in which, as illustrated in FIG. 1B, the information management target 101 corresponds to a node 102 that is the reporting source of information. That is, when the node 102 itself reports the "state" of the entire node 102, the management target 101 is considered as the node 102 itself. However, in view of a more general situation such as a case in which the method is applied to information gathering regarding a plurality of components of a specified type that constitute the node 102, the management target 101 and the reporting-source node 102 are conceptually distinguished.

However, as an information gathering technique, gathering of information regarding a plurality of management targets 101 on the node 102 is equivalent to a case in which the management target 101 is considered as the node 102 and the reporting process for the collective identifier is performed in a layered manner between the nodes 102, and when emphasizing the ease of understanding, there are no problems in many cases in assuming that the management target 101 is the information reporting-source node 102 itself.

<First Embodiment>

FIG. 4 illustrates an example of functions of a computer that constitute an information gathering mechanism. The first embodiment includes (1)-(6) described below.

(1) With respect to a reporting-target event set for a plurality of management targets in a distributed system, the state of the system as a whole is managed by gathering, as information, encoded identifiers of targets in which the event has occurred. The encoded identifier corresponding to individual management target is referred to as an "individual identifier" below.

(2) The "mechanism for gathering, as information, encoded individual identifiers of targets" is referred to as an "ID gathering mechanism 401" below. The individual identifier is input to the ID gathering mechanism 401.

(3) In the ID gathering mechanism 401, the gathering of identifiers is performed by a "reduction unit 404" that is a form of collective communication. Objectives of the reduction unit 404 are to reduce the communication volume on the network, and to reduce the memory capacity required for reception and the CPU time (including the memory access time) required for reception in the node (103 in FIG. 1B) that receives gathered information.

The ID gathering mechanism 401 in the present embodiment may be regarded as implementation, on a computer system, of the combination of an "ID encoding mechanism 403" that is a function for encoding the management target into an individual identifier and the "reduction unit 404".

The reduction unit 404 is a kind of collective communication on a distributed parallel system, and it refers to operations in which data arranged in a distributed manner on a plurality of nodes (102 in FIG. 1B) are input, and the operation result is returned as output to one or all of the nodes. That is, the reduction unit 404 is a combination of communications and operations between nodes. In the present embodiment, a method that has been conventionally known may be used for the "mechanism" of the reduction unit 404. However, the reduction unit 404 according to the present embodiment has a policy regarding what data are, and how the data are, set as the target of the "reduction". Note that details of the packet format for reduction communication do not matter in the present embodiment.

The result of calculation by the reduction unit 404 from individual identifiers that are determined by the "ID encoding mechanism 403" is referred to as a "collective identifier" below. In view of the fact that the reduction unit 404 is a typical collective communication, the calculation result of the reduction unit 404 is referred to as a "collective identifier".

Individual identifiers used for the calculation of the collective identifier are referred to as a "generation factor" (of the collective identifier) or simply a "factor". When the operation is multiplication, it corresponds to the "factor" as a usual term in mathematics. However, in the present application, the term "generation factor" or "factor" is used for a case in which an operation other than multiplication such as bitwise OR (OR operation for each bit) or addition is used for the reduction unit 404 as well.

(4) The technical elements of the present embodiment for achieving the objectives in (3) are the "the ID encoding mechanism and the operation method applied to the encoded identifier". The technical elements have the following two aspects.

(4a) The technique in the aspect of (the encoding mechanism of) identifiers and the algorithm for each code.

(4b) The technique regarding the method for using an "inter-node operation apparatus" (a special network or a special apparatus connected to the network used for realizing the reduction unit 404) that is specific to the system.

(5) When calculating the collective identifier corresponding to a plurality of management targets from individual identifiers by the reduction unit 404, the node (corresponding to 101 in FIG. 1B) that is in charge of reporting information is referred to as a "transmitter side node". Meanwhile, the node (corresponding to 103 in FIG. 1B) that is in charge of gathering information is referred to as a "receiver side node".

FIG. 5 is a flowchart illustrating an example of the process of the ID gathering mechanism 401 at a transmitter side (FIG. 4). The process in the flowchart in FIG. 5 is executed by a CPU 701-1 of a transmission origin node 701 or a CPU 702-1 of a reception relay node 702 that functions as a relay node, in FIG. 7 described later. Meanwhile, the work area of an input parameter 1 or 2 or the like is stored in a memory 701-2 of the transmission origin node 701 or in a memory 702-2 of the reception relay node 702.

First, whether or not the local node is the origin node of the communication is judged (step S501). When the judgment in step S501 is NO ("n" in the drawing), the value that has already been received (the collective identifier) is stored in the input parameter 1 that stores the value that has already been received (step S502). When the judgment in step S501 is YES ("y" in the drawing), there is no value that has already been received, and therefore, a specified value is stored in the input parameter 1 (step S503). Here, it is preferable that the specified value is the identity element of the operation used for the reduction unit 404. For example, when the operation is addition or bitwise OR, 0 is preferable as the specific value. When the operation is multiplication, 1 is preferable as the specified value. When the local node is the origin node of the communication and there is no value that has already been received, the input parameter 1 is prevented from affecting the operation of the reduction unit 404 by storing the identity element in the input parameter 1.

Next, whether or not the condition that is to be reported is satisfied in the management target managed by the local node is judged (step S504). When the judgment in step S504 is Yes, the individual identifier corresponding to the management target of the local node (or the local node itself) is stored in the input parameter 2 that stores the state of the local node (step S505). When the judgment in step S504 is NO, a specified value is stored in the input parameter 2 (step S506). It is preferable that, in the same manner as in the case of S503, the specified value here is also the identity element of the operation used for the reduction unit 404. When the condition to be reported is not satisfied in the management target managed by the local node, the input parameter 2 is prevented from affecting the operation of the reduction unit 404 by storing the identity element in the input parameter 2.

A binary operation used for the reduction unit 404 is executed with respect to the input parameter 1 and the input parameter 2 (step S507). Details of the binary operation are described in some embodiments discussed later.

The operation result in step S507 is output as the collective identifier that is a content of transmission to the next forwarding destination (step S508). After that, the process of the ID gathering mechanism 401 at the transmitter side node illustrated in the flowchart in FIG. 5 is terminated.

According to the ID gathering mechanism 401 in the first embodiment, the communication volume and the memory capacity required for the calculated collective identifier respectively become smaller than the total communication volume and the total memory capacity required in reporting information separately to the node into which information is gathered from the reporting node.

Meanwhile, in some cases, every node may take charge of reporting information and may also gather information. That is, the transmitter side node and the receiver side node do not necessarily refer to physically specific nodes, and these simply refer to roles in the system.

In the field of collective communication, when each node takes charge of both reporting of information and gathering of information, simple gathering of information is called Allgather, and when the reduction unit 404 is executed, it is called Allreduce. There are following two methods for realizing Allreduce. In the first method, gathering (reduce) into a specific node is combined with broadcast (one-to-many communication for data of the same content) to a plurality of nodes. Note that, depending on the context, the one-to-many communication for data of the same content may be called multicast in a general case, and the term broadcast may be used only for a special case of "simultaneous communication to all the nodes in physical one segment in the network". In the second method, nodes exchange information with each other in the process of gathering, so that information is shared, after the completion of the communication process, between the nodes that participated in the gathering. For example, information gathering process may be realized by "exchanging, between every two nodes at each stage, information held by each of the nodes". These two methods are distinguished in terms of the communication mechanism, and in the present embodiment, either of them may be used.

(6) The mechanism for specifying the management target in the monitored state from the received collective identifier is called an "ID analysis mechanism 402". The ID analysis mechanism 402 includes the following two portions (see FIG. 4). The first portion is a process for specifying and restoring an individual identifier that is the "generation factor", from the received collective identifier (according to the ID encoding mechanism 403 in FIG. 4). The second portion is a process for specifying the management target (101 in FIG. 1B) from the individual identifier.

FIG. 6 is a flowchart illustrating an example of the process of the ID analysis mechanism 402 at a receiver side node (FIG. 4) in the first embodiment. The process in the flowchart in FIG. 6 is executed by the CPU 702-1 of the reception relay node 702 in FIG. 7 that functions as a receiver side node. Meanwhile, the work area W and the like are stored in the memory 702-2 of the reception relay node 702.

The collective identifier obtained by the reduction unit 404 between nodes is received (step S601). The collective identifier is stored in the work area W (step S602).

Whether or not the value indicated by the work area W has become the identity element in the operation of the reduction unit 404 is judged (step S603). When the judgment in step S603 is NO, one individual identifier is specified from the collective identifier (step S604). As a specific method for this specification, the following means are used for example, depending on the ID encoding mechanism 403 in FIG. 4.
(a) bit operational calculation
(b) factorization in prime factors
(c) search in a "comparison table of the collective identifier and individual identifiers (that are its generation factors)"
(d) "hash function" that makes the search faster by limiting the area for which the search in the comparison table is needed
(e) "perfect hash function" that obtains, from the collective identifier, at least one individual identifier (that is its generation factor)
Details of these means are described in some embodiments discussed later.

After that, the management target corresponding to the individual identifier specified in step S604 is processed (specified) (step S605). As a specific method for this specification, the following means are used for example, depending on the ID encoding mechanism 403 in FIG. 4.
(a) bit operational calculation
(b) search in a "comparison table of the individual identifier and a management number"
(c) "hash function" that makes the search faster by limiting the area for which the search in the comparison table is needed
(d) "perfect hash function" that obtains the management target number from the individual identifier Next, by an inverse operation of the reduction unit 404, the individual identifier specified from the work area W in step S604 is removed (step S606). After that, returning to the process in step S603, the processes from step S603 to step S606 described above are repeatedly executed. When the judgment in step S603 becomes YES, the process of the ID analysis mechanism 402 at a receiver side node illustrated in the flowchart in FIG. 6 is terminated.

The present embodiment realizes a mechanism that has (1)-(6) on the information gathering mechanism illustrated in FIG. 7 for example. The minimum requirement for an information gathering mechanism for realizing the present embodiment is a "configuration in which individual computers (nodes) equipped with a CPU, a memory and a network interface are coupled with each other by a network". That is, as illustrated in FIG. 7 through FIG. 10, the transmission origin node 701 and the reception relay node 702 are connected by the network including a relay apparatus 703 that is a switch or a router, and a communication line 704. Meanwhile, FIG. 7 is an example of a computer system according to the first embodiment, and the nodes 701, 702 or the relay apparatuses 703 may be included in the system in any number. The transmission origin node 701 is equipped with the CPU 701-1, the memory 701-2, and an NIC 701-3 that is a network interface. The reception relay node 702 is equipped with the CPU 702-1, the memory 702-2 and an NIC 702-3. Meanwhile, the reception relay node 702 is categorized into a type 1 (the reception area for the collective identifier) and a type 2 (the reception area for the collective identifier and the storage area for the table of identifiers), depending on the usage format of the storage area of the memory 702-2.

Figure 1B:
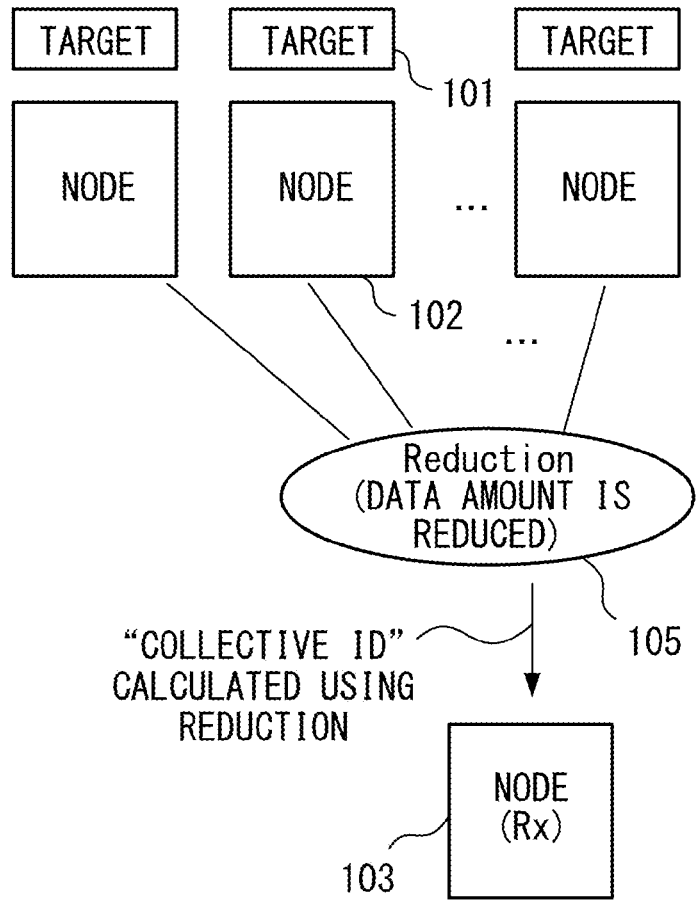

In FIG. 7, the transmission origin node 701 corresponds to the node 102 in FIG. 1, and includes the management target 101 in FIG. 1. Alternatively, the transmission origin node 701 may be the management target 101.

FIG. 8 is diagram explaining the management target managed by a node. The management target managed by a node may be the state of the node itself as illustrated in FIG. 8A, and may be the state of each component of the node as illustrated in FIG. 8B. In addition, the management target managed by a node may be a management target object other than the components of the node, and may be specific data in the memory of the node. As illustrated in FIGS. 8B-8D, the management target whose state is managed may be conceptually distinguished from the node that is the information communication source. However, when state information for a plurality of management targets managed by the information communication-source node is gathered in the information communication-source node by an information gathering process that is similar to the process of the reduction unit 404 (FIG. 4), explanation may be provided in the same manner as the case in which they are conceptually regarded as equivalent. Therefore, in order to simplify the explanation, the management target managed by a node is assumed for the sake of convenience as the state of the node as illustrated in FIG. 8A.

In the transmission origin node 701, the CPU 701-1 executes the process of ID gathering mechanism 401 illustrated in the flowchart in FIG. 5 by executing a provided control program, while using the memory 701-2 as a work area. As a result, the transmission origin node 701 forwards the operation result of the reduction unit 404 (FIG. 4) with respect to the individual identifier generated in the local node (or the identity element described above) to the reception relay node 702 as a collective identifier. As previously described in the explanation for step S506, when the condition to be reported is not satisfied in the management target managed by the local node, the identify element is stored in the input parameter 2, and then the operation of the reduction unit 404 is executed. In this case, input information does not change according to the operation of the reduction unit 404, that is, the collective identifier is forwarded to the reception relay node 702 without any change.

In FIG. 7, when the reception relay node 702 works as a relay node, the reception relay node 702 may also be the transmission origin node 701. In this case, the reception relay node 702 receives the collective identifier from the transmission origin node 701 or another reception relay node 702 that functions as a relay node. Then, the CPU 702-1 executes the process of the ID gathering mechanism 401 illustrated in the flowchart in FIG. 5 by executing the provided control program, while using the memory 702-2 as a work area. As a result, the reception relay node 702 forwards the calculation result of the reduction unit 404 (FIG. 4) with respect to the received collective identifier and the individual identifier generated in the local node to another reception relay node 702 as a new collective identifier.

When the reception relay node 702 works as a reception node, the reception relay node 702 corresponds to the node 103 in FIG. 1A, and receives the collective identifier from the transmission origin node 701 or another reception relay node 702. Then, the CPU 702-1 executes the process of the ID analysis mechanism 402 illustrated in the flowchart in FIG. 6 by executing a provided control program, while using the memory 702-2 as a work area. As a result, the reception relay node 702 identifies the individual identifier and the management target corresponding to the individual identifier, from the received collective identifier.

The first embodiment has the following two features.
(1) The individual identifier of the management target in the present embodiment is not a sequence number or the like but is data encoded in a specific method.
(2) Data transmitted to the receiver side is not the individual identifier itself but is a collective identifier calculated by the reduction unit from the individual identifier corresponding to a management target in which the condition is satisfied.

Above-mentioned (1) and (2) are realized by the process of the ID gathering mechanism 401 presented in FIG. 4 and the flowchart in FIG. 5.

FIGS. 9A and 9B illustrates an example of a method for calculating the collective identifier by the reduction unit 404. In the example illustrated in FIGS. 9A and 9B, the management target is encoded into an individual identifier by the management target ID encoding mechanism 403, and the reduction unit 404 is executed according to the state of each management target and the individual identifier. In FIG. 9A, 0b indicates a binary notation.

As illustrated in FIG. 9A, the ID encoding mechanism 403 encodes each individual identifier corresponding to each management target using data in which the bit at the position corresponding to the management target is turned on. That is, regarding the management target that satisfies a specified condition, the individual identifier corresponding to the management target is given to the reduction unit 404, and regarding other management targets, the identity element in which the bit field is 0 is given to the reduction unit 404.

As illustrated in FIG. 9A, the reduction unit 404 generates the collective identifier by executing an bitwise OR operation to the coded individual identifiers. Meanwhile, in this operation, it is preferable that the condition "only 1 bit in the input data from each node is on, and others are off". In addition, the collective identifier may also be generated using multiplication (FIG. 9B), bitwise exclusive OR (XOR operation in units of bits), integer addition, or floating point addition (however, used as integer addition in the range of the number of digits of the mantissa portion). In addition, the collective identifier may be generated using bitwise AND by applying bit inversion (bitwise NOT) to all the input data at each node. In this case, the data may be interpreted at the receiver side node by applying bit inversion to the final result or inverting the meaning of on/off of the bits.

As described above, in the first embodiment, "Technical problem 1" described above is solved by "folding information from a plurality of nodes into one packet/message". That is, state information from the respective nodes is reduced using the collective identifier. Accordingly, the communication volume on the network (the communication line 704 in FIG. 7) may be significantly reduced compared with the case in which state information from the respective transmitter side nodes (the transmission origin nodes 701 in FIG. 7 or the like) are simply gathered and received. In a similar manner, the memory capacity and the communication processing time required for reception at the receiver side node (the reception relay node 702 in FIG. 7) may be significantly reduced compared with the case in which state information from the respective transmitter side nodes (the transmission origin nodes 701 in FIG. 7 or the like) is simply gathered and received.

FIGS. 10A-10B are explanatory diagrams for the effect of reduction in the memory usage by information gathering according to the reduction unit. FIG. 10A illustrates a case in which, according to the related art, the receiver side node simply gathers and receives state information from the respective transmitter side nodes. Meanwhile, FIG. 10B illustrates a case in which the receiver side node receives state information that is reduced using a collective identifier. In the case in which the receiver side node simply receives state information (FIG. 10A), the memory capacity required for the receiver side node to receive state information of the respective management targets is the minimum write size (2 bits)×the number of the management targets (4). Meanwhile, in the case in which the receiver side node receives state information that is reduced using the collective identifier, (FIG. 10B), the minimum write size (4 bits)×the number of the management targets (4)/the number of bits in the area (4 bits) is sufficient as the memory capacity required for the receiver side node to receive state information of the respective management targets.

In the present embodiment, further, the communication efficiency and the usage efficiency of the memory area may be improved by the encoding based on the ID encoding mechanism 403. The method for encoding is explained below.

By the encoding that is suitable for the nature of the reporting-target event, the communication volume required for communication on the network and the memory capacity and the communication processing time required for reception at the information gathering node may be improved. Meanwhile, in the following description, the "resolution" relates to the "nature of the reporting-target event" that should be considered in encoding.

With regard to a positive integer k, a case "when the number of management targets in which the reporting-target event has occurred at the same point in time is k or less, and only at that time, the ID analysis mechanism 402 can identify the nodes in which the reporting-target event has occurred, from a received collective identifier" is assumed. When this assumption is satisfied, the "resolution" of the ID analysis mechanism 402 (as a "system" including the ID gathering mechanism 401, the individual identifier, the collective identifier) is defined as k. Assuming the number of management targets in which there is a possibility of occurrence of the reporting-target event, N≥k is established.

In this patent specifications, the following descriptions may be used.
(1) When N=k, the "resolution of the ID analysis mechanism 402 is "perfect" (or unlimited).
(2) When N>k, the "resolution" of the ID analysis mechanism 402 is limited (by an upper limit k).

When the resolution is limited, it is not necessary to include all the "distinction between whether or not the state to be monitored about all the management targets". For this reason, by including, in the message area of the same length, other information, specifically information about a part of identifiers of the targets in which the state to be monitored has been established, it is possible to transmit information with which it is possible to make some sort of determination. When a plurality of pieces of information are included (two or more bits are set in one string), it is possible to handle a case such as when it is necessary only to know that an abnormality has occurred in either one of the management targets in the monitored state.

Figure 11A:
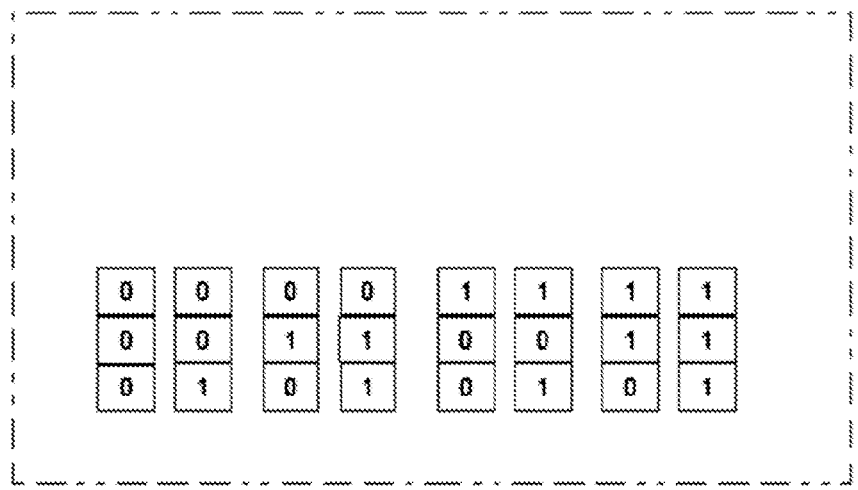
FIGS. 11A and 11B explain the resolution of the collective identifier.
Figure 11B:
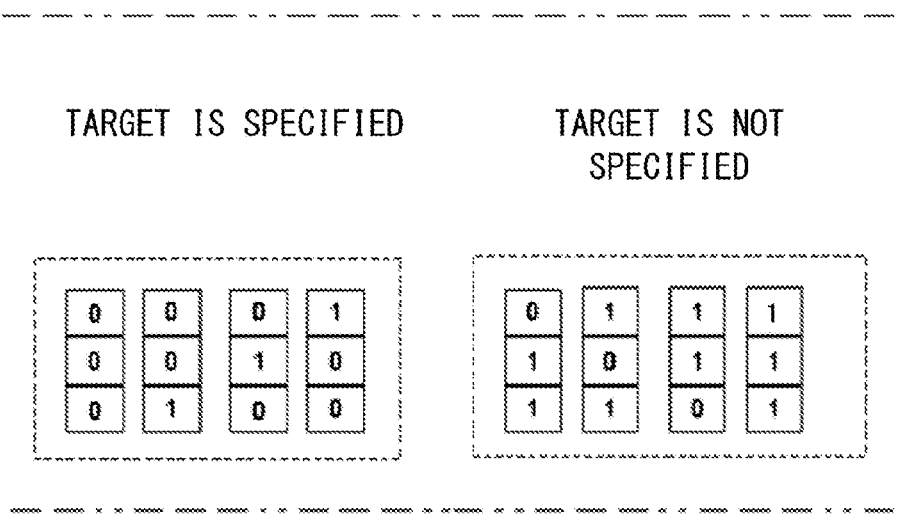

FIG. 11A and FIG. 11B are explanatory diagrams for the concept of the resolution of the collective identifier. When the resolution of the collective identifier is perfect, as illustrated in FIG. 11A, the management targets that are in the monitored state and that management targets that are not specified with respect to all the combination of the states. When the resolution of the collective identifier is limited, as illustrated in FIG. 11B, in a case in which the number of targets in the monitored state is not greater than the upper limit, the targets may be respectively specified. On the other hand, when the number of targets that are in the monitored state exceeds the upper limit, the targets are not specified.

FIG. 12A and FIG. 12B are diagrams explaining reduction of the communication volume and the memory usage by the reduction unit. As illustrated in FIG. 12A, in order to receive 1-bit information of whether or not the monitored state has established at respective management targets without limiting the resolution with respect to N (3 in the drawing) management targets, at least N bits (3 bits in the drawing) are required. That is, the number of targets that may be managed using N bits is up to N. However, when the resolution k is limited (k<N) as illustrated in FIG. 12B, it is possible to receive information regarding the monitored state from more than N management targets using an area that is smaller than N bits. That is, the number of targets that may be managed using N bits is larger than N. FIG. 12B illustrates a case in which the states of 5 management targets are received in an area of 3 bits while setting an upper limit 1 for the resolution. The present embodiment realizes reduction in the communication volume and the memory usage mainly by the encoding by the ID encoding mechanism 403.

In the present embodiment, when the resolution is limited, the "property, as a numerical value, of a set of identifiers that may be stored in an area" is used in information compression.

When the resolution is limited, Technical problem 2 mentioned above is solved by elaboration about the ID encoding mechanism 403 according to fifth through ninth embodiments described later. Meanwhile, in a case in which a perfect resolution is required, Technical problem 2 mentioned above is solved by regarding management targets for which grouping is applied (in a plurality of layers if needed) as a new management target, as described later in the fourth or the tenth embodiment.

As described above, according to the first embodiment, it becomes possible to reduce the time required for information-gathering communication. Especially the communication volume on the network required for the reception or relaying, and the memory area access amount and the overhead involved in the memory access at each node are significantly reduced.

In addition, according to the first embodiment, the referenced memory area at the relay node and the reception node becomes smaller, and therefore, usages of the memory bus band and the cache in the entire system are reduced, leading to a decrease in the load related to the monitoring of the states and the process for sharing the states. Accordingly, the throughput for the entire system is improved.

According to the first embodiment, by the usage of the collective identifier, the communication volume on the network and the memory capacity and the communication processing time required for reception at the information gathering node are significantly reduced compared with the case in which state information from the respective nodes is simply gathered and received.

According to the first embodiment, when there is an upper limit in the "resolution", it becomes possible to reduce the communication volume and the memory usage, according to the idea explained in FIG. 12B.

Furthermore, reduction in the memory capacity required for reception has a large secondary effect of improving the total performance of a system in which the computing process and the reception process are executed in an overlapped manner, by reducing conflicts between the memory access due to the computing process (that is independent from reception) performed in parallel with reception and the memory access at the time of reception.

Meanwhile, details of the ID encoding mechanism 403 are described in some embodiments discussed later.

<Second Embodiment>

The function configuration of the second embodiment is substantially the same as the configuration according to the first embodiment explained in FIG. 4. In addition, the overall system configuration of the second embodiment is also substantially the same as the configuration according to the first embodiment explained in FIG. 7. Furthermore, the functions of the ID encoding mechanism 403 and the reduction unit 404 in the second embodiment are also substantially the same as the functions according to the first embodiment explained in FIG. 9.

The ID encoding mechanism 403 encodes each individual identifier corresponding to the individual management target using data in which the bit at the position corresponding to the management target is turned on. The bit position corresponding to the individual management target is determined as in (1) through (5) below for example.

(1) When sharing information in units of bits in an information gathering mechanism in which there are N management targets (nodes, subsystems, jobs . . . ), connected memory areas of N bits, or areas that are connected in a sectional manner, are prepared. In the case in which connected areas are prepared, the connected areas are sectioned in every size of s bits that is the application target of one bit operation order (in many cases, a size of an integer supported by (the (processor) of) the CPU), the x-th area is specified as the one at s×x bits (s×x/8 bytes) from the start. In the Case of areas that are connected in a sectional manner, when the connected areas are sectioned and handled in every size of s bits that is the application target of one bit operation order, first, the start address of the x-th area is specified (according to a table storing pointers, or the like).

(2) The memory areas of N bits mentioned above are divided into every m bits, m being the unit of update by reduction or atomic operation. The number of bit areas after division is assumed as n. For example, when atomic operation can only be performed in units of 128 bits with respect to 1024 bits corresponding to 1024 nodes, 8 areas of 128 bits are prepared. Meanwhile, when the alignment restriction regarding atomic operation is in units of 16 bytes (=128 bits), the area on the 16-byte border is used. When N is not an integer multiple of m, dummy bits are added to the end of the area to make it an integer multiple of m.

(3) Assuming the i-th (i is an integer 1 to N) individual identifier as i and the number for n bit areas after the division into every m bits as j, and the bit number in each area of m bits as k, i and (j, k) are associated one-to-one. For example, in the case of connected areas, the association is made as $j=((i-1)/m)+1$, $k=i-j*m$. In this case, inverse mapping is obtained as $i=(j-1)*m+k$. The individual identifier and the management target number in the information gathering mechanism are associated by arithmetic conversion such as "to use the low order digit" or the like, or by creating a correspondence table between the management target number and the individual identifier.

The processes in (1) through (3) are further explained using FIG. 13. FIG. 13 illustrates the correspondence relationship between the management target number and the bit position in the collective identifier storage area in the memory area in the receiver side node. As illustrated in FIG. 13, the nodes that are the management targets in the information gathering mechanism are divided into sets of nodes equal to or less than the number of bits in an integer area s, and the set of the nodes and the integer area are associated. Meanwhile, the memory area of N bits is divided into a bit field of m bits, and the management target number (node number) in the set of the nodes and the bit number in the integer area are associated. The management target number and the individual identifier are associated, and accordingly, the individual identifier and 1 bit at a specified position in the memory area are associated.

Figure 14:
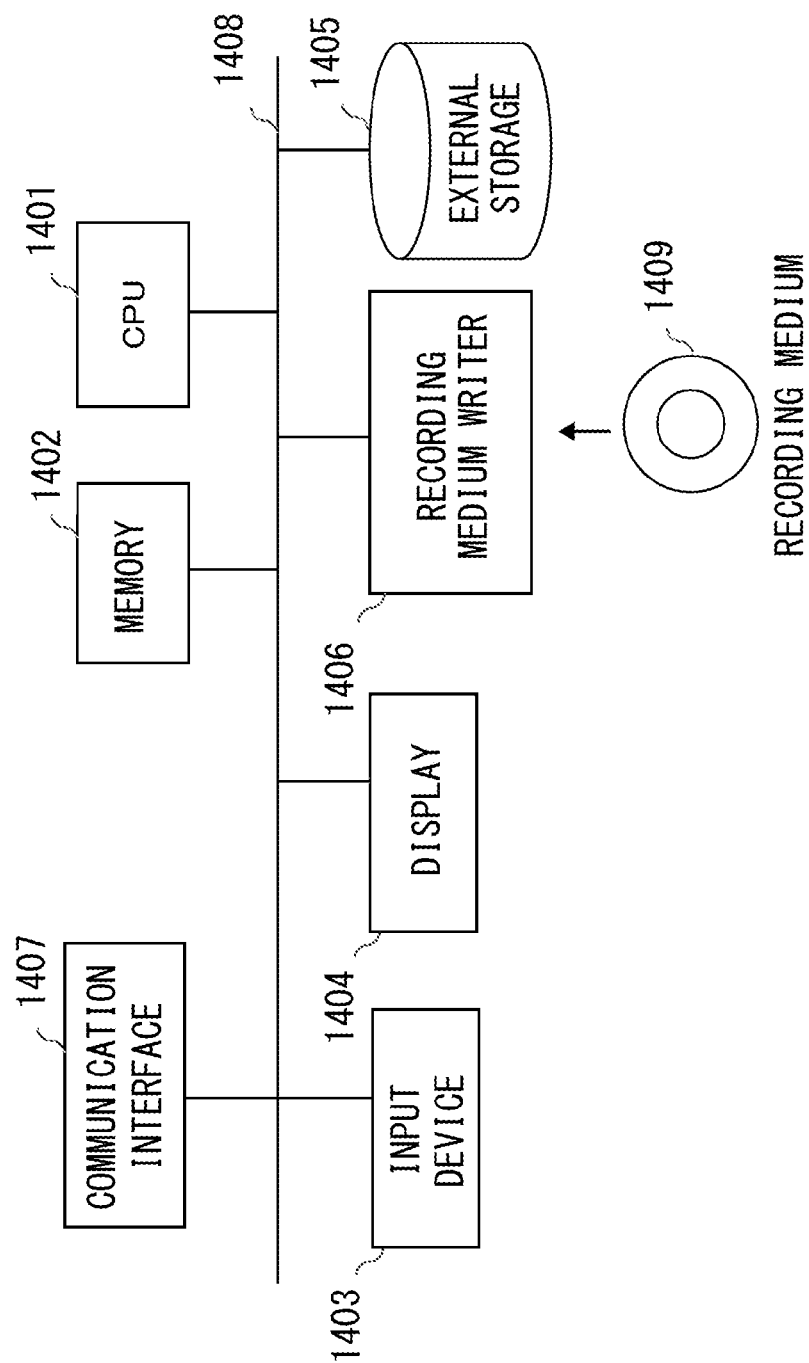
FIG. 14 illustrates an example of a computer that associates a management target number and a bit position.

The processes of (1) through (3) described above are executed in advance by a computer, before the start of operation of the information gathering mechanism. FIG. 14 illustrates a configuration example of a computer that associates the management target and the bit position. As illustrated in FIG. 14, the computer includes a CPU 1401, a memory 1402, an input device 1403, a display device 1404, an external storage 1405, a recording medium writer 1406 that is able to write data into a recording medium 1409, and a communication interface 1407. They are connected with each other by a bus 1408. The association between the management target and the bit position are executed by the CPU 1401, and the execution result is displayed on the display device 1404 and recorded in the recording medium 1409 through the recording medium writer 1406. Data that are recorded in the recording medium 1409 and that represent the correspondence described above may be recorded in the memory 701-2 or 702-2 of the transmission origin node 701 or the reception relay node 702 that needs to identify the management target, through a recording medium reading apparatus that is not particularly illustrated in the drawing, in the system configuration illustrated in FIG. 7.

FIGS. 15A-15H illustrate an example of an individual identifier table held by the receiver side node in a case in which the operation is multiplication. FIG. 15A represents ordered prime numbers that are smaller than a specified upper limit. FIG. 15B represents ordered prime numbers between specified upper limit and lower limit. FIG. 15C represents ordered powers of prime numbers that are smaller than a specified upper limit. FIG. 15D represents ordered powers of prime numbers between specified upper limit and lower limit. FIGS. 15E and 15F illustrate the correspondence relationship. In these examples, one of the components matches FIG. 15A-15D, and the other components are 1. FIG. 15G represents the correspondence relationship between the management target number and the real part and the imaginary part of the "prime numbers" (prime elements) in Gaussian integers. FIG. 15H represents the correspondence relationship between the management target number and the coefficient of 1 and the coefficient of ω of the "prime numbers" (prime elements) in Eisenstein integers.

Figures 16A, 16B, 16C, 16D:
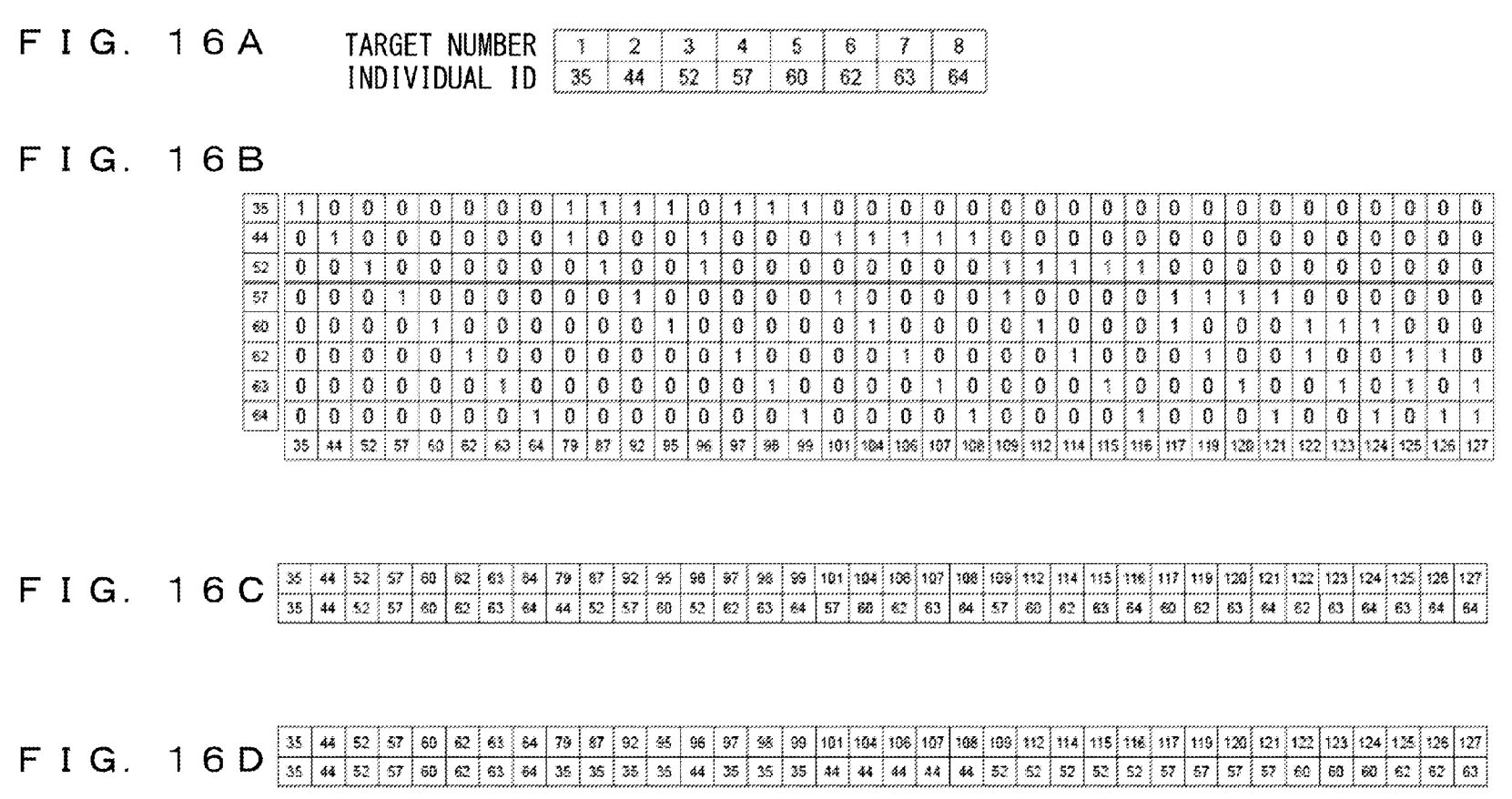

FIGS. 16A-16D illustrate an example of an individual identifier table held by the receiver side node in a case in which the operation is addition. As an example, the operation used in the function of the reduction unit 404 is addition, the upper limit for the resolution is 2, and the field length of the identifier is 7 bits. FIG. 16A represents a comparison table of the individual identifier and the management target number. FIG. 16B represents a comparison table of the collective identifier and the bit map of the individual identifiers that are generation factors of the identifiers. In the bit map, the value is 1 when the monitored condition is satisfied, and the value is 0 when it is not satisfied. FIG. 16C represents a comparison table of the collective identifier and the "largest individual identifier that is included as a generation factor". FIG. 16D represents a comparison table of the collective identifier and the "smallest individual identifier that is included as a generation factor".

In FIG. 15A through FIG. 16D, each identifier table is used for realizing the function of the ID encoding mechanism 403. Data that represent each identifier table are deployed on the memory 702-2 of the reception relay node 702 that functions as the receiver side node in FIG. 7.

When the ID analysis mechanism 402 uses the comparison tables in FIGS. 16A-16D while the operation is addition, in order to obtain individual identifiers that are the generation factors of the received collective identifier, a comparison table such as FIG. 16C or 16D is required in which the collective identifier is associated with at least one of the individual identifiers that are the generation factors, or with a plurality of individual identifiers (expressed as a bit map, an array, a connected list or the like).

When the resolution is 2 or more, the number of entries in the comparison table is larger than the number of individual identifiers, and therefore, the storage capacity of the memory 702-2 (FIG. 7) required to keep the whole comparison table becomes large. Accordingly, a secondary storage medium such as a hard disk device may be required. However, it is possible to suppress the memory reference amount per one search in identifiers (a process to obtain a generation-factor individual identifier from the collective identifier or a process to obtain the management target number from the individual identifier) in the present embodiment, by using "hash function" explained in embodiments described later, for example.

(4) The function of the ID encoding mechanism 403 realized by the CPU 701-1 or 702-1 of the transmission origin node 701 and the reception relay node 702 in FIG. 7 executes a process as follows. The ID encoding mechanism 403 gives data that turn on the k-th bit with respect to the j-th area sectioned in every m bits, as an argument for Reduction or Atomic Operation as needed (for example, when the state flag of a certain management target is on). For example, when Atomic Operation can only be performed in units of 128 bits with respect to 1024 bits corresponding to 1024 nodes, the node of the node number 130 performs a bitwise OR operation in the second 128-bit area using data in which the second bit is turned on. Accordingly, the ID encoding mechanism 403 reports the satisfaction of the monitored condition regarding the management target in the corresponding node. Here, the bit number in the area sectioned in m bits may be counted from either end. Especially, as the word length for the computer used by m bits, how to assign numbers in the computer architecture in Endian and how to assign bit numbers do not have to be the same. For example, the one which is more convenient for (speeding-up of) the process at the receive ride node for specifying individual identifiers from the collective identifier may be selected.

FIG. 17 is a flowchart illustrating an example of a process performed by the ID gathering mechanism 401 at a transmitter side in the second embodiment.

Here, each identifier represents the following information.
(1) collective identifier=the value of the bit field in which all the reduction operation results have been stored
(2) individual identifier=the bit field number, the position in the bit field When the process of the ID gathering mechanism 401 starts, the CPU 701-1 of the transmission origin node 701 (or, the CPU 702-1 of the reception relay node 702) inputs the bit field number of the management target managed by the node into the bit field number (step S1701).

When the node is the transmission origin node 701 (transmitter side node) in FIG. 7, (the judgment in step S1702 is YES), the CPU 701-1 inputs 0 (zero) as the initial value for the bit field (step S1703). On the other hand, when the node is not the origin node of the communication, that is, when it is the reception relay node 702 that functions as a relay node (the judgment in step S1702 is NO), the CPU 702-1 inputs the value received from the node of the preceding stage as the initial value for the bit field (step S1704).

When the condition that should be reported is satisfied in a management target managed by the local node (the judgment in step S1705 is YES), the CPU 701-1 or 702-1 executes an OR operation between the bit field value that was input in step S1703 or step S1704 and the bit corresponding to the management target (step S1706). On the other hand, when the condition that should be reported is not satisfied in a management target managed by the node (the judgment in step S1705 is NO), the CPU 701-1 or 702-1 skips step S1706. The CPU 701-1 or 702-1 transmits the operation result to the next forwarding-destination node as the collective identifier, through the NIC 701-3 or 702-3 (step S1707).

(5) The relay node or the reception node obtains information of the entire management target (the system, sub-system, job, apparatus, and the like), by referring to the received N bits (n areas of m bits). Meanwhile, in order to confirm that all the nodes that gather information have updated a specified area, for example, barrier synchronization may be executed or reduction operation including a synchronization function may be executed after the respective nodes updated information.

According to the processes (1) through (5) described above, each node is able to include the 1-bit state information for each management target in the collective identifier and to report it to the receiver side node. In addition, data of a given length may be reported while being broken down to bit strings. However, assuming the bit count of the data area that is the reduction operation target as m, data that are larger than m bits are processed while being divided in units of m bits.

Figure 18:
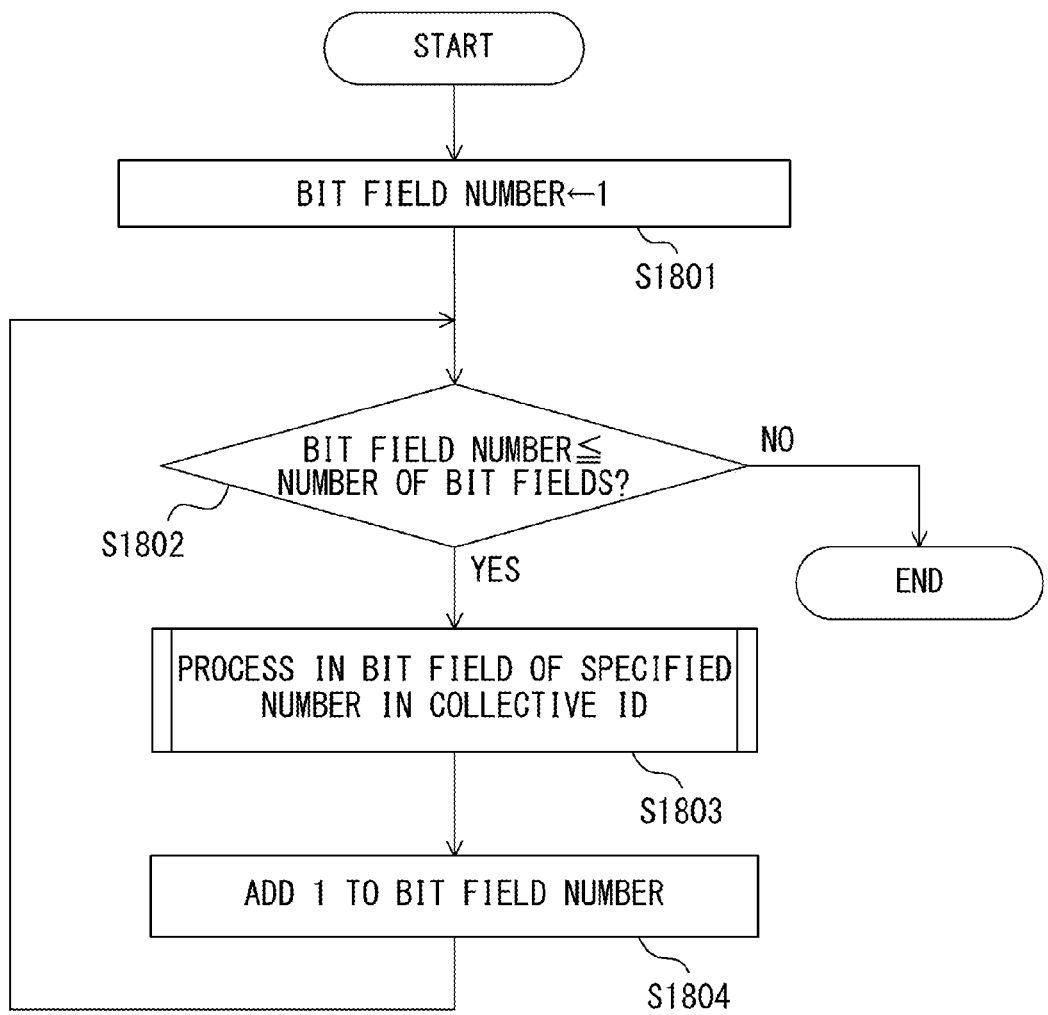
FIG. 18 is a flowchart illustrating an example of a reception process across an entire collective identifier performed by an ID encoding mechanism at a receiver side node in the second embodiment.

FIG. 18 is a flowchart illustrating a reception process across an entire collective identifier performed by an ID analysis mechanism 402 in FIG. 4 at a receiver side node in the second embodiment. When the process of the ID analysis mechanism 402 starts, the CPU 702-1 of the reception relay node 702 inputs 1 as the initial value for the bit field number (step S1801). When the current bit field number is equal to or smaller than the number of bit fields (the judgment in step S1802 is YES), the CPU 702-1 executes a process with respect to the bit field of the corresponding bit field number in the collective identifier received by the local node (step S1803).

When the process in step S1803 is terminated, the CPU 702-1 adds 1 to the bit field number (step S1804), and returns to the process in step S1802. When the bit field number exceeds the number of bit fields (the judgment in step S1802 is NO), the CPU 702-1 terminates the process of the ID analysis mechanism 402.

Figure 19:
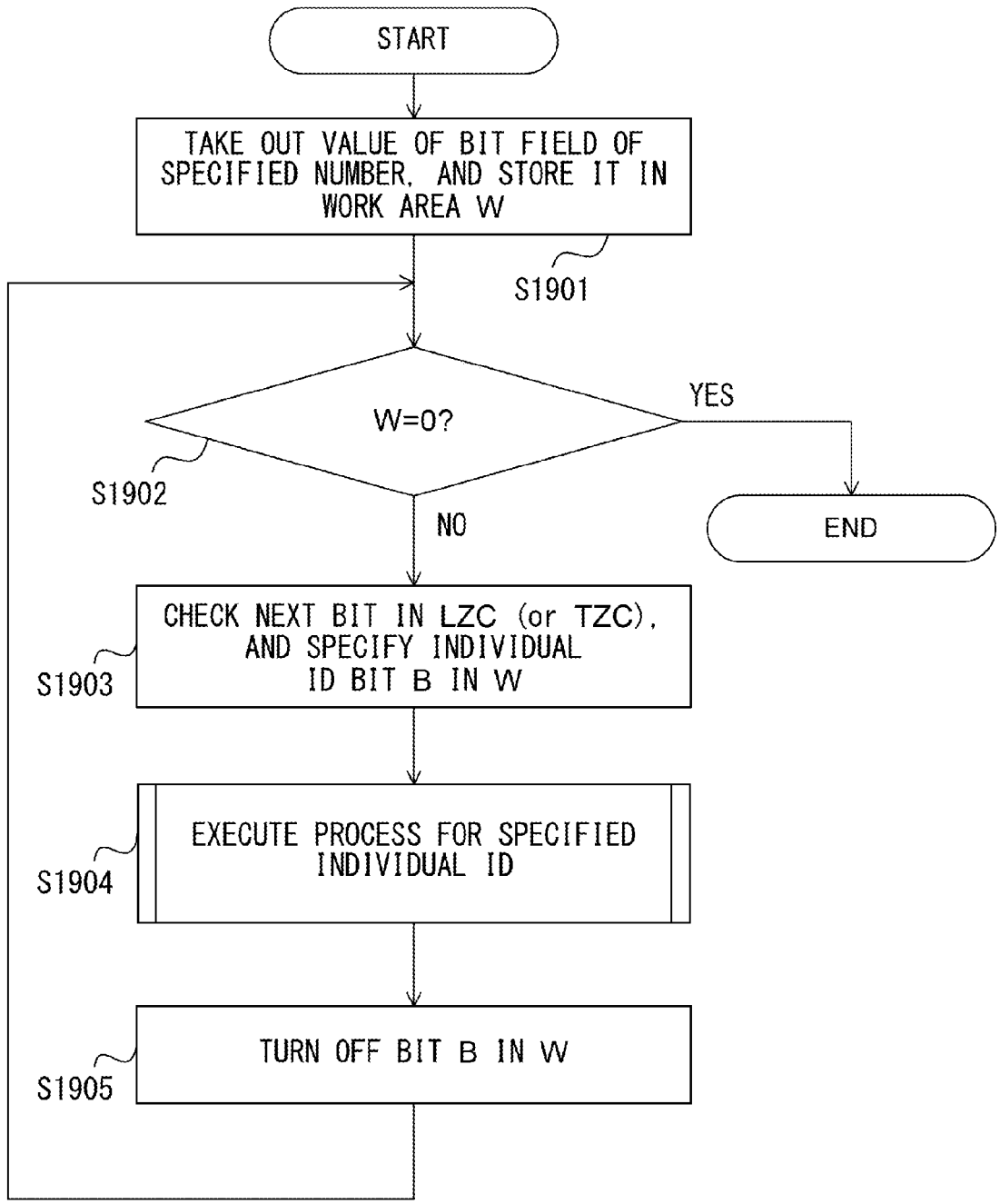
FIG. 19 is a flowchart illustrating an example for a reception process for an individual bit field that configures a collective identifier, performed by ID analysis mechanism at a receiver side node in the second embodiment.

FIG. 19 illustrates details of step S1803 in FIG. 18. That is, FIG. 19 is a flowchart illustrating an example of a reception process for the individual bit field configuring the collective identifier, performed by the ID analysis mechanism 402 at a receiver side node in the second embodiment.

When a process with respect to the bit field of a specified bit field number starts, the CPU 702-1 takes out the value of the bit field of the specified bit field number, and stores the bit field value that has been taken out in the work area W in the memory 702-2 (step S1901).

When the value stored in the work area W is not 0 (zero) (the judgment in step S1902 is NO), the CPU 702-1 specifies a bit B in which 1 appears in the individual identifier, by referring to the next bit in Leading Zero Count (LZC) or Trailing Zero Count (TZC) in the work area W (step S1903). Here, LZC is an operation to obtain Number of Leading Zero (NLZ), and NLZ refers to the number of Os counted from Most Significant Bit (MSB) until 1 appears for the first time. Meanwhile, TZC is an operation to obtain Number of Trailing Zero (NTZ), and NTZ refers to the number of Os counted from Least Significant Bit (LSB) until 1 first appears.

The CPU 702-1 specifies the management target number corresponding to the specified individual identifier, and executes the process defined in advance with respect to the management target of the specified management target number (step S1904). The CPU 702-1 turns off the value of the bit B specified in S1903 to 0 (zero), and returns to the process in step S1902.

When the value stored in the work area W becomes 0 (zero) (the judgment in step S1902 is YES), the CPU 702-1 terminates the processes with respect to the bit field of the specified bit field number, and the process in step S1803 in FIG. 18 is terminated. From the state in which identity element=0 (see step S1704 in FIG. 17) individual identifiers are sequentially added to the collective identifier by OR operations in units of bits (step S1706 in FIG. 17). Therefore, in the flowchart in FIG. 19, the individual identifiers are sequentially specified by inverse operations of the OR operation in units of bits (step S1903), the specified bits are turned to off (step S1905), and the bit field eventually returns to identity element=0. Therefore, when the judgment in step S1902 becomes YES, the processes in the flowchart in FIG. 19 are terminated.

Assuming the bit string that represents data of each node as a vector of a finite field GF(2) and making a matrix from a set of vectors representing data of a plurality of nodes, data transmission of the transmitter side node according to the second embodiment corresponds to a communication method based on a virtual transposed matrix as described below.

In the data-gathering communication of the related art, the receiver side node receives data corresponding to each transmission side node in the original form of "one for each node".

node01|b11 b12 ... b1m ("row vector" corresponding to the node01)
node02|b21 b22 ... b2m ("row vector" corresponding to the node02)
.........
node0N|bN1 bN2 ... bNm ("row vector" corresponding to the node0N)

On the other hand, the receiver side node according to the second embodiment receives "the same type of data in which the bits at the same position are arranged in the order of nodes" with respect to data transmitted from all the transmitter side nodes. When the receiver side node reads a group of bit data from the individual nodes, each column before transposition may be restored from the matrix after transposition (the transmission result by the reduction unit), by looking at each row assuming a matrix again as described below.

the first bit|b11 b21 ... bN1 ("column vector" corresponding to the first bit)
the second bit|b12 b22 ... bN2 ("column vector" corresponding to the second bit)
...
the m-th bit|b1m b2m ... bNm ("column vector" corresponding to the m-th bit)

According to the information gathering mechanism according to the second embodiment, in the same manner as the case of the first embodiment, the communication volume and the required time for information-gathering communication may be reduced. Furthermore, the access amount in the memory area required for reception or relaying at each node and the overhead involved with the memory access are significantly reduced. When usages of the memory bus band and the cache in the entire system are reduced as the usages of the memory bus band and the referenced memory area at the relay node and the reception node become smaller, it leads to a decrease in the load related to monitoring of the states and the process for sharing the states, and an effect of improving the throughput in the entire system may be obtained.

Furthermore, when the receiver side node accumulates 1-bit state information from the respective transmitter side nodes and performs a particular process for only the management target in which a specified state has occurred, the following technical effect may be obtained. When performing a particular process for only the management target in which a specified state has occurred, processing performed while referring to data in which bit position is associated with the node according to reduction by bit operation in the integer area is faster than the method in which data gathered from the respective nodes by gather are directly used. This is because, when state information of the management targets are accumulated in the receiver side node by gather, the pieces of information of the respective management targets are located in areas parted at a distance of about the minimum packet length or the minimum length of write RDMA. For this reason, it is necessary for the receiver side node to issue a load instruction for each of the management targets in judging whether each of the management targets is in a specified state. On the other hand, according to the accumulation method involving the reduction according to the embodiment, assuming the area representing an integer as m bits, the states of m management targets are integrated into one integer in advance. For this reason, the number of issues of load instructions becomes 1/m, significantly reducing the occurrence rate of cache misses per unit time and speeding up the process.

In addition, the technical effect including the case in which information of a plurality of bits is accumulated is further described in detail, focusing on the size of the memory area used. By efficiently using all the bits in the area of the size for which reduction operation as in the second embodiment is available, the memory area for reception may be smaller compared with the case in which "write RDMA is used while all the information of the transmission source node is included in the packet from the individual nodes".

First, assuming that information that should be reported from each node is 1 bit, the minimum unit that may be written by write RDMA is W bits, and the number of transmitter side nodes is N. In the method in which each node write information by write RDMA, a memory area of NW bits is required at the receiver side node. On the other hand, the required area in the present embodiment is, using a description N=qm+r (0≤r<W), equal to or larger than (qm) bits and smaller than ((q+1) m) bits, that is, equal to or larger than N bits and smaller than (N+m) bits. N, W, and m are a positive integer, and W and m are close to each other. When N>1, N+W<NW is always satisfied. Therefore, the memory efficiency in the second embodiment using 1-bit report (presence/absence of occurrence of an event) is NW/(N+W) times compared with the case in which the report is made from each node by write RDMA, and if N>>W, it is about W times. In an information gathering mechanism of a large scale of more than 1000 nodes, N>>W may be satisfied because W may be about several tens of bit to several hundreds of bits.

In the case in which information that should be reported from each node is X bits, in the method in which each node write information by write RDMA, when there are portions of Y bits that are not effectively used in terms of the unit of W bits, YN bits are redundant, and the order of the number of redundant bits is generally about N, which is described as O(N) as the Landau symbol. In particular, when X=1, then Y=W-1, and (W-1)N bits become redundant. On the other hand, in the case in which information that should be reported from each node is X bits in the second embodiment, X pairs of areas required for the 1 bit report are to be prepared. In terms of each forwarding of each bit, the maximum number of redundant bits is (m-1) bits when reminder r of division of N by m is 1, and therefore, when X pairs are used, the redundant information is X(m-1) bits. That is, the second embodiment has an effect of keeping the redundant-bit area in a certain size or smaller even when the number of nodes N increases, and if N>>X, the required memory area may be significantly smaller compared with the method in which each node writes in formation by write RDMA. Even when N and X are close to each other, according to the second embodiment, the number of redundant bits may be smaller and the memory efficiency may be improved. This is because, when N is divisible by m, the number of redundant bits in forwarding 1 bit is 0, and therefore, redundant bits in forwarding X bits with respect to given X that is larger than 1 are also 0. When reminder r of division of N by m is close to m, the number of redundant bits in forwarding 1 bit is m-r, and the ratio of the number of redundant bits in the method in which each node write information by write RDMA and the number of redundant bits in the second embodiment is ((W-1)/N)/X(m-r). Therefore, if (m-r)<(X(W-1)/N), then ((W-1)/N)/(X(m-r))>1, and the required memory are becomes smaller in the second embodiment. For example, when N=X, then m-r<W-1 is necessary to obtain the effects.

<Third Embodiment≥

The configuration of the third embodiment is substantially the same as the configuration according to the first embodiment explained in FIG. 4. Meanwhile, in the information gathering mechanism according to the third embodiment, similar to the information gathering mechanism according to the second embodiment, the individual identifier corresponding to each management is the bit corresponding to the sequence number of the management target. However, the configuration of the information gathering mechanism according to the third embodiment is different from the first or second embodiment illustrated in FIG. 7. In the third embodiment, the bit operation in the reduction unit 404 is realized using an inter-node calculator such as Atomic Operation and the reduction function of the network or the like as illustrated in FIG. 20, FIG. 21, FIG. 22, instead of the CPU 701-1 or 702-1 in the node.

FIG. 20 through FIG. 22 illustrate first through third configuration examples of the information gathering mechanism according to the third embodiment. Meanwhile, in FIG. 7, FIG. 20 through FIG. 22, the same number is assigned to the elements that have the same function.

As illustrated in FIGS. 20-22, in the information gathering mechanism according to the third embodiment, the CPU 701-1 of the transmission origin node 701 and the CPU 702-1 of the reception relay node 702 do not include the ID gathering mechanism 401 and the ID analysis mechanism 402 in FIG. 4, unlike the information gathering mechanism according to the first or second embodiment. Meanwhile, in the information gathering mechanism according to the third embodiment, as illustrated in FIG. 20, an inter-node calculator 2001 that executes the ID gathering mechanism 401 to put together individual identifiers as a collective identifier may be connected to a relay apparatus 703. As illustrated in FIG. 21, the inter-node calculator 2101 or 2102 may be implemented in each node separately from each constituent element in the transmission origin node 701 or the reception relay node 702. Furthermore, as illustrated in FIG. 22, the inter-node operation function may be implemented in an NIC2201 or 2202 in the transmission origin node 701 or the reception relay node 702.

The function of the reduction unit 404 refers to, for example, a process defined by an API called MPI_reduce in the Message Passing Interface (MPI) standard, and it refers to contraction into one data of the same type as that before operation, by repeating binary operations for which individual data is specified. For example, when the specified binary operation is addition, the result of corresponding reduction is the sum total of data of all the nodes. Besides addition, in the MPI standard, multiplication, bitwise OR, a macro specifying "a pair of the maximum value and the location" and the like, are defined as operations that may be specified for reduction by MPI_reduce.

The performance of the reduction unit 404 in the environment of a distributed memory system is determined by the communication time between nodes, and the required time for operation is negligible. However, along with the increase in the system scale, the reduction unit 404 may become a process that involves relaying operations in multiple stages between all the nodes that have input information.

The inter-node communication time is the access overhead from the network device to the main memory, that is, the time for data to pass through the IO bus, and the CPU time for controlling the IO process to execute operation. In order to perform operation on the CPU, it is necessary to import operation-target data stored in the memory into the CPU, and the operation result needs to be stored in the memory. When the operation of the reduction unit 404 is performed on the CPU while relay processes in a plurality of states are performed on the network, the data is to pass through the IO bus and the memory bus twice per relaying at each stage. On the other hand, when the operation is performed inside the network device equipped with the inter-node operation function, the overhead due to the passing of data through the IO bus and the memory bus is reduced, and the reduction performance is significantly improved.

In the information gathering mechanism according to the third embodiment, the procedure of the gathering process for identifiers is substantially the same as that in the first embodiment except that the bit operation is executed by the inter-node operation device. However, since the type of the operations available in the inter-node calculator are limited compared with the case in which operation is performed by software on the CPU, it is preferable to realize the operation function using a function available in the inter-node operation device.

The technique related to the function described above is described in documents [1] through [5] below, for example.

[1] A. Gara et al, "Overview of the Blue Gene/L system architecture", IBM Journal of Research and Development VOL. 49 NO. 2/3 March/May 2005, p. 195-212.

In the document [1], the function of Collective Network of Blue Gene/L that is an example of an "device that executes operation independently from the CPU with respect to data on a plurality of nodes". The inter-node operation function is provided inside a "network interface for Collective Network" of each node.

[2] Hiroaki Ishihata, "Development of a high-function, high-performance system interconnect technology" p. 1-13 [Retrieved Apr. 1, 2014], Internet (URL:http://ng-arch.isit.or.jp/psi/images/event/hiroaki_ishihata_20061220.pdf)

[3] Toshiyuki Shimizu, "Development of a high-function switch that supports collective communication" p. 1-14 [Retrieved Apr. 1, 2014], Internet (URL:http://ngarch.isit.or.jp/psi/images/event/toshiyuki_shimizu_20080218.pdf)

The documents [2], [3] disclose the function and the internal structure of a "high-function switch" that is an example of the "inter-node calculator of an independent-unit type" in the "device that executes operation independently from the CPU with respect to data on a plurality of nodes".

[4] Y. Ajima, S. Sumimoto, T. Shimizu, "Tofu: A 6d mesh/torus interconnect for exascale computers", IEEE Computer Society, Vol. 42, No. 11, pp. 36-40 (2009)

[5] Y. Ajima, T. Inoue, S. Hiramoto, T. Shimizu, Y. Takagi, "the Tofu Interconnect", IEEE, Vol. 32, Issue 1, p. 87-94 (2011)

The documents [4], [5] disclose the function of the TBI (Torus Barrier Interface) of the ICC (InterConnect Controller: serves as both the network interface and the router) of Torus fusion (tofu) that is an original network of the supercomputer "Kei" (the K computer). The TBI is an example of the NIC 2201 or 2202 in which the inter-node calculator of the present application in FIG. 22 is provided. The document [4] describes that, while the form of realization is different from the "high-function switch" in the documents [2], [3], functions are equivalent.

In the third embodiment, a hardware mechanism such as those disclosed in the documents [1] through [5] may be used as the inter-node calculator 2001 (FIG. 20), 2101 or 2102 (FIG. 21), the NIC 2201 or 2202 (FIG. 22).

The network device (inter-node calculator) that supports the reduction function often has operation functions of relatively many types such as integer addition, multiplication, bitwise {AND, OR, exclusive OR}, max, min, floating-point addition, and the like. However, the supported types of operations, the compatible data types, and the size and number of data that may be controlled each time are different depending on the type of the network device. When it is impossible to realize Atomic Operation and reduction within the range of the supported data size and number of data, it may be necessary to expand the application range by applying layers, use of a plurality of areas, repeated use, and the like. Therefore, an operation that is one of available operations explained in the second embodiment and that is supported by the network apparatus is used.

Meanwhile, the reduction function in the MPI standard that is the API standard regarding reduction in parallel processing includes the synchronization function, and therefore, the synchronization function at the time of completion is often included in the reduction function provided by the network device in the parallel-processing environment. In this case, the receiver side node is able to know that data from all the transmitter side node have been collected, according to the completion of synchronization.

On the other hand, for example, in a case such as Fetch and Add in InfiniBand when an inter-node operation function in which the completion of operation performed by other nodes is not reported, it is necessary to use another method to know the timing at which data of all the nodes have been collected, by another method. Therefore, between the transmitter side node and the receiver side node, a synchronization procedure such as (a) or (b) below is performed.

(a) A barrier synchronization is executed between all the transmitter side nodes and the receiver side node as follows. That is, the transmitter side node starts barrier synchronization after the completion of transmission of the individual identifier code from the local node. The receiver side node starts barrier synchronization from the beginning of the process.

(b) The receiver side node monitors a specific area that the transmitter side node updates. That is, by Fetch and Add, the transmitter side node adds the number of management targets for which the local node is in charge of reporting information to the area (the initial value is 0) on the receiver side node, after the completion of the transmission of the individual identifier code from the local node. The receiver side node monitors the area that the transmitter side node updates by Fetch and Add, and determines the termination when the data in the area match the number of the management targets.

Meanwhile, the execution of Fetch and Add directly to the area of the receiver side node by all the nodes at the transmitter side may not always be a good idea in terms of performance (even if overflow does not occur to the counter), and it may be more advantageous to divide synchronization by Fetch and Add into several layers and perform it in stages. While this application of layers is performed by software, there are advantages in the third embodiment in terms of performance that data are gathered without overhead involved in the report of operation in each layer to the CPU by interruption by hardware on the network side, and that the number of nodes that may be gathered in one layer may be larger compared with the case in which software on the CPU performs reduction without using these mechanisms. This is because, when the inter-node operation mechanism and Fetch and Add are not used, it is necessary for the higher-layer node side with respect to information gathering to repeat the communication processes for the same number of times as the number of nodes in one layer, and therefore, in a large-scale system, it is inevitable to make the number of gathered nodes in one level small such as 2 or 3 in order to prevent delay at each stage too large, and the number of relay stages tends to increase.

According to the information gathering mechanism of the third embodiment, substantially the same technical effect described above as in the information gathering mechanism according to the first or second embodiment may be obtained. In addition, according to the information gathering mechanism of the third embodiment, the actual time to the communication completion is shortened, and the load on the receiver side node (including an intermediate node in a case in which layered processing is performed) may be reduced.

<Fourth Embodiment>

In the fourth embodiment, based on the first through third embodiments, speeding-up of the process after the receiver side node receives the collective identifier is realized.

Data of each management target is expressed in 1 bit. When the corresponding management target is in a specified state, the bit on the position corresponding to the management target is "on (1)", and it is "off (0)" otherwise. Meanwhile, it is assumed that each storage area for the collective identifier for reception consists of a plurality of areas of m bits, each of the areas being able to be processed by each as an "integer".

When "applying a specific process to the management target in a specified state", a process of "sequentially checking all the bits in each of the areas of mbits, performing the process when the bit is 1 and proceeding to the next when it is 0", is often performed. However, in this method, when there are a relatively small number of nodes in the specified state as represented by the sparse bit string in which almost all the bits are 0 as in FIG. 3 explained in the first embodiment, many condition judgments and bit references are to be performed even to the bits corresponding to the nodes to which the process is not performed. That is, in the process of this type, when the number of management targets in the specified state is relatively small, many references are made to the areas corresponding to the management targets to which the process is not performed, many cache misses and subsequent memory references occur, leading to an increase in the processing time at the receiver side node.

When the number of management targets in the specified state is relatively small, by "performing logical OR on a plurality of areas corresponding to a group of management targets in advance, and applying the process while skipping the group whose result is 0", the number of bit operations may be reduced and speeding-up may be realized. However, there is no difference in this method in that load instructions to the areas corresponding to all the management targets are issued, and a significant speeding-up is not expected.

Therefore, for example, "compiling" at a representative node for each group is considered. When the "compiling" node exists in an embodiment that uses reduction using Fetch and Add such as InfiniBand, additional resources required in using this method are a few, and therefore, this method is possible.

Figure 24:
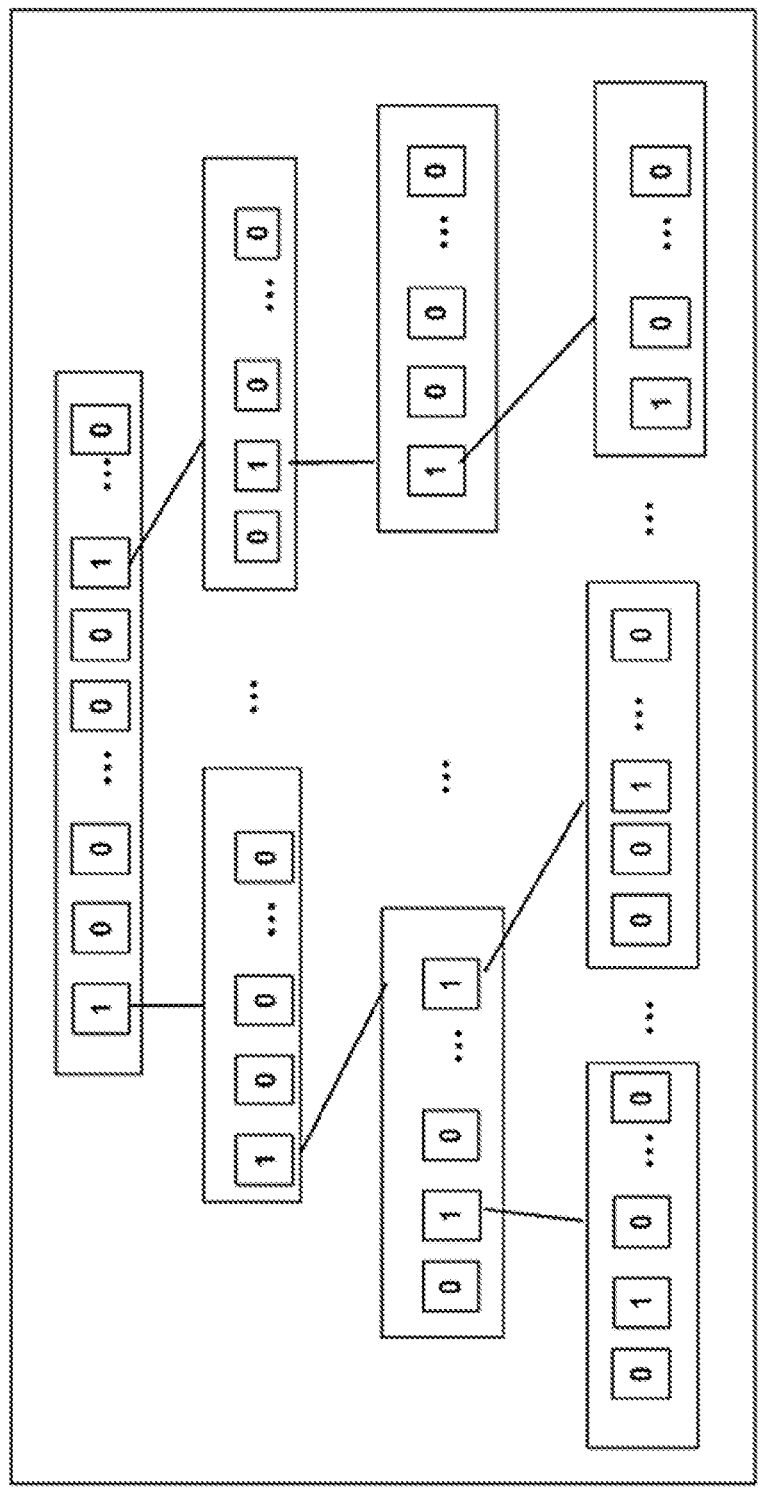
FIG. 24 explains the correspondence relationship between layers in grouping and an identifier assigned to each subgroup.
Figure 25:
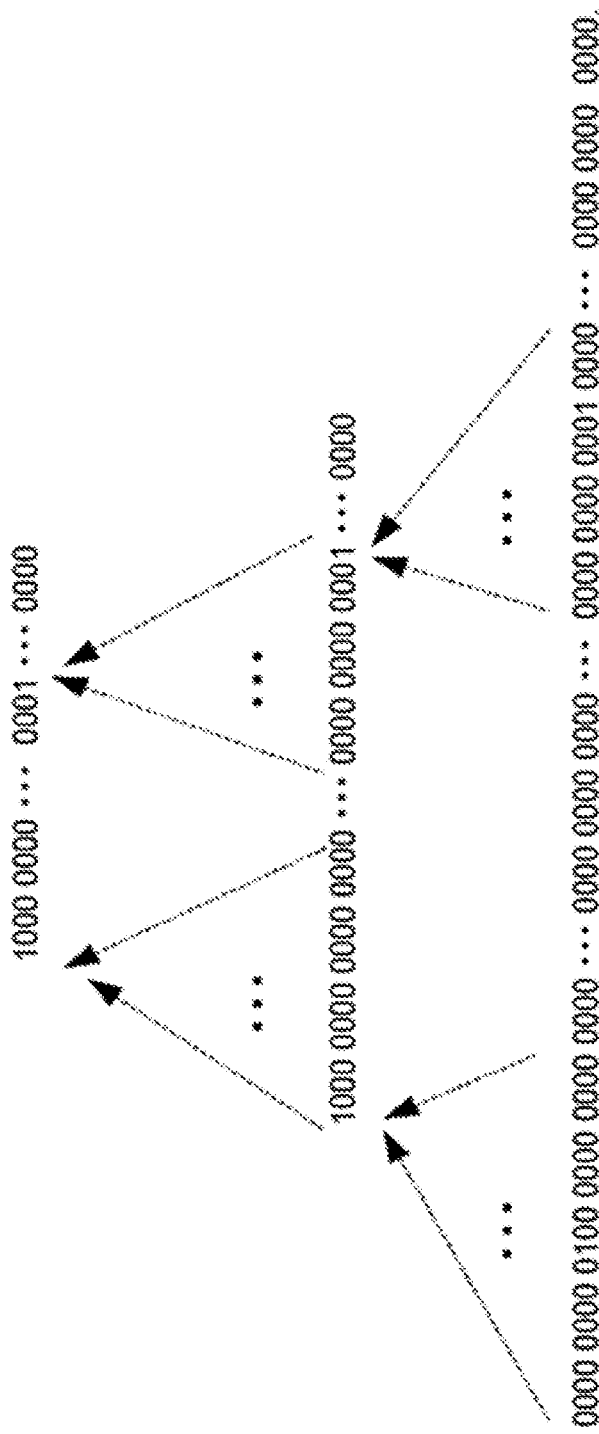
FIG. 25 explains the operation for limiting the search range for a bit that is not zero in a sparse bit string.

In the fourth embodiment, management targets to which grouping (in a plurality of layers if necessary) has been applied are regarded as new management targets. FIG. 23 is an explanatory diagram for the layers in grouping of management targets (nodes). FIG. 24 explains the correspondence relationship between the grouping layers for management targets and "assigned identifiers" to the respective sub groups. FIG. 25 is a specific example of FIG. 24. In the fourth embodiment, logical OR is executed for the management targets in the group by the transmitter side node. That is, as illustrated in FIG. 23, the management targets are divided into groups in a layered manner. Next, as illustrated in FIG. 24 and the specific example in FIG. 25, when any one of the management targets in a certain group is in the specified state, the node that manages the group generates data in which the bit position corresponding to the group is turned on and other bit positions (bit positions corresponding to the other groups) are turned off. Then, with respect to such data, reduction is performed separately from reporting of the state of the management target.

The process described above is nothing other than setting of a "group of management targets" as a "(virtual) higher-level management targets", and as the process procedure at the transmitter side node, the same process is performed as in the first through third embodiments in which grouping is not performed, except that there are more management targets for some of the nodes. That is, in the fourth embodiment, an area for a group is specified in the storage area in which the collective identifier is to be stored.

The receiver side node judges the necessity of referring to the areas for (lower-level) management targets in the group according to on/off of the bits in the area corresponding to each group (higher-level management targets), and performs processing while skipping the area to which reference is not needed. That is, as illustrated in FIG. 25, the management targets are handled in a tree structure whose branches are the positions of bit on in the managed area in each layer. Especially when grouping is performed for the purpose of speeding-up of the search in the identifier areas in the lowest layer, as described later, the size of the memory areas that need to be used during the search may be saved, by performing depth-first search in the tree structure.

Figure 26:
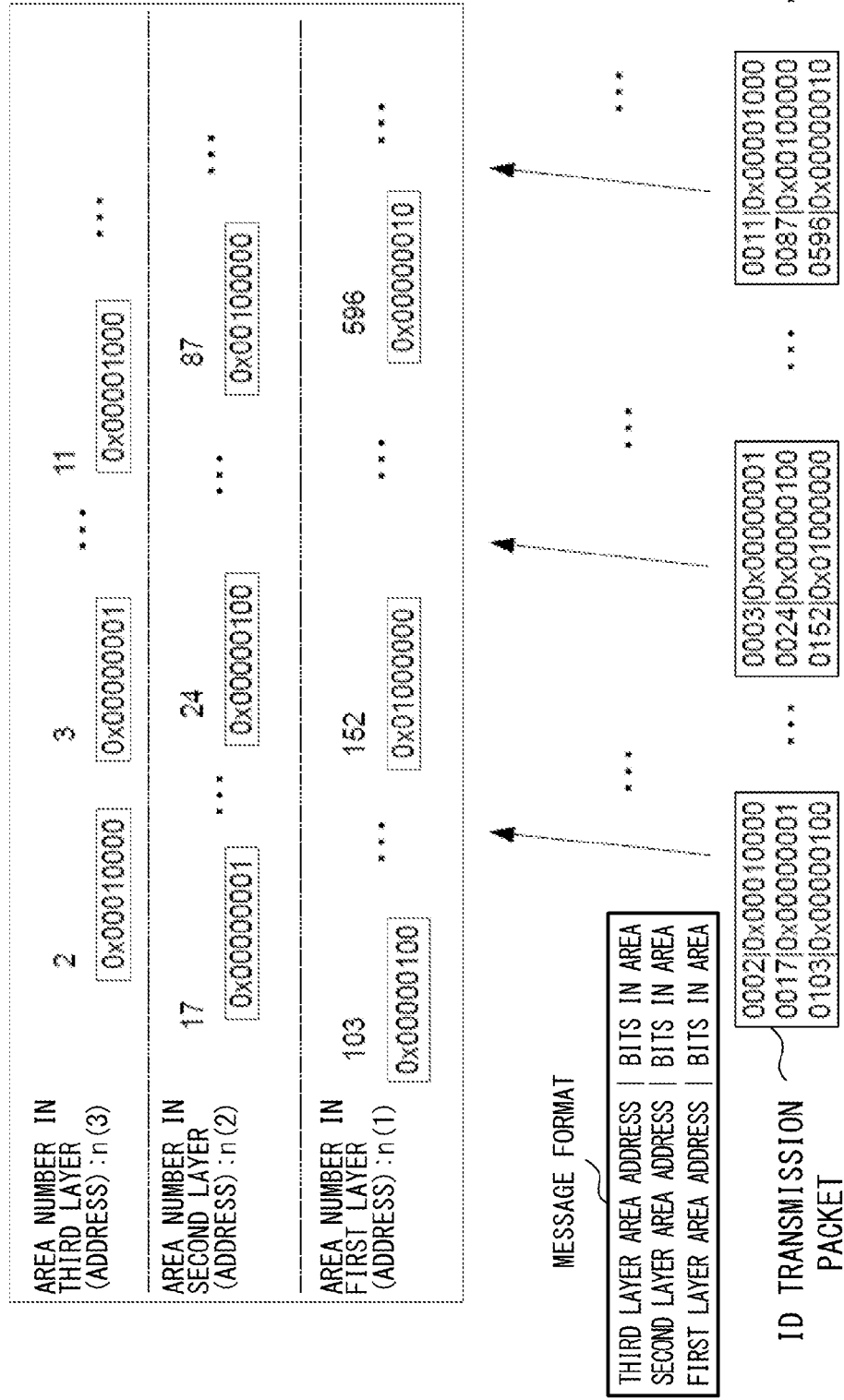
FIG. 26 illustrates an example of a transmission message and a reception area in limiting the search range for a bit that is not zero in a sparse bit string.

FIG. 26 illustrates an example of a transmission message and the reception area when the search range for bits that are not 0 in a sparse bit string in layered grouping is limited. In FIG. 26, 0x indicates hexadecimal representation. In the example illustrated in FIG. 26, the format of a transmission packet for the collective identifier is as follows.

"the n-th layer area address|bits in the area"

The "n-th layer" represents the first layer, the second layer, the third layer . . . . The "n-th layer area address" indicates the address corresponding to the n-th layer in the storage area for the collective identifier in the memory (for example, the memory 702-1 of the reception relay node 702 in FIG. 7) in the receiver side node. The "bits in the area" is the bit string of the collective identifier corresponding to the n-th layer. Then, for each layer, the bit information of the individual identifiers related to the management targets of the local node may be set as explained in the first, second or third embodiment.

FIG. 27 is a flowchart illustrating an example of a transmission process for a collective identifier for which grouping has been applied in a layered manner by the ID gathering mechanism 401 at a transmitter side (FIG. 4) in the fourth embodiment. The functional blocks and the system configuration are explained using FIG. 4 and FIG. 7 as examples. The system configuration of FIG. 20, FIG. 21, FIG. 22 or the like may also be used.

When the processing of the ID gathering mechanism 401 in FIG. 4 starts, the CPU 701-1 or the 702-1 of the transmission origin node 701 or the reception relay node 702 that functions as a relay node inputs 1 as the initial value of the group layer number (step S2701). When the current group layer number is equal to or smaller than a specified number of group layers (the judgment in step S2702 is YES), the CPU 701 or 702-1 obtains the collective identifier by the reduction unit 404 in FIG. 4 from the individual identifiers in the current group layer indicated by the "group layer number" received at the local node (step S2703). When the process in step S2703 is completed, the CPU 701-1 or 702-1 increases the group layer number by 1 (step S2704), and returns to the process in step S2702.

When the group layer number exceeds the specified number of group layers (the judgment in step S2702 is YES), the CPU 701-1 or 702-1 terminates the processes of the ID gathering mechanism 401. Then, the collective identifier to which group layers have been applied is output (step S2705).

FIG. 28 is a flowchart illustrating an example of a reception process involving a depth-first search performed by the ID analysis mechanism 402 at a receiver side node (FIG. 4) in the fourth embodiment. The "depth-first search" is a process of performing a search in a layered structure of a tree structure in which, instead of performing the search in the lateral direction in each layer, the processing of the lowest layer management targets are performed upon reaching the lowest layer in the layers, and after that, returning to the first layer, the search is performed for the next lowest layer. The functional blocks and the system configuration are explained using FIG. 4 and FIG. 7 as examples. The system configuration of FIG. 20, FIG. 21, FIG. 22 or the like may also be used.

When the processing of the ID gathering mechanism 402 in FIG. 4 starts, the CPU 702-1 of the reception relay node 702 in FIG. 7 inputs 1 as the initial value of the group layer number (step S2801). When the current group layer number is equal to or smaller than the specified number of group layers (the judgment in step S2802 is YES), the CPU 702-1 judges whether or not there is an area that is not zero in the next layer of the current group layer indicated by the "group layer number" received at the local node (step S2803).

When the judgment in step S2803 is YES, the CPU 702-1 obtains the area that is not zero in the layer that is immediately below the current group layer by the process of a "search in the lower-level identifier area" described later in FIG. 29 (step S2804). After that, the group layer number is increased by 1 (step S2805), and the process returns to the process in step S2802.

When the group layer number reaches the number of group layers and the layer is the lowest layer, making the judgment in step S2802 NO, the CPU 702-1 executes a process to extract a management target according to an individual identifier that has been taken out from the lower layer by step S2804 (step S2806). After that, the CPU 702-1 returns to the process in step S2801, and continues the search for other group layers.

Figure 29:
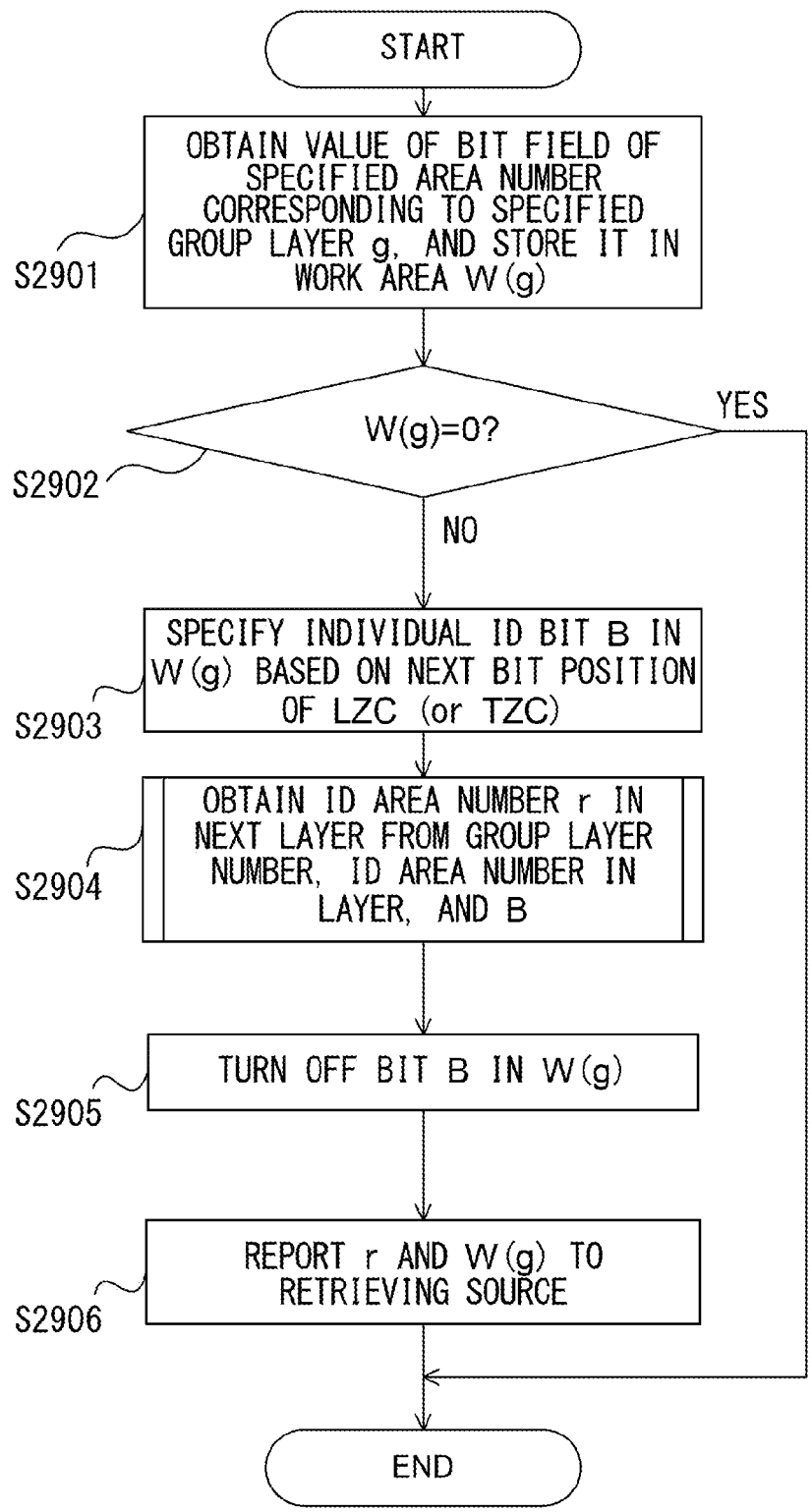
FIG. 29 is a flowchart illustrating an example of a process of a search in a lower-level identifier area at the time of a reception process performed by an ID analysis mechanism at a receiver side node in the fourth embodiment.

FIG. 29 is a flowchart illustrating details of step S2804. First, the CPU 702-1 obtains the value of the bit field of the specified area number corresponding to the group layer (assumed as "g") specified by the group layer number in FIG. 28, and stores it in the work area W(g) of the memory 702-2 (step S2901).

The CPU 702-1 judges whether the content of the work area W(g) is 0 (zero) (step S2902). When the judgment in step S2902 is YES, the CPU 702-1 moves to the process in S2906 described layer. When the judgment in step S2902 is NO, the CPU 702-1 specifies the bit B at which 1 appears in the individual identifier, by checking the next bit position of LZC or TZC (see the explanation for step S1903 in FIG. 19) from the work area W(g) (step S2903).

The CPU 702-1 obtains the identifier area number r of the next layer from the group layer number, the identifier area number in the layer, and B (step S2904). The CPU 702-1 turns off the value of the bit B specified in S2903 to 0 (zero) (step S2905).

After the process in step S2905 or when the judgment in step S2902 is NO, the CPU 702-1 reports the identifier area number r of the next layer and the content of the work area W(g) to the program (FIG. 28) that is the retrieving source (step S2906). After that, the CPU 702-1 terminates the process in the flowchart in FIG. 29, and terminates the process in step S2804 in FIG. 28.

In the fourth embodiment, in addition to the above operations, a process for the purpose of speeding up in a case in which "the number of bits of 1 is relatively small" in bit reference in one area (handled as an integer) of m bits corresponding to the management targets in each layer is explained. Details of this process are disclosed, for example, in the document [6] below.

[6] Henry S. Warren, "Hacker's Delight (2nd Edition)", 2012 Sep. 14

The document [6] discloses a currently known fast algorithm with respect to counting (Population count) of bits in a specified integer area, LZC or TZC that counts bits of zero from start to end of the integer area, and dividing by specific constants such as 3, 5, 7. The algorithm may be realized by a general computer.

A means for executing the following bit operation at a high speed in an integer area has been known.
(a) Check the number of bits of 1 (bit on) in the integer area
(b) Specify the bit position at which 1 appears first counted from the end (LSB: Least Significant Bit) of the integer area.
(c) Specify the bit position at which 1 appears first counted from the start (MSB: Most Significant Bit) of the integer area.

Meanwhile, obtaining the bit position at which 1 appears first is equivalent to obtaining the number of bits of 0 until 1 appears first. Relevant terms and acronyms are defined below.

Population Count: an operation to check the number of bits of 1 in the area

NTZ (Number of Trailing Zero): Number of bits of 0 counted from LSB until 1 appears first TZC (Trailing Zero Count): an operation to obtain NTZ NLZ (Number of Leading Zero): Number of bits of 0 counted from MSB until 1 appears first LZC (Trailing Zero Count): an operation to obtain NLZ The fast operation of the means (a) mentioned above may be used for realizing the fast operation of the means (b) in some cases. For example, as the number of bits of 1 in a bits integer area, repeated operations of five substitutions described below that does not involve any judgment or loop has been known. Here, "bits" represents an integer area of 32 bits, "=" represents substitution, "&" represents bitwise AND, and "a>>b" represents shift (a bit shift process) of b bits, and 0x before a constant indicates hexadecimal representation.

bits=(bits & 0x55555555)+(bits>>1 & 0x55555555);
bits=(bits & 0x33333333)+(bits>>2 & 0x33333333);
bits=(bits & 0x0f0f0f0f)+(bits>>4 & 0x0f0f0f0f);
bits=(bits & 0x00ff00ff)+(bits>>8 & 0x00ff00ff);
bits=(bits & 0x0000ffff)+(bits>>16 & 0x0000ffff);

In addition, when the CPU is equipped with an "instruction for obtaining the number of bits of 1 in a specified integer area" (for example, the POPCNT instruction that is one of SSE instructions in the Intel CPU), the number of bits of 1 in the area is obtained at a high speed by using the instruction.

By the means (b) described above, the NTZ may be obtained by population count with respect to "((x & (−x))−1)" for example, because the expression format of negative numbers in the current general CPU is based on "two's complement".

For the means (c), a fast execution using a general instruction provided in many CPUs is regarded as difficult compared with the means (b). For example, there is a method using the LZC instruction provided in the CPU such as SPARC64 IXfx developed by Sun Microsystems and trademarked currently by SPARC International Inc.

In addition, for a CPU in which conversion of integers and floating-point numbers defined in IEEE754 may directly be performed between registers, a relatively fast calculation method has been known that uses the fact that "the exponent in conversion into the floating-point format is the "integer part of a base 2 logarithm".

"Selecting the one which is more convenient for (speeding-up of) the process for specifying individual identifiers from the collective identifier" indicates associating the management target number and the bit sequentially from LSB when the receiver side node is equipped with the LZC instruction and from MSB otherwise.

When the number of bits of 1 is relatively small, the method in which "a management target is specified by sequentially obtaining a bit of 1 using LZC or TZC", is faster than the method using a loop of "shifting the reference position by every 1 bit and judging whether the bit is 1 or not".

Determining whether to use LZC or to use TZC according to which is able to execute at a higher speed at the receiver side node has a meaning as apart of optimization as a system.

According to the fourth embodiment, in a case in which it is expected that the proportion of "management targets in the specified state" is small and that there are many area in which a bit that is 1 does not exist in terms of the integer areas of m bits, it becomes possible to speed up the process by grouping the management targets in a layered manner and making judgment with respect to the "higher-level management target" first.

<Fifth Embodiment>

The fifth embodiment relates to the encoding method for the individual identifier. The functional blocks and the system configuration are explained using FIG. 4 and FIG. 7 as examples. The system configuration of FIG. 20, FIG. 21, FIG. 22 or the like may also be used.

By reduction operation executed in the reduction unit 404, assignment of individual identifiers are performed using not only a prime number but also a "a power of a prime number whose exponent itself of the power is a power of a prime number", using multiplication operation as explained in the first embodiment using FIG. 9B. The case when "the exponent itself of the power is a power of two" is especially the most effective in terms of increasing the number of "individual identifiers of a size equal to or smaller than a specified size".

The fifth embodiment is based on a precondition that the resolution explained in the first embodiment does not have to be perfect (when a number of management targets that exceeds a fixed upper limit k enter the specified state, the management target do not need to be identified).

From the collective identifier calculated from individual identifiers that are encoded by "reduction" using multiplication, it is possible to judge, by division by each individual identifier, whether or not the individual identifier is included as a factor of the multiplication. For example, by selecting "integers that are mutually prime" or "prime numbers that are all different" as individual identifiers, it becomes possible to take out an individual identifier as a factor of multiplication from the collective identifier. Meanwhile, assignment of individual identifiers is as described with reference to FIG. 8A-8D, 9B, 12B.

As an example, a case in which integers that satisfy the following condition are assigned as individual identifiers is considered (a more general assignment method is described later).

"Integers corresponding to different management targets do not have a common prime factor."

This condition may also be expressed in other words as follows.

"Integers corresponding to different management targets are mutually prime."

For example, when different prime numbers are assigned to different management targets, the above condition is satisfied.

Here, it is assumed that individual identifiers are assigned to management targets that are in the specified state, and 1 is assigned other management targets. In addition, the collective identifier is generated by the reduction unit 404 using multiplication. Meanwhile, the area for storage is provided with a size in which overflow does not occur with respect to the product of a number of individual identifiers that is smaller than a given number k. For example, the size is set as a size in which, when k individual identifiers are taken in descending order in size, the product of them can be stored. Then, the condition "integers corresponding to different management targets are mutually prime" ensures that, when overflow has not occurred for the product that has become the collective identifier, it is possible to determine that "the specified event in a given management target has been reported" according to the fact that "the collective identifier is divisible by the individual identifier of the management target".

As described above, when the resolution is limited by the upper limit k, allowing for the possibility of overflow for the operation with respect to a number of identifiers that is larger than k, an operation that is able to restore identifiers that have been the input, from the calculation result for k identifiers or less (for example, reduction using integer multiplication, or addition of integers or floating point numbers) is used. Meanwhile, "overflow" often refers to an error in the calculation procedure in a normal calculation, but in the present embodiment, it follows that "overflow" is positively utilized as one of "information reporting routes for collectively receiving the states of a plurality of management targets".

The fifth embodiment utilize the fact that there is a constraint regarding the resolution (it does not have to be perfect) to handle more management targets than in the case of the first through fourth embodiments using the same size of area (or handle the same number of management targets using a smaller area).

For example, assuming k=2 and 54 as the number of management targets, when prime numbers are assigned to the respective management targets in ascending order, the 53rd prime number is 241, and the 54th prime number is 251, and considering 241*251<(256*256)−1=2^16−1 ("^" means power), 16 bits are sufficient for the area for storage. Assuming k=1, the number of prime numbers that are smaller than 2^16−1=6542 management targets may be handled using a 16-bit area.

In the first through third embodiments, the number of management targets that may be handled using 16 bits is 16. The reason for 16<54<6542 is that, as k becomes smaller, only a "smaller part of information regarding a plurality of targets" needs to be transmitted. For example, assuming that there is no need to distinguish that "two or more management targets are in the specified state" from that "only one is in the specified state", when an easier condition than "the resolution k=1" is given, it follows that more management target may be handled. For example, using any integers other than 0 that may be stored in the 16-bit area as individual identifiers, assigning individual identifiers to management targets in the specified state and assigning 0 (zero) to other management targets and executing reduction at a "maximum value", $2^16-1=65535$ management targets may be handled using the 16-bit area.

Figure 30:
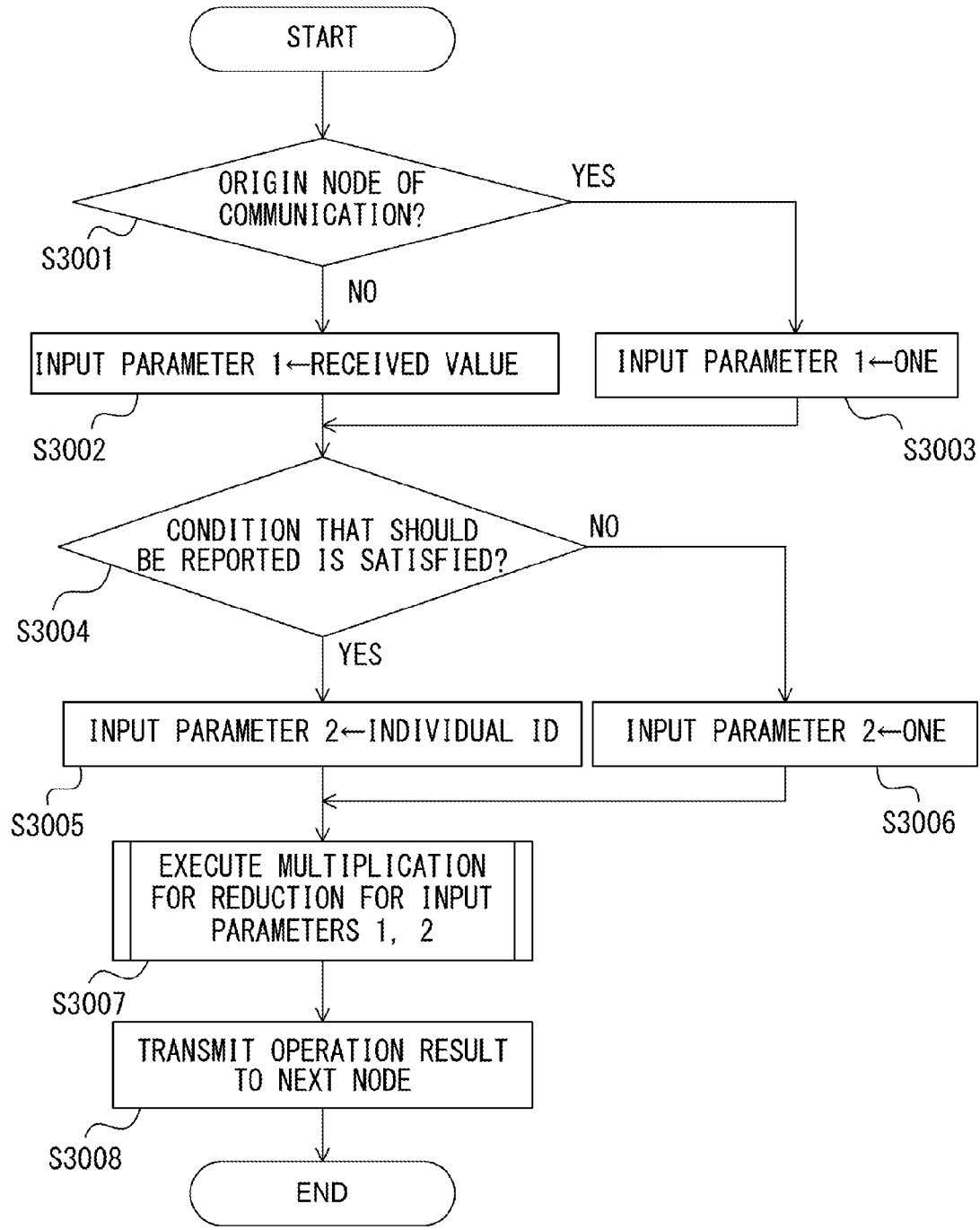
FIG. 30 is a flowchart illustrating an example of a process of an ID gathering mechanism at a transmitter side node in the fifth embodiment.

FIG. 30 is a flowchart illustrating an example of a process of the ID gathering mechanism 401 at a transmitter side (FIG. 4) in the fifth embodiment. The flowchart illustrated in FIG. 30 may be obtained by replacing addition with multiplication as the operation for the reduction unit 404. The functional blocks and the system configuration are explained using FIG. 4 and FIG. 7 as examples. The system configuration of FIG. 20, FIG. 21, FIG. 22 or the like may also be used.

When the processing of the ID gathering mechanism 401 in FIG. 4 starts, the CPU 701-1 of the transmission origin node 701 or the CPU 702-1 of the reception relay node 702 that functions as a relay node in FIG. 7 executes the process in the flowchart. The work area such as the input parameter 1 or 2 or the like is stored in the memory 701-2 of the transmission origin node 701 or the memory 702-2 of the reception relay node 702.

First, whether or not the local node is the origin node of the communication is judged (step S3001). When the judgment in step S3001 is NO, the value that has already been received (the collective identifier) is stored in the input parameter 1 that stores the value that has already been received (step S3002). When the judgment in step S3001 is YES, there is no value that has already been received, and therefore, the value 1 that is the identity element of the multiplication operation is stored in the input parameter 1 (step S3003). When the local node is the origin node of the communication (the transmission origin node 701 in FIG. 7) and there is no value that has already been received, the input parameter 1 is prevented from affecting the operation of the reduction unit 404 by storing the identity element in the input parameter 1.

Whether or not the condition that is to be reported is satisfied in the management target managed by the local node is judged (step S3004). When the judgment in step S3004 is YES, the individual identifier corresponding to the management target for the local node (or the local node itself) is stored in the input parameter 2 that stores the state of the local node (step S3005). When the judgment in step S3004 is NO, the value 1 of the identity element is stored in the input parameter 2 (step S3006). When the condition to be reported is not satisfied in the management target managed by the local node, the input parameter 2 is prevented from affecting the operation of the reduction unit 404 by storing the identity element in the input parameter 2.

The multiplication operation used for the reduction unit 404 is executed with respect to the input parameter 1 and the input parameter 2 (step S3007), The operation result in step S3007 is output as the collective identifier that is the content transmitted to the next forwarding destination (step S3708).

After that, the process of ID gathering mechanism 401 at a transmitter side illustrated in the flowchart in FIG. 30 is terminated.

Figure 31:
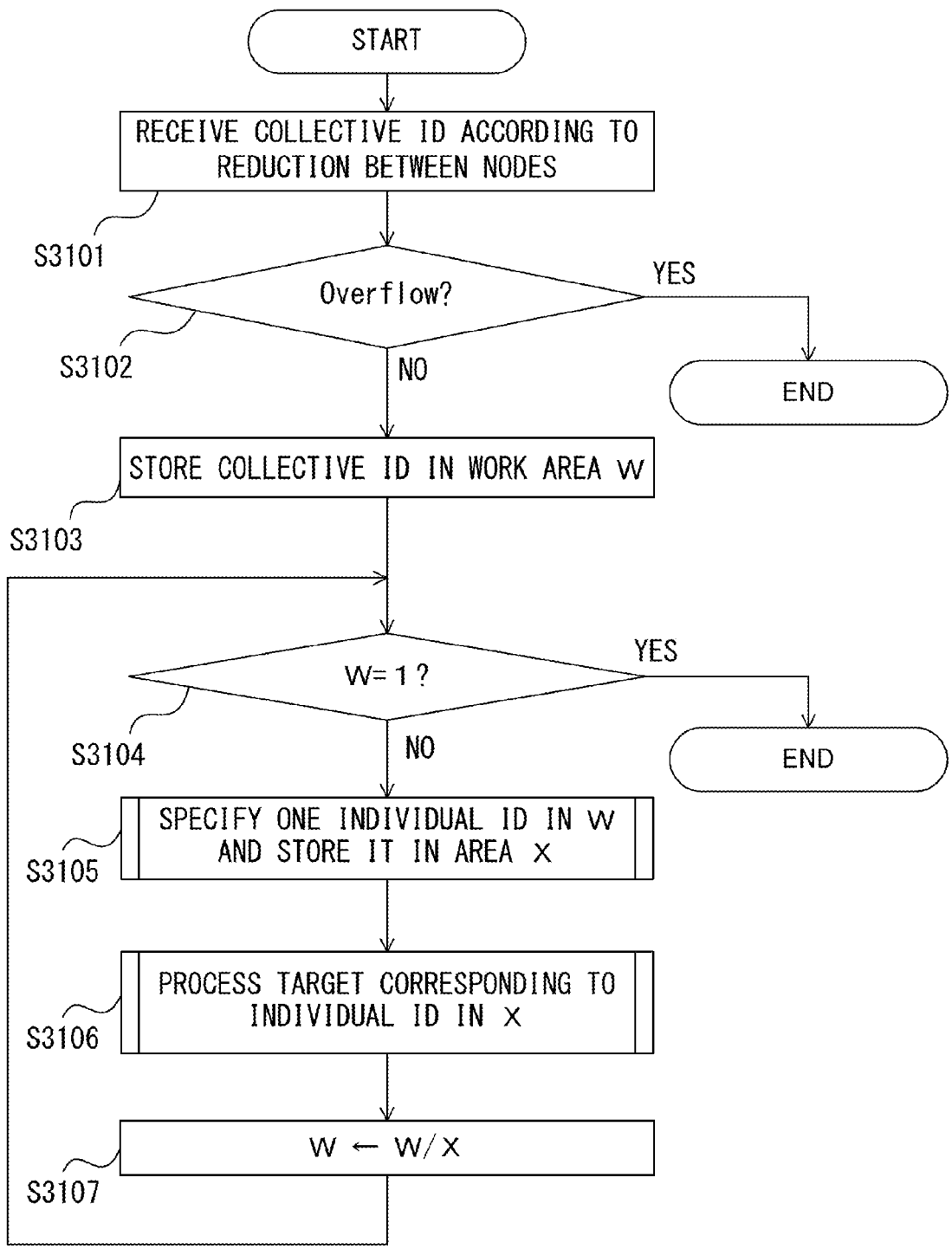
FIG. 31 is a flowchart illustrating an example of a process of an ID analysis mechanism at a receiver side node in the fifth embodiment.

FIG. 31 is a flowchart illustrating an example of the process of the ID analysis mechanism 402 at a receiver side node (FIG. 4) in the fifth embodiment. The embodiment illustrated in FIG. 31 may be obtained by replacing addition with multiplication as the operation for the reduction unit 404 in the flowchart in FIG. 6 related to the first embodiment. The functional blocks and the system configuration are explained using FIG. 4 and FIG. 7 as examples. The system configuration of FIG. 20, FIG. 21, FIG. 22 or the like may also be used.

When the processing of the ID gathering mechanism 402 in FIG. 4 starts, the CPU 702-1 of the reception relay node 702 that function as a receiver side node executes the process in the flowchart. Meanwhile, the work areas W and X and so on are stored in the memory 702-2 of the CPU 702-1 of the reception relay node 702.

First, a collective identifier according to the reduction unit 404 between nodes is received (step S3101). Whether or not an overflow has occurred in the collective identifier is judged (step S3102). When the judgment in step S3102 is YES, substantially no reception process is performed, and the process of the ID analysis mechanism 402 at a receiver side node illustrated in FIG. 31 is terminated. When the judgment in step S3102 is NO, the collective identifier is stored in the work area W (step S3103).

Whether the value indicated by the work area W has become 1 that is the value of the identity element in the multiplication operation in the reduction unit 404 is judged (step S3104). When the judgment in step S3104 is NO, one of the individual identifiers is specified from the collective identifier, and the result is stored in the work area X (step S3105). Specifically, whether or not the collective identifier is divisible by each individual identifier is judged, and when it is divisible, it is judged that the specified event has occurred in the target represented by the individual identifier, and the individual identifier is specified.

The management target corresponding to the individual identifier stored in the work area X in step S3105 is processed (specified) (step S3106). The specific method for this specification is substantially the same as in the case in step S605 in FIG. 6 related to the first embodiment.

The individual identifier specified from the work area W and stored in the work area X in step S3105 is removed by inverse operation of the multiplication operation (that is, a division operation) used for the reduction unit 404 (step S3107). That is, a division operation W/X is executed, and its result is stored again in the work area W. After that, the process is returned to step S3104, and the processes in step S3104 to step S3107 are repeatedly executed.

When the judgment step S3104 becomes YES because the value indicated by the work area W has become 1 that is the value of the identity element in the multiplication operation for the reduction unit 404, the process of the ID analysis mechanism 402 at a receiver side node illustrated in the flowchart in FIG. 31 is terminated. From the state in which identity element=1 (see step S3003 in FIG. 30), individual identifiers are sequentially added by multiplication operation (step S3007 in FIG. 30). Therefore, in the flowchart in FIG. 31, individual identifiers are sequentially removed by division operation (step S3107) that is inverse operation of multiplication, and the collective identifier eventually returns to identity element=1. Therefore, when the judgment in step S3104 becomes YES, the process in the flowchart in FIG. 31 is terminated.

In the operations in the fifth embodiment, the correctness of judgment is ensured by the condition "the identifiers of the respective nodes are mutually prime" and the fact of "uniqueness of factorization in prime factors" that is well known in the field of mathematics called "number theory".

In the description above, individual identifiers are mutually prime or all prime numbers, but it is explained below that assignment of individual identifiers is possible in a more general condition (it is for the purpose of simplifying the explanation that "mutually prime" or "all prime numbers" is assumed).

With respect to a given individual identifier a and collective identifier b, "b is divisible by a" and that "a has been used in the process of multiplication to calculate b" are necessary and sufficient conditions for each other. It is obvious that the latter is a sufficient condition for the former, and therefore, it is required that the latter is a necessary condition for the former.

It is assumed that when a plurality of individual identifiers a1 and a2 share a prime factor p, a1 includes only one p, and a2 includes 2 ps (that is, divisible by p^2 but not divisible by p^3), and that there are no other individual identifiers that have the prime factor p. Whether or not a1 and a2 have been used in the process of calculating b is determined by the number of times the prime number p is included in b, as in the table in FIG. 32, and therefore, the latter becomes a necessary condition for the former. In the same manner, with respect to a prime factor shared between a plurality of individual identifier, as long as the number of times each of the individual identifiers include the prime number is "a number from which the individual identifier can be determined by the collective identifier that includes the product of the combinations of the products of given individual identifiers", the individual identifiers does not have to be "mutually prime".

For example, when there is a set Q={q^a|a=0, 1, 2, . . . } constituted by powers of an integer q with respect to a prime number p and the "number of times each of the individual identifiers that share the prime number p includes p" are elements different Qs, assuming any one of digits that are not 0 in the "number of times the collective identifier includes p" expressed in q-adic number, the "individual identifier that includes the prime number p q^a times" may be judged as a generation factor of the collective identifier.

FIG. 33 through FIG. 36 illustrate details of the process for specifying the individual identifier in step S3105 in FIG. 31.

Figure 33:
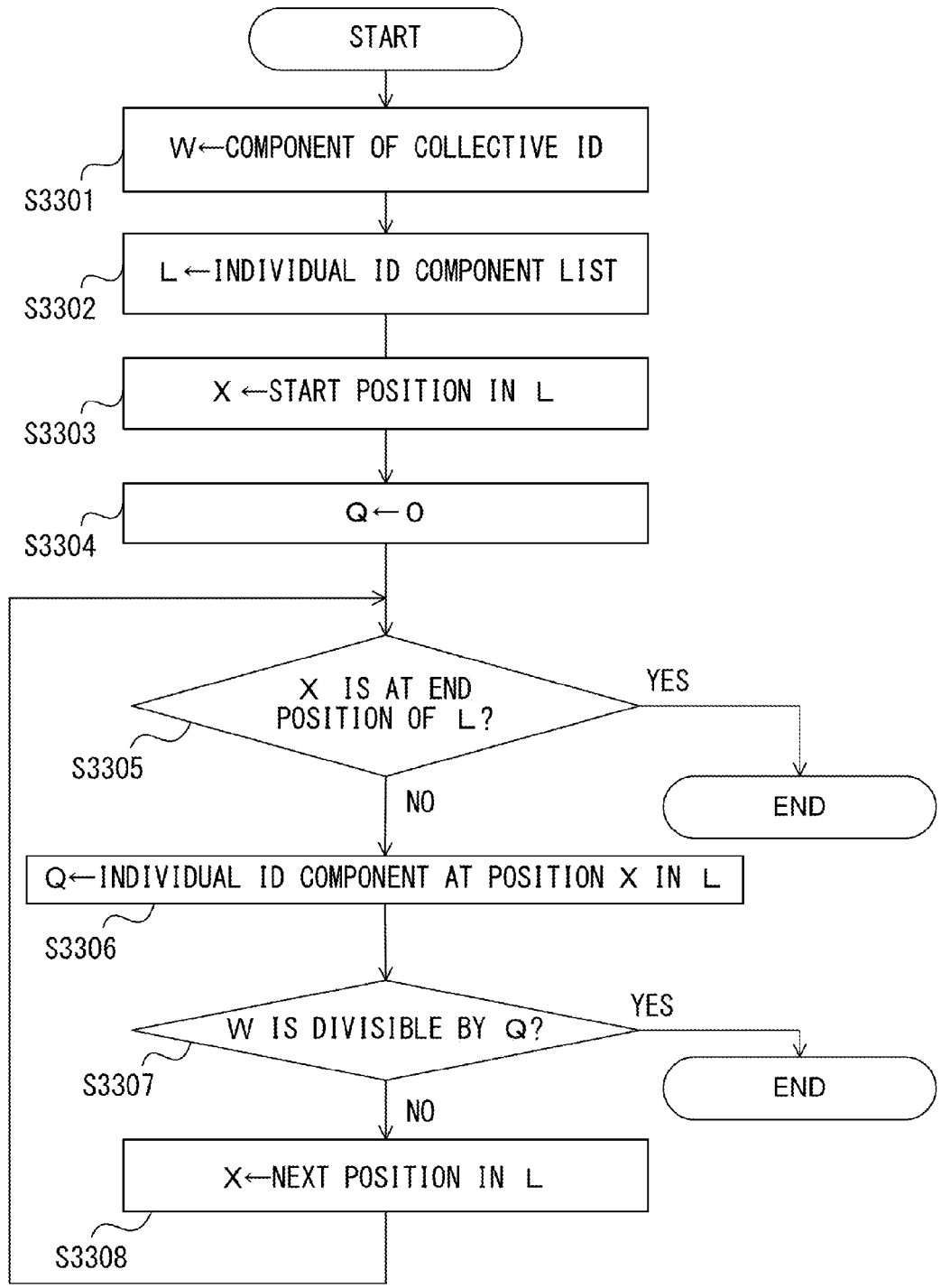

First, the processes in the flowchart in FIG. 33 are explained. The flowchart realizes a function (A) for extracting the individual identifier component of a power of a prime number from the collective identifier.

The components of a received collective identifier are stored in the work area W (step S3301). The component list for individual identifiers is stored in a work area L (step S3302). The start position of the work area L is stored in the work area X (step S3303). The process in step S3306 and S3307 are repeatedly executed while the next position in the work area L is sequentially stored in the work area X, until it is judged in step S3305 that the value in the work area X has come to the end position of the work area L.

That is, in step S3306, the component of the individual identifier at the position in the work area L indicated by the work area X is stored in a work area Q. Then, in step S3307, whether or not the value of the work area W is divisible by the value of the work area Q is judged. When the judgment in step S3307 is YES, the process is terminated. When the judgment in step S3307 is NO, the position in the work area L indicated by the work area X is updated in step S3308, and the process returns to step S3305. When the judgment in step S3305 becomes YES because the value of the work area X has come to the end position of the work area L as a result of the repeated operations above, the process is terminated.

In the processes in the above flowchart, the search result in the list in the work area L can be distinguished by the value of the work area Q. When the value of the work area Q is not 0 (zero), it indicates that the individual identifier has been found in the list in the work area L.

The flowchart illustrated in FIG. 34 realizes a function (B) for extracting the individual identifier component of a power of a prime number from the collective identifier.

The components of a received collective identifier are stored in the work area W (step S3401). One of the prime factors in the work area W is stored in a work area p (step S3402). The value of the work area p is stored (step S3403). The value "1" is stored in a work area f (step S3404). The result of division of the value of the work area W by the value of the work area p is stored in a work area V (step S3405).

The processes in step S3407 to S3409 are executed repeatedly until it is judged in step S3406 that the value of the work area V is no longer divisible by the value of the work are p. That is, when the judgment in step S3406 becomes YES because the value of the work area V is divisible by the value of the work area p, the result of division of the value of the work area V by the value of the work area p is stored in the work area V in step S3407. In step S3408, the result of multiplication of the value of the work area p by the value of the work area q is stored in the work area q. The value of the work area q is the largest power factor about the prime number in the work area p included in the work area W. That is, assuming that W/q does not include the factor of the prime number p and assuming the exponent as f, q=p^f. Then, in step S3409, the value stored in the work area f is incremented by 1. When the judgment in step S3406 becomes NO because the value of the work area V is no longer divisible by the value of the work area p as a result of the repeated processes above, the press is terminated.

The flowchart illustrated in FIG. 35 realizes a function (C) for extracting the individual identifier component of a power of a prime number from the collective identifier. Note that the process in FIG. 35 is executed after the process in FIG. 34.

The value of the work area f in FIG. 34 is stored in a work area g (step S3501). The factor a power of a prime number power factor that becomes the individual identifier is stored in the work area X (step S3502). Whether or not the value of the work area g is zero is judged (step S3503). When the judgment in step S3503 is YES, returning to step S3502, the next factor of the power of the prime number that becomes the individual identifier is stored in the work area X. When the judgment in step S3503 becomes NO, the process is terminated. Note that instead of the processes illustrated in FIG. 35 described above, assuming LZC(g) (leading zero count to g) as d, a procedure for making the (d+1)th bit counted from MSB 0 may also be executed.

Figure 36:
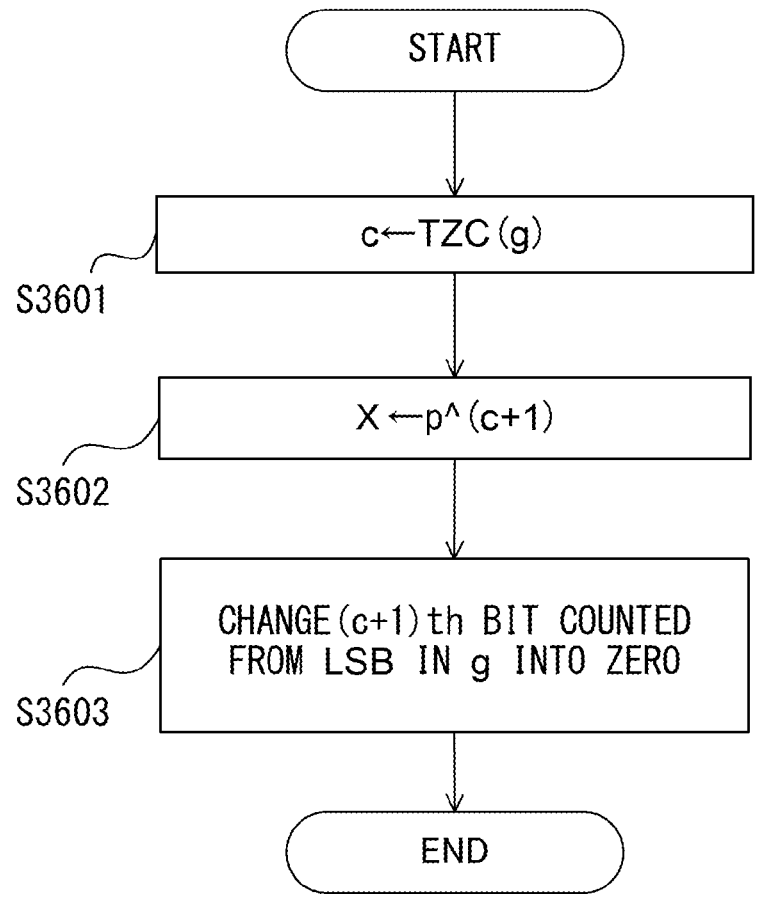

The flowchart illustrated in FIG. 36 realizes a function (D) for extracting the individual identifier component of a power of a prime number from the collective identifier.

The value of TZC(g) is stored in a work area c (step S3601). Here, TZC(g) is trailing zero count to the value of the work area g (the number of consecutive bits of zero counted from LSB (Least Significant Bit) in g). The work area g is set in the flowchart in FIG. 35. Instead of TZC(g), LZC (g) (leading zero count) may also be used. Then, $p^{(c+1)}$ (the prime number p raised to the power of the value obtained by +1 to the value of the work area c) is stored in the work area X (step S3602). Then, in the work area g, the value of the (c+1)th bit counted from LSB is changed to 0 (zero) (step S3603).

In the generalized method for taking out the individual identifier described here, when increasing the resolution k while keeping the size of the area fixed, it is advantageous to use "a number whose exponent is a power of 2 in prime numbers or powers of prime numbers" in the case when q is 2, that is, expressed in symbols, $\{p^{(2^a)} | p \text{ is a prime number}, a=0, 1, 2, \ldots \}$. FIG. 9B, 15C, 15D explained in the first embodiment illustrate this case.

Meanwhile, when the resolution k is fixed so that overflow occurs as soon as possible when a number of management targets that is larger than k have entered the specified date, it is advantageous to include, in the set of individual identifiers, a required number of numbers in descending order from "numbers in the range in which overflow does not occur for the product of up to k", including numbers other than powers of prime numbers.

As described above, according to the fifth embodiment, when the required resolution k is relatively small, it becomes possible to reduce the memory area compared with the first through fourth embodiments.

<Sixth Embodiment>

The sixth embodiment is a developed form of the fifth embodiment. The assignment of individual identifiers in the sixth embodiment follows FIGS. 15E-15F illustrated in the explanation for the first embodiment.

In the sixth embodiment, an ordered combination configured by a plurality of integers is assigned to each node, in the same system configuration as that in the fifth embodiment. Assuming i, j as a node number, a combination of m numbers is assigned to each node. That is, a vector whose elements are m integers as presented below is used as the individual identifier of the management target.

$Z(i)=(zi1, zi2, \ldots, zim)$
$Z(j)=(zj1, zj2, \ldots, zjm)$

It is assumed that, when i≠j, at least numbers at one place in the combination of m numbers are different. That is, assuming that "∨" represents logical expression OR, the following expression is obtained.

$i \neq j \Leftrightarrow (zi1 \neq zj1 \lor zi2 \neq zj2 \lor \ldots \lor zim \neq zjm)$ Here, the sets of integers used for the respective components of the vector may be the same or may be different, but it is assumed that different elements are mutually prime in each set. In addition, the following description is used.

S1: a set of integers for the first component of the vector . . .

Sm: a set of integers for the m-th component of the vector

S1, . . . , Sm are sets of integers in which all different two elements are mutually prime. However, except when all the components are 1, 1 may appear in the components.

In the following explanation, the number of prime factors that appear in a set of x mutually prime integers is x or more, and the number of prime factors is x only when all of the x numbers are prime numbers.

In addition, in the fifth and sixth embodiments, factorization for specification of nodes is nothing but a process to sequentially see whether or not the reduction result is divisible by elements of a predetermined number of sets.

In the six embodiment, the number of fields increases compared with the fifth embodiment in which the management target is identified using a single number, but with respect to a system with the same number of management targets, it becomes possible to identify a node using a set configured by a relatively few numbers whose magnitude is small. Therefore, it becomes possible to perform factorization of the respective elements at a high speed, and the processing time for specifying the node is shortened compared with the fifth embodiment.

While it is necessary that the number of elements of the set S of numbers used in the fifth embodiment may be equal to or larger than the number of nodes N, but the number of elements of the sets S1 . . . Sm used in the sixth embodiment may be the smallest natural number that exceeds N/m. In both of the embodiments, the maximum number and the average number of required divisions are the same. This is because, in the sixth embodiment, factorization of each component is to be repeated m times, while the number of divisions required for each component is 1/m.

Meanwhile, in the same manner as in the fifth embodiment, a more general assignment method in which a number that is "a power of prime number whose exponent is a power of prime number" is included in the prime factor is possible in the sixth embodiment as well ("mutually prime" has been assumed so far in order to simplify the explanation).

Here, a mention is made to the principle that is common to other embodiment explained later. The fifth and sixth embodiments are both based on a common principle of "uniqueness of factorization in prime factors with respect to a natural number". The difference is "whether the identifier assigned to each node is a single number or a combination of a purity of numbers".

Focusing on that, for the entire integers (in a usual meaning) including 0 and negative numbers, 0 is also excluded from the target of factorization and "+1, −1 are not regarded as prime factors (in other words, the difference in symbols attached to each factor in the product of negative numbers is not regarded as representing different factorizations), the uniqueness of factorization in prime factors is established.

When a "unique" "factorization in prime factors" in a similar meaning as in th case of integers is possible by "multiplication" defined by a general set, identifiers may be encoded while setting a condition regarding "prime numbers" in the set in the same manner as in the fifth and six embodiments (generally, "numbers whose reciprocal is also an integer" such as 1 and −1 are not included in "prime factors").

As an example of a set for which a "unique" "factorization in prime factors" is possible in the same meaning as in the case of integers, there is a set configured by a polynomials whose coefficient is elements of a given "field". In the set of polynomials, the "irreducible polynomial" corresponds to the "prime number".

Here, a "field" refers to a set in which the four arithmetic operations are defined, both addition and multiplication satisfying the communicative law and the associative law, the set including 0, 1 and in which an "inverse element" exists in the set, the inverse element being a "number multiplication with which results in 1" with respect to all the elements other than 0. As the "field", there are "all rational numbers", "all real numbers", or "all complex numbers", "finite field GF(q)" (q is the number of elements as a set), and the like. Meanwhile, when emphasizing that the set of "all rational numbers", "all real numbers", or "all complex numbers" is a "field", they are referred to as a "rational number field", a "real number field" or a "complex number field". There are sets that have multiplication for which "uniqueness of factorization in prime factors" is established other than the set of integers and polynomials of integers with "field" coefficients. An embodiment that uses "algebraic integers" that are a kind of such sets is described later in the explanation for the seventh embodiment.

Figure 37:
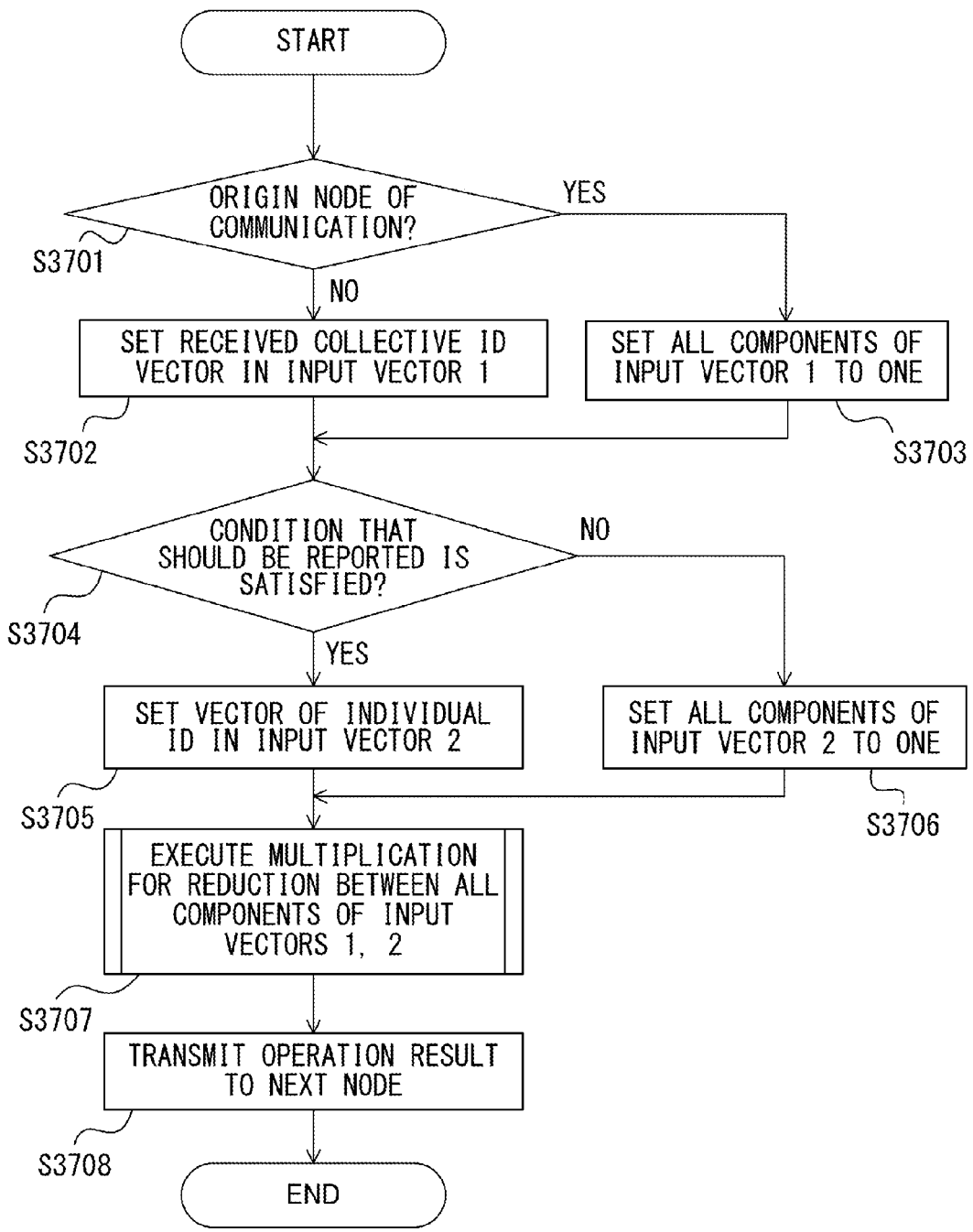
FIG. 37 is a flowchart illustrating an example of a process of an ID gathering mechanism at a transmitter side node in the sixth embodiment.

FIG. 37 is a flowchart illustrating an example of the process of the ID gathering mechanism 401 at a transmitter side (FIG. 4) in the sixth embodiment. The ideas of the processes in the flowchart are substantially the same as in FIG. 5 (the first embodiment), FIG. 17 (the second embodiment), FIG. 30 (the fifth embodiment) described above. The flowchart illustrated in FIG. 37 is obtained by replacing addition with multiplication as the operation for the reduction unit 404, and by vectorizing the individual identifier and the collective identifier in the flowchart in FIG. 5. The functional blocks and the system configuration are explained using FIG. 4 and FIG. 7 as examples. The system configuration of FIG. 20, FIG. 21, FIG. 22 or the like may also be used. When the processing of the ID gathering mechanism 401 in FIG. 4 starts, the CPU 701-1 of the transmission origin node 701 or the CPU 702-1 of the reception relay node 702 that functions as a relay node in in FIG. 7 executes the process of the flowchart. Work area such as the input vector 1 or 2 may be implemented in the memory 701-2 in the transmission origin node 701 or the memory 702-1 in the reception relay node 702.

The identifier is a ordered set of integers. The "ordered set" is called a "vector", and integers that are the elements of the "ordered set" are called components. When emphasizing that the identifier is a vector, it is called the "individual identifier vector", "collective identifier vector", or an "identifier vector". The operation between identifier vectors is performed by operation between components at corresponding positions.

In FIG. 37, first, whether or not the local node is the origin node of the communication is judged (step S3701). When the judgment in step S3701 is NO, the collective identifier vector that has been received is stored in the input vector 1 that stores the value that has been received (step S3702). When the judgment in step S3701 is YES, there is no received value, and therefore, 1 that is the value of the identity element of multiplication operation is given to all the components in the input vector 1 (step S3703).

Next, whether or not the condition that is to be reported is satisfied in the management target managed by the local node is judged (step S3704). When the judgment in step S3704 is YES, the individual identifier vector corresponding to the management target for the local node (or the local node itself) is stored in the input vector 2 that stores the state of the local node (step S3705). When the judgment in step S3704 is NO, 1 that is the value of the identify element 1 is given to all the components in the input vector 2 (step S3706).

After that, multiplication operation that is used for the reduction unit 404 is executed between all the components of the input vectors 1, 2. (step S3707). Lastly, the operation result in step S3707 is output as the collective identifier vector that is the content transmitted to the next forwarding destination (step S3708).

Figure 38:
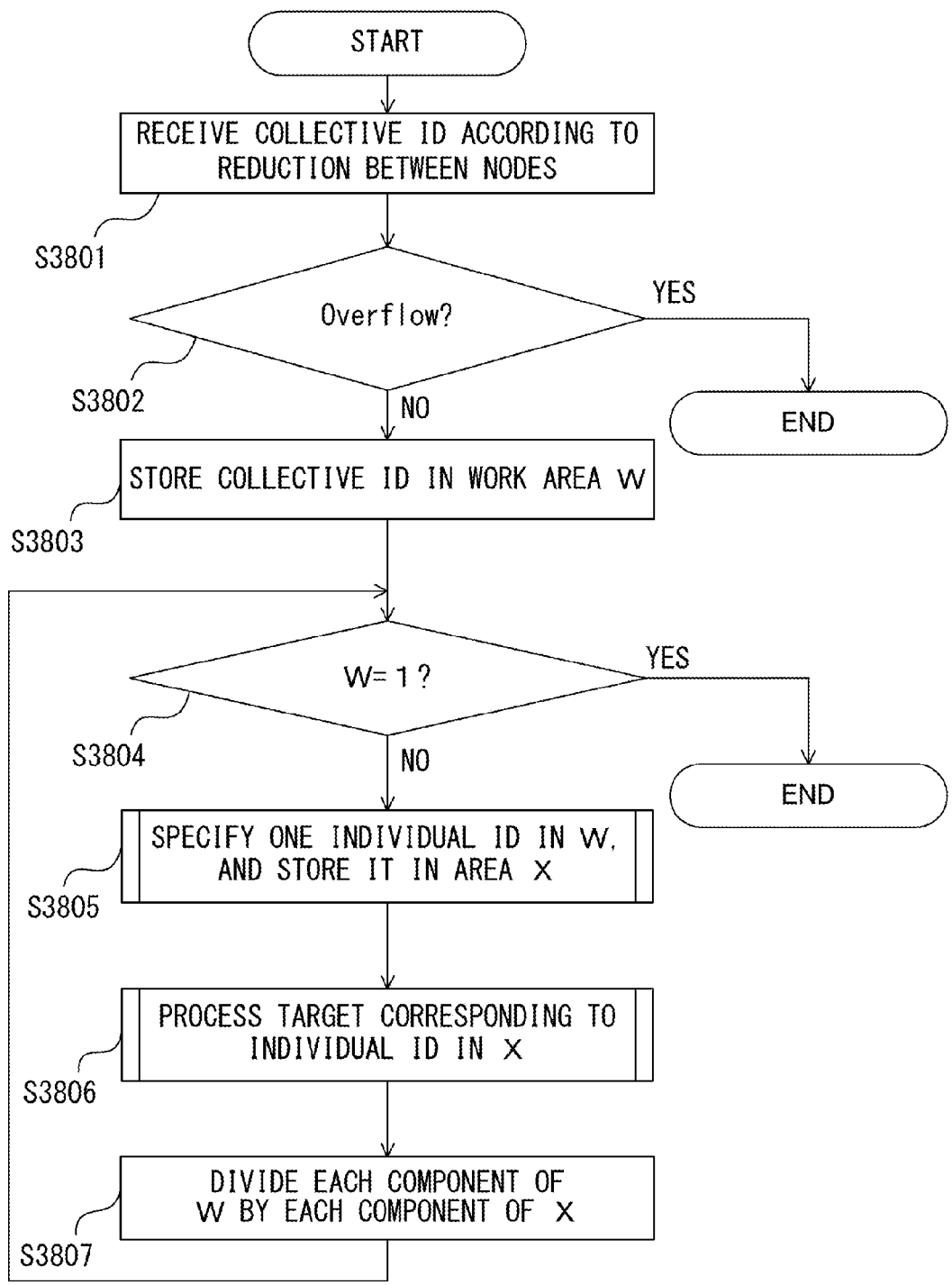
FIG. 38 is a flowchart illustrating an example of a process of an ID analysis mechanism at a receiver side node in the sixth embodiment.

FIG. 38 is a flowchart illustrating an example of the process of the ID analysis mechanism 402 at a receiver side node (FIG. 4) in the sixth embodiment. The ideas of the processes in this flowchart are substantially the same as in FIG. 6 (the first embodiment), FIG. 18 (the second embodiment), FIG. 31 (the fifth embodiment) and the like described above. The flowchart illustrated in FIG. 38 is obtained by replacing addition with multiplication as the operation for the reduction unit 404 and vectorizing the individual identifier and the collective identifier in the flowchart in FIG. 5 related to the first embodiment. The functional blocks and the system configuration are explained using FIG. 4 and FIG. 7 as examples. The system configuration of FIG. 20, FIG. 21, FIG. 22 or the like may also be used. When the processing of the ID analysis mechanism 402 in FIG. 4 starts, the CPU 702-1 of the reception relay node 702 that functions as the receiver side node in FIG. 7 executes the process in the flowchart. Meanwhile, work area vectors W, X and so on may be implemented by the memory 702-2 of the CPU 702-1 of the reception relay node 702.

First, a collective identifier vector according to the reduction unit 404 between nodes is received (step S3801). Next, whether or not overflow has occurred in the collective identifier is judged (step S3802). When the judgment in step S3802 is YES, substantially no reception process is performed, and the process of the ID analysis mechanism 402 at a receiver side node illustrated in FIG. 38 is terminated. When the judgment in step S3802 is NO, the collective identifier vector is stored in the work area vector W (step S3803).

Whether or not all the component values of the work area vector W have become 1 that is the value of the identity element in multiplication for the reduction unit 404 is judged (step S3804). When the judgment in step S3804 is NO, one of the individual identifier vectors is specified from the collective identifier vector, and the specified vector is stored in the work area vector X (step S3805).

The management target corresponding to the individual identifier vector stored in the work area vector X in step S3805 is processed (specified) (step S3806). Inverse operation of multiplication operation used for the reduction unit 404, that is, division operation is applied to the respective components of the work area vector W and the work area vector X, and the individual identifier specified from the work area vector W and stored in the work area vector X in step S3805 is removed (step S3807). After that, returning to the process in step S3804, the processes from step S3804 to step S3807 are repeatedly executed. When the judgment in step S3804 becomes YES, the process of the ID analysis mechanism 402 at a receiver side node illustrated in the flowchart in FIG. 38 is terminated.

Generally, in order to execute division, the dividend and the divisor need to be fetched from the memory. In the sixth embodiment, by making sets of components all the same, the number of divisors that need to be fetched from the memory becomes 1/m, and in a large-scale system in which N>>m (N is sufficiently larger than m), the advantage from the increased number of cache hits of the divisors exceeds the disadvantage from the increased cache misses due to the number of dividends becoming m from 1. Therefore, when N>>m, the sixth embodiment is more advantageous than the fifth embodiment in terms of the calculation processing time.

In addition, when N is sufficiently large, the sixth embodiment does not become disadvantageous in terms of the memory usage either. This is because, when a function that represents the "number of prime numbers equal to or smaller than x" is expressed as $\pi(x)$, according to the fact that is called "prime number theorem" in number theory, it is known that the ratio of $\pi(x)$ and $(x/\log(x))$ converges to 1 when $x \to \infty$. That is, the "density of prime numbers" $(\pi(x)/x)$ becomes about a reciprocal $1/\log(x)$ of a logarithmic function (the logarithm here is the natural logarithm). That is, when the number of nodes becomes large and prime numbers that may be used as prime factors of components are added, it is necessary to increase the number of prime numbers in an exponential manner on average. For this reason, the number of bits of the memory area required for storage without overflow becomes smaller in more cases by using a set of individual identifiers of a plurality of combinations of relatively small prime numbers or powers of prime numbers in the sixth embodiment compared with the fifth embodiment using one prime number or a power of a prime number.

<Seventh Embodiment>

An operation in a given set other than integer multiplication may be used for realizing the function in FIG. 4, as long as the operation has a common nature with integer multiplication in terms that "it is possible to restore the original elements from the operation result for a plurality of elements". In particular, using a set that has multiplication with which the "uniqueness of factorization in prime factors" is established, the operations of the function in FIG. 4 may be executed by almost the same method as using usual integer multiplication.

Assignment of individual identifiers in the seventh embodiment follows FIG. 15G and FIG. 15H illustrated in the explanation for the first embodiment.

With respect to a given "field", a "vector space" for which the "field" is a "coefficient field" is defined as a set that has addition that satisfies the communicative law and the associative law between "vectors" that are elements and operation of "scalar multiplication" for which elements of the specified field are scalars. In the fields including the rational number field, the field K that is finite dimensional as a vector space is called a "(finite dimensional) algebraic number field" (hereinafter, "finite dimensional" is omitted). The entire "algebraic integers" included in K are expressed as O_K. (Here, the "algebraic integer" refers to a complex number that becomes the root of equation $f(x)=0$ assuming an irreducible polynomial in which the highest-order coefficient is 1 as $f(x)$). It is known that O_K is a set that is closed with respect to addition, subtraction, multiplication, and the number that serves the role of "prime number" in O_K is defined as p|ab→p|a∨p|b (here, "x|y" means that y is divisible by x, "→" means "if . . . then", and "∨" means "or").

According to this definition, conditions and actual cases in which the "uniqueness of factorization in prime factors" in O_K is established are well-known in a field of mathematics called "algebraic number theory". Therefore, using any O_K in which the "uniqueness of factorization in prime factors" is established, the operations for the function in FIG. 4 may be executed using a method that is similar to that in the fifth or sixth embodiment.

The point in that case is that the algebraic number field K is finite dimensional in terms of the rational number field. Therefore, assuming the dimension as n, and appropriately selecting n elements k1, k2, . . . , kn from K, elements of a given K may be expressed as linear combination {c1*k1+ c2*k2+ . . . cn*kn|ci is a rational number, ki∈K (i=1, 2, . . . n)} of rational coefficients, and therefore, the area for storage can be a fixed length. Furthermore, k1, . . . , kn with which element coefficients of O_K all become an integer are selected and a combination of n integers and an element of O_K are associated one-to-one. It is known that the algebraic number field K is obtained by adding an algebraic integer α (and its power) to a rational number field. Therefore, such k1, . . . , kn may be determined as, k1=1, k2=α, . . . , kn=α^(n−1), taking one "irreducible polynomial (x) of integer coefficients in which the highest-order coefficient is 1" and using α that satisfies $f(α)=0$.

Here, k1, . . . , kn are the base of K (as a vector space on a rational number field). Meanwhile, when the necessary and sufficient condition for n elements of K to be the base is that they are "linearly independent" as elements of the vector space on a rational number field, and therefore, there is more than one way for selecting {k1, . . . , kn}. Unless otherwise stated, it is assumed as {1, α, . . . , α^(n−1)}, according to the algebraic integer α included in K.

Hereinafter, two examples in which n=2 are presented. Regarding general n, the principle is still the same.

First, the imaginary unit i is the root of $x^2+1=0$, and therefore, a field Q[i] obtained by adding the imaginary unit i to a rational number field becomes a two-dimensional vector space on the rational number field. A set Z[i]={complex numbers whose coefficients for the real part and the imaginary part are both integers} are called "Gaussian integers". The Gaussian integers are an example of O_K described above with respect to K=Q[i]. It is known that "uniqueness of factorization in prime factors" is established about the Gaussian integers.

For example, in the "Gaussian integers", 2 is expressed as the product of two Gaussian integers as 2=(1+i)*(1−i), and therefore, 2 is not a "prime number as a Gaussian integer". However, 1+i, 1−i are ""prime numbers" in the Gaussian integers" (as it is apparent considering the absolute values of the real number part and the imaginary number part). Then, a method for breaking down 2 into "prime numbers in the Gaussian integers" is limited to breaking down into the product of the two Gaussian integers.

The Gaussian integers are divided into the real number part and the imaginary number part and storing them in two areas for usual integers, and the individual identifier for each management target is set by replacing the condition regarding the prime numbers in the fifth and sixth embodiments with the condition regarding ""prime numbers" in the Gaussian integers". Then, the collective identifier can be obtained by reduction for which the "product as the Gaussian integers (product as complex numbers)" is binary operations. This is because whether or not it is possible to establish A=B×C while a certain Gaussian integer C is taken with respect to two Gaussian integers A, B may be judged according to whether or not both the real part and the imaginary part of the coefficient of D×A are both integers while taking a reciprocal D of B as a complex number. According to the uniqueness of factorization in prime factors in the Gaussian integers described above, the judgment regarding the product of which individual identifiers were used in generation may also be executed in that same manner as in the fifth and sixth embodiments.

Meanwhile, among the Gaussian integers, division that generates a quotient and reminder is defined, and it is known that it is also possible to judge whether or not the (components) of the collective identifier is (are) divisible by the (components) of individual identifier according to whether or not the reminder of the division is 0.

Next, when $ω=(−1+i\sqrt{3})/2$ (i is the imaginary unit), ω is the root of $x^2+x+1=0$, and therefore, it is an algebraic integer. The field Q(ω) in which ω is added to a rational number field becomes a two-dimensional vector space on the rational number field. This is because, it is obvious that Q[ω]={A+Bω|A,B are rational numbers} is closed with respect to addition and multiplication, and therefore, when it is also closed with respect to division, Q(ω)=Q[ω] is established, and therefore, it is understood to be two dimensional on the rational number field. It will do when it is closed with respect especially to the reciprocal. With respect to any two rational numbers a, b where $a+b\omega \neq 0$, $1/(a+b\omega)=(a+b\omega^2)/(\alpha^2-ab+b^2)=((a-b)-\omega)/(\alpha^2-ab+b^2) \in Q[\omega]$ can be confirmed.

The set $Z[\omega]=\{a+b\omega | a,b \text{ are usual integers}\}$ is called "Eisenstein integers".

By substituting $\omega^2 = -1 - \omega$ into $$(a+b\omega)*(c+d\omega)=ac+(bc+ad)\omega+bd\omega^2$$

the following equation is obtained.

$$(a+b\omega)*(c+d\omega)=(ac-bd)+(bc+ad-bd)\omega$$

Therefore, the product of the "Eisenstein integers" may be expressed as an operation between "two combinations of integers", and therefore, one "Eisenstein integer" may be kept in two areas for usual integers, and the "Eisenstein integer" may be used as the individual identifier.

When an Eisenstein integer C exists with respect to two Eisenstein integers A, B, whether A=B×C holds is judged according to whether D×A is an Eisenstein integer, with respect to D that is the reciprocal of B in the complex number. From the following equation, the reciprocal D of a given Eisenstein integer B may be expressed as D=(E/Z), and therefore, whether the expression A=B×C is possible may be judged according to whether or not the coefficient of E×A is divisible by Z.

$$(a+b\omega)*(a+b\omega^2)=a^2-ab+b^2$$

$$\therefore 1/(a+b\omega)=(a+b\omega^2)/(a^2-ab+b^2)$$

Among the "Eisenstein integers", the "uniqueness of factorization in prime factors" is established as well. In addition, among the Eisenstein integers, division that generates a quotient and reminder is also defined, and it is known that it is possible to judge "divisible or not" according to whether or not the reminder of the division is 0. According to the above, by using the "Eisenstein integers" (or combinations thereof) as individual identifiers and obtaining the collective identifier by reduction according to multiplication, the operation function in FIG. 4 may be realized.

For a general n-dimensional algebraic number field, assuming the root of f(x)=0 as α with respect to an irreducible polynomial in which the highest-order coefficient is 1, elements of 0_K are also expressed as a linear combination of integer coefficients of $\{1, \alpha, \alpha^2, \ldots, \alpha^{(n-1)}\}$. Accordingly, it is understood that the product of elements of 0_K may be expressed as an operation between "combinations of n integers" by replacing $\alpha^n$ with a linear combination of a power of α, the power being smaller than n-th power, according to f(α)=0.

With respect to a given n-dimensional algebraic number field K and the set 0_K of algebraic integers therein, the existence of a function N(γ) (called "norm of (γ)") that satisfies the following (a), (b) is known.

(a) (a1), (a2) are satisfied with respect to a given element of K.
(a1) With respect to a given element γ of K, N(γ) is a rational number.
(a2) With respect to given two elements γ1, γ2 of K, $N(\gamma 1 \times \gamma 2) = N(\gamma 1) \times N(\gamma 2)$
(b) With respect to a given element β of 0_K, (b1), (b2) below are also satisfied.
(b1) N(β) is an integer.
(b2) The reciprocal δ of β is expressed as δ=(ε/N(β)) according to an element ε of 0_K.

For example, with respect a Gaussian integer α+bi, N(a+bi)=$\alpha^2+b^2$ holds, and with respect to an Eisenstein integer α+bω, N(a+bω)=$\alpha^2-ab+b^2$ holds.

Therefore, with respect to a general n-dimensional algebraic number field, when the uniqueness of factorization in prime factors is satisfied for the entire algebraic integers 0_K therein, it is also possible to obtain the collective identifier by reduction according to the multiplication using the elements (or a combination thereof) of 0_K as individual identifiers, and to realize the operation function in FIG. 4. Here, according to the characteristics (b) of the norm, it is judged that the collective identifier is divisible by the individual identifier. According to the uniqueness of factorization in prime factors, by selecting the characteristics of prime factors included in the individual identifier in the same manner as in the fifth, sixth embodiment, the condition that "the individual identifier was used in the process of calculation of the collective identifier" is guaranteed by the fact it is "divisible".

Note that the uniqueness of factorization in prime factors is not necessarily established with respect to the algebraic integers 0_K in a general n-dimensional algebraic number field K. In addition, among 0_K, it is not always possible to define division that generates a quotient and reminder, and to judge "divisible" according to the reminder of the division being 0.

However, the necessary and sufficient condition for the uniqueness of factorization in prime factors to be established with respect to the algebraic integers 0_K is well known. From given 0_K in which the "uniqueness of factorization in prime factors" is established, the set of individual identifiers may be determined according to the same condition regarding "prime number" as in fifth and sixth embodiments.

Figure 40:
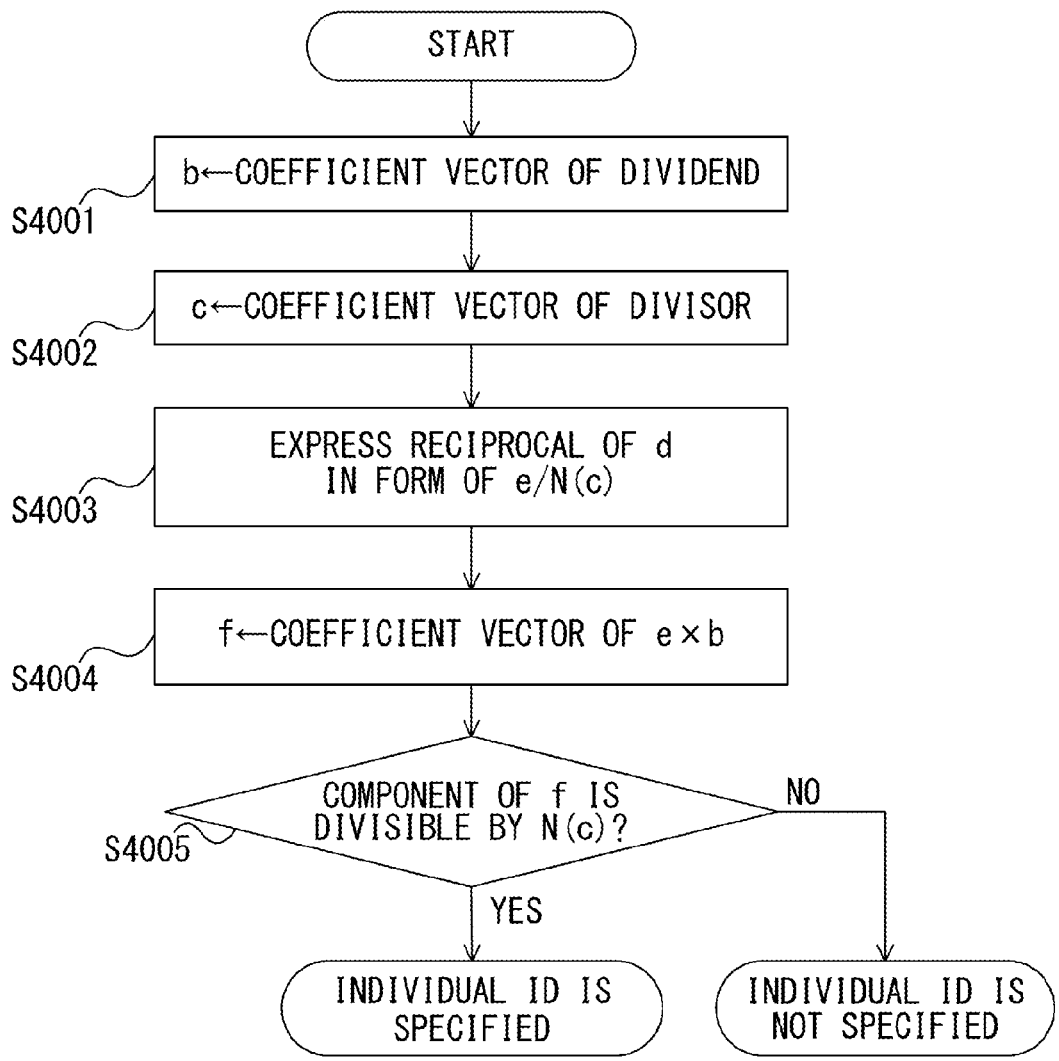
Figure 41:
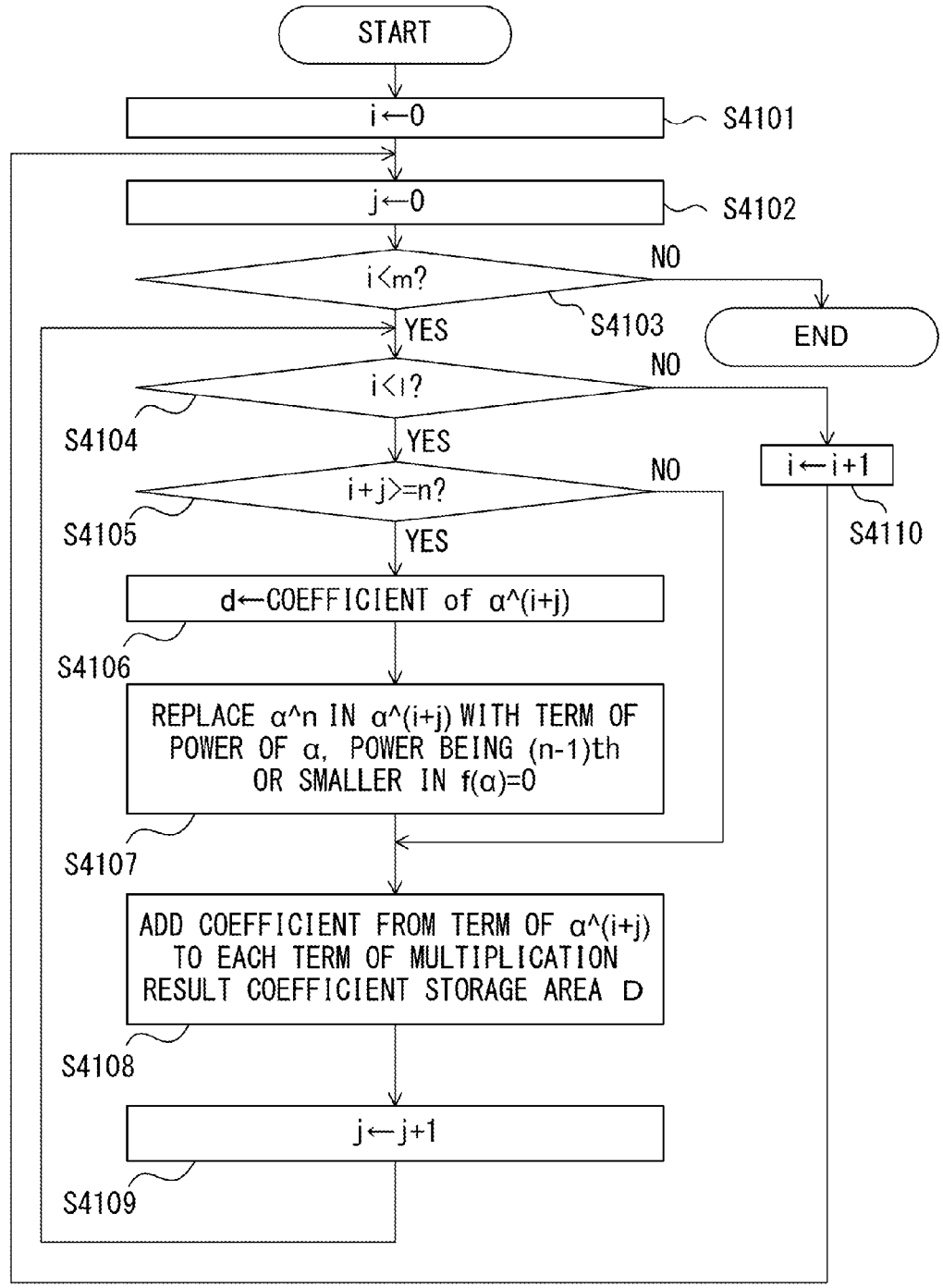

FIG. 39 through FIG. 41 are flowcharts illustrating an example of the processes in the seventh embodiment. The reduction operation that realizes the reduction unit 404 of the ID gathering mechanism 401 in the fifth or sixth embodiment is executed in step S3007 in FIG. 30 or in step S3707 in FIG. 37. In these reduction operations, the individual identifier is a "prime number or a power of a prime number as the usual integer". Meanwhile, in the seventh embodiment, one algebraic number that is not a rational number field is fixed, and the individual identifier in the seventh embodiment is a "prime element" (a prime number as an algebraic integer) in the algebraic number field. Specifically, a prime number as a Gaussian integer or the like is used. According to these relationships, the "product, quotient of usual integers" becomes the "product, quotient of algebraic integers" in the seventh embodiment. In view of these, in FIG. 39 related to the seventh embodiment replaces step S3007 in FIG. 30 in the fifth embodiment or step S3707 in FIG. 37 in the six embodiment.

Meanwhile, in the fifth or sixth embodiment, the "process for restoring individual identifiers that are the generation factors from the collective identifier" by the ID analysis mechanism 402 in FIG. 4 is executed in step S3107 in FIG. 31 or in step S3807 in FIG. 38. FIG. 40 in the seventh embodiment replaces these processes. In addition, FIG. 41 is a flowchart in which the processes in FIG. 40 are generalized in another form.

As a precondition for the process in the flowchart in FIG. 39, the base of an algebraic number field K is given as $\{1, \alpha, \alpha^2, \ldots, \alpha^{(n-1)}\}$ according to an algebraic integer α that satisfies the following characteristics.

$$f(x)=x^n+a_{(n-1)} \times x^{(n-1)}+ \ldots a_k * x \times k+ \ldots +a_0$$

$$f(\alpha)=0$$

Then, algebraic integers β, γ are expressed as in the following polynomials of α.

$g(x)=b\_m*x^m+b\_(m-1)*x^(m-1)+ \ldots b\_1*x+b\_0$ $\beta=g(\alpha)$ $h(x)=c\_l*x^l+b\_(l-1)*x^(l-1)+ \ldots c\_1*x+c\_0$ $\gamma=h(\alpha)$ The flowchart in FIG. 39 operates using the algebraic integers β, γ defined above.

A coefficient vector of the algebraic integer β is stored in a work area B (step S3901). A coefficient vector of the algebraic integer γ is stored in a work area C (step S3902). A coefficient vector of the product of the algebraic integers 1, 2 are calculated, and the coefficient vector is stored in a work area D (step S3903).

According to the process of flowchart in FIG. 39, for example the process in step S3007 in FIG. 30 in the fifth embodiment or in step S3707 in FIG. 37 in the sixth embodiment may be replaced.

The processes in the flowchart in FIG. 40 are explained. A coefficient vector of the dividend is stored in work area b (step S4001). A coefficient vector of a divisor is stored in a work area c (step S4002). The reciprocal of d is expressed in the form of e/N (c) (e is an algebraic integer of K, N(c) is norm of c) (step S4003). A coefficient vector of e×b is stored in a work area f (step S4004). Then, whether or not the vector component of the work area f is divisible by each component of N(c) is judged (step S4005).

According to the flowchart in FIG. 40, for example the process in step S3107 in FIG. 31 in the fifth embodiment or in step S3807 in FIG. 38 is replaced.

The process in the flowchart in FIG. 41 is explained. In this flowchart, i is reset to 0 (zero) in S4101, and after that, while being incremented by +1 each time in step S4110, it is changed from 0 to m until a judgment is made in step S4013 that it has reached m. In addition, for each value of i, the value of j is reset to 0 in step S4102, and after that, while being incremented by +1 each time in S4109, it is changed from 0 to 1 until a judgment is made in step S4104 that it has reached 1.

When it is judged that the value of i+j is equal to or larger than n using i and j that are changed as described above, in step S4106, the coefficient of the operation result $\alpha^{(i+j)}$ in which an algebraic integer α is raised to the power of the value of i+j is stored in a work area d. In step S4107, $\alpha^n$ in $\alpha^{(i+j)}$ is replaced by a term of a power of α, the power being (n−1)th or smaller, according to a relational expression $f(\alpha)=0$. In step S4108, the coefficient from the term $\alpha^{(i+j)}$ is added to each term in the multiplication result coefficient storage area D. The processes described above are repeatedly executed while i and j are incremented.

In order to efficiently perform operations with respect to encoded identifiers, it is necessary to store identifiers in an area of a specific fixed length supported by the CPU and the inter-node calculator, or in combinations of such areas. Compared in the range in which the magnitude of the coefficient is constant, there are more "prime numbers" (prime elements) in algebraic integers such as the "Gaussian integers" and the "Eisenstein integers" than usual prime numbers. Therefore, when algebraic integers are used according to the present embodiment, it becomes relatively easy to assign individual identifiers so as to make the resolution k larger using an area of the same size.

Furthermore, compared with the method of "using two areas for integers to express an integer of twice the digits in binary notation", in a set of (algebraic integers in a two-dimensional algebraic number field on a rational number field such as) the "Gaussian integers" and the "Eisenstein integers", both the areas may be effectively used within the area of numbers whose absolute values are relatively small. When expressing an integer of twice the digits in binary notation using two integer areas, the area used for expressing the higher-order digit is not used for storing the individual identifier unless an integer whose magnitude cannot be expressed by only one of the areas is used. For this reason, it is more advantageous to use "Gaussian integers" and "Eisenstein integers" as the individual identifier than to use usual integers in areas of twice the digits as the individual identifier, compared in terms of the memory efficiency based on the same level of calculation amount.

The same applies to comparisons between the method in which algebraic integers in an n-dimensional algebraic field on a rational number field are expressed using n areas for integers, and the method of "using n areas for integers to express an integer of n times the number of digits in binary notation".

<Eighth Embodiment>

When the ID encoding mechanism 403 in FIG. 4 is provided for using reduction that uses multiplication as operation, realization using an inter-node calculator that supports addition and speeding-up thereby is possible by converting multiplication into addition using the logarithm of each identifier. However, in selecting the numbers that are to be used as individual identifiers, the following caution and elaboration are needed. Detail explanation is provided below.

By advance verification or by precision-guaranteed operation, it should be guaranteed that "there is no wrong judgment due to accumulation of errors in floating-point operations in factorization selecting the nearest integer". When obtaining the logarithm, data is in the floating-point format, and therefore, in calculations after that, the judgment of "being equal" needs to be replaced by "the error being smaller than a value determined in advance (for example, a value called "machine epsilon")". Errors are accumulated in each process in which data without change or data converted into the fixed-point format (integer format) according to the convenience in transmission are used for obtaining the sum and inputting the result that has been turned back to the floating-point format is input into the exponential function, to restore the product before obtaining the logarithm.

In order to reduce the influence of digit-cancellation errors, it is effective to make the original numbers (before obtaining the logarithm) "magnitudes of the same level". In this case, a policy to "determine in descending order with a fixed maximum value" with respect to the range of individual identifiers is advantageous.

The eighth embodiment is also applied to the case in which the resolution is limited by a positive integer k as the upper limit, in the same manner as in fifth through seventh embodiments. While the logarithm of the individual identifier is used in the eighth embodiment, the description in the case in which a logarithmic function of the complex number is used is complicated even there are many points in common in principle, and therefore, the individual identifier is assumed as a usual positive integer below.

In the eighth embodiment, the function realized by the integer multiplication in the fifth and sixth embodiments is realized by addition. However, there are both cases of using floating-point addition and integer (fixed-point) addition.

The fifth embodiment may be regarded as a case in the sixth embodiment in which the number of components is 1. Meanwhile, the sixth embodiment may be regarded as execution of the fifth embodiment with respect to a plurality of components. In the eighth embodiment, in order to simplify the description, explanation is made about one component.

In the same manner as in the fifth and sixth embodiments, individual identifiers are assigned to the respective management targets (the respective nodes for example), and the collective identifier is defined as the "reduction result by integer multiplication", in the same manner as the case of the fifth and sixth embodiments. However, in the eighth embodiment, the "reduction result by integer multiplication" is obtained using reduction operation by addition that goes through the logarithm (according to the fact that the "logarithm of a product" is the "sum of the logarithms"). However, a logarithm other than the number that is the power of the base of a logarithm is not an integer, and therefore, an error occurs when turning to the floating-point format, and an error is further generated in the calculation of floating-point addition for logarithms, and in view of these, elaboration is needed in the assignment of identifiers.

The calculation procedure for obtaining individual identifiers from the collective identifier is substantially the same as in the fifth and sixth embodiments except that the fact that the "logarithm of a product" is the "sum of the logarithms" is used. By performing the calculation of logarithms of individual identifiers at the time of assigning the individual identifiers and storing the logarithm values in the reporting-side node, the need for logarithm calculation at the time of information reporting may be eliminated. The values of individual identifiers converted into logarithms, or values after conversion into the integer format by multiplication by a constant after the conversion into logarithms are referred to as "modified individual identifiers" and distinguished from the original individual identifiers. In the same manner, the result of reduction (total sum) with respect to the "modified individual identifiers" is referred to as a "modified collective identifier" and distinguished from the original collective identifier.

(a) When using floating-point addition (a1) Logarithms of individual identifiers of management targets are obtained at each node that reports information, or logarithms of individual identifiers that have been memorized in advance are prepared as input for reduction. Using the latter method, there is no need to calculate logarithms at the transmitter side node. Reduction operation is performed so that the node that gathers information receives the reduction result according to addition of the logarithms of the individual identifiers of the management targets.

(a2) The node that gathers information restores the product of the individual identifiers from the total sum of the logarithms. The original data is an integer, and therefore, the collective identifier is obtained by obtaining the integer that is nearest to the result of restoration from the logarithms by an exponential function.

(a3) The individual identifier by which the collective identifier is divisible is obtained.

(b) When using integer addition (b1) Logarithms of individual identifiers of management targets are obtained at each node that reports information, or logarithms of individual identifiers that have been memorized in advance are prepared as input for reduction. Here, to "prepare" means to multiply logarithms of individual identifier in the floating-point format by a constant to convert them into integers, or to make the input data multiplied by a constant and converted into integers in advance. Using the latter method, there is no need to calculate floating-point operation at the transmitter side node.

(b2) Reduction operation is performed so that the node that gathers information receives the reduction result by addition of the logarithms of the individual identifiers of the management targets. Here, to "make a fixed-point format up to certain digits, and after that, to multiply a number of digits m after the decimal point by $2^m$ to express the approximate value of logarithms in the integer format" is described as to "convert to an integer".

(b3) The node that gathers information turns the reduction result in (b2) back to the floating-point format and divides it by the constant $2^m$ for magnitude adjustment that was used in the conversion into the integer format in (b2), to set the magnitude back to the original as well.

(b4) The node that gathers information restores the collective identifier that is the product of the original individual identifiers, from the "total sum of the logarithms of the individual identifiers" that has been turned back to the floating-point format. The original data is an integer, and therefore, the collective identifier is obtained by obtaining the integer that is nearest to the result of restoration from the logarithms by an exponential function.

(b5) The individual identifier by which the collective identifier is divisible is obtained.

In the eighth embodiment, wrong judgments due to errors involved in the operation to obtain the logarithm and the expression of the result in a finite number of digits are excluded. In other words, the key in high-speed realization is to reduce the magnitude of errors to a level that does not affect the judgment result. Note that errors may be made as small as desired by using "multiple length operation", but it increases the required memory area capacity and the memory access amount including the transmitter side node, and therefore, realization by operation in the fixed-length area is advantageous in terms of performance.

There is also a method for limiting the range of errors by "precision-guaranteed operation", but a simpler method is to confirm by actual calculation that it is possible to restore the individual identifiers in the specified state by the procedures (a), (b) described above, with respect to a set of individual identifiers determined in advance. This calculation may be performed when determining the set of individual identifiers. For example, by preparing a set of individual identifiers that has a sufficiently large number of elements, the precision-check calculation described above does not negatively affect the performance at the time when the system is in operation.

In a system in which it is necessary to dynamically increase the management targets, by using individual identifiers that are taken away from a pool of available individual identifiers, execution of precision-check calculation during operation may be avoided. The check calculation may be executed, for example, to confirm that a wrong judgment does not occur due to errors in the procedures (a), (b), with respect to all the combinations of identifiers that give a product that does not exceed U(k), assuming the product of k individual identifiers taken in descending order, in the case in which the resolution is k.

Here, when a case of wrong judgment is detected by the precision-check calculation described above, it is handled by replacing the set of individual identifiers, or by storing the value of the collective identifier with the combination in a "exceptional value list" together with a combination of correct individual identifiers, and by performing a process to check the exceptional value list" first, when calculating the individual identifier from the collective identifier.

In view of that, in the addition of floating-point numbers whose magnitudes are extremely different, significant figures tend to be lost due to digit cancellation, it is desirable in the present embodiment in the case of using addition of numbers in the floating-point format to make the magnitudes of the individual identifiers close to each other. In addition, in order to increase the number of cases in which it is possible to make the judgment using numbers whose magnitudes do not require division for which the calculation amount is relatively large, it is more advantageous to take all the individual numbers whose magnitudes are large as possible within the range in which they satisfy conditions, and therefore, it is effective to "select individual identifiers in descending order of magnitude from numbers that can be individual identifiers".

For example, assuming the largest integer that can be stored in a prepared area as z and assuming the k-th root of z as z^(1/k)=y, numbers to be the individual identifiers (or numbers that are to be pooled as candidates of the individual identifiers) are taken out in descending order from y. Meanwhile, when it is desired to "distinguish a number of identifiers that is larger than the resolution k" in more cases, it is more advantageous to take individual numbers whose magnitudes are as small as possible, and therefore, it is effective to "separate the required number of individual identifiers away from the maximum value of the section as much as possible". However, when selection is made in ascending order of magnitude from integer candidates before obtaining logarithms, it becomes difficult to satisfy the condition in terms of "making the magnitudes close to each other in order to make errors smaller". For example, selection is made so that the difference in the numbers of digits of numbers (the smallest and largest) that become the ends of a section determined by the number of required individual identifiers become smaller than the range of digits of significant figures in conversion into floating-point numbers or into integers (fixed-point numbers) by multiplication by a constant.

By excluding use of numbers that include a combination that makes errors larger as individual identifiers, it is also possible to reduce the number of registrations in the exceptional value list. Furthermore, in terms of speeding up of the search process for individual identifiers at the time of reception, it is advantageous that the size (the number of elements) of the exceptional value list is as small as possible. Note that a case in which the size of the exceptional value list is eventually 0 (that is, a case in which the exceptional value list is no longer needed) is logically possible.

Figure 42:
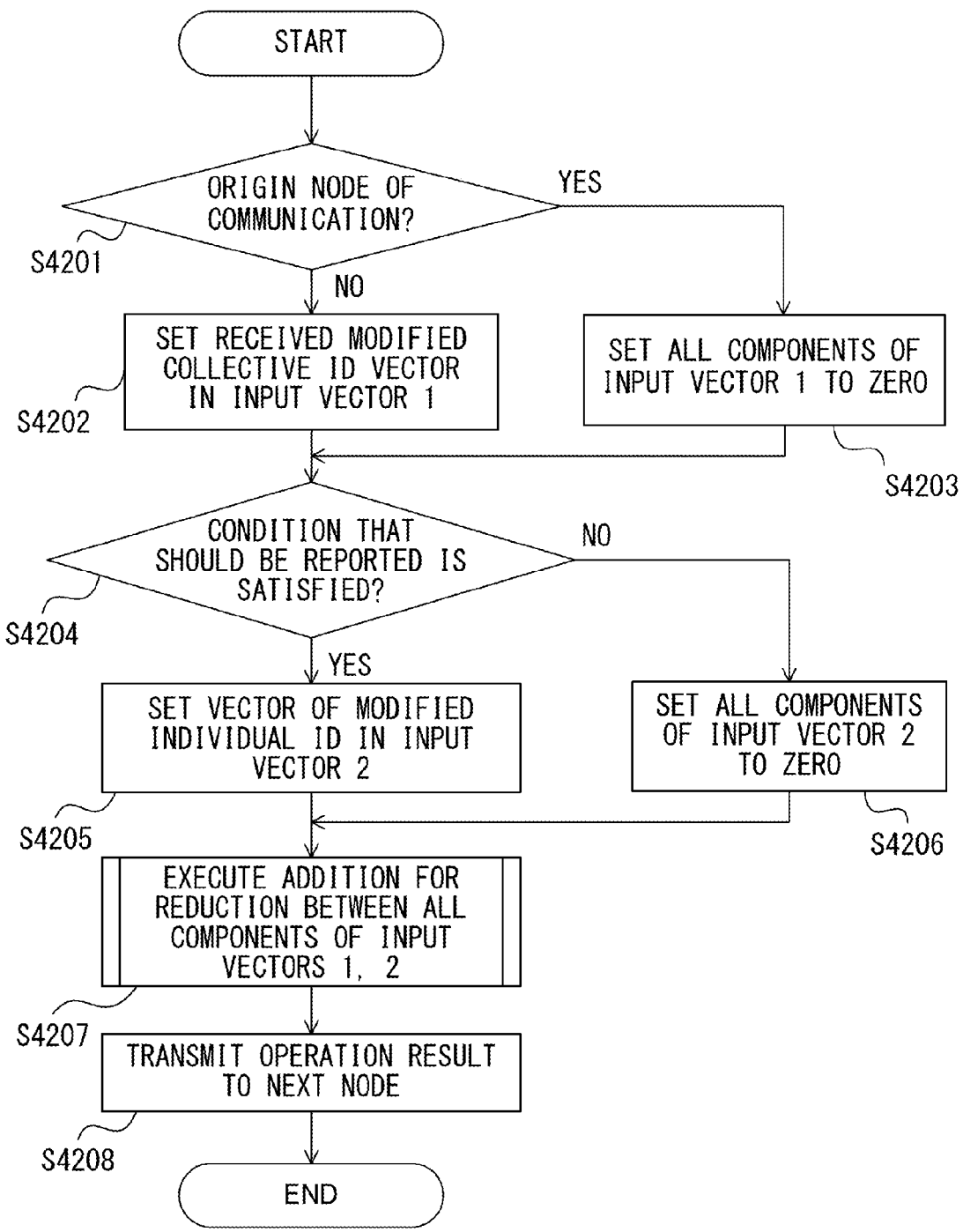
FIG. 42 is a flowchart illustrating an example of a process of an ID gathering mechanism at a transmitter side node in the eighth embodiment.

FIG. 42 is a flowchart illustrating an example of the process of ID gathering mechanism 401 at a transmitter side (FIG. 4) in the eighth embodiment. The ideas of the processes in this flowchart are substantially the same as in FIG. 5 (the first embodiment), FIG. 17 (the second embodiment), FIG. 30 (the fifth embodiment), FIG. 37 (the sixth embodiment) and so on described above. The flowchart illustrated in FIG. 42 is obtained by replacing multiplication with addition of logarithms as the operation for the reduction unit 404 and vectorizing the individual identifier and the collective identifier in the flowchart in FIG. 30 or FIG. 37. The functional blocks and the system configuration are explained using FIG. 4 and FIG. 7 as examples. The system configuration of FIG. 20, FIG. 21, FIG. 22 or the like may also be used. When the processing of the ID gathering mechanism 401 in FIG. 4 starts, the CPU 701-1 of the transmission origin node 701 or the CPU 702-1 of the reception relay node 702 that functions as a relay node executes the process in the flowchart. Work area such as input vector 1 or 2 may be implemented by the memory 701-2 of the transmission origin node 701 or the memory 702-2 of the CPU 702-1 of the reception relay node 702.

Meanwhile, identifiers in the eighth embodiment are an ordered set of integers. However, what are stored in the transmitter side node are not necessarily original individual identifiers themselves, but are the modified individual identifiers that have been converted into logarithms or into logarithms and then into integers by multiplication by a constant, and the receiver side node obtains the individual identifiers by restoring the original collective identifier from a received modified collective identifier. Here, the "ordered set" may be called a "vector", and integers that are the elements of the "ordered set" may bee called components. The "identifier" is a generic name for the original individual identifier and the original collective identifier, and the "modified identifier" is a generic name for the modified individual identifier and the modified collective identifier. The operation between identifier vectors or modified identifiers is performed by operation between components at corresponding positions.

In FIG. 42, first, whether or not the local node is the origin node of the communication is judged (step S4201). When the judgment in step S4201 is NO, the modified collective identifier vector that has been received is stored in the input vector 1 that stores the received value (step S4202). When the judgment in step S4201 is YES, there is no value that has already been received, and therefore, 0 that is the value of the identify element of logarithm addition operation is given to all the components of the input vector 1 (step S4203).

Next, whether or not the condition that is to be reported is satisfied in the management target managed by the local node is judged (step S4204). When the judgment in step S4204 is YES, the modified individual identifier vector corresponding to the management target for the local node (or the local node itself) is stored in the input vector 2 that stores the state of the local node (step S4205). When the judgment in step S4204 is NO, 0 that is the value of the identity element is given to all the components of the input vector 2 (step S4206).

After that, between all the components of the input vectors 1 and 2, logarithm addition operation used for the reduction unit 404 is executed (step S4207). Lastly, the operation result in step S4207 is output as the modified collective identifier vector that is the content transmitted to the next forwarding destination (step S4208).

Figure 43:
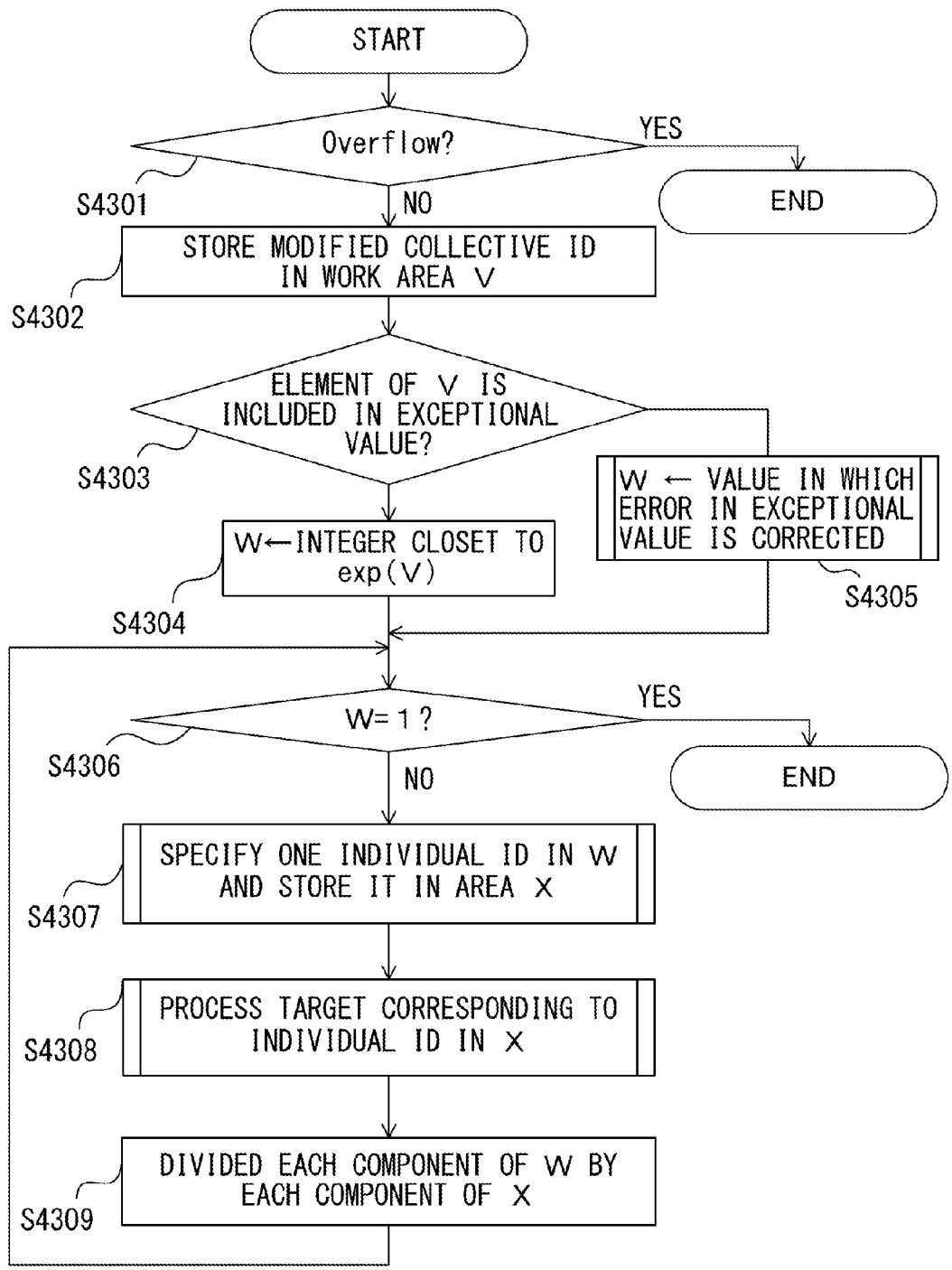
FIG. 43 is a flowchart illustrating an example of a process of an ID analysis mechanism at a receiver side node in the eighth embodiment.

FIG. 43 is a flowchart illustrating an example of the process of ID analysis mechanism 402 at a receiver side node (FIG. 4) in the eighth embodiment. The ideas of the processes in this flowchart are substantially the same as in FIG. 6 (the first embodiment), FIG. 18 (the second embodiment), FIG. 31 (the fifth embodiment), FIG. 38 (the sixth embodiment) and so on described above. The flowchart illustrated in FIG. 43 is obtained by replacing multiplication with addition of logarithms as the operation for the reduction unit 404 and by vectoring the individual identifier and the collective identifier in the flowchart in FIG. 31 or FIG. 38. The functional blocks and the system configuration are explained using FIG. 4 and FIG. 7 as examples. The system configuration of FIG. 20, FIG. 21, FIG. 22 or the like may also be used. When the processing of the ID analysis mechanism 402 in FIG. 4 starts, the CPU 702-1 of the reception relay node 702 that functions as receiver side node in FIG. 7 executes the process in the flowchart. Meanwhile, work area vectors W, X and so on are implemented by the memory 702-2 in the reception relay node 702.

First, whether or not overflow has occurred in a received modified collective identifier vector is judged (step S4301). When the judgment in step S4301 is YES, substantially no reception process is performed, and the process of the ID analysis mechanism 402 at a receiver side node illustrated in FIG. 43 is terminated. When the judgment in step S4301 is NO, the modified collective identifier vector is stored in the work are vector V (step S4302).

Next, whether or not each element of the work area vector V is included in the exceptional values is judged (step S4303). When the judgment in step S4303 is NO, exponential operation is performed for each element of the work area vector V (this is expressed as "exp(V)"), and an integer that is closest to the calculation result is stored in the corresponding element in the work area vector W (step S4304). When the judgment in step S4303 is YES for any of the elements of the work area vector V, a value in which the error in the exceptional value is corrected with respect to the element is stored in the corresponding element in the work area vector W (step S4305). The creation process for the exceptional value list required for this step is described later using flowcharts in FIG. 44 through FIG. 46.

Next, whether or not all the component values of the work area vector W has become 1 that is the identity element when turning back from the logarithm addition operation area to the multiplication operation area (see step S3404) is judged (step S4306). When the judgment step S4306 is NO, one of the individual identifier vectors is specified from the collective identifier vector, and the result is stored in the work area vector X (step S4307). The management target corresponding to the individual identifier vector stored in the work area vector X in step S4307 is processed (specified) (step S4308).

Next, the inverse operation of multiplication operation before conversion to logarithms used for the reduction unit 404, that is, division operation is applied to the respective components of the work area vector W and the work area vector X, and the individual identifier specified from the work area vector W and stored in the work area vector X in step S3805 is removed (step S4309). After that, returning to the process in step S4306, the processes from step S4306 to step S4309 are repeatedly executed. When the judgment in step S4306 becomes YES, the process of the ID analysis mechanism 402 at a receiver side node illustrated in the flowchart in FIG. 43 is terminated.

Figure 44:
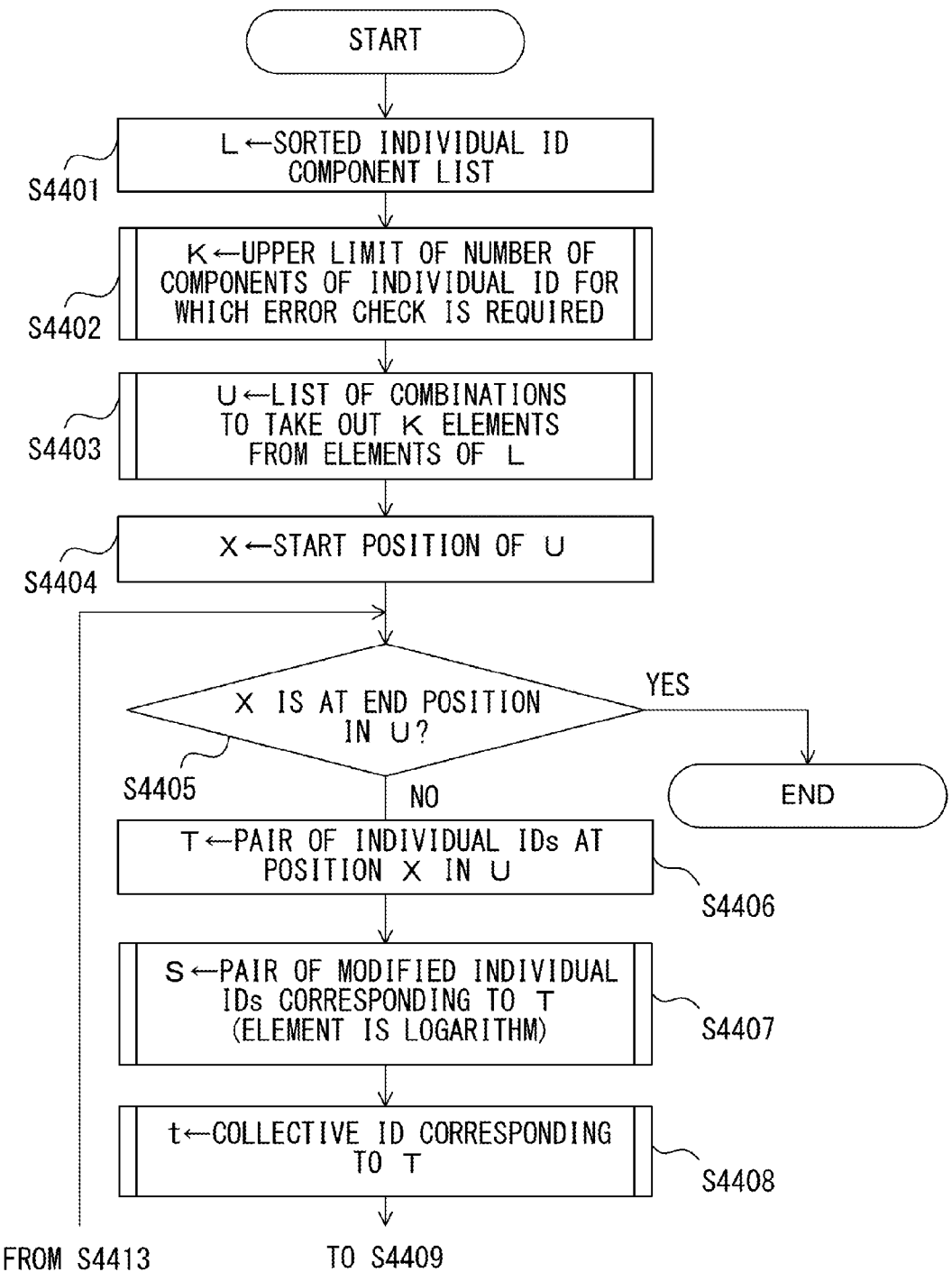
Figure 45:
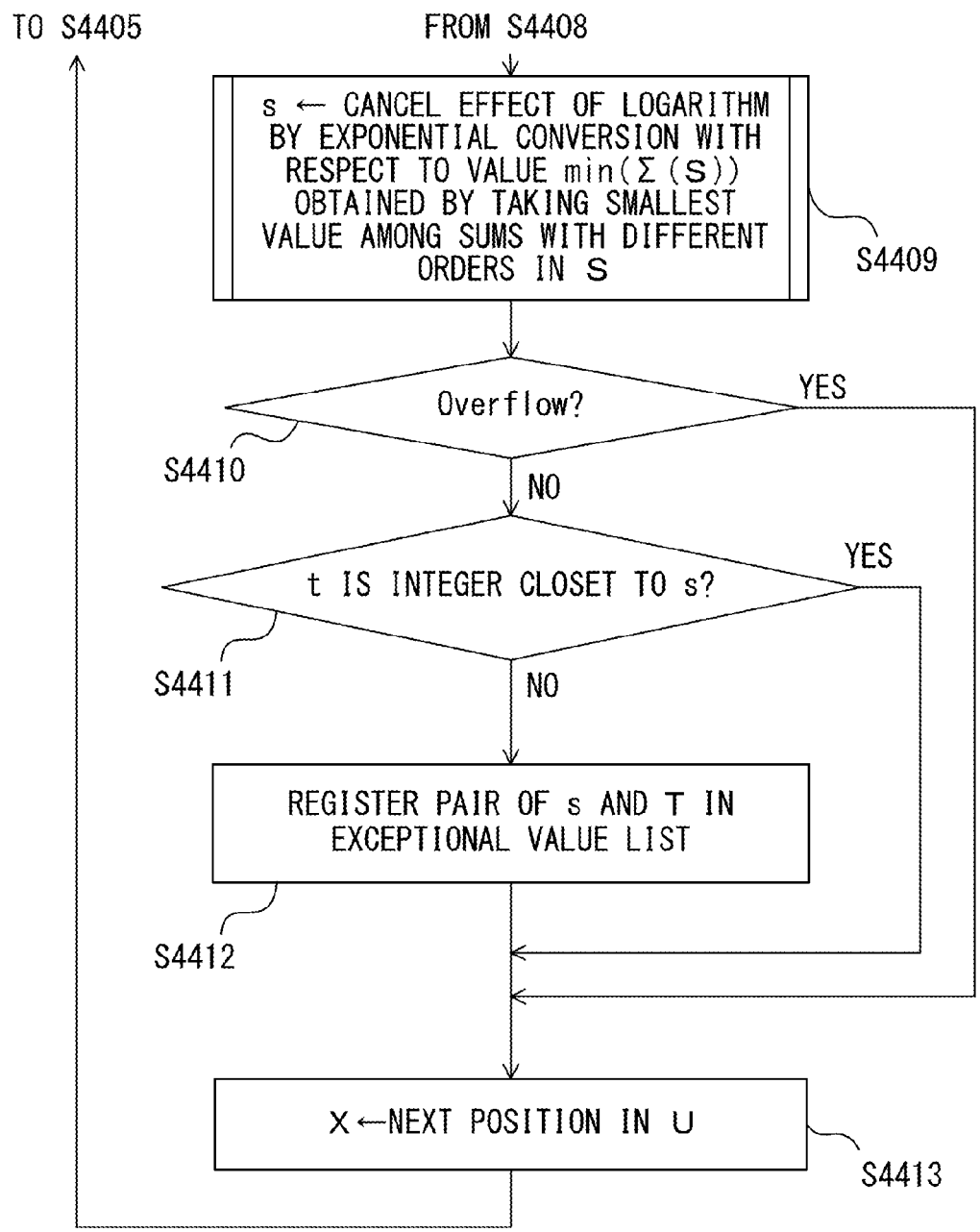

FIG. 44 and FIG. 45 are flowcharts illustrating an example of a creation process for an exceptional value list that is required for the correction process in step S4305 in FIG. 43.

First, a sorted individual identifier component list is stored in a work area L (step S4401). The upper limit value of the number of components of individual identifier for which error check is necessary is calculated and stored in a work area K (step S4402). Details of the process are described later using the flowchart in FIG. 46.

A list of combinations to take out k elements from the elements in the work area L is created and stored in a work area U (step S4403). The start position of U is stored in the work area X (step S4404).

The processes from step S4406 in FIG. 44 to step S4412 in FIG. 45 are repeated while the next position in the work area U is stored in the work area X in step S4413 in FIG. 45, until the work area X is determined as at the end position of the work area U in step S4405.

When the judgment in step S4405 is NO, the combination of individual identifiers at the current position indicated by the work area X in the work area U is stored in the work are T (step S4406). The combination of the modified individual identifiers (the elements are logarithms) corresponding th the work area T is stored in the work area S (step S4407). The collective identifier corresponding to the work area T is stored in a work area t (step S4408).

By the execution of conversion by the exponential function with respect to the value min($\Sigma$(S)) obtained by taking the smallest value among the sums with different orders in the work area S, the effect of the logarithm is cancelled, and the calculation result is stored in a work area s (step S4409 in FIG. 45). Whether or not overflow has occurred in the operation result in step S4409 is judged (step S4410). When the judgment in step S4410 is YES, the process proceeds to S4413. When step S4411 is NO, whether or not the integer that is closest to the value of the work area s is the value of the work area t is judged (step S4411). When the judgment in step S4411 is YES, the process proceeds to S4413. When the judgment in step S4411 is NO, the pair of the value of the work area s and the value of the work area T is stored in the exceptional value list (step S4412). After that, the next position in the work area U is stored in the work area X (step S4413), and the process returns to step S4405. When the judgment in step S4405 becomes YES as a result of the repeated processes from step S4405 to S4413, the creation process for the exceptional value list is terminated.

FIG. 46 illustrates the details of step S4402 in FIG. 44. First, a sorted individual identifier component list is stored in a work area L (step S4601). Here, the work area L is sorted so that the smallest element comes to the start. The upper value of the resolution is stored in a work area k (step S4602). The start position of the work area L is stored in a work area Y (step S4603). Value 1 is stored in a work area f (step S4604). The value of the work area k is stored in the work area K as the initial value (step S4605).

Whether or not the position of the work area Y has become the end position of the work are L is judged (step S4606). When the judgment in step S4606 is NO, the element at the current position indicated by the work area Y in the work area L is stored in the work area g (step S4607). The result of multiplication of the value of the work area f by the value of the work area g is stored in the work area f (step S4608).

Whether or not overflow has occurred in the operation result in step S4608 is judged (step S4609). When the judgment in step S4609 is YES, the process is terminated. When the judgment in step S4609 is NO, the value of the work area K is incremented by +1 (step S4610). The next position in the work area L is stored in the work area Y (step S4611), and the process returns to the process in step S4606. When the judgment in step S4606 becomes YES as a result of the repeated process from step S4606 to step S4611 described above, the processes in the flowchart in FIG. 46 is terminated. That is, the upper limit value of the number of components of individual identifiers for which error check is necessary is stored in the work area K, and the process in step S4402 in FIG. 44 is terminated.

The eighth embodiment explained above is especially effective when only addition is available as the inter-node operation mechanism (Reduction or Atomic Operation function). This is because it is more advantageous in terms of performance when the inter-node operation mechanism is used, compared with the case in which each node performs operation on the CPU without using the inter-node operation mechanism, as explained in the third embodiment.

Note that the logarithm of the individual identifier of each node can be calculated and distributed to each node in advance. Thus, calculation of the exponential function and logarithmic function and the operation to search the table of the exceptional value list only need to be executed at the receiver side. Accordingly, the transmitter side node does not need any calculator for this purpose or memory for storing the table.

<Ninth Embodiment>

In the eighth embodiment described above, the reduction for obtaining the collective identifier is executed by addition, and division is used (after conversion using the exponential function that is the inverse function of the logarithmic function) when taking out the individual identifier, whereas in the ninth embodiment, the individual identifier is taken out by searching a table based on the result of addition.

The calculation method in the ninth embodiment corresponds to the case in which all the collective identifiers are registered in the "exceptional value list" in the eighth embodiment. However, the individual identifier in the ninth embodiment does not have to be the one obtained from the "individual identifier of the fifth, sixth embodiments", and it only needs to be an element of a "set in which addition is defined" that satisfies the following conditions (P) and (Q).

(P) Sums according to combinations of individual identifiers that does not overflow in calculation in an area of a specified size are all different (Q) Sums of more than k individual identifiers are all larger than a certain number, and sums of k individual identifiers or less are all different For example, a set that has the above characteristics about integer addition may be selected as follows, assuming the upper limit of the number of identifiers that may be stored in the area that stores identifiers as a.

When k=1: A set of all integers that are "equal to or larger than a/2 and equal to or smaller than a" may be used as the set of individual identifiers.

When k≥2: In the range of a/k or smaller, elements of a set S obtained in this way are added in descending order of magnitude as follows. Any partial set of S may be used as the set of individual identifiers.

(1) The set S is assumed as a set {[a/k]+1} that has one element. The symbol [x] is the "Gaussian symbol" that means a largest integer that does not exceed x. Assuming that a is an m bits area, it is expressed as a=2^m−1. It is easy to confirm that overflow does not occur when consecutive k integers are selected in descending order from [a/k]+1 and the sum of them is obtained (that is, the sum is equal to or smaller than a).

(2) Assuming the smallest value of the set S as b, whether or not S∪{c} maintains the conditions (P) and (Q) with a positive integer c that is smaller than b is checked in descending order starting from b−1. When an integer c that maintains the conditions is found, (2) is repeated while newly assigning S∪{c} as S. It is not necessarily required to try all the positive integers equal to or smaller than b−1, and the process may be terminated when individual identifier candidates in the size determined in advance or the number determined advance have been found. For example, the process may be terminated at the size at which "overflow occurs with the sum of k+1" or when the required number (that is sufficiently larger than the number of management targets in the system) is obtained.

When k≥2, assuming that a is an "integer that can be stored in the m-bit area", in the case in which the resolution is perfect, in order to be able to be used for a number of targets that is larger than m that is the upper limit of the number of management targets, it is preferable to confirm that the number of elements of S is larger than m.

For example, assuming the upper limit of the resolution k=2, a set {64,63,62,60,57,52,44,35} in a 7 bits area has eight elements and satisfies the conditions (in the procedures (1), (2) described above, a=127)

First, looking at FIG. 16B presented in the explanation of the first embodiment, it is confirmed that the "sums of two elements" are all different. In addition, it is apparent that overflow occurs in all the sums of three elements in the 7 bits area according to 35+44+52=131>127, that is, according to the fact that overflow occurs in the sum of the smallest three elements in the 7 bits area.

The check is performed in descending order in the above example with an intention of reducing the calculation amount for the check by using the fact that "in the area in which overflow occurs in the sum of numbers more than k, only the calculation of the sums of combinations of k elements or less is required". However, the set of individual identifiers is prepared not when the system is in operation but at the time of designing of the system, and therefore, the calculation time for determining the set of identifiers does not affect the performance at the time of system operation.

In a table or hash function for checking individual identifiers that were used in generating the collective identifier, at least one of the individual identifiers that generate a certain collective identifier is given, the remaining individual identifiers may be sequentially obtained by newly searching a table again or applying a hash function again. For example, by preparing a table or a hash function that gives the largest number in the individual identifiers that generate a given collective identifier in advance, all the individual identifiers that generated a received collective identifier may be obtained.

FIG. 47 is a flowchart illustrating an example of the ID gathering mechanism 401 at a transmitter side (FIG. 4) in the ninth embodiment. In the flowchart illustrated in FIG. 47, in the same manner as in the case of the flowchart in FIG. 5 related to the first embodiment, addition is used as the operation for the reduction unit 404, and the individual identifier and the collective identifier are vectorized. However, the addition in the ninth embodiment satisfies the conditions (P) and (Q) described above. The functional blocks and the system configuration are explained using FIG. 4 and FIG. 7 as examples. The system configuration of FIG. 20, FIG. 21, FIG. 22 or the like may also be used. When the processing of the ID gathering mechanism 401 in FIG. 4 starts, the CPU 701-1 of the transmission origin node 701 or the CPU 702-1 of the reception relay node 702 that functions area relay node in FIG. 7 executes the process in the flowchart. The work area such as the input vector 1 or 2 is implemented by the memory 701-2 of the transmission origin node 701 or the memory 702-2 of the reception relay node 702.

The identifiers in the ninth embodiment are an ordered set of integers. Here. The "ordered set" is called a "vector", and integers that are the elements of the "ordered set" are called components. The operation between identifier vectors is performed by operation between components at corresponding positions.

In FIG. 47, first, whether or not the local node is the origin node of the communication is judged (step S4701). When the judgment in step S4701 is NO, in the input vector 1 that stores the received value, the collective identifier vector that has been received is stored (step S4702). When the judgment in step S4701 is YES, there is no value that has been received, and therefore, 0 that is the value of the identity element of addition operation is given to all the components in the input vector 1 (step S4703).

Next, whether or not the condition that is to be reported is satisfied in the management target managed by the local node is judged (step S4704). When the judgment in step S4704 is YES, the individual identifier vector that corresponds to the management target for the local node (or the local node itself) is stored in the input vector 2 that stores the state of the local node (step S4705). When step S4704 is NO, 0 that is the value of the identity element is given to all the components of the input vector 2 (step S4706).

After that, between all the components of the input vectors 1 and 2, addition operation used for the reduction unit 404 is performed (step S4707). Lastly, the operation result in step S4707 is output as the collective identifier vector that is the content transmitted to the next forwarding destination (step S4708).

FIG. 48 is a flowchart illustrating an example of the process of ID analysis mechanism 402 at a receiver side node (FIG. 4) in the ninth embodiment. In this flowchart, the receiver side node searches an individual identifier (component) configuration table whose key is the collective identifier, in order to obtain the individual identifier (component). The individual identifier and the collective identifier are vectorized as described above. The functional blocks and the system configuration are explained using FIG. 4 and FIG. 7 as examples. The system configuration of FIG. 20, FIG. 21, FIG. 22 or the like may also be used. When the processing of the ID gathering mechanism 402 in FIG. 4 starts, the CPU 702-1 of the reception relay node 702 that functions as a receiver side node in FIG. 7 executes the process in the flowchart. Meanwhile work area vectors W, X and the like are implemented by the memory 702-2 of the reception relay node 702.

First, the collective identifier according to the reduction unit 404 provided between nodes is received (step S4801). Whether or not overflow has occurred in the collective identifier vector is judged (step S4802). When the judgment in step S4802 is YES, substantially no reception process is performed, and the process of the ID analysis mechanism 402 at a receiver side node illustrated in FIG. 48 is terminated. When the judgment in step S4802 is NO, the collective identifier vector is stored in the work area W (step S4803).

Then, with respect to each component of the work area vector W, as illustrated in FIG. 16B, a comparison table of the collective identifier and a bitmap of individual identifiers that are the generation factors is searched, and the individual identifier is specified (step S4804). The comparison table is held in the memory 702-2 of the reception relay node 702 for example.

Figure 49:
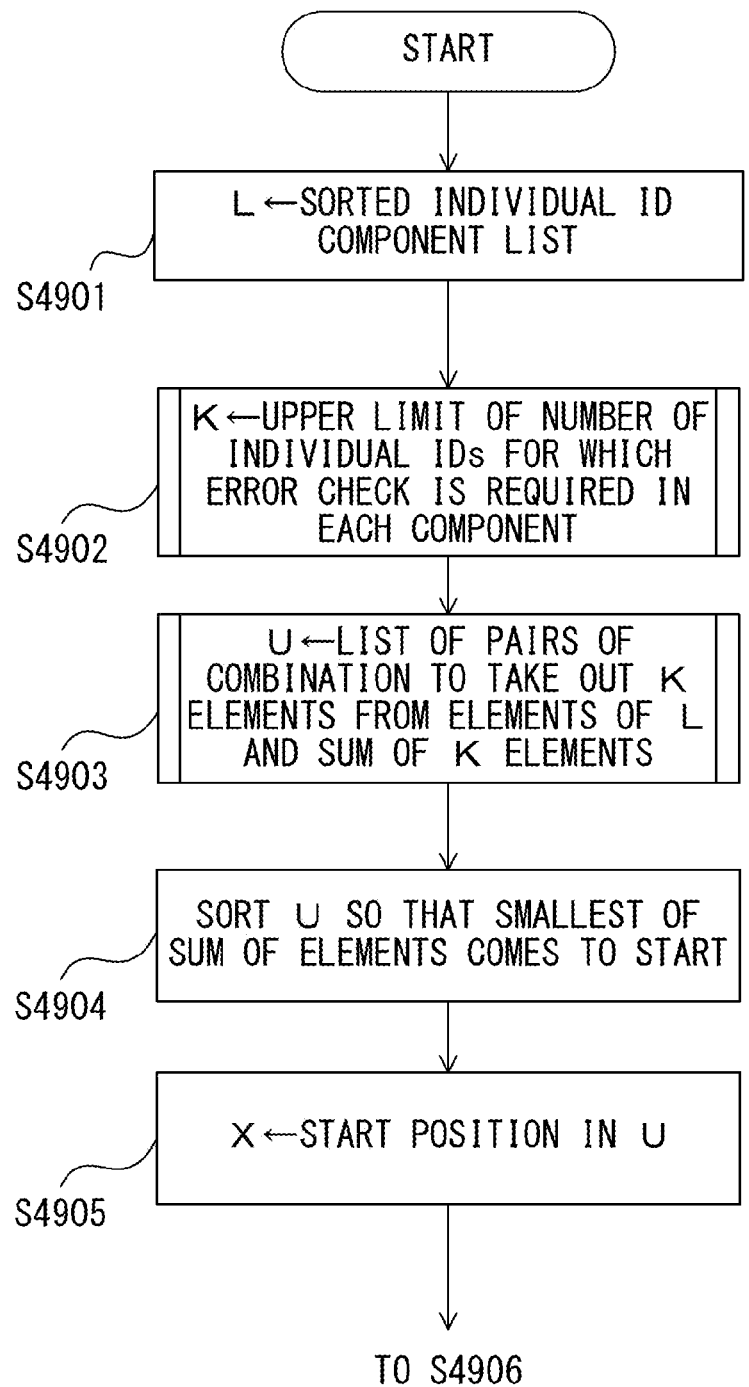
Figure 50:
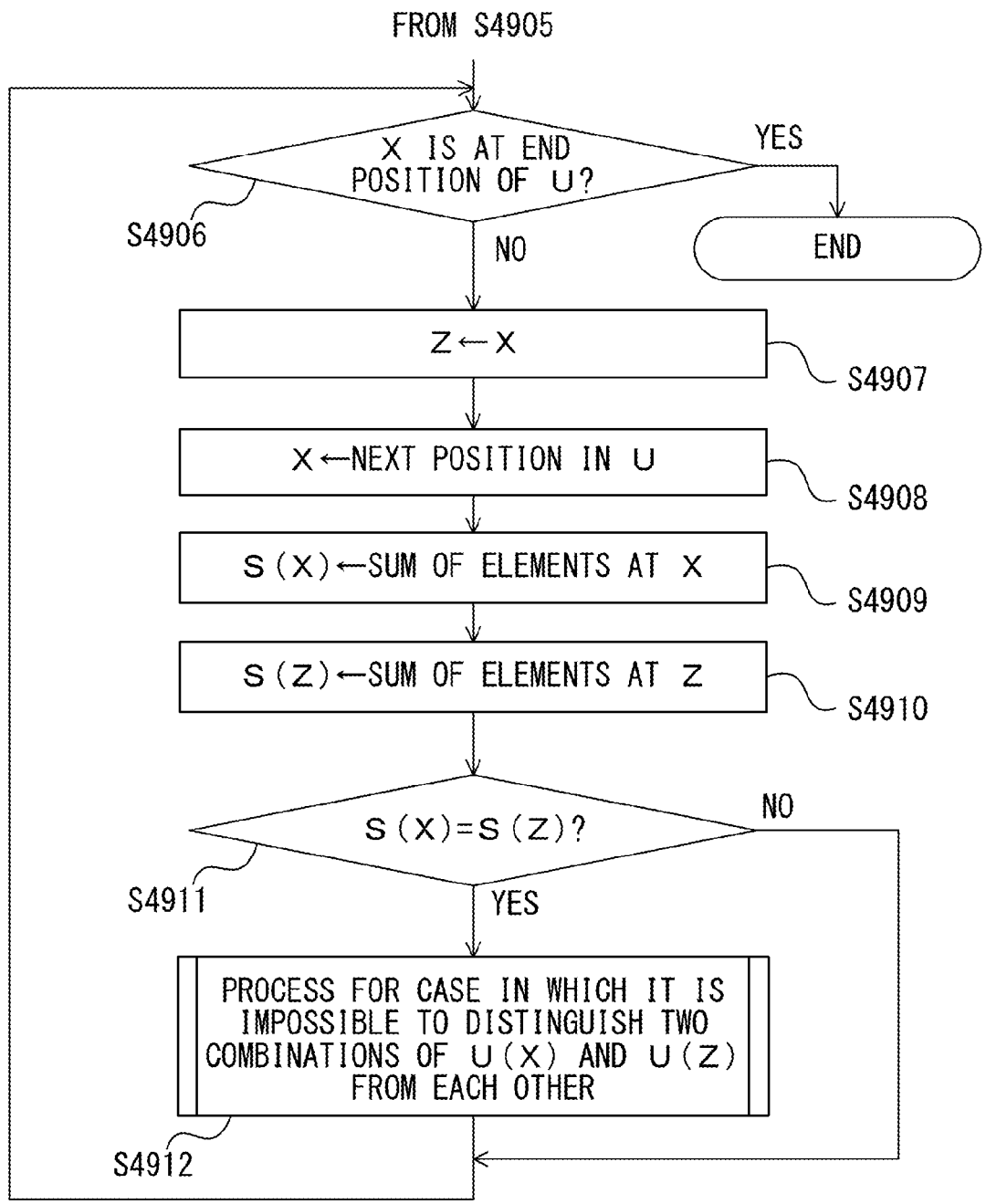

FIG. 49 and FIG. 50 are flowcharts illustrating an example of a creation process for a correspondence list for individual identifier components used by the receiver side node, in a case in which the components of the collective identifier are obtained by reduction using addition in the ninth embodiment. This process may be executed by a computer other than the reception relay node 702 in FIG. 7.

First, a sorted individual identifier component list is stored in a work area L (S4901). The upper limit value of the number of components of individual identifier for which error check is necessary for each component is calculated and stored in a work area K (step S4902). Details of the process are described later using the flowchart in FIG. 51.

A list of combinations to take out k elements from the elements in the work area L and the sums of the k elements is stored in a work area U (step S4903). The work area U is sorted so that the smallest of the sums of the elements comes to the start (step S4904). The start position of U is stored in the work area X. (step S4905).

Whether or not the position indicated by the work area X is the end position of the work area U is judged (step S4906). When the judgment in step S4906 is NO, the value of the work area X is stored in the work area Z (step S4907).

The next position in the work area U is stored in the work area X (step S4908). The sum of the elements of the position indicated by the value of the work area X is calculated and stored in a work area S(X) (step S4909). The sum of the elements of the position indicated by the value of the work area Z is calculated and stored in a work area S(Z) (step S4910).

Whether or not the values of the work area S(X) and the work area S (Z) are equal is judged (step S4911). When the judgment in step S4911 is YES, a process that has been determined in advance is executed for the case in which it is found that it is impossible to distinguish the two combinations of the value U(X) of the work area U indicated by the value of the work area X and the value U(Z) of the work area U indicated by the value of the work area Z from each other (step S4912). For example, registration of the corresponding values in the comparison table is prohibited. When the judgment in step S4911 is NO, the process in step S4912 is skipped. After that, returning to the process in step S4906, the process for the next position indicated by the value of the work area X is continued. When the judgment in step S4906 becomes YES because the position of the work area X has reached the end position of the work area U, the creation of the comparison table is terminated.

FIG. 51 illustrates the details of step S4902 in FIG. 49. The flowchart illustrated in FIG. 51 is similar to the process in the flowchart in FIG. 46. However, in step S5102 in FIG. 51 corresponding to step S4608 in step FIG. 46, a new value of the work area f is calculated by adding the value of the work area f and the value of the work area g. This is because the operation for the reduction unit 404 in the ninth embodiment is not multiplication but addition. Other portions of the algorithm for calculating the upper value are substantially the same as in the case in FIG. 46.

Based on the flowcharts in FIG. 49 through FIG. 51 described above, the specific procedures for creating the comparison table in FIG. 16B is explained below.

An initial set is assumed as S={64}. Then, overflow does not occur since 64+63=127. Therefore, S={64,63} is acceptable. Here, the smallest value of S is 63.

All of 64+63, 64+62, 63+62 are different. Therefore, the following conditions (P) and (Q) are satisfied.

(P) Sums according to combinations of individual identifiers that does not overflow in calculation in an area of a specified size are all different (Q) Sums of more than k individual identifiers are all larger than a certain number, and sums of k individual identifiers or less are all different For this reason, it is possible to add 62. Therefore, S={64, 63,62} is acceptable.

However, S={64,63,62,61} is not acceptable since 64+61=63+62. Therefore, 61 is skipped. The acceptability of S={64,63,62,60} may be confirmed as follows.

When both of the two are included in the partial set consisting of the preceding three elements, it is already confirmed. Meanwhile, the smallest sum is 63+62=125. When at least one of them sticks out, one of the elements is 60. The sum with the largest element 64 is 124, and therefore, the sums with any of the preceding three elements is smaller than the sum of two from the preceding three elements, and therefore, it does not match. In addition, the sums with preceding elements are all different Generally the difference with the preceding element is 1 or more, and therefore, it is obvious from 63+59=62+60 that S={64,63,62,60,59} is unacceptable. Therefore, 59 is skipped.

It is obvious from 64+58=62+60 that S={64,63,62,60,58} is unacceptable. Therefore, 58 is also skipped.

It has already been confirmed that S={64,63,62,60,57} is acceptable, when both of the two elements are included in the partial set consisting of the preceding four elements. When at least one of them sticks out, one of the elements is 57. The sum with the largest element 64 is 121, and therefore, the sums with any of the preceding three elements is smaller than the sum of two from the preceding three elements, and therefore, it does not match. In addition, the sums with preceding elements are all different. After this, similar processes are executed, and the comparison table in FIG. 16B is completed.

The ninth embodiment described above is especially effective when only addition is available as the inter-node operation mechanism (Reduction or Atomic Operation function). This is because it is more advantageous in terms of performance when the inter-node operation mechanism is used, compared with the case in which each node performs operation on the CPU without using the inter-node operation mechanism, as explained in the third embodiment.

<Tenth Embodiment>

In the fifth through eighth embodiments, according to the condition that the "resolution has the upper limit k" for the data transmitted from the transmitter side node to the receiver side node, it is possible to receive information of many management targets using a smaller area, compared with the second through fourth embodiments. In the method of the second through fourth embodiments in which the resolution is perfect, the same number of bits as the number of the management targets is are required.

However, in the fifth to eights embodiment, it is necessary to refer to the table of identifiers when obtaining the individual identifier from the collective identifier, and therefore, without limiting the range of possible individual identifiers using a certain method, access to the memory area of the table of identifiers increases, including the area of individual identifiers that do not correspond to the management targets that need to be identified.

In the tenth embodiment, a set of identifiers are divided into a plurality of groups, and each node reports the group that the identifier of the management target belong to using a different reduction, separately from the identifier of the management target. This idea is the same as in the fourth embodiment, and assuming the group as a higher-level (virtual) management target, an individual identifier (virtual, for management) is set separately for each group. In the tenth embodiment, the following process is further performed.

In identifying a group, by assigning "individual identifiers in which the bit at the same position in the same area is on" to management targets belonging to the same group, that "at least one of the management target in the group is in the monitored state" may be reported by reduction by bitwise OR operation. That is, logical OR of the states of a plurality of management targets may be reported.

When using bitwise AND (AND operation in units of bits) or multiplication is used, De Morgan's law "not (A and B) ←→ (not A) or (not B)" may be used. That is, the result of bitwise AND or multiplication whose input is 0 for a management target in which the condition is satisfied and whose input is 1 for other management target may be inverted.

When using addition, simply a "storage area for the collective identifier for the group" may be separately provided. When the individual identifiers are all positive, whether or not a value is input (changed) may be known only by addition, and when the result is a value that is not 0 as the initial value 0 or when overflow occurs, it reveals that at least one of inputs is not 0. Thus, there is no need to set an "individual identifier for the group" separately from the identifiers of the individual management targets. The "individual identifier for the group" is for referring to the "storage area for the collective identifier for the group", and in the above case, the "storage area for the collective identifier for the group" may be calculated without the "collective identifier for the group".

In the calculation of the collective identifier for the group, the number of management targets is small, and therefore, the average reference range may be reduced compared with the case of sequentially trying identifiers of all the management targets. As the collective identifier for the group, the method in the second or third embodiment (totally the same as in the fourth embodiment) may be used, or the fifth through ninth embodiments may be applied. Meanwhile, it is also possible to apply the method in the fifth through eighth embodiment to the identifier for the group with respect to the second or third embodiment.

FIG. 52 is a flowchart illustrating an example of a transmission process for an identifier for which grouping has been applied in a layered manner by bitwise OR operation in the tenth embodiment.

First, the collective identifier of the group is obtained by reduction using bitwise OR operation from individual identifiers of each group layer (step S5201). The collective identifier by multiplication is obtained with respect to the individual identifiers (of the original management targets) in the lowest layer (step S5202). Both of the collective identifiers are transmitted to the next node (step S5203).

FIG. 53 is a is a flowchart illustrating an example of a reception process for an identifier for which grouping has been applied in a layered manner by bitwise or operation in the tenth embodiment. From the collective identifier of each group layer, the list of individual identifier components in the lowest layer whose operation is multiplication is specified by a depth-first search (step S5301). As a specific algorithm example for the reception process involving the depth-first search is described referring to the flowchart in FIG. 28. Based on the specified list of the individual identifier components, the (components of) individual identifiers are specified from the collective identifier according to reduction by multiplication (step S5302).

Figure 54:
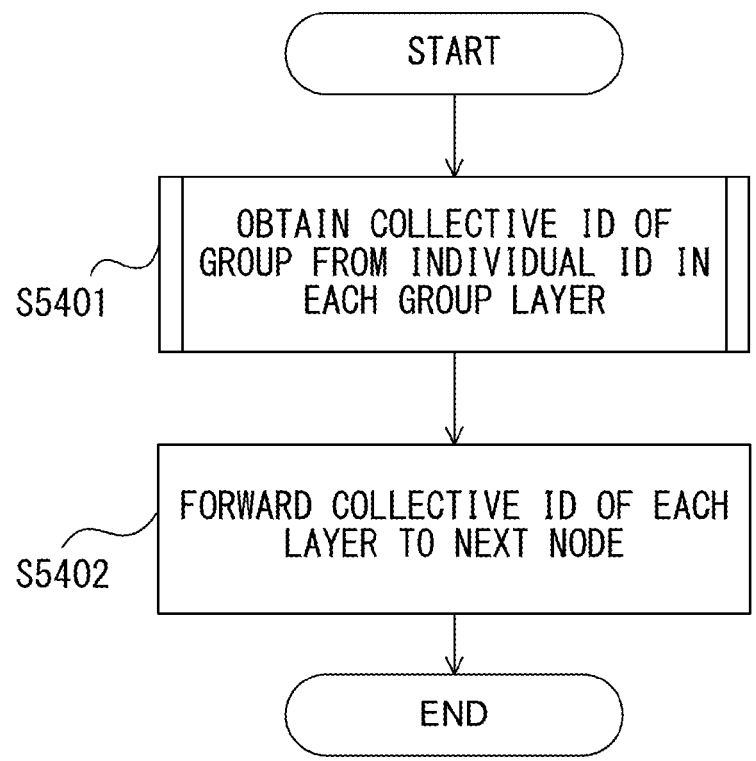
FIG. 54 is a flowchart illustrating an example of a transmission process for identifiers for which grouping has been performed in a layered manner by multiplication in the tenth embodiment.

FIG. 54 is a flowchart illustrating an example of a transmission process for an identifier for which grouping has been applied in a layered manner by multiplication operation in the tenth embodiment. The collective identifier of the group is obtained from individual identifiers of each group layer (step S5401). The collective identifier of each layer is transmitted to the next node (step S5402).

Figure 55:
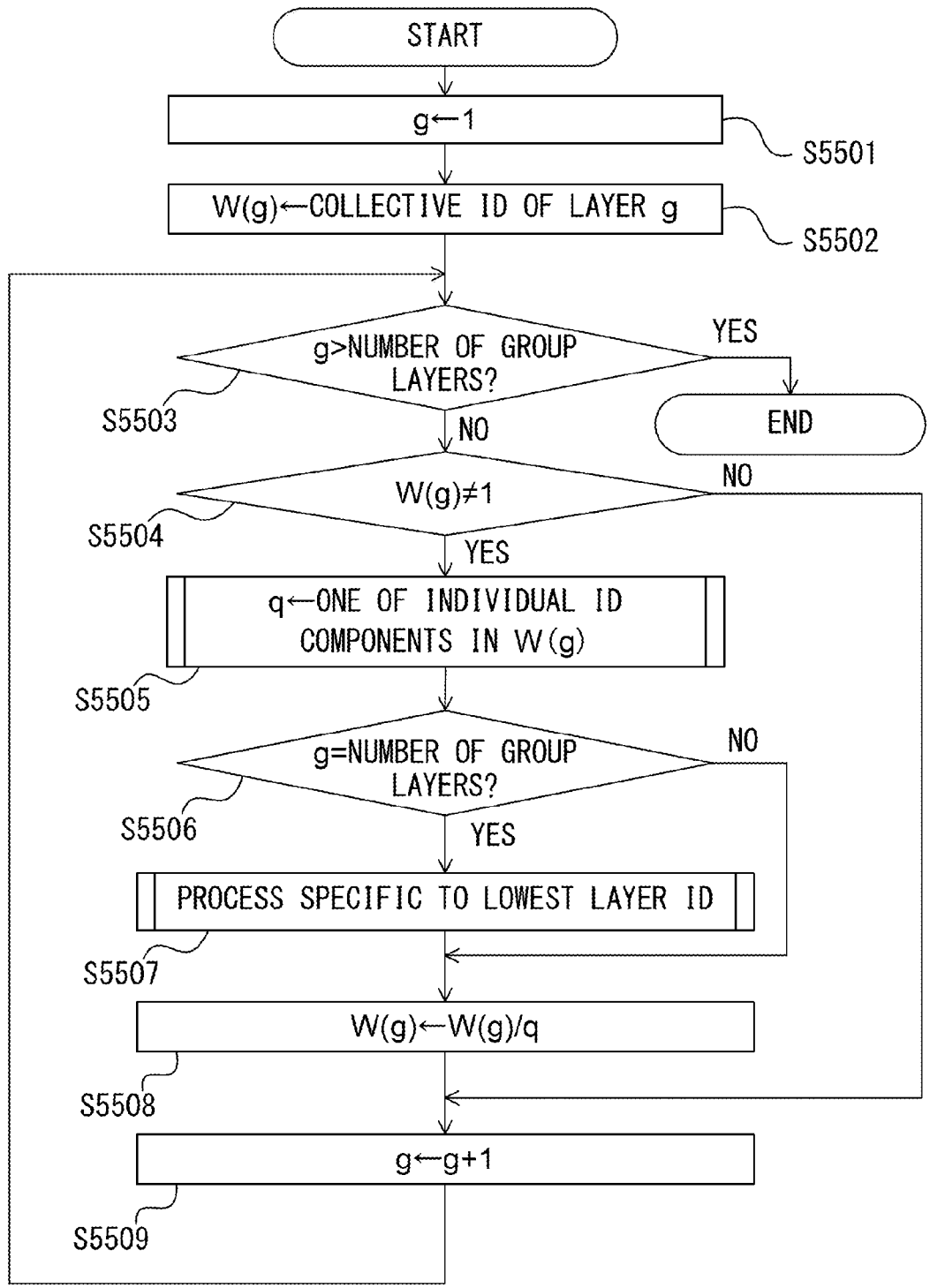
FIG. 55 is a flowchart illustrating an example of a reception process for identifiers for which grouping has been performed in a layered manner by bitwise or operation in the tenth embodiment.

FIG. 55 is a flowchart illustrating an example of a reception process for an identifier for which grouping has been applied in a layered manner by multiplication operation in the tenth embodiment.

Value 1 is stored in a work area g that indicates the currently processed layer (step S5501). The collective identifier (component) of the layer indicated by the work area g is stored in a work area W(g) (step S5502).

Whether or not the value of the layer indicated by the work area g has become larger than the number of group layers is judged (step S5503). When the judgment in step S5503 is NO, whether or not the work area W(g) is 1 (the identity element for multiplication operation) is judged (step S5504). When step S5504 is YES (W(g) is not 1), one of the individual identifier components in the work area W(g) is stored in the work area q (step S5505).

Whether or not the value of the layer indicated by the work area g is equal to the number of group layers, that is, whether it is the lowest layer is judged (step S5506). When the judgment in step S5506 is YES, a process that is specific to the lowest-level identifier, that is, a process to extract the management target from the individual identifiers that have been taken out from the lowest layer is performed (step S5507). When the judgment in S5506 is NO, the process in S5507 is skipped.

The work area W(g) is divided by the work area q and the result is newly stored in the work area W(g) (step S5508). The value of the work area g is incremented by +1 (step S5509). After that, the process returns to the process in step S5502, and the reception process for the next layer is executed. When the judgment in step S5503 becomes YES because the value of the layer indicated by the work area g has become larger than the number of group layers, the reception process is terminated.

According to the tenth embodiment described above, it becomes possible to shorten the processing time involved in memory access, by limiting the search range for the individual identifiers with respect to a given resolution k.

<Eleventh Embodiment>

When a table is searched in the course of specifying the individual identifier from the collective identifier, or when a search is performed in a table in the process of specifying the management target from the individual identifier, speeding-up of the search process is a subject matter. The idea especially "when the resolution is limited by the upper limit k" and the operation is multiplication is to take out the individual identifier from the collective identifier calculated by the reduction by multiplication, using "the uniqueness of factorization in prime factors". Therefore, the required time for "factorization in prime factors" is an important factor in speeding-up.

By using "algebraic integers" instead of integers in the usual sense as a set that satisfies "the uniqueness of factorization in prime factors", the number of individual identifiers that may be used within the range in which the coefficient is the same magnitude, and the memory usage required for realizing the same resolution k are reduced. Here, "(elements corresponding to) prime numbers" insets other than that of usual integers (for example, a set of "algebraic integers") are called "prime elements" in related mathematical documents, and "factorization in prime factors" in these sets are often called "unique factorization", but in the present application, mainly the term "prime numbers in a set" is used. This is for emphasizing the ease in understanding rather than academic strictness.

In the eleventh embodiment, when using the brute force method (a method of prime factorization by sequential divisions by numbers that may be the factor), the set of "numbers that may be the factor" is made smaller by using a method for separately reporting the range of the prime factors that appear or calculation of reminder of integer division, and the processing time involved in the memory access for searching a table that includes the elements of the set is reduced. In the brute force method, the management target number may also be obtained in the course of searching the table of the numbers that may be the factor. The management target number itself is used as "the main key" of the table, or the management target number is included in each entry of the table. In addition, using the reminder of division as a hash value, it becomes possible to reduce the size of the table to be drawn by dividing the table of "numbers that may be the factor" for each hash value. By limiting "combinations of reminders of individual identifiers" according to "the reminders of divisions of the collective identifier" within the range of "the upper limit for the number of prime factors in the collective identifier" defined from the set of the identifiers, the table that needs to be searched for to obtain the individual identifier may be limited. Furthermore, by subdividing the table of "the numbers that may be the factor" according to the combinations of reminders of divisions by a plurality of numbers, it becomes possible to further reduce the size of the table to be searched. The condition according to the reminders of the divisions becomes "an independent condition" by making the divisors mutually prime, and therefore, the subdivision may be done by creating a table for each "combination of reminders according to a plurality of mutually prime divisors".

In the eleventh embodiment, in the operation of obtaining the management target number from the identifier, the reminder of division is used as a hash value, and by dividing the table of "numbers that may be the factor" for each hash value, the size of the table to be searched is reduced. That is, in the eleventh embodiment, by using a "hash function", the capacity of the memory area to which reference is required in the search process is limited. When multiplication is used for reduction operation, and the generation factor of the collective identifier is obtained by "factorization in prime factors", the set of all the individual identifiers used is "candidates of prime factors that are known in advance", and therefore, assuming the number of sets of all the individual identifiers as N, it is O(N) or less. Even when N is several tens of thousands to several hundreds of thousands, it may be "within the allowable range" in some systems. Even for a hash function that uses the reminder of division and O(N) is unchanged, it may be "within the allowable range" in some cases by making "the constant coefficient" smaller.

When "a table of prime numbers used for individual identifiers" is searched in obtaining the management target number from the individual identifier, by sorting the table in the order of the size (not using Linear Search but using binary search), the search time with respect to the size of the table N may be suppressed to about $\log\_2(N)$. Furthermore, the search range may be narrowed using a table for which reverse lookup is available and calculation (hash function) or their combination. An example of a hash function that is available in the eleventh embodiment is presented below.

For example, using values of lower 4 bits or lower 8 bits of the individual identifier area as the hash function, prime numbers that are used for individual identifiers may be arranged in separate tables for every lower 4 bits or 8 bits in advance. By selecting the set of prime numbers used for individual identifier so as to average the sizes of tables for the respective hash values (values of lower 4 bits or 8 bits), the size of the table to be searched may be reduced to about $1/15$ or $1/255$.

In the fifth, sixth embodiments, in a case in which k=2 and a 32 bit area is used, when a prime number that is smaller than $2^{16}-1$ and larger than $2^{(32/3)}$ is used (for example, a prime number that is 1627 or larger) as the individual identifier, overflow occurs in the product of three or more individual identifiers, and therefore, the number of collective identifiers may be two or less. In addition, since 1627^2>2^16−1, the case in which two individual identifier are included and the case in which only one individual identifier is included may be distinguished according to the size of the collective identifier.

Once it is found out that only one individual identifier is included, the search range may be reduced using the same method as for the case of k=1. When two individual identifiers are included, the square root r of the collective identifier is calculated. One of the individual identifiers is larger than r and the other is smaller than r, and therefore, the search may be performed in the range of either one.

Furthermore, by making the magnitudes of individual identifiers close to each other as much as possible, the included individual identifiers become close to the square root of the collective identifier, and therefore, using "the prime number that is as close as the square root" as the first prime number for trying the divisibility, and trying in descending or ascending order of size is effective.

With respect to a combination of a given resolution k and an m bits area, using prime numbers within the range whose lower limit is 2^(m/k) as individual identifiers, the search range may be limited using the fact that at least one of the individual identifiers is larger or smaller than the k-root of the collective identifier. The effect of making the magnitudes of individual identifiers close to each other is the same as the case of k=2.

In addition, using only odd prime numbers as individual identifiers, and by further referring to lower 2 bits and creating a tables separately about prime numbers that gives reminder 1 when divided by 4, the search range in the table of individual identifiers may be limited as follows.

When a collective identifier divided by 4 gives reminder 3, one of the prime numbers divided by 4 gives reminder 3, the other divided by 4 gives reminder 1, and therefore, by dividing the table of prime numbers into two according to the "reminder of division by 4", an individual identifier is always included in both of the tables, and the search range becomes about half by performing the search first in the range of one of the tables. When the collective identifier divided by 4 gives reminder 1, the method of searching the range of one of the tables first increases the search time in the case when an individual identifier is not included in the table, and therefore, the search time is averaged by starting by searching a table in which all the individual identifier candidates are included from the beginning instead.

Meanwhile, when each node reports which one the reminder of division of the individual identifier is in parallel to the reduction result using logical OR, it becomes possible to determine which one the reminder is even when reminders of divisions of two individual identifiers by 4 are the same, the search range becomes about half. This is an example of the method explained in the fourth embodiment.

It is also possible to sort individual identifiers according to the reminder of division by a divisor other than a power of 2. For example, the reminder of division by 3, the reminder of division by 5, the reminder of division by 7, and the like are prepared in advance. As the distribution of prime numbers that are to be primer factors of the individual identifiers, for example, a condition may be attached according to the search procedure for individual identifiers, such as to make the distribution even with respect to each reminder, or to make only the prime number that gives a specific reminder as prime factors of individual identifiers.

For example, when the reminder of division by 3 is 1 or 2 and the reminder of the product of two numbers is 1, it is recognized that the two reminders are the same each other.

On the other hand, when the reminder of the product of two numbers is 2, it is recognized that at least one of the reminders is 1 and the other is 2, and therefore, by searching only one of them, the prime factor is always found. Therefore, the search range becomes half.

The probability that the hash value according to the reminders of divisions of two numbers by 4 and the hash value according to the reminders of division of two numbers by 3 becomes the same is about ¼ (when the proportions of individual identifiers having the respective identifiers are even). Thus, when combined with the hash value according to the reminders of division by 3, the search time becomes about half at the probability of about ¾. By further using a hash value according to a reminder with another number, it is even possible to reduce the search time at a larger rate.

Generally, the cost (in terms of time) of calculation instruction by a calculator is much smaller than the memory reference cost, and therefore, speeding up is realized in some cases by adding a process that requires calculation by a calculator to reduce the reference cost. The cost of division is relatively high among processes that use a calculator, but with respect to divisions by 3, 5, 7 for example, a relatively fast algorithm has been known such as the one disclosed in the document [6] cited in the fourth embodiment. For this reason, the time for additional division process (or a process for obtaining a reminder) is excepted to be sufficiently shorter compared with the effect of reducing the search range.

With respect to the reminder of division by another number, the search range may also be narrowed in some cases according to the condition about the reminder of divisions that have already been tried. That is, assuming a set of individual identifiers $Q=\{q\_1, q\ 2, \ldots, q\_i\}$ and by sorting the respective elements of $Q-\{q\_1\}=\{q\_2, \ldots, q\_i\}$ as $Q\_1, Q\_2, \ldots, Q\_j$ according to the reminder of division by $q\_1$, among $Q\_1, Q\_2, \ldots, Q\_j$, the ones that do not include the generation factor of the collective identifier may be specified according to the condition about the reminder of division of the collective identifier by $q\_1$.

Furthermore, it is possible to adjust the set of individual identifiers so as to increase the reduction effect for the search range according to the hash function. In a table of individual identifiers for which "collision" occurs with the value of a certain hash function and a search is required, by removing candidates of individual identifiers in order starting from the one with more "collisions" from the table, the average search range decreases according to the reduced "collisions".

FIG. 56 is a flowchart illustrating an example of a search process in the list of individual identifiers in the eleventh embodiment. Here, an example of a general process for limiting the individual identifier table by a hash value and performing the search is presented.

The hash value of an individual identifier is stored in a work area h (step S5601). A table of individual identifiers corresponding the hash value indicated by the work area h is stored in a work area L (step S5602). A search for the individual identifier is performed in the work area L, and the management target number is obtained (step S5603).

Figure 57:
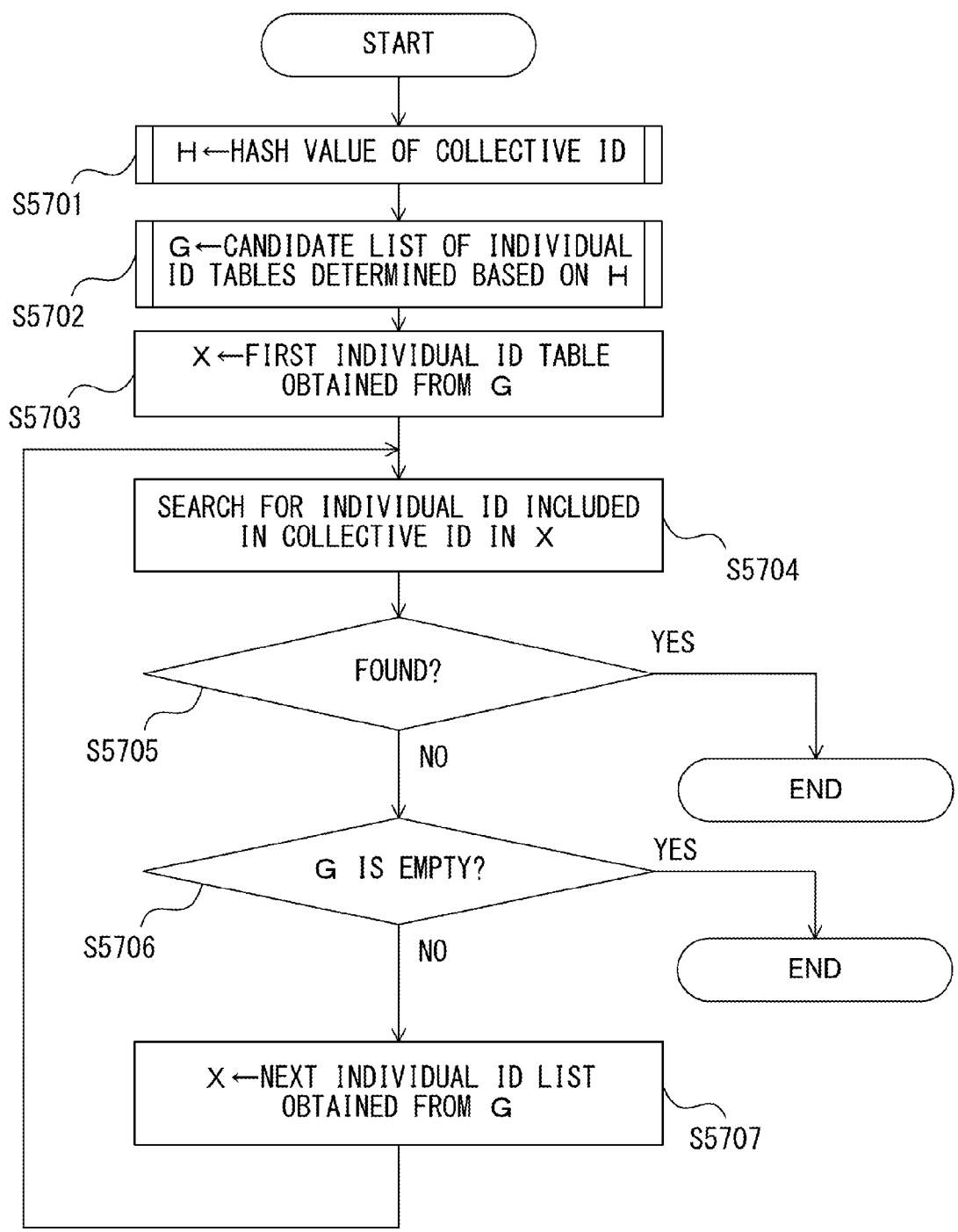
FIG. 57 is a flowchart illustrating an example of a specific process of a search process in an individual identifier list in the eleventh embodiment.

FIG. 57 is a flowchart illustrating an example of a search process in the individual identifier list in the eleventh embodiment. Here, an example of a process for limiting the range of the hash value of individual identifiers by the hash value of the collective identifier in order to limit the table of individual identifiers is described.

The hash value of the collective identifier is stored in a work area H (step S5701). The candidate list of individual identifier tables determined by the work area H is stored in a work area G (step S5702). The first individual identifier table is taken out from the work area G and stored in a work area X (step S5703). An individual identifier included in the collective identifier is searched in the work area X (step S5704).

Whether or not an individual identifier has been found is judged (step S5705). When the judgment in step S5705 is YES, the search process is terminated. When the judgment in step S5705 is NO, whether or not the content of the work area G is empty is judged (step S5706). When the judgment in step S5706 is YES, the search process is terminated. When step S5706 is NO, the next individual identifier list is obtained from the work area G (step S5707), while returning to step S5704, and the next search is continued.

Figure 58:
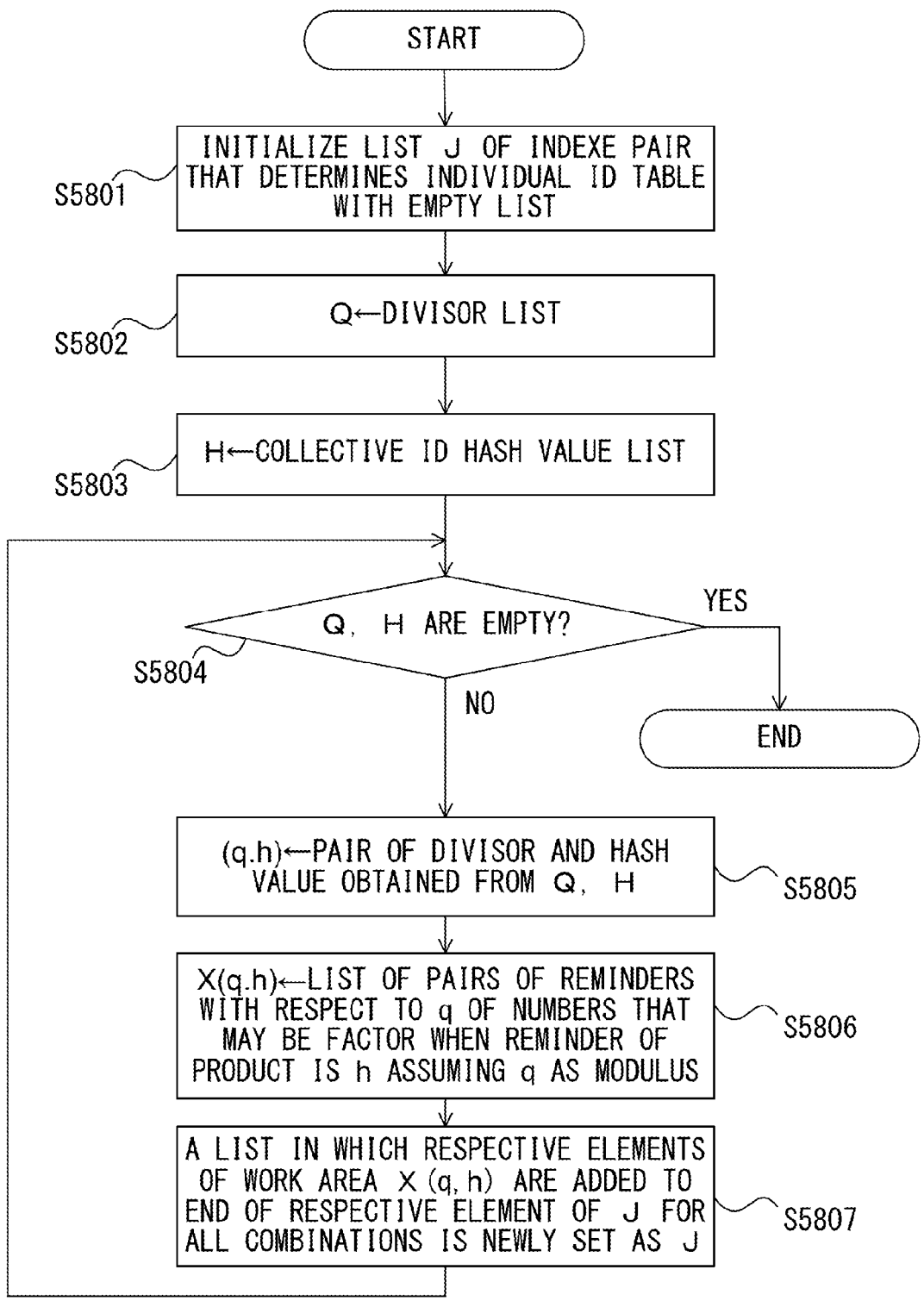

FIG. 58 is a flowchart illustrating an example of a search process in the individual identifier list in the eleventh embodiment. Here, an example of creation process for an individual identifier table candidate list according to the hash value of the collective identifier is described.

A list J of combinations of indexes that determine the individual identifier table is initialized with an empty list (step S5801). A divisor list is stored in a work area Q (step S5802). A hash value list of the collective identifier is stored in the work area H (step S5803).

Whether or not the work area Q or the work area H is empty is judged (step S5804). When the judgment in step S5804 is NO, a pair of the divisor and the hash value is obtained respectively from the work areas Q, H, and stored in a pair (q,h) of the work area (step S5805). A list of pairs of reminders with respect to q of numbers that may be the factor when the reminder of the product is h, assuming q as the modulus is stored in the work area X (q, h) (step S5806). A list in which the respective elements of work area X (q,h) are added to the end of the respective elements of J for all the combinations is newly set as J (step S5807). After that, returning to step S5804, the process is continued. When the judgment in step S5804 becomes YES, the process is terminated.

FIG. 59 is a flowchart illustrating an example of a search process in the individual identifier list in the eleventh embodiment. Here, an example in which combinations of reminders according to a plurality of divisors are used as the hash value list of identifiers is described.

A divisor list is stored in a work area Q (step S5901). Whether or not work area Q is empty is judged (step S5902). When the judgment in step S5902 is NO, divisor q is taken out from the work area Q, reminder r with respect to q of the identifier is obtained, and r is added to the hash value list (step S5903). After that, returning to step S5902, the process is continued. The process is terminated when the judgment in step S5902 becomes YES.

A specific example of the search process is described below. Here, k is 2. Prime numbers are odd numbers that are larger than 5, and the hash values are assumed as "the reminder of division by 4", "the reminder of division by 3". A set of appropriate prime numbers is determined and equally divided into four by combinations of "the reminder of division by 4" and "the reminder of division by 3". Then, the product of two prime numbers=the reminder of the collective identifier is as follows.
The reminder of the product:
When the division of the product by 4 gives reminder 3, one of the prime numbers divided by 4 gives reminder 1, and the other of the prime numbers divided 4 gives reminder 3.
When the division of the product by 4 gives reminder 1, division of both the prime numbers divided 4 gives the same reminder.
When the division of the product by 3 gives reminder 2, one of the prime numbers divided by 3 gives reminder 1, and the other of the prime numbers divided by 3 gives reminder 2.
When the division of the product by 3 gives reminder 1, division of both the prime numbers divided 3 gives the same reminder.

By preparing tables sorted by the combination conditions of reminders of the product divided by 3, and by 4, the search time in the table becomes ¼.

In the process in the flowchart in FIG. 58, assuming, Q={3,4}(divisors), H={5,7,11,13,17} (prime numbers), the left side representing the reminder of division by 3 and the right side representing the reminder of division by 4, the following outputs are obtained by the process.
Output:
5→(2,1)
7→(1,3)
11→(2,3)
13→(1,1)
17→(2,1)

In the process of the flowchart in FIG. 59, the following four groups are created from Q={3,4}(divisor) by the process.
(1) Reminder is 1 when divided by 3, and reminder is 1 when divided by 4
(2) Reminder is 2 when divided by 3, and reminder is 3 when divided by 4
(3) Reminder is 1 when divided by 3, and reminder is 3 when divided by 4
(4) Reminder is 2 when divided by 3, and reminder is 3 when divided by 4

For example, 55 as a result of multiplication of prime numbers 5 and 11 (=5×11) is a number that gives reminder of 1 when divided by 3, and gives reminder of 3 when divided by 4, and therefore, it belongs to the group 3.

According to the eleventh embodiment described above, in the same manner as in the case of the tenth embodiment, it is possible to limit the search range for individual identifiers. In addition, including a case in which the tenth embodiment is used together, it is possible to reduce the required amount of system resources for the CPU 702-1 of the reception relay node 702 in FIG. 7 compared with the case of the tenth embodiment (alone), by eliminating the need for, or reducing communication required for reduction of "the group individual identifier (virtual, for management)".

In the eleventh embodiment, the communication data amount does not increase, and the cost of added calculation is kept within the range in which it is smaller than the cost of memory access (here, it means "processing delay due to memory access"). Therefore, especially by using a combination of a plurality of hash functions, the memory access cost is significantly reduced.

<Twelfth Embodiment>

In the same manner as the case in the eleventh embodiment, a case of searching a table in the course of specifying the individual identifier from the collective identifier, or a case of searching a table in the process of specifying the management target from the individual identifier is considered. As a special case of the hash method mentioned in the eleventh embodiment, it is possible to use an approximate expression obtained by applying the "regression analysis" or "discrete Fourier transform" to the following combinations of data.

{a set of individual identifiers} and {a set of management target numbers}

{a set of collective identifiers} and {a set of individual identifiers}

In the twelfth embodiment, the search range in the search process with respect to identifiers is narrowed using the "regression analysis" and "discrete Fourier transform", and accordingly, the memory access amount is limited and speeding-up is realized. The twelfth embodiment may also be considered as one of methods that uses "hash function", but the nature is significantly different from the hash function mentioned in the eleventh embodiment. It uses floating-point calculation, which is another difference from the eleventh embodiment that uses integer operation.

In the tenth embodiment, the operation used for the reduction unit 404 (FIG. 4) is limited to multiplication, whereas the twelfth embodiment is intended for the case in which the operation used for the reduction unit 404 is addition as well. Therefore, the twelfth embodiment may be applied to the following search range.

(1) The search range in a case when the management target number is obtained from (the component of) the individual identifier. Meanwhile, there is one-to-one correspondence between the management target number that is the response variable (dependent variable) and the individual identifier that is the explanatory variable (independent variable) and "a perfect hash function" may also be possible.

(2) The search range for (the component) of the individual identifier from (the component of) the collective identifier. The correspondence between the collective identifier and the individual identifier is not one-to-one, and therefore, for example, by determining "one representative" that is the smallest, the largest or others according to the order relationship between individual identifiers, the regression analysis may be applied to the individual identifier as a function of the collective identifier. The order relationship between (the components of) individual identifiers is determined as the following relationships for example. The relationship of magnitudes as numbers. The relationship of magnitudes as a whole according to the components and the lexicographic order between the number components. In addition, the relationship of magnitudes according to "norm" of the algebraic integer, the magnitude relationship between coefficients and the lexicographic order (with respect to "the base" as a vector space) corresponding to each coefficient. Generally, when the correspondence is not one-to-one (when there is no inverse function), it is impossible to obtain an effective appropriate expression only by a regression analysis using a one-variable linear expression, and therefore, the non-linear regression analysis is used. For example, by dividing into a plurality of sections for each range of magnitudes, the correspondence in each section is one-to-one, and a linear approximate expression may become effective in some cases. The discrete Fourier transform and multiple regression analysis (to which a variable transformed by a function that is not a periodic function or a monotonically increase function) are still effective in the case when the correspondence is not one-to-one.

In explaining the twelfth embodiment, the case in which the individual identifier has a plurality of components as in the six embodiment may be handled using the same calculation in the case of the fifth embodiment where there is only one component. For this reason, the management target numbers (not the numbers itself of the management targets) are stored in a multidimensional array in which the respective dimensions are equal to the number of elements of the set of corresponding components, and the components of the individual identifier and the indexes of the multidimensional array are associated with each other. The process for making the respective components of the (one-dimensional) individual identifier with the management target number in the fifth embodiment and the process for obtaining the correspondence between the respective components of the individual identifier and the indexes of the multidimensional array in the sixth embodiment become equivalent.

Hereinafter, in order to simplify explanation, the explanation is given assuming that the number of components is one in the fifth embodiment, unless otherwise stated. This does not spoil the generality, as described above that the calculation methods are equivalent.

When associating the numbers used as individual identifiers with the numbers of the management targets, each of the tables is sorted in order of magnitude, in a way in which, with respect to individual identifiers $p1$, $p2$ that respectively correspond to two numbers $n1$, $n2$, either one of the following conditions is satisfied.

(1) When $n1<n2$, always $p1<p2$ (2) When $n1<n2$, always $p1>p2$

Here, the "regression analysis" is executed between the numbers of the management targets and individual identifiers, to create a linear approximate expression. For example, in a case in which it is desired to know the number when the individual identifier is obtained, a linear approximate expression whose explanatory variable is the individual identifiers is created by the regression analysis.

The liner approximation is assumed as $n=A*p+B$, and the absolute value of the error in the case when the error with this approximation becomes largest is assumed as E. In this case, the search range in obtaining the corresponding number when an individual identifier p is found is limited inside a section $[z-E-1, z+E+1]$ assuming the integer that is closest to the value obtained from the approximation is z. In consideration of the sign of the error, assuming the largest error in the case of "excessively small" as E, and the largest error in the case of "excessively large" as F, the search range is limited inside a section $[z-E-1, z+F+1]$. By dividing the range of p into s sections and obtaining the largest error $\{(-E1, F1), \ldots (-Ei, Fi), \ldots (-Es, Fs)\}$ in consideration of the sign in each section, the search range for the number in the i-th section is limited within $[z-Ei-1, z+Fi+1]$.

Note that the error mentioned above may be made smaller using the following means (including combinations thereof).

(1) To remove numbers that make the error in the approximate expression larger. When missing in numbers is not allowed, numbers are assigned again and the regression analysis is executed again.

(2) To divide individual identifiers into groups and to use a separate linear approximate expression. This corresponds to the use of "the local linear model" that is a type of a nonlinear regression analysis in terminology for the regression analysis. For example, by sorting by magnitude, grouping is applied for the ones whose magnitudes are close.

(3) To apply a nonlinear regression analysis using a function that is not a linear expression to the individual identifiers and numbers. For example, the regression analysis using a linear expression for a set of numbers in which the elements (or the components of the elements) of one or both are converted using power, the legalistic function, the exponential function, the trigonometric function, or an expression such as the sum of these is a nonlinear regression analysis between original data sets. By converting the respective variables using one function or a plurality of functions that are not a linear expression, executing "the multiple regression analysis" in which these are added as new variables and turning it back to the relational expression between the original variables, an approximate expression whose fit is improved is obtained. By increasing explanatory variables, an expression whose fit is improved is always obtained (in the worst case, making the coefficient of the added variable 0, it is impossible that the fit deteriorates), and therefore, the set of individual identifiers is data that may be selected at the time of designing, not statistical data in the original since, there is no need to consider "appropriateness of addition of variables to the model" as with the case of processing of statistical data. In this embodiment, it will do as long as the fit of the expression is simply improved.

(4) To execute a nonlinear regression analysis by combining a linear regression analysis and discrete Fourier transform. For example, discrete Fourier transform is executed with respect to the error term of the linear approximation obtained by the linear regression analysis to make an expression to approximate the error term by the sum of trigonometric functions, and it is added to the original linear expression.

Meanwhile, when using addition as reduction, the procedure in searching for the individual identifier from the collective identifier is the same as the procedure in searching for the number of the management target from the individual identifier, except that the eventual correspondence is generally not one-to-one basis. This is because, when using a linear approximate expression, when the values of approximate expressions are different for combinations corresponding eventually to the same individual identifier, it is regarded that the error of one of them is large. When the discrete Fourier transform is used, the same value is allowed to appear for different variables an approximate expression, and therefore, there is no particular problem.

FIG. 60 through FIG. 65 are flowcharts illustrating an example of a speeding-up process for making individual identifiers and management target numbers correspond in the twelfth embodiment.

Figure 60:
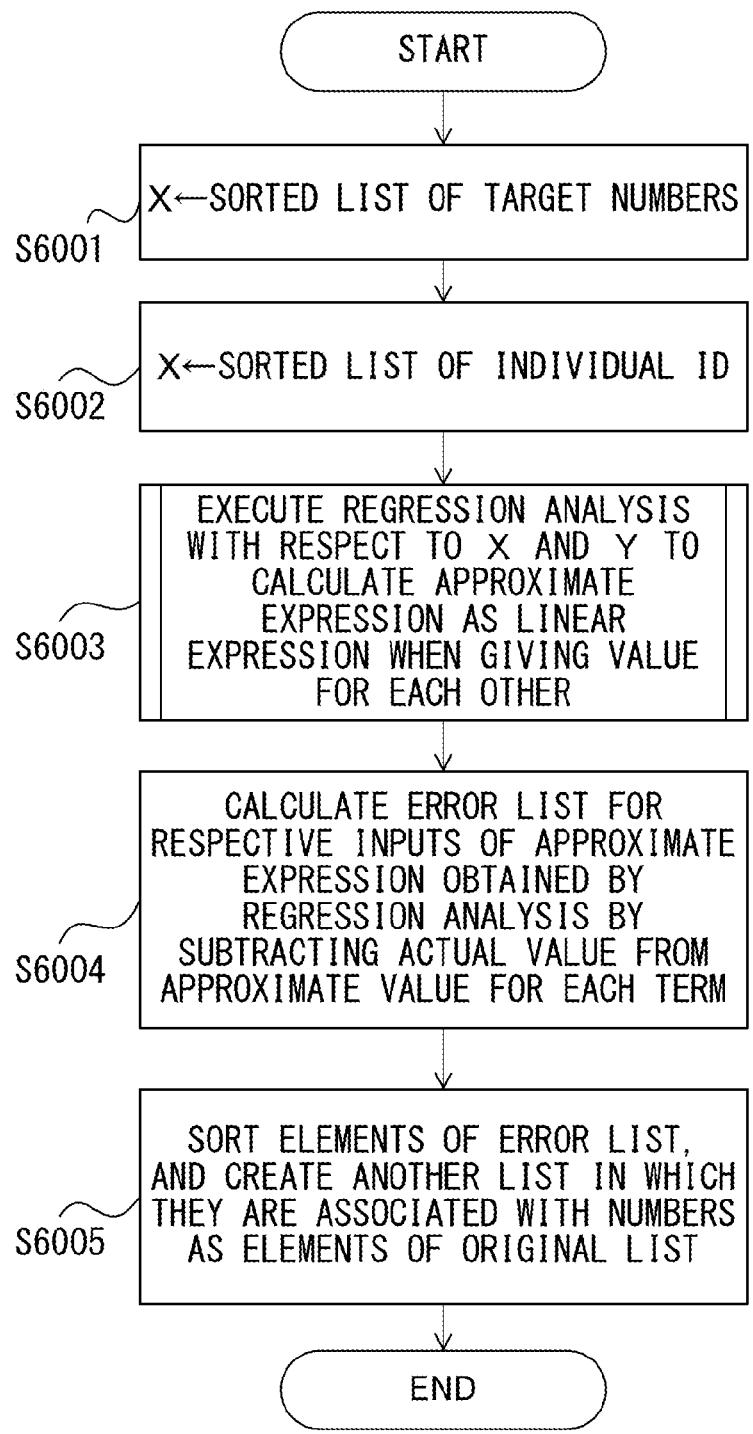

FIG. 60 illustrates an example of a creation process for a linear approximate expression between management target numbers and individual identifiers by the regression analysis.

A sorted list of management target numbers is stored in a work area X (step S6001). A sorted list of individual identifiers is stored in a work area Y (step S6002). A regression analysis is executed with respect to X and Y, and an approximate expression as a linear expression in which the input for each is the other is calculated (step S6003). An error list for the respective inputs of the approximate expression obtained by the regression analysis is calculated by subtracting the actual value from the approximate value for each term (step S6004). The elements of the error list are sorted, and another list in which they are associated with numbers as the elements of the original list, that is, a table in which the error list is associated with the list of sorted management target number is created (step S6005).

Figure 61:
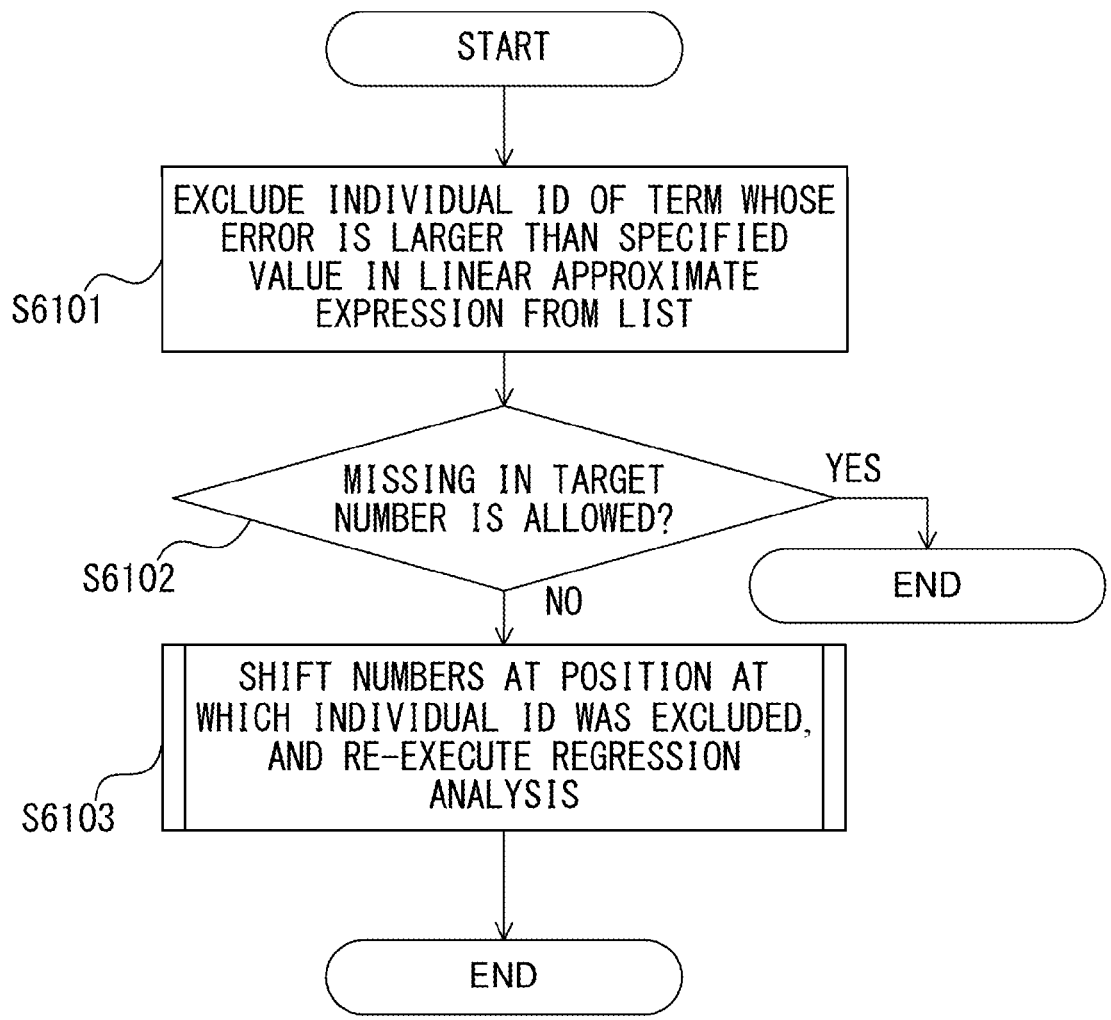

FIG. 61 illustrates an example of improvement in accuracy of the linear approximate expression by removing the portion of a large error.

The individual identifier of the term whose error is larger than a specified value in the linear approximate expression is removed from the list (step S6101). Whether or not missing in the management target numbers is allowed is judged (step S6102). When the judgment in step S6102 is YES, the process is terminated. When the judgment in step S6102 is NO, the numbers are shifted at the position at which the individual identifier was removed, and the regression analysis is re-executed (step S6103).

FIG. 62 illustrates an example of improvement in accuracy of the linear approximate expression by the local linear model.

The portion at which the error is larger than a specified value is selected from an error term list sorted by magnitude of error (step S6201). The set of data is divided at a border that is the number of the portion at which the error is larger (step S6202). To each of the divided sets of data, the regression analysis is executed again, to obtain the linear approximate expression for each set (step S6203).

FIG. 63 illustrates an example of improvement in accuracy of the linear approximate expression by the discrete Fourier transform of the error.

The discrete Fourier transform is applied to the list of error terms obtained by the liner regression analysis, and an approximate expression of error terms is created (step S6301). The original linear approximate expression and the approximate expression of error terms are added, and a nonlinear approximate expression is obtained (step S6302).

Figure 64:
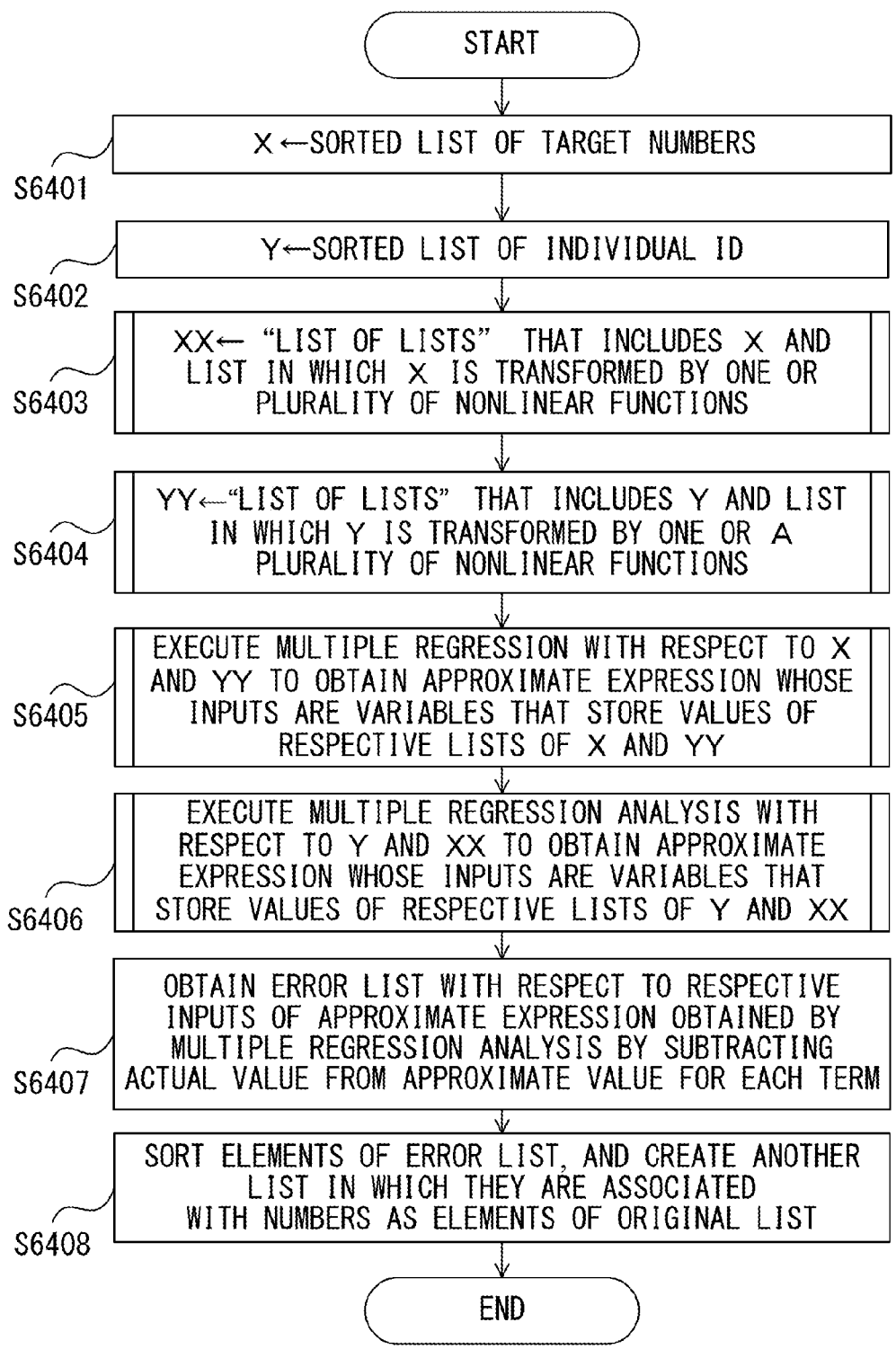

FIG. 64 illustrates an example of a creation process for a nonlinear approximate expression by the multiple regression analysis.

A sorted list of management target numbers is stored in the work area X (step S6401). A sorted list of individual identifiers is stored in the work area Y (step S6402). "A list of lists" consisting of X and a list in which X is transformed by one or a plurality of nonlinear functions is stored in a work area XX (step S6403). In the same manner, "a list of lists" consisting of Y and a list in which Y is transformed by one or a plurality of nonlinear functions is stored in a work area YY (step S6404).

A multiple regression analysis is executed with respect to X and YY, and an approximate expression whose inputs are variables that store the values of the respective lists of X and YY is obtained (step S6405). In the same manner, a multiple regression analysis is executed with respect to Y and XX, and an approximate expression whose inputs are variables that store the values of the respective lists of Y and XX is obtained (step S6406). An error list with respect to the respective inputs of the approximate expression obtained by the multiple regression analysis is obtained by subtracting the actual value from the approximate value for each term (S6407). The elements of the error list are sorted, and another list in which they are associated with the numbers as the elements of the original list is created (step S6408).

Figure 65:
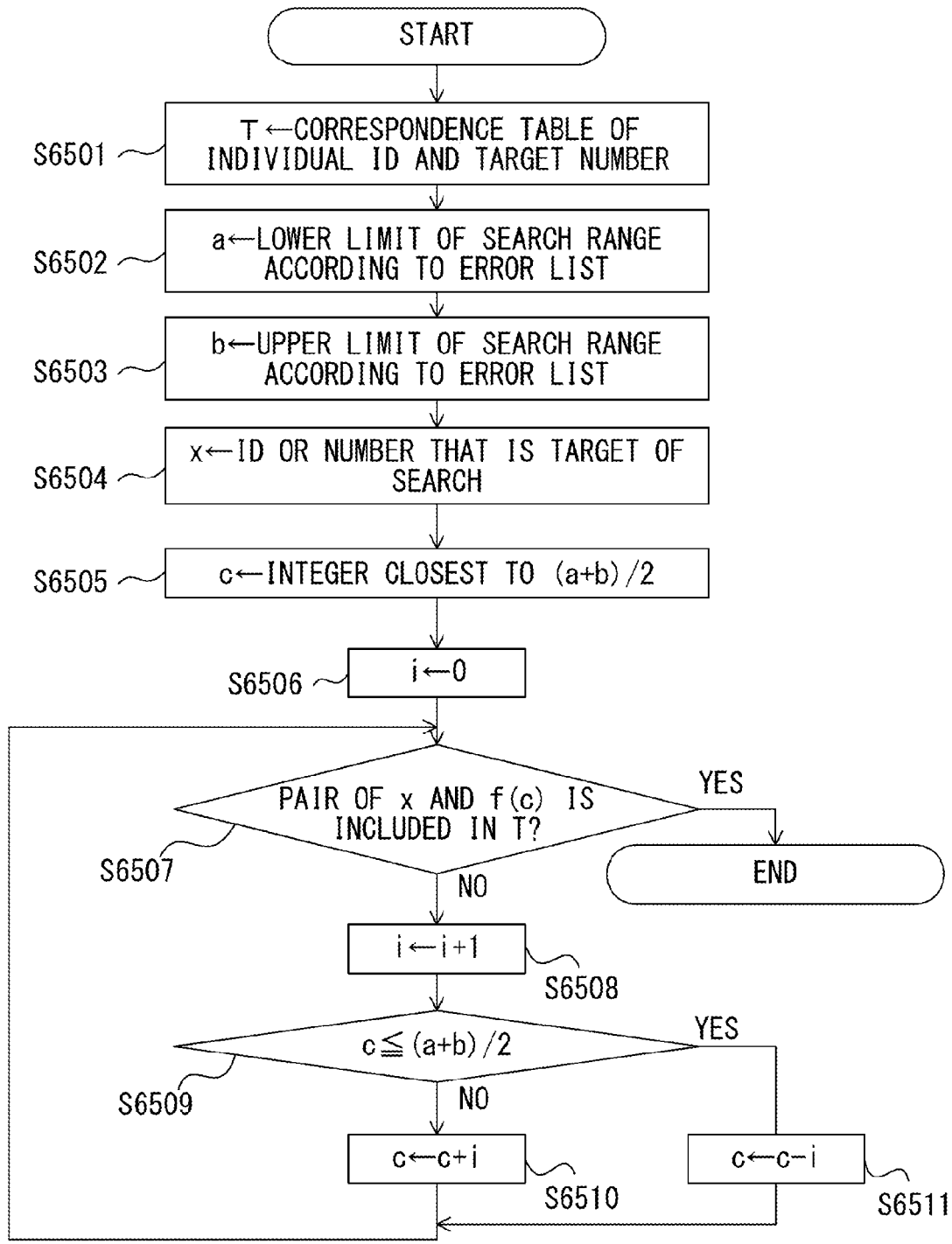

FIG. 65 illustrates an example of a search process using an approximate expression f(x) created by the regression analysis as the hash function.

A correspondence table of individual identifiers and management target numbers is stored in a work area T (step S6501). The lower limit of the search range according to the error list is stored in a work area a (step S6502). The upper limit of the search range according to the error list is stored in the work area b (step S6503). The identifier or the number of a search target is stored in a work area x (step S6504). An integer that is closest to an average value (a+b)/2 of the value of the work area a and the value of the work area b is stored in the work area c (step S6505).

Initial value 0 (zero) is stored in a work area I (step S6505). Then the following processes are repeatedly performed while the variable i is incremented by +1 in step S6508, until it is determined that the pair of x and f(c) is included in T in step S6507. That is, whether or not the value of the work area c is equal to or smaller than the average value (a+b)/2 is judged (step S6509). When the judgment in step S6509 is NO, i is added to the value of the work area in step S6510, and when the judgment in step S6509 is YES, i is subtracted from the value of the work area c in step S6511. As a result of the repeated operations above, the pair of x and f(c) is included in T. When the judgment in step S6507 becomes YES, the search process is terminated.

In the twelfth embodiment explained above, the fit of the linear approximate expression is improved relatively easily by excluding prime numbers from the one whose error is larger from the set of individual identifier as needed without transform using functions when the fit of the linear approximate expression according to the regression analysis described above is good in the first place, the fit of the linear approximate expression, as in the case of the set {prime numbers that are larger than or equal to 1627 and smaller than $2^{16}-1$}.

The number of elements of a set of {prime numbers that are larger than or equal to 1627 and smaller than $2^{16}-1$} is larger than 6000, and furthermore, by using a plurality (the number being a) of 32-bit areas according to the sixth embodiment, the number of management targets that can be handled may be a-th power of the number that may be handed using one area. For this reason, even if the number of prime numbers used in one area is reduced to about several hundreds, several tens of thousands to several hundreds of thousands of management targets may be handed when using two 32-bit areas. As described above, when the sixth embodiment is given as a precondition, even when another characteristic is attached to the prime numbers, the characteristic that "more management targets may be handled using an area of the size that is smaller or about the same level" may be easily maintained compared with the second and third embodiments. Furthermore, the fit of the linear approximate expression may be certainly improved also by dividing into a plurality of ranges according to the size.

According to the transform by functions, when the fit is bad using a linear approximate expression (when there is a large nonlinearity in the statistical relationship between the respective sets of numbers and individual identifiers), the number of divisions of the set of individual identifiers may be reduced according to the size, and overhead of the condition judgment process in obtaining the number may be reduced.

Meanwhile, in the twelfth embodiment, data are integers, and therefore, as long as the approximate expression satisfies the condition "the error is smaller than 0.5" for all the input data, "the perfect hash function" may be obtained by taking the integer portion of the approximate expression. Even when it does not become "the perfect hash function", the search range may be limited to the range of "a fixed width around the approximate value". That is, the memory reference mount may be kept within the range of a fixed value.

<Thirteenth Embodiment>

The thirteenth embodiment includes elaboration about speeding up of the calculation for obtaining the individual identifier from the (component of) the collective identifier in the fifth or sixth embodiment, in the same manner as the eleventh embodiment. As explained in the eleventh embodiment, the idea of "when the resolution is limited by the upper limit k" and the operation is multiplication to take out the individual identifier from the collective identifier calculated by the reduction by multiplication, using "the uniqueness of factorization in prime factors". Therefore, the required time for "factorization in prime factors" is an important factor in speeding-up of the processing performance of the system.

For example, by associating the components of the individual identifier with the indexes of a multidimensional array that stores the numbers of the management targets, the case in which the individual identifier has a plurality of components like the sixth embodiment may be handled in the same manner as the case of the fifth embodiment where there is only one component. Hereinafter, unless otherwise stated, the number of components is assumed as 1.

In the eleventh embodiment, when obtaining the individual identifier from the collective identifier, elements of a set of individual identifier (or its components) are sequentially selected and divisions of the collective identifier (or its components) is sequentially executed, a speeding-up method within this frame is used. Therefore, especially when (the components of) individual identifiers are prime numbers, "a method by sequential divisions by numbers that may be the factor (brute force method)" is used.

In the thirteenth embodiment, one or a combination of algorithms of factorization in prime factors other than the brute force method, such as the following ones for example. Any algorithm may be combined with brute force method. A common feature among these algorithms (that is, the difference over the brute force method) is that "a set of prime numbers that may be factor" is not used as input.

(1) ρ method (a method using "pseudo-random number sequence")
(2) p−1 method (a method that is effective when p−1 has a relatively small prime factor with respect to a prime number p)
(3) p+1 method (a method that is effective when p+1 has a relatively small prime factor with respect to a prime number p)
(4) Fermat's method (a method that is effective when the prime factor is close to the square root of the original number)
(5) Continued Fraction Method
(6) MPQS: Multiple Polynomial Quadratic Sieve Method
(7) ECM: Elliptic Curve Method These algorithms are known as propositions in the field of mathematics called "number theory" or basic algorithms in computer science, as presented in the document [7] below for example.

[7] Donald E. Knuth, "The Art of Computer Programming, Volume 2"

However, there are some algorithms that are not used very often as "factorization in prime factors" as a problem in "number theory", that is, as "an operation to obtain at least one prime factor that is given using input that is an integer for which it is not necessarily known whether it is a prime or not". This is because an algorithm that is not capable of "obtaining the prime factor except in a certain few cases" or that is "slow except in a certain few cases" are not suitable for a general situation "in which the number as the target of factorization in prime factors is arbitrarily selected".

However, in the thirteenth embodiment, the purpose may be achieved by selecting the set of (the components) of individual identifiers such that "at least one prime factor is obtained at a high speed by the algorithm used", and the method that is regarded as poor in generality as algorithms of factorization in prime factors as a problem in the usual number theory (the p−1 method, p+1 method, Fermat's method and so on) may also be effectively used. For example, Fermat's method is known to be fast only when the prime factor is close to the square root of the original number, and therefore, it may be used effectively by making the magnitudes of (the components of) individual identifiers close to each other as much as possible when the resolution k=2. Meanwhile, in algorithms of factorization in prime factors other than the brute force method, after the prime factor is obtained, the number of the management target is separately obtained.

FIG. 66 is a flowchart illustrating an example of a process for obtaining at least one prime factor that is an integer by an algorithm other than the brute force method An empty list is stored in a work area L (step S6601). The collective identifier is stored in a work area X (step S6601). One of prime factors of the value of the work area X is stored in a work area p (step S6603). An initial value 1 is stored in the work area i (step S6604).

The processes from step S6605 to S6607 are repeatedly executed until it is judged in step S6606 that the value of work area X is no longer divisible by the value of the work area p, while the value of the work area i is incremented by +1 each time. During repeated process, the result (X/p) of division of the value of the work area X by the value of the work area p is newly stored in the work area X (step S6605).

Whether or not the value of the work area X is divisible by the value of the work area p is judged (step S6606). When the judgment in step S6606 is YES, the value of the work area i is incremented by +1, and step S6605 is executed again. When the judgment in step S6606 becomes NO as a result of the above repeated process, a pair (p,i) of the prime factor of the collective identifier and the index is added in the work area L as an element (step S6608).

After that, whether or not the value of the work area X has become equal to 1 that is the identity element of the multiplication operation is judged (step S6609). When the judgment in step S6609 is NO, returning to the process in step S6603, the process with respect to the next prime factor in the work area X is repeated. When the judgment in step S6609 becomes YES, the processes in the flowchart in FIG. 66 are terminated.

As described above, in the thirteenth embodiment, by using algorithms of factorization in prime factors that do not use "a set of prime numbers that may be the factor" as input, when obtaining the collective identifier from the individual identifier, the memory reference amount may be reduced compared with the case of the method of referring to "a table of numbers that may be the factor". Especially when "the collective identifier that needs factorization" is large because one or both of the resolution k or the prime number used for the component of the individual identifier is large, it is effective in both the aspect of speeding up and the aspect of reducing the processing load.

<Fourteenth Embodiment>

The fourteenth embodiment includes elaboration about speeding up of the calculation for obtaining the individual identifier from the collective identifier in the fifth or sixth embodiment, in the same manner as in the thirteenth embodiment.

For example, by making the components of the individual identifier correspond to the indexes of a multidimensional array that stores the numbers of the management targets, the case in which the individual identifier has a plurality of components like the sixth embodiment may be handled in the same manner as the case of the fifth embodiment where there is only one component. Hereinafter, unless otherwise stated, the number of components is assumed as 1. In addition, the fourteenth embodiment is based on the presupposition of a system configuration in which the receiver side node is "a quantum computer (a computer equipped with an arithmetic calculator that performs calculation of quantum bit (Qubit)).

In order to specify the (component of) individual identifier from the (component) of the collective identifier in the fifth, sixth embodiments using Shor's algorithm, using factorization in prime factors according to Shor's algorithm, an arithmetic calculator that performs calculation using quantum bits (Qubits) is used. The document [8] below discloses "Shor's algorithm" for performing factorization in prime factors on a quantum computer "in a polynomial time (=a time that is impossible for a conventional computer).

[8] Peter W. Shor, "Polynomial-Time Algorithms for Prime Factorization and Discrete Logarithms on a Quantum Computer", SIAM. Journal on Computing Volume 26 Issue 5, January 1996, Pages 1-28

FIGS. 67A and 67B illustrate the difference between the thirteenth and fourteenth embodiments. In the thirteenth embodiment, as illustrated in FIG. 67A, using a usual computer equipped with a general CPU that performs operation of usual bits and a memory, a computer that executes the an algorithm of factorization in prime factors other than the brute force method may realize the ID gathering mechanism 401 or ID analysis mechanism 402 in FIG. 4. Meanwhile, in the fourteenth embodiment, in addition to a general CPU that performs operation of usual bits and a memory, a quantum computer that is an arithmetic calculator that performs operation of quantum bits (Qubits) is used. This quantum computer realizes the ID gathering mechanism 401 or the ID analysis mechanism 402 in FIG. 4.

"The quantum computer" may be an independent computer, or may be an arithmetic calculator as "an auxiliary processor that has only a function for executing factorization in prime factors by Shor's algorithm", as illustrated in FIG. 67B. "Shor's algorithm" does not search a table in the course of factorization in prime factors, and the procedure for obtaining the number of the management target from the obtained prime factor is executed separately.

According to the fourteenth embodiment explained above, by using Shor's algorithm on a quantum computer, factorization in prime factors may be performed "in polynomial time (with respect to the size of the number that is the target of factorization in prime factors". That is, the processing time for factorization in prime factors is maintained at a size that may be expressed by a polynomial whose variable is the magnitude of the number that is the target of factorization in prime factors.

Factorizations in prime factors in a method that does not use a known quantum computer all require "a subexponential time" (the calculation time increases at a rate that is the same level as the exponential function whose argument is the magnitude of input data"). However, even when the number that is the target of factorization is in a size for which it is impossible to perform factorization in prime factors in a realistic processing time by known other methods, it becomes possible to perform factorization in prime factors in a realistic processing time by using Shor's algorithm on a quantum computer.

Therefore, according to the fourteenth embodiment, "a case in which "in the process for obtaining the individual identifier from the collective identifier", "the components of the collective identifier to be factorized are too large to be handled within a realistic processing time in other embodiments" may be handled within a realistic processing time. That is, the number of management targets that may be handled in the fifth, sixth embodiments may be drastically increased, and the resolution k may also be increased. For example, when applying the ID gathering mechanism 401 and the ID analysis mechanism 402 to distributed parallel computing of a large-scale sparse matrix, it is expected that a larger resolution k compared with the application to state monitoring is required in many cases, and thus the fourteenth embodiment is especially effective.

Currently, as a practical application of factorization in prime factors, the fact that, with respect to a pair p, q of two large prime numbers, even when the product pq is made public, it is difficult to calculate p, q by a conventional-type computer, and it may be regarded as "a secret key" is utilized. This application loses its value when factorization in prime factors using Shor's algorithm on a quantum computer becomes popular. Meanwhile, in the fourteenth embodiment, the fast execution of factorization in prime factors by a quantum computer leads to expansion of the applicable range.

<Other Embodiments>

As described previously, the first through fourteenth embodiments are not necessarily mutually exclusive, and may be combined as needed.

As described previously, the ID gathering mechanism 401 and the ID analysis mechanism 402 in FIG. 4 may be implemented by software processing of the CPU 701-1 or 702-1 in the node 701 or 702 that configures the information gathering mechanism in FIG. 7, FIG. 20, FIG. 21, or FIG. 22. In this case, a recording medium reader, that is provided in each node 701 or 702 or a relay 703 in FIG. 7, can read a control program recorded in a magnetic disk, an optical disk, a magneto-optical disk, and semiconductor memory or the like. The control program read by the recording medium reader is stored in the memory 701-2 or 702-2 in a specified node 701 or 702 directly or from the relay apparatus 703 via a communication line 704. The CPU 701-1 or 702-1 provides the functions of the ID gathering mechanism 401 and the ID analysis mechanism 402 in FIG. 4 according to the first through fourteenth embodiments by executing the control program stored in the memory 701-2 or 702-2.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information gathering system comprising:
a first processor, provided at a transmitter side node, configured to generate a collective identifier from one or a plurality of individual identifiers of respective management targets by performing a reduction operation, each of the individual identifiers being generated according to a state of a corresponding management target; and
a second processor, provided at a receiver side node, configured to restore an individual identifier from the collective identifier and specify a management target based on the restored individual identifier,
the first processor outputs a first parameter according to whether the transmitter side node is an origin node on a network,
when the transmitter side node is the origin node on the network, the first parameter is an identity element in the reduction operation, and
when the transmitter side node is not the origin node on the network and the transmitter side node receives an identifier from another node, the first parameter is the received identifier,
the first processor outputs a second parameter according to whether a condition in which information should be reported is satisfied at a management target managed by the transmitter side node,
when the condition is satisfied at the management target, the second parameter is an individual identifier specific to the management target, and
when the condition is not satisfied at the management target, the second parameter is an identity element in the reduction operation,
the first processor generates the collective identifier by performing the reduction operation on the first parameter and the second parameter, a length of the collective identifier is shorter than a sum of a length of the first parameter and a length of the second parameter, and
the second processor restores the individual identifier that is a generation factor of the collective identifier from the collective identifier, and restores information of the management target from the restored individual identifier.

2. The information gathering system according to claim 1, wherein barrier synchronization is performed between the transmitter side node and the receiver side node.

3. The information gathering system according to claim 1, wherein logical OR operation is executed with respect to management targets in a group in advance at the transmitter side node.

4. The information gathering system according to claim 1, wherein an ordered combination of a plurality of integers is associated with the transmitter side node.

5. The information gathering system according to claim 1, wherein the first processor uses uniqueness of factorization in prime factors and multiplication of algebraic integers in assignment of the individual identifier.

6. The information gathering system according to claim 1, wherein the first processor uses uniqueness of factorization in prime factors and addition of algebraic integers in assignment of the individual identifier.

7. The information gathering system according to claim 6, wherein the second processor uses the addition of algebraic integers to restore an individual identifier from the collective identifier.

8. The information gathering system according to claim 1, wherein a set of identifiers is divided into a plurality of groups.

9. The information gathering system according to claim 8, wherein a search range in a search process with respect to the identifiers is narrowed using a regression analysis or discrete Fourier transform.

10. The information gathering system according to claim 1, wherein the second processor restores an individual identifier from the collective identifier using an algorithm of factorization in prime factors that does not use a set of prime numbers that may be a factor.

11. The information gathering system according to claim 1, wherein the receiver side node is a quantum computer.

12. A non-transitory computer-readable recording medium having stored therein a program for causing a computer of a transmitter side node that is connected to a network to execute a process, the process comprising:

outputting a first parameter according to whether the transmitter side node is an origin node on a network,
when the transmitter side node is the origin node on the network, the first parameter is an identity element in the reduction operation, and
when the transmitter side node is not the origin node on the network and the transmitter side node receives an identifier from another node, the first parameter is the received identifier;
outputting a second parameter according to whether a condition in which information should be reported is satisfied at a management target managed by the transmitter side node,
when the condition is satisfied at the management target, the second parameter is an individual identifier specific to the management target, and
when the condition is not satisfied at the management target, the second parameter is an identity element in the reduction operation; and
generating a collective identifier by performing the reduction operation on the first parameter and the second parameter, a length of the collective identifier is shorter than a sum of a length of the first parameter and a length of the second parameter.

13. An information gathering method comprising:
generating, at a transmitter side node, a collective identifier from one or a plurality of individual identifiers of respective management targets by performing a reduction operation, each of the individual identifiers being generated according to a state of a corresponding management target; and
restoring, at a receiver side node, an individual identifier from the collective identifier to specify a management target based on the restored individual identifier,
a first processor that is implemented in the transmitter side node outputs a first parameter according to whether the transmitter side node is an origin node on a network,
when the transmitter side node is the origin node on the network, the first parameter is an identity element in the reduction operation, and
when the transmitter side node is not the origin node on the network and the transmitter side node receives an identifier from another node, the first parameter is the received identifier,
the first processor outputs a second parameter according to whether a condition in which information should be reported is satisfied at a management target managed by the transmitter side node,
when the condition is satisfied at the management target, the second parameter is an individual identifier specific to the management target, and
when the condition is not satisfied at the management target, the second parameter is an identity element in the reduction operation,
the first processor generates the collective identifier by performing the reduction operation on the first parameter and the second parameter, a length of the collective identifier is shorter than a sum of a length of the first parameter and a length of the second parameter, and
a second processor that is implemented in the receiver side node restores the individual identifier that is a generation factor of the collective identifier from the collective identifier, and restores information of the management target from the restored individual identifier.

* * * * *